(12) United States Patent
Guina

(10) Patent No.: US 10,063,119 B2
(45) Date of Patent: Aug. 28, 2018

(54) ELECTROMAGNETIC DEVICE

(71) Applicant: HERON ENERGY PTE LTD, Singapore (SG)

(72) Inventor: Ante Guina, Surfers Paradise (AU)

(73) Assignee: HERON ENERGY PTE LTD, Singapore (SG)

( * ) Notice: Subject to any disclaimer, the term of this patent is extended or adjusted under 35 U.S.C. 154(b) by 0 days.

(21) Appl. No.: 15/319,742

(22) PCT Filed: Jun. 17, 2015

(86) PCT No.: PCT/AU2015/050333
§ 371 (c)(1),
(2) Date: Dec. 16, 2016

(87) PCT Pub. No.: WO2015/192181
PCT Pub. Date: Dec. 23, 2015

(65) Prior Publication Data
US 2017/0133900 A1 May 11, 2017

(30) Foreign Application Priority Data

Jun. 17, 2014 (AU) .................................. 2014902313
Jun. 20, 2014 (AU) .................................. 2014902359
(Continued)

(51) Int. Cl.
*H02K 3/28* (2006.01)
*H02K 21/02* (2006.01)
(Continued)

(52) U.S. Cl.
CPC ................ *H02K 3/28* (2013.01); *H02K 3/04* (2013.01); *H02K 3/42* (2013.01); *H02K 7/11* (2013.01);
(Continued)

(58) Field of Classification Search
CPC .......... H02K 19/00; H02K 21/00; H02K 3/28; H02K 55/00
See application file for complete search history.

(56) References Cited

U.S. PATENT DOCUMENTS 3,034,030 A    5/1962  Rosenschold et al.
3,421,062 A    1/1969  Dickey
(Continued)

FOREIGN PATENT DOCUMENTS

EP    1203437 B1   4/2005
JP    1-501913 A   6/1989
(Continued)

OTHER PUBLICATIONS

Office Action received for Japanese Patent Application No. 2016-574051, dated Jun. 22, 2017, 5 pages (2 pages of English Translation and 3 pages of Official Copy).
(Continued)

*Primary Examiner* — Dang Le
(74) *Attorney, Agent, or Firm* — Morrison & Foerster LLP

(57) ABSTRACT

The motors/generators of the preferred embodiments include a rotating part (rotor) and a stationary part (stator). In the devices disclosed, the primary function of the stator is to provide a high strength background magnetic field in which the rotor rotates. The rotor can be powered with a current that changes direction in concert with the relative change in magnetic field direction of the background field (that is, as the rotor moves from one magnetic pole to the next) in the case of a motor. In the case of a generator, the movement of the rotor generally results in the generation of an alternating voltage and current.

20 Claims, 175 Drawing Sheets

(30) Foreign Application Priority Data

| | | | |
|---|---|---|---|
| Jul. 24, 2014 | (AU) | ................................ | 2014902869 |
| Aug. 22, 2014 | (AU) | ................................ | 2014903311 |
| Aug. 29, 2014 | (AU) | ................................ | 2014903449 |
| Sep. 12, 2014 | (AU) | ................................ | 2014903657 |
| Sep. 22, 2014 | (AU) | ................................ | 2014903781 |
| Sep. 25, 2014 | (AU) | ................................ | 2014903829 |
| Oct. 13, 2014 | (AU) | ................................ | 2014904072 |
| Oct. 30, 2014 | (AU) | ................................ | 2014904356 |
| Dec. 23, 2014 | (AU) | ................................ | 2014905256 |
| May 22, 2015 | (AU) | ................................ | 2015901886 |

(51) Int. Cl.

| | |
|---|---|
| *H02K 49/10* | (2006.01) |
| *H02K 55/00* | (2006.01) |
| *H02K 3/04* | (2006.01) |
| *H02K 3/42* | (2006.01) |
| *H02K 7/11* | (2006.01) |
| *H02K 16/00* | (2006.01) |
| *H02K 11/01* | (2016.01) |

(52) U.S. Cl.
CPC ............. *H02K 11/01* (2016.01); *H02K 16/00* (2013.01); *H02K 21/02* (2013.01); *H02K 49/102* (2013.01); *H02K 55/00* (2013.01); *Y02E 40/62* (2013.01)

(56) References Cited

U.S. PATENT DOCUMENTS

| | | | | |
|---|---|---|---|---|
| 4,892,863 | A | | 1/1990 | Agarwala |
| 4,982,128 | A | | 1/1991 | McDonald |
| 5,751,089 | A | | 5/1998 | Stridsberg |
| 5,777,420 | A | | 7/1998 | Gamble et al. |
| 7,309,939 | B2 | * | 12/2007 | Dooley ................. H02K 1/165 310/179 |
| 7,579,812 | B2 | * | 8/2009 | Dooley .................... H02P 9/34 310/201 |
| 2003/0201686 | A1 | | 10/2003 | Narita et al. |
| 2008/0224557 | A1 | | 9/2008 | Cleveland |
| 2011/0025158 | A1 | | 2/2011 | Aiki et al. |
| 2011/0109185 | A1 | | 5/2011 | Sullivan et al. |
| 2011/0148238 | A1 | | 6/2011 | Goodzeit et al. |
| 2011/0248589 | A1 | | 10/2011 | Konecný et al. |
| 2015/0171694 | A1 | | 6/2015 | Walsh |
| 2015/0214793 | A1 | * | 7/2015 | Kuntz ................... H02K 53/00 310/126 |

FOREIGN PATENT DOCUMENTS

| | | | |
|---|---|---|---|
| JP | 2-228234 A | | 9/1990 |
| JP | 8-172759 A | | 7/1996 |
| JP | 9-168263 A | | 6/1997 |
| JP | 2003-189565 A | | 7/2003 |
| JP | 2003-526304 A | | 9/2003 |
| JP | 2004-32984 A | | 1/2004 |
| JP | 2009-106149 A | | 5/2009 |
| JP | 2009-247046 A | | 10/2009 |
| JP | 2010-154648 A | | 7/2010 |
| JP | 2016-7132 A | | 1/2016 |
| WO | 1987/05754 A1 | | 9/1987 |
| WO | 2005/025036 A1 | | 3/2005 |
| WO | 2012/160841 A1 | | 11/2012 |
| WO | 2013/086558 A1 | | 6/2013 |
| WO | 2014/010978 A1 | | 1/2014 |
| WO | 2015/192181 A1 | | 12/2015 |
| WO | 2017/008114 A1 | | 1/2017 |

OTHER PUBLICATIONS

International Preliminary Report on Patentability received for PCT Application No. PCT/AU2015/050333, Completed on Jun. 27, 2016, 9 pages.

International Search Report and Written Opinion received for PCT Application No. PCT/AU2015/050333, dated Nov. 20, 2015, 10 pages.

Extended European Search Report received for European Patent Application No. 15810217.8, dated Jan. 26, 2018, 7 pages.

International Preliminary Report on Patentability received for PCT Patent Application No. PCT/AU2016/050610, dated Nov. 3, 2017, 4 pages.

International Search Report and Written Opinion received for PCT Patent Application No. PCT/AU2016/050610, dated Sep. 5, 2016, 10 pages.

Office Action received for Japanese Patent Application No. 2016-574051, dated Feb. 14, 2018, 9 pages (4 pages of English Translation and 5 pages of Official Copy).

* cited by examiner

Background Field = 1T = 10,000 Gauss
Wire Field @R10mm = 0T = 0 Gauss
Current in Wire = 0A Background Field = 1T = 10,000 Gauss
Wire Field @10mm R = 40 Gauss
Current in Wire = 200A

TOROIDAL SUPERCONDUCTING WINDING

SINGLE ROTOR CURVED PERMANENT MAGNET MOTOR/GENERATOR

Laminated winding support (detail)

Current carrying windings divided into 12 Phases

Inter-layer cooling channels

Outer current carrying winding layer

Inner current carrying winding layer

Liquid Metal Switch

Spray System

Brush System

Sectors of the Wave Toroidal windings

Helical Toroidal Drive background field coils

Helical Toroidal Drive – axial current carrying windings (rotor) on the outer radius

ELECTROMAGNETIC DEVICE

CROSS REFERENCE TO RELATED APPLICATIONS

This application is a U.S. National Phase patent application of PCT/AU2015/050333, filed on Jun. 17, 2015, which claims priority to Australian Patent Application Nos.: 2014902313, filed on Jun. 17, 2014; 2014902359, filed on Jun. 20, 2014; 2014902869, filed on Jul. 24, 2014; 2014903311, filed on Aug. 22, 2014; 2014903449, filed on Aug. 29, 2014; 2014903657, filed on Sep. 12, 2014; 2014903781, filed on Sep. 22, 2014; 2014903829, filed on Sep. 25, 2014; 2014904072, filed on Oct. 13, 2014; 2014904356, filed on Oct. 30, 2014; 2014905256, filed on Dec. 23, 2014; and 2015901886, filed on May 22, 2015, the disclosures of which are hereby incorporated by reference in the present disclosure in their entirety.

TECHNICAL FIELD

The present invention relates to electromagnetic devices using reciprocating or rotating elements in a magnetic field, in particular to the variations of current carrying bars/windings placed in a magnetic field and the application of electrical current through these current carrying bars/windings.

BACKGROUND ART

One of the fundamental principles of physics is the relationship between electricity and magnetism. This relationship was first observed in the mid-1800s when it was noted that current passing through a simple bar conductor, induces a magnetic field perpendicular to the direction of current flow. As a result of the induced magnetic field, each of the moving charges, which comprises the current, experiences a force. The force exerted on each of the moving charges generates torque on the conductor proportional to the magnetic field.

It is a well understood aspect of electrometric theory that as current passes through a simple bar conductor, it induces a magnetic field perpendicular to the direction of current flow. As a result of the induced magnetic field, each of the moving charges comprising the current, experiences a force. The force exerted on each of the moving charges generates torque. It is this principle that underpins devices such as electric motors and generators.

Most typical DC motors consist of three main components namely a stator, armature/rotor and commutator. The stator typically provides a magnetic field which interacts with the field induced in the armature to create motion. The commutator acts to reverse the current flowing in the armature every half revolution thereby reversing the field in the armature to maintain its rotation within the field in the one direction. A DC motor in its simplest form can be described by the following three relationships:

$$e_a = K\Phi\omega$$

$$V = e_a + R_a i_a$$

$$T = K\Phi i_a$$

Where $e_a$ is the back emf, V the voltage applied to the motor, T the torque, K the motor constant, $\Phi$ the magnetic flux, $\omega$ the rotational speed of the motor, $R_a$ the armature resistance and $i_a$ the armature current.

The magnetic field in a typical motor is stationary (on the stator) and is created by permanent magnets or by coils. As current is applied to the armature/rotor, the force on each conductor in the armature is given by $F = i_a \times B \times l$. Back emf is generated due to a relative rate of flux change as a result of the conductors within the armature rotating through the stationary field. The armature voltage loop therefore contains the back emf plus the resistive losses in the windings. Thus, speed control of the DC motor is primarily through the voltage V applied to the armature while torque scales with the product of magnetic flux and current.

Thus, in order to maximise torque in a DC motor, one would presume that it is simply a matter of increasing either the magnetic field or the current supplied. In practice, however, there are limitations. For instance, the size of the magnetic field which can be generated via permanent magnets is limited by a number of factors. In order to produce a significantly large field from a permanent magnet, the physical size of the magnet is relatively large (e.g. a 230 mm N35 magnet is capable of producing a field of a few Kilogauss (kG)). Significantly, larger fields can be produced utilising a plurality of magnets, the size and number of magnets again adds to the overall size and weight of the system. Both size and weight of the motor are critical design considerations in applications such as electric propulsion systems. Generation of larger magnetic fields is possible utilising standard wire coils but the size, weight and heating effects make the use of standard coils impractical.

Another factor which has an effect on torque that needs consideration is the production of drag caused by eddy currents created within the armature/rotor. Eddy currents occur where there is a temporal variation in the magnetic field, a change in the magnetic field through a conductor or change due to the relative motion of a source of magnetic field and a conducting material. The eddy currents induce magnetic fields that oppose the change of the original magnetic field per Lenz's law, causing repulsive or drag forces between the conductor and the magnet. The power loss (P) caused by eddy currents for the case of a simple conductor assuming a uniform a material and field, and neglecting skin effect can be calculated by:

$$P = \frac{\pi^2 B_P^2 d^2 f^2}{12\rho D}$$

where $B_p$ is peak flux density, d—thickness or diameter of the wire, $\rho$—resistivity, $\sigma$—electrical conductivity, $\mu$ magnetic permeability, f frequency (change in field) and penetration depth (D).

As can be seen from the above equation, as the magnetic field increases the size and effects of eddy currents increase i.e. the higher the magnetic field, the greater the drag produced as a result of eddy currents. In addition to the field strength, the resistivity of and thickness of the conductive elements in the armature are also a factor. Selection of the material of the conductive elements in the armature can greatly affect the amount of current that can be applied to the armature.

These basic properties and functions are the focus of continuing developments in the search for improved devices having better efficiencies.

It will be clearly understood that if a prior art publication is referred to herein, this reference does not constitute an admission that the publication forms part of the common general knowledge in the art in Australia or in any other country.

SUMMARY OF INVENTION

The present invention is directed to improvements in electromagnetic devices using reciprocating or rotating elements in a magnetic field which may at least partially overcome at least one of the abovementioned disadvantages or provide the consumer with a useful or commercial choice.

With the foregoing in view, the present invention in one form, resides broadly in an electromagnetic device including at least one magnetic field generator to generate a background magnetic field, at least one conductive element located within the background magnetic field for movement, an electric current delivery system to deliver electric current to the at least one conductive element wherein an electric current is supplied to the at least one conductive element sufficient to generate a magnetic field about the at least one conductive element of at least equal or greater strength to the background magnetic field to produce a large force on the conductive element.

Use of the term "seal" in this document does not relate to physically sealing the at least one conductive element but instead relates to the diversion of the magnetic field about the periphery of the at least one conductive element rather than allowing the field to extend through the at least one conductive element, which results in a large force reaction.

The electromagnetic device of the present invention will normally be in the form of an electromagnetic motor or similar in which an applied electrical input produces a mechanical output. Typically, the device or components of the device will be at least partially enclosed within a cryogenic envelope or cryostat in order to cool the preferred superconducting coils used.

The device of the present invention can have a reciprocating or rotating configuration with the at least one conductive element mounted for movement according to either (or both) of these principles.

The device of the present invention includes at least one magnetic field generator to generate a background magnetic field. Preferably, the background magnetic field is predominantly uniform but it is most preferred that the background magnetic field is predominantly uniform in the region in which the at least one conductive element is located and moves.

The background magnetic field can be generated in any way, using any device(s) or configuration of device(s). As mentioned above, it is particularly preferred that the background magnetic field is produced using at least one superconducting structure and particularly at least one superconducting coil. The preferred superconducting coil is formed by winding superconducting tape or wire to form the coil. These types of coils are particularly preferred due to their near zero electrical resistance when cooled below the critical temperature. They also allow high current density and hence, allow creation of a large (and dense) magnetic field.

The background magnetic field of the invention can be permanent or changing. Typically, the background field will be a permanent field with the field of the at least one conductive element being the changing field in order to provide the motive force for moving the at least one conductive element through interaction with the background magnetic field.

Normally, where a changing field is provided, this is preferably achieved through an either physically or electronically commutated direct current supply or an alternating current supply.

It should be appreciated that the characteristics of the at least one magnetic field generator and the at least one conductive element will be determined according to the application.

In a reciprocating configuration, at least one coil can be used to create the background magnetic field but preferably a pair of fixed coils is used. In the preferred configuration, two coils preferably act as stator elements with the at least one conductive element, preferably including a third coil located therebetween with the third call being subjected to an alternating polarity of current.

In the less preferred configuration wherein a single coil is used to create the background magnetic field, the at least one conductive element, preferably including a second coil, is subjected to the alternating polarity of current.

The preferred coils can be provided in any number of layers with multiple layers typically being preferred. Current indications are that four layers is the optimum number of layers to obtain the required maximum field strength for a given length of high temperature superconducting wire used to form the coils whilst staying within the parameters of current coil fabrication technology.

Increasing the depth of the coils used by using more than one coil in a standard configuration preferably results in greater projection of the background magnetic field when moving perpendicular to the surface of the coil. This leads to less variation in the force applied to the at least one conductive element which in turn leads to smooth the power delivery along the stroke of the movement.

As mentioned above, a key consideration is that the dimensions and magnetic fields produced by the at least one magnetic field generator and the at least one conductive element are equal for the coils employed in the device regardless of the type of magnetic field generator, conductive element or the geometry of either of these. In practice, it will normally be simpler to ensure that the magnetic field of the at least one conductive element is of at least equal strength to the background field produced where the at least one magnetic field generator coil and the conducting element or coil are basically of the same type and configuration with virtually identical proportions and physical characteristics.

Therefore, the at least one conducting element is therefore also preferably a coil which is substantially the same as the coils employed to create the background magnetic field in order to generate a matched field.

In the preferred embodiment, each of the coils are typically annular and are normally planar when viewed from the side.

Therefore, according to the preferred reciprocating embodiments, there will normally be a pair of fixed coils which are responsible for generating the background magnetic field with a moving conducting element also including a matched coil between the two fixed coils and reciprocating therebetween or alternatively, there is one fixed coil to generate the background magnetic field and moving conducting element including a matched coil which reciprocates relative to the fixed coil.

In relation to the physical layout of the preferred coils, the coils are generally oriented coaxially and at least one moving conductive element will normally reciprocate along the axis. The at least one conductive element is preferably linked to some form of mechanical work takeoff device, normally a shaft or similar, and particularly a crankshaft which converts the reciprocation to rotation. Normally, the movement of the at least one conductive element will be limited by the shaft. The at least one conductive element is normally linked to a commutator in order to control reversal of current if required. A combined torque transducer and brake assembly may also be provided.

If an alternating current is applied to the moving at least one conductive element, then the electrical power controls and particularly the commutator may not be required or the need for electrical power controls will at least be reduced.

While reciprocating arrangements differ significantly from traditional rotating electric motor apparatus, they maintain a number of advantages over a rotating configuration. These include the ability to keep variations in field strength over the course of the stroke small (neglecting the end conditions) thus maximising the power of the device, the removal of the need for the development of specialized coil winding techniques in order to obtain coil geometry suited to a circular configuration and the simplification of the vessels required to contain the coils and facilitate their cooling to a sub-critical temperature. While none of these reasons precludes the development of a circular configuration that mimics the fundamental function of the reciprocating arrangement, they do serve to outline reasons why a reciprocating configuration could be preferred.

According to such a rotating embodiment, it is preferred that the at least one magnetic field generator will include a set of coils in order to produce the background magnetic field. Typically, the at least one conductive element is located within the background field and will normally rotate about an axis substantially perpendicular to the dominant direction of the background magnetic field. According to a particularly preferred embodiment, the background magnetic field generator will normally be provided in a first cryostat and the at least one conductive element will be provided in a second cryostat with the second cryostat being movable relative to the first cryostat. Typically, the first cryostat will be fixed and a second cryostat rotates within at least a portion of the first cryostat with the at least one conductive element fixed within the second cryostat.

The at least one magnetic field generator will preferably be formed from a number of coils. According to a particularly preferred embodiment, at least one primary coil is used to form the background magnetic field with at least one secondary coil provided to shape the background magnetic field to increase uniformity of the background magnetic field in the region in which the rotating at least one conductive element is located.

According to a preferred embodiment, at least two primary coils are provided. Each of the primary coils of this embodiment is shaped as a rectangular solenoid. Each of the primary coils will therefore preferably form one half of the at least one magnetic field generator. Each of the primary coils is preferably annular and substantially rectangular in shape. The primary coils will typically be spaced from one another allowing the mounting for the rotating cryostat containing the at least one conductive element to extend into the background magnetic field generated by the primary coils, between the primary coils.

The preferred two primary coils are typically coaxially positioned relative to one another. Each of the primary coils is preferably of sufficient width to define the background magnetic field such that the rotating cryostat is located within the background magnetic field wholly at all positions during its rotation.

According to the preferred embodiment, a number of secondary coils are provided and preferably, secondary coils are provided perpendicularly to the primary coils. Typically, there will be at least one secondary coil provided on each of the "long sides" of each of the primary coils and most preferred is at least one upper secondary coil and at least one lower secondary coil for each primary coil.

The secondary coils are preferably also annular and substantially rectangular in shape. It is preferred that an annular surface of each secondary coil is positioned substantially coplanar with an inner perimeter surface of the primary coil with which the secondary coil is associated.

An inner perimeter surface of each secondary coil is preferably located laterally outside the outer edges of the primary coil about which the secondary coil is positioned.

Additional secondary coils may be located on the "short side" of each primary coil. These additional secondary coils may become increasingly important as the length of the "short side" of the primary coil increases; that is in situations where the aspect ratio of the primary coil moves towards 1:1.

Alternate configurations of secondary coils may assist with increasing the field uniformity in a central region of the primary coils within which the at least one conductive element and second cryostat is located and rotates. It has been found that "bedstead" secondary coils are particularly useful for this purpose. Each bedstead secondary coil includes a substantially parallel upper and lower portion located in the same plane and end portions which connect the upper and lower portions which are oriented perpendicularly to the upper and lower portions in two directions.

Where bedstead secondary coils are provided, the end portions are typically oriented extending away from one another. Preferably, the upper and lower portions of the bedstead secondary coils are coplanar with portions of the primary coils relative to which they are located. According to the most preferred embodiment, the upper and lower portions of each bedstead coil are located between adjacently located primary coils.

The at least one conductive element of the rotating embodiment will preferably have an annular rectangular shape. The at least one conductive element is mounted for rotation within the first cryostat. Normally, the at least one conductive element is fixed in the second cryostat and the second cryostat rotates within the first cryostat.

Appropriate bearings, shafts, seals etc. are normally provided in order to mount the first and second cryostats relative to one another and to allow rotation of the at least one conductive element to output mechanical work.

Preferably, the at least one conductive element of the rotating embodiment is a superconducting coil connected to a current delivery system. The second cryostat is also preferably connected to a cryogenic delivery system.

The current delivery system will preferably be capable of reversing the current flow in the at least one conductive element when the rotating coil is magnetically aligned with the field reduced by the primary coils. In the case of the preferred embodiment, the current reversal occurs every 180° and is timed so as to result in a continuous rotation of the at least one conductive element. However, this angle may change depending upon the number and/or configuration of primary coils forming the background magnetic field.

It is preferred that the current is applied in a waveform which is as close as possible to a square wave form. Again, this reduces the period in which the coil field strength is less than the background field strength maximises the torque and power of the device. The current delivery system will typically apply the current as close as possible to instantaneously and then maintain the current through the at least one conductive element during rotation until the switch point where the current flow is reversed.

An important consideration is that the rotating element is designed to have circuit properties conducive to rapid increases in current and rapid reversal of current (low inductance) so that the field levels can be established and reversed quickly. Additionally, the power supply to the device (when driven as a motor) will need to be of sufficiently high voltage, relative to the inductance of the rotating coil, in order to effect this rapid establishment and reversal of current. The waveform preferred is a fully reversing DC signal (or square wave AC current signal). A non-reversing square wave DC current wave form could be used provided that the drive coil is an open circuit during the half cycle dwell time.

There are a further two important systems within the rotating coil assembly. The current to the rotating coil will normally be delivered by stationary current leads from the square wave power supply. This current delivery is preferably achieved via a set of sliding current contacts. These sliding current contacts would likely be a liquid metal brush.

In such instance, a liquid metal brush may be formed by the use of a channel with a complementary groove and a liquid metal may be introduced into the channel from a reservoir under variable pressure. A gas may also be introduced into the channel during sealing to reduce the adverse effects of moisture and oxygen on the liquid metal.

The second system concerns the operation of the rotating cryostat that contains the rotating coil. Cooling in the cryostat is preferably achieved via the delivery of a liquid cryogen, such as helium via a stationary tube. The liquid cryogen is typically delivered to the outer parts of the coil assembly via centrifugal force created by the rotating of the cryostat. A secondary stationary outer pipe may be used to collect the heated cryogenic gas which can be used to impart additional cooling on the current delivery channels as the cryogenic gas exits the rotating cryostat and is returned to be re-cooled as part of a closed loop cryogenic system. This system can be configured so as to not require additional pumping of the cryogenic fluid. According to this preferred embodiment, there is one point of rotating cryogenic seal required between the stationary and rotating boundary.

In a preferred embodiment of the invention, one or more thermal blocking stages may be provided between the liquid metal brushes and the one or more superconducting elements. The one or more thermal blocking stages may be of any suitable form, although the purpose of the one or more thermal blocking stages may be to separate the higher-temperature liquid metal brushes from the lower-temperature superconducting elements. The liquid metal brushes may be located at any suitable location relative to one another, although in some embodiments of the invention, the system may be provided with at least one inner liquid metal brush and at least one outer liquid metal brush. In this embodiment of the invention, the rotor may have superconducting current transmission elements between the outer liquid metal brush used for current input and the inner liquid metal brush used to remove current from the system.

The rotor may be of any suitable size, shape or configuration. Preferably, however, the rotor comprises at least a pair of concentric conducting elements, including an inner conducting element and an outer conducting element. In a preferred embodiment of the invention, the inner conducting element and the outer conducting element are substantially annular. In some embodiments, the inner conducting element and the outer conducting element may be linked using one or more of thermally optimised normal conducting elements or HTS bulks or wires as an intermediate current transfer stage with limited thermal conductivity.

The rotor may be mounted relative to a shaft assembly, and preferably a substantially central shaft assembly. In some embodiments, a single drive element (such as a primary HTS drive element) may be configured as a spoke which radiates from the shaft assembly to the inner conducting element. Preferably, the drive element and the point at which the drive element is mounted to the shaft assembly may be encapsulated within a support structure. Preferably, the support structure is non-conductive.

In some embodiments of the invention, the system may be provided with one or more additional spokes radiating between the shaft assembly and the inner conducting element. In a preferred embodiment of the invention, the one or more additional spokes may be non-conducting. It is envisaged that the support structure may include additional torque transfer provided by the non-conducting spokes. This may be done as the preferred configuration of multiple strands of HTS wire or tape used to form the single drive element may not be sufficiently rigid to transfer torque.

In an alternative embodiment of the invention, multiple drive elements (such as HTS drive elements) may be employed between the inner conductive element and the outer conductive element. In a preferred embodiment each of these drive elements may produce a field strength around the coil equal or greater to the strength of the background magnetic field.

In some embodiments, electrical current may be provided to the system through a pair of liquid metal brushes. In a specific embodiment of the invention, the current may flow from a larger radius liquid metal brush associated with an outer conductive element to an inner conducting element. Preferably, the current flows from the larger radius liquid metal brush through HTS bulks to the inner conducting element. From the inner conducting element, the current may flow through a primary drive element and out through a current return path. In a preferred embodiment of the invention, the current return path may be provided in the shaft assembly and out through the smaller radius liquid metal brush.

In a specific embodiment of the invention, the device may include a single superconducting current lead made of multiple strands of superconducting wire and/or tape. The superconducting current lead may be used as at least one of the drive elements. Preferably, the superconducting current lead may be used in a region where the primary drive field is perpendicular to the flow of current through the drive elements resulting in rotation of the rotor. It is envisaged that, in this embodiment of the invention, a single current path may be used where the current density is sufficiently high enough to ensure the strength of the magnetic field is higher than the strength of the background field in which the rotor is situated.

It is envisaged that, in some embodiments, the rotor may be encapsulated by a dual-walled or two stage rotating cryostat. In this embodiment, the first of the two stages may be the inner superconducting stage that contains the rotor, and the current return path that transports the working current out along the axis of rotation. This inner superconducting stage may preferably be contained within an inner, rotating cryostat.

The second stage may be a thermal isolation stage that transitions between the relatively low temperature of the inner stage and the relatively high temperature of the liquid metal brushes. This transitional stage may be comprised of a conducting material, such as copper.

In another broad form, the present invention resides in an electromagnetic machine having a number of magnetic elements, each having a north magnetic pole and/or field and a south magnetic pole and/or field positioned relative to one another to create an interstitial magnetic pole between adjacent magnetic elements and at least one conductor element located relative to the magnetic elements such that the conductor interacts with the magnetic poles and/or fields of the magnetic elements to produce electrical current or mechanical work.

The fundamental basis of operation of devices according to one aspect of the present invention is the interaction between a current carrying conductor and a background magnetic field. This interaction results in an output torque developed in the device (in the case of a motor) or an output voltage and current in the case of a generator. Many of the preferred embodiments include one static or stationary magnetic field and one alternating field.

The background magnetic field consists, at a fundamental level, of a magnetic pole created by either an electromagnetic coil or by a permanent magnet. The pole has a North and South orientation of the magnetic field.

One key advance in the devices presented in this document is the manner in which the magnetic field in the devices is used more than once, that is—that multiple paths are described through the background magnetic field by the current carrying conductors in order to greatly increase the power density of the electrical machines.

The rotating machines (motors and generators) of the preferred embodiments each have:
  a rotating and a stationary component or,
  a rotating and a counter-rotating component or,
  a combination of rotating and counter-rotating and stationary components.

In the preferred embodiment, the driving or generating path remains stationary while the background field electromagnetic coils rotate. While the reverse scenario with moving driving or generating windings and stationary background field coils is also workable, the advantage of the preferred embodiment is that the higher currents that are constantly reversing polarity in the driving or generating coils do not have to be transmitted via a sliding contact or brush, reducing electrical losses in the device.

On the other hand, if there is application requirement that the spinning mass of the device be reduced to allow for rapid stopping, starting, acceleration and deceleration, there may well be an advantage in spinning the driving or generating path instead of the background field coils. In this case, the design of the machine should favour a larger number of windings in the background field coils and a commensurate reduction in the driving or generating path windings.

The operating direction of the machines presented in this document can preferably be reversed by a reversal of the current direction in the background field coils or driving/generating path windings.

While the images and descriptions in this document present the preferred embodiments in terms of rotating electrical machinery, it would be clear to anyone skilled in the art that the principles presented could be applied to linear machines as well as rotating devices.

The inventions and variations disclosed in this document also concern the production of mechanical work from an input of electrical voltage and current (motors) or the production of electrical voltage and current from the application of mechanical work (generators). The motors and generators based on the devices disclosed are collectively known as Toroidal Drives.

The motors/generators of the preferred embodiments comprise a rotating part (rotor) and a stationary part (stator). In the devices disclosed, the primary function of the stator is to provide a high strength background magnetic field in which the rotor rotates. The rotor can be powered with a current that changes direction in concert with the relative change in magnetic field direction of the background field (that is, as the rotor moves from one magnetic pole to the next) in the case of a motor. In the case of a generator, the movement of the rotor generally results in the generation of an alternating voltage and current.

The basic elements of the Toroidal Drive are a set of background field windings or permanent magnets that are generally toroidal in shape and a set of rotor windings. This shape of coils/magnets contains the bulk of the magnetic field within the cross section of the preferred toroid itself. The rotor windings are typically placed inside the cross section of the toroid and operate within this contained field.

In the devices disclosed herein, electrical energy is converted into mechanical work or mechanical work is used to create electrical energy through the action of a current carrying conductor moving within a background magnetic field.

In some embodiments, the background magnetic field may be created by a series of adjoining electromagnetic coils that are wound in the form of toroids or sections of toroids in order to direct the magnetic field into a working region or a series of working regions through which a current carrying conductor moves. These preferably toroidal sections both direct the magnetic field such that it is substantially perpendicular to the direction of current flow in the current carrying conductors/windings and contain the magnetic field largely within the device itself. In this manner, a high power device can be constructed limiting or eliminating the need for steel or ferromagnetic flux guides.

A gap region may exist between toroidal winding sections to allow for the mechanical placement and operation of the current carrying conductors.

Generally, the embodiments show the toroidal winding sections and arrangements built from superconducting wire and current carrying conductors from normal conducting material such as copper. It would be clear to a person skilled in the art that either part of the device could be readily constructed from either superconducting or normal conducting material.

In light of this disclosure, important features include (either separately or in one or more combinations):
  that any of the technologies disclosed relying on toroidal coils could be readily constructed using arrangements of discrete sub-coils (open toroids/windings) or by a continuous winding of conductive material in a toroid or toroidal sector (sealed or closed windings/toroids)
  that where background magnetic field windings have been used to direct flux to an air gap or working region, that these windings could be replaced by permanent magnetic material, with or without ferromagnetic flux guides, that direct the flux to these regions in a like fashion.
  that where attributions have been made regarding one part of the device being the 'rotor' and another being the 'stator' that these designations simply imply relative rotation between the two parts and that the rotating and stationary roles or designations could readily reversed such that previously stationary parts rotate and rotating parts are stationary.

That with devices that operate on the principle of maintaining one DC or stationary (background) magnetic field and one alternating magnetic field that it is equally acceptable that the background field alternate in polarity and the current carrying windings that previously produced the alternating field produce a stationary field.

That where an alternating current is employed that that wave form of that current could suitably be any shape of waveform such that continuous rotation or generation of the device results and that such waveform maybe shaped to produce a minimum of ripple in the power output of the motor or generator.

That where a device has been described as a motor, producing mechanical work upon the application of electrical energy, that the reverse scenario of a generator that produces electrical energy on the application of mechanical work is also claimed.

That where a device has been described as a generator that the reverse scenario where the device operates as a motor is also claimed.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 119 is a magnetic field plot of the two pole permanent magnet and individual windings assembly with a steel shroud around the outside of the device.

FIG. 120 is an isometric view of a four pole permanent magnet and rotor assembly with a steel shield or shroud around the outer windings.

FIG. 121 is a magnetic field plot of the four pole permanent magnet and individual windings assembly with a steel shroud around the outside of the device.

FIG. 122 is an isometric view of a four pole device similar to that shown in FIG. 120 but without the steel shielding/shroud and a section of the windings removed.

FIG. 123 is a magnetic field plot of the device shown in FIG. 122.

FIG. 124 shows the six assembly device of FIG. 122 with a steel shroud/shield around the device.

FIG. 125 is a field plot of the device shown in FIG. 124 showing the improved containment of the magnetic field resulting from the steel shield.

FIG. 126 is an isometric view of a four pole permanent magnet assembly that is constructed from two halves that are magnetised parallel to the split plane.

FIG. 127 is a further variation of the four pole magnet shown in FIG. 126.

FIG. 128 is an isometric view of a six pole permanent magnet assembly constructed from a series of arc segments that alternate radially in magnetic polarity.

FIG. 129 is an isometric view of a six pole magnetic assembly constructed from magnets that are magnetised parallel to the assembly split planes.

FIG. 130 is a magnetic field plot from 4-Pole Permanent magnet and winding assembly within a steel shroud and small gaps between the sectors of magnetic material.

Figure 131:
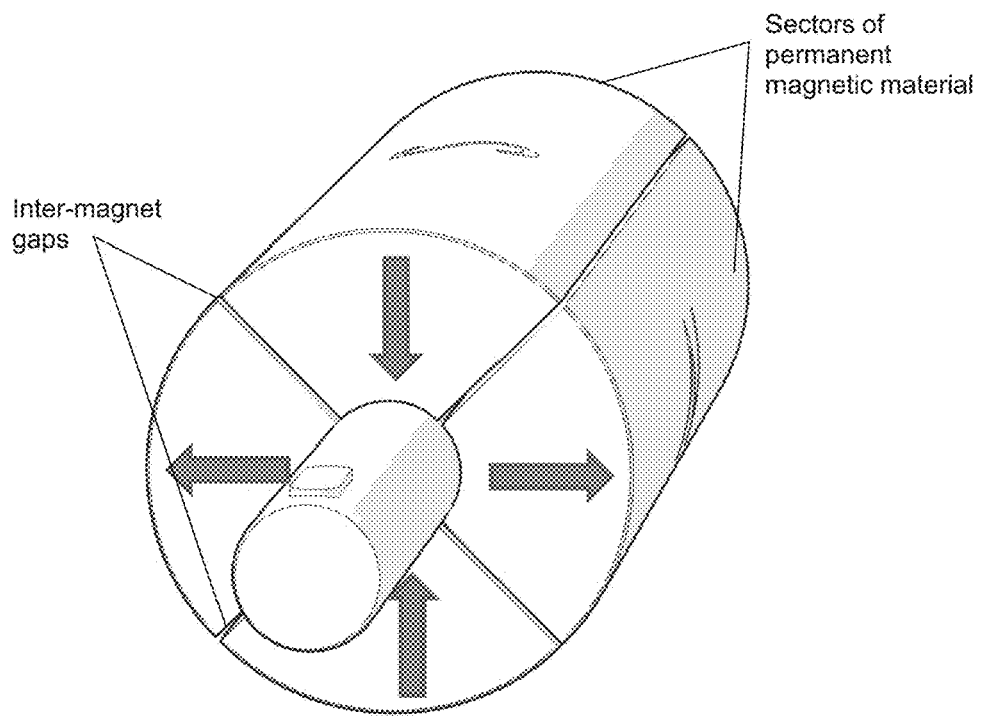

FIG. 131 shows a 4-pole permanent magnet assembly that incorporates small gaps between the sectors of magnetic material with the external steel shielding constructed from multiple laminations of steel or other magnetically permeable material.

Figure 132:
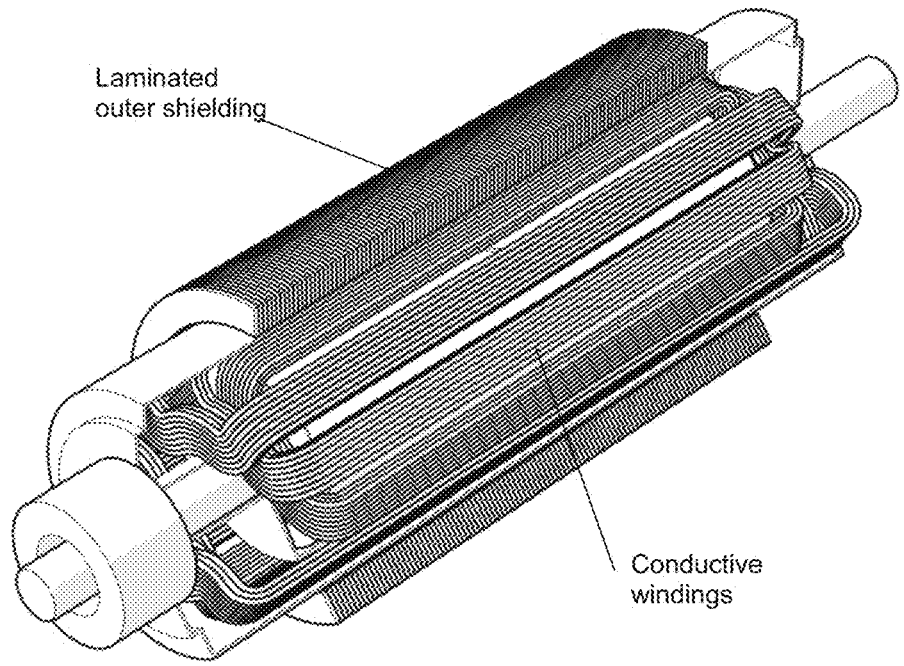
Figure 133:
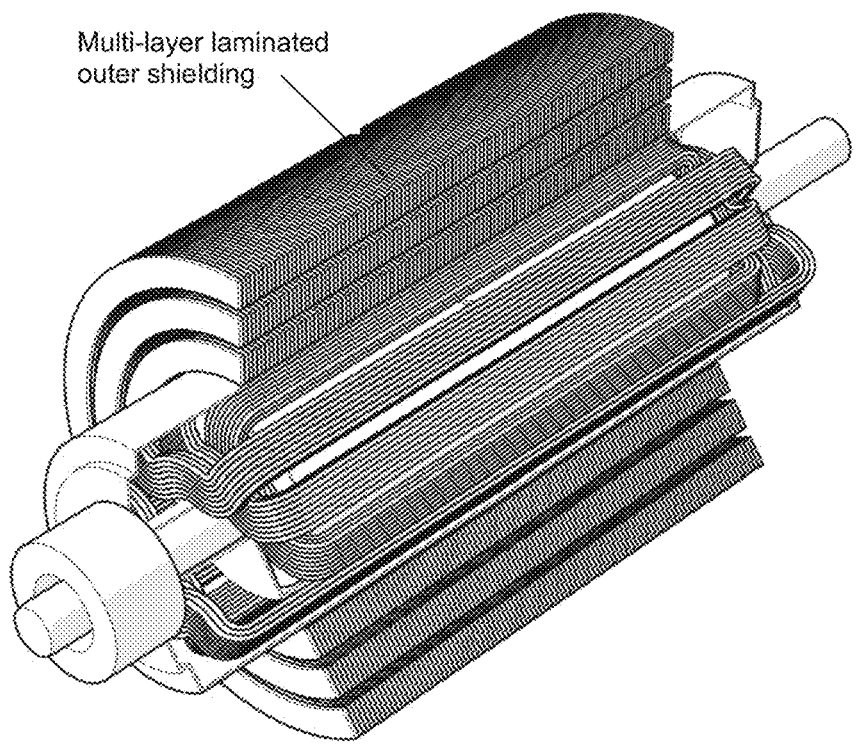

FIG. 132 shows a variation of permanent magnet devices with the external steel shielding constructed from multiple laminations of steel or other magnetically permeable material FIG. 133 is a further variation on the device shown in FIG. 132 where the steel shielding is created from a set of concentric layers of laminated shielding material.

Figure 134:
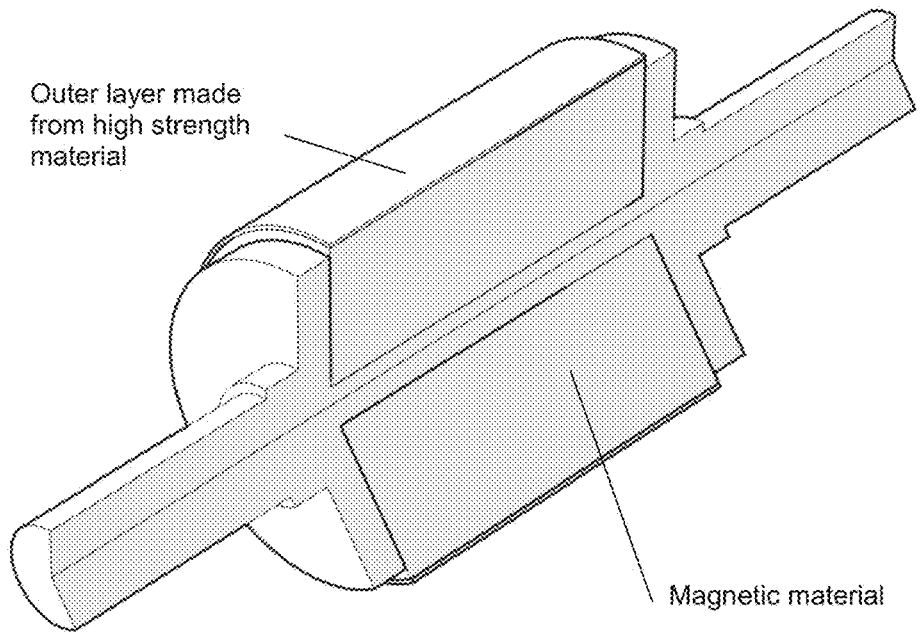

FIG. 134 shows a permanent magnet that has an external wrap of Kevlar, carbon fibre, titanium or other high strength material.

Figure 135:
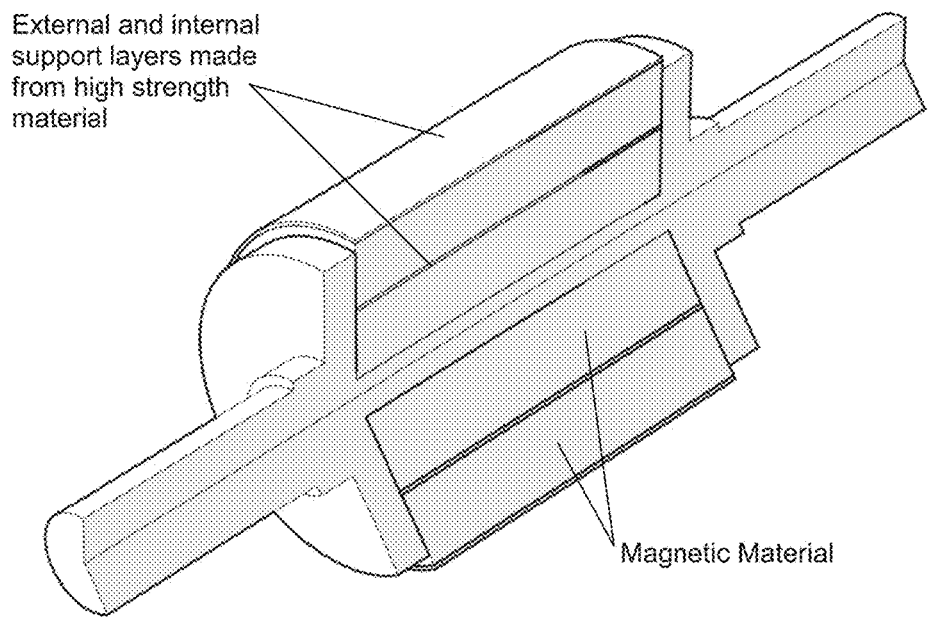

FIG. 135 shows a variation on the construction of the permanent magnet assembly where the permanent magnetic material is divided into a number of concentric layers with Kevlar or carbon fibre material between concentric layers.

Figure 136:
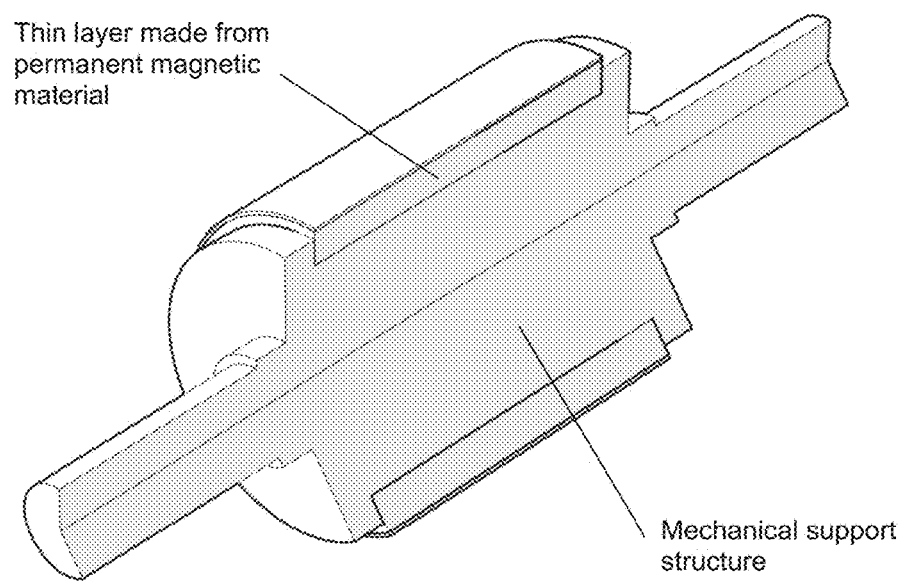

FIG. 136 shows a permanent magnet assembly that consists of a thin wall of permanent magnetic material mounted on a central assembly.

Figure 137:
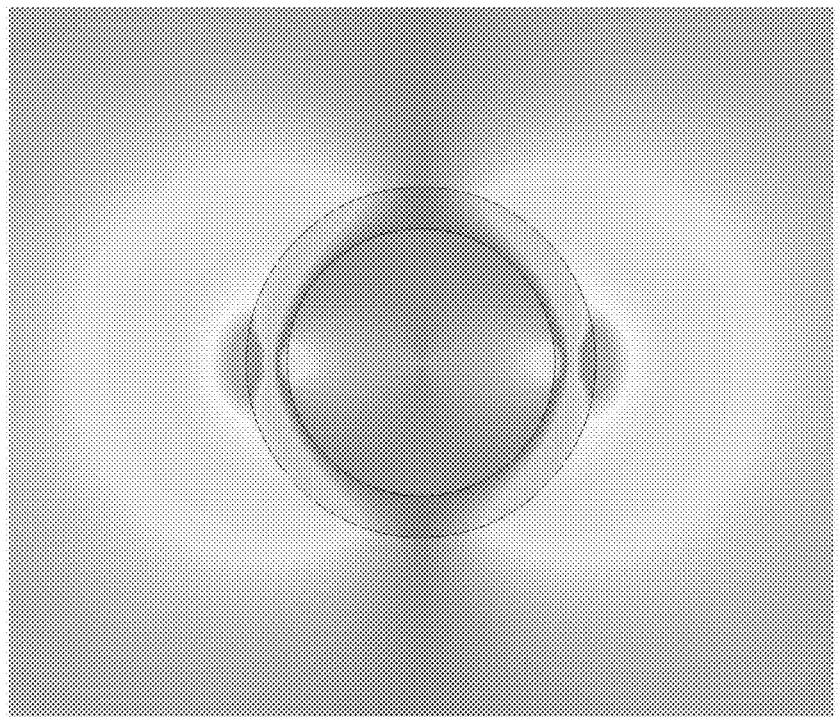

FIG. 137 is a sectional plot of the strength of the radial magnetic field of a 2-pole version of the device shown in FIG. 136.

Figure 138:
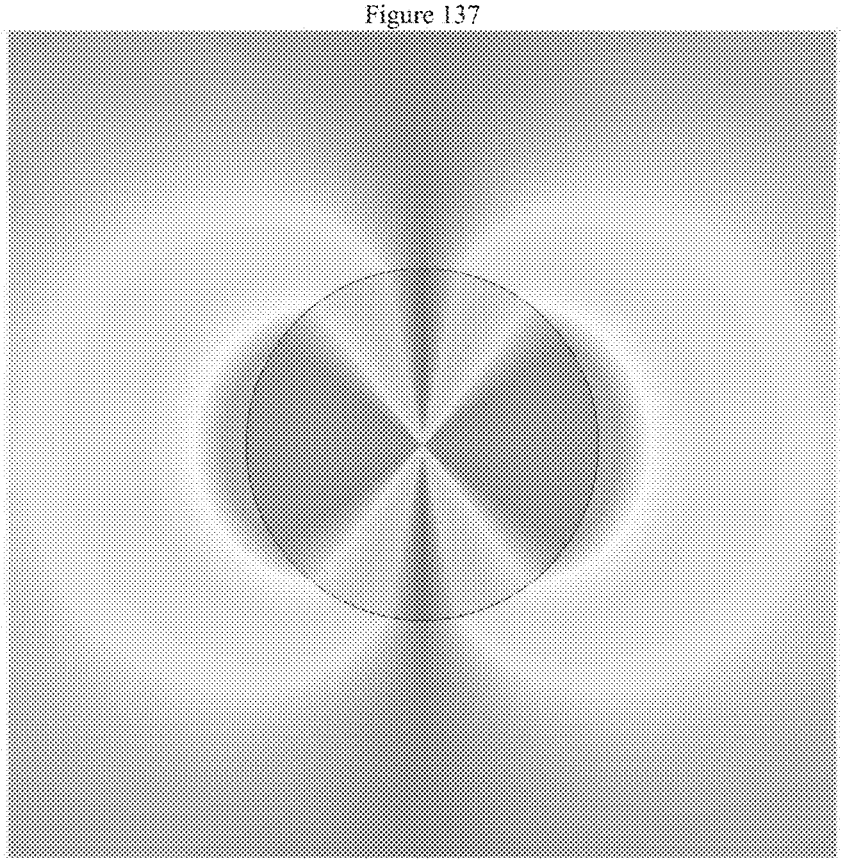

FIG. 138 is a sectional field plot of the strength of the radial magnetic field produced by a full thickness 2-pole permanent magnet assembly similar to the assemblies disclosed previously.

Figure 139:
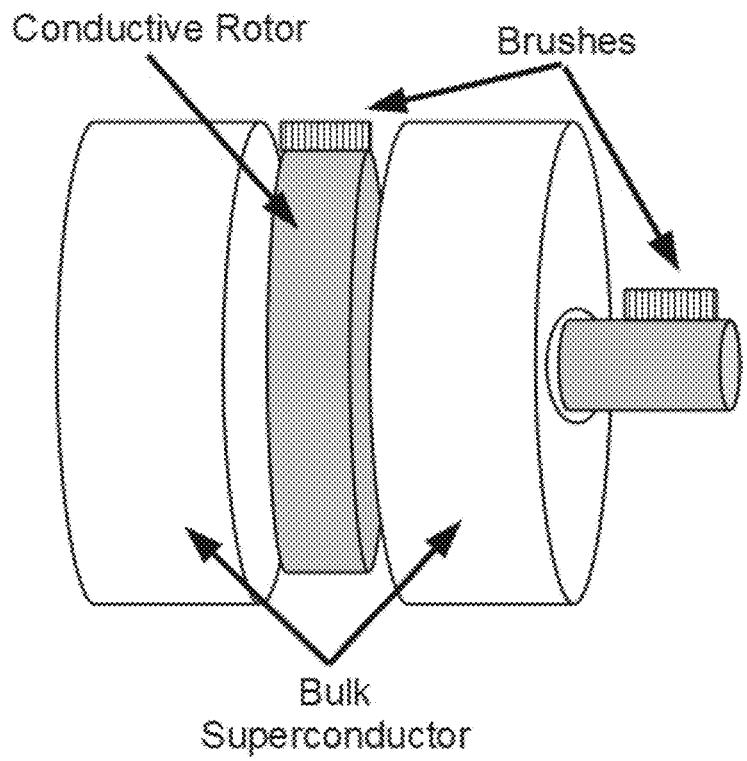

FIG. 139 is an isometric view of a homopolar style electromagnetic turbine where the driving magnetic field is created via energised superconducting bulk material.

Figure 140:
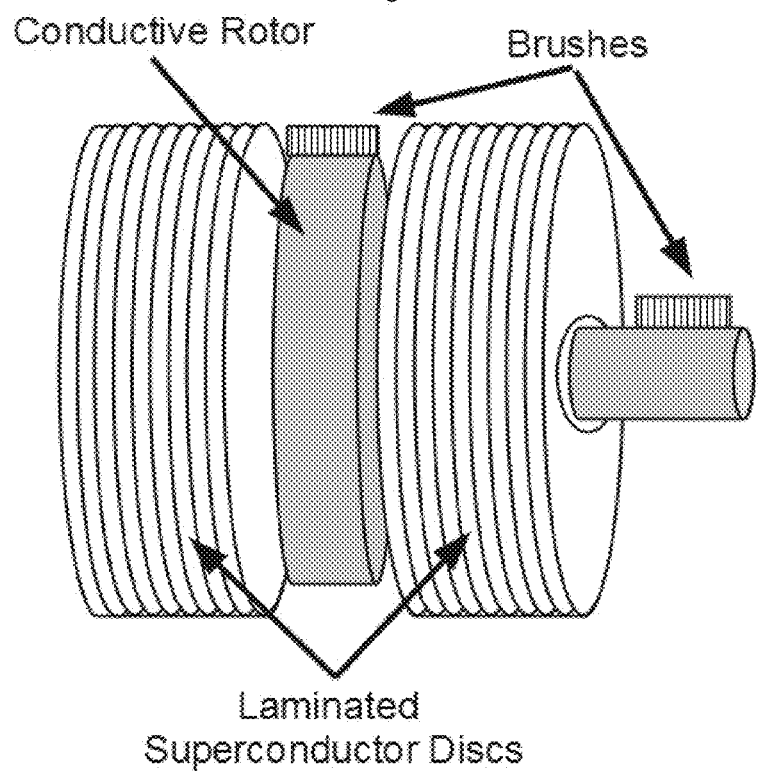

FIG. 140 shows a homopolar electromagnetic turbine similar to that shown in FIG. 139 in which the bulk superconducting material has been created using laminations of superconducting material.

Figure 141:
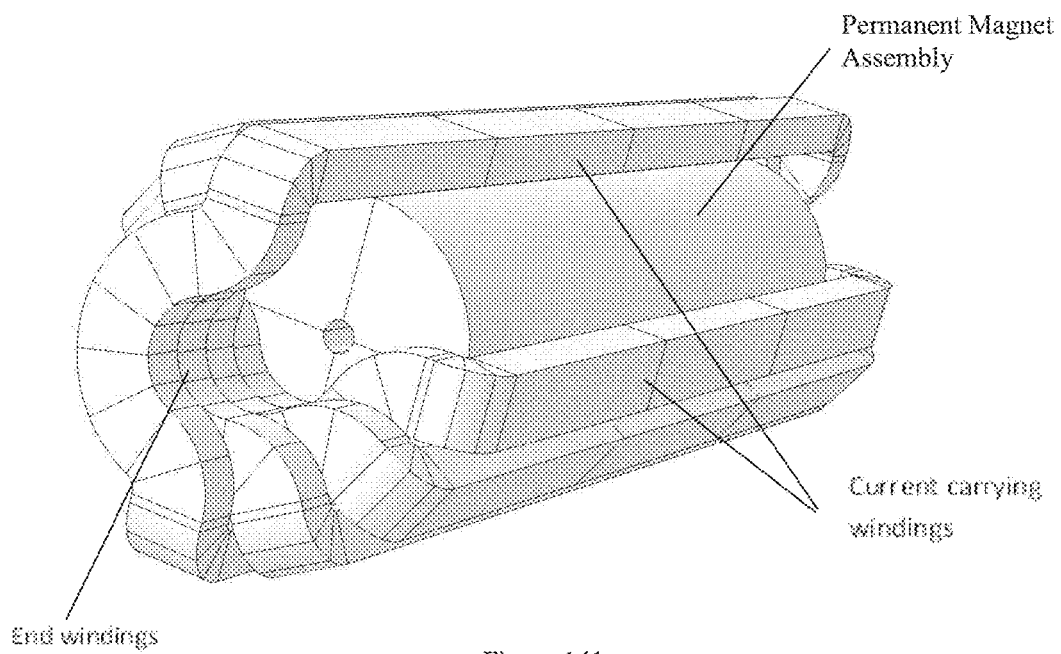

FIG. 141 shows an embodiment of a permanent magnet device with an aspect ratio similar to that of devices previously disclosed with some windings removed for clarity.

Figure 142:
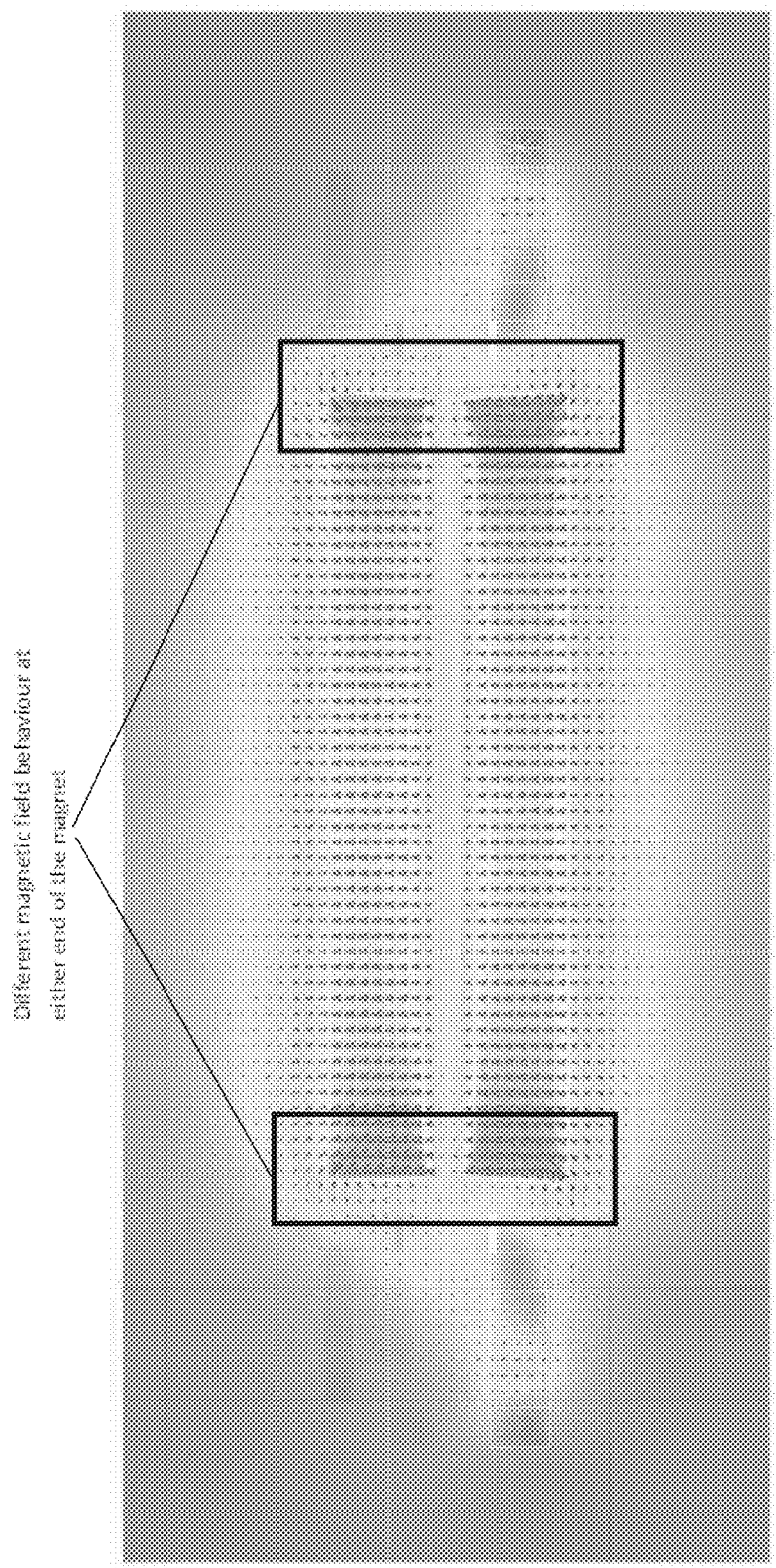

FIG. 142 is a magnetic field plot of the device shown in FIG. 141.

Figure 143:
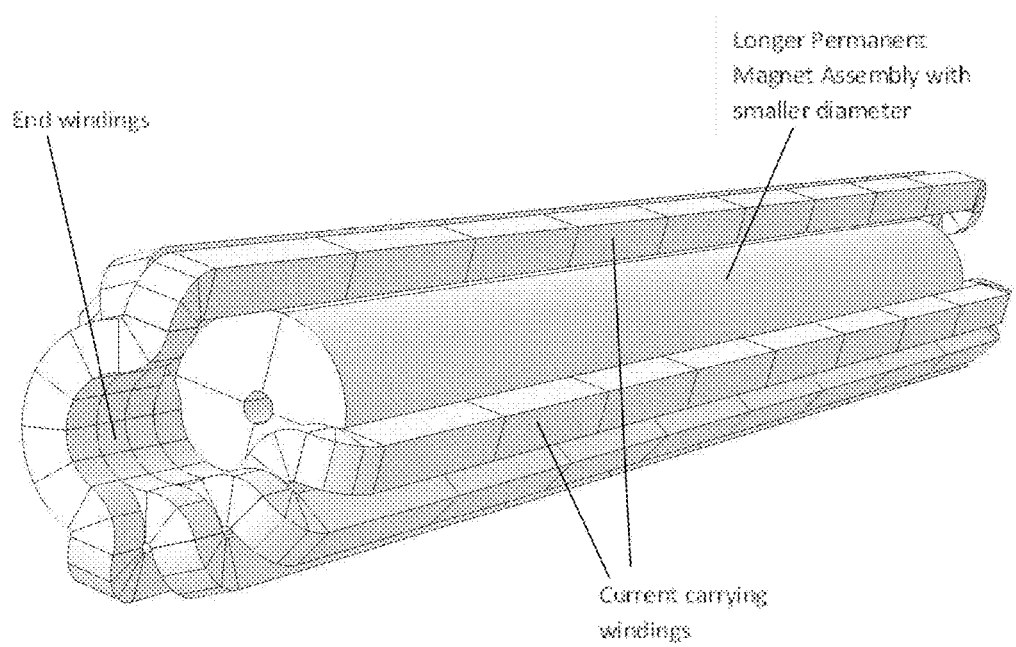

FIG. 143 is an embodiment of a permanent magnet device that uses the same volume of magnetic material and current carrying windings as the device shown in FIG. 141 but with a smaller diameter and correspondingly longer length.

Figure 144:
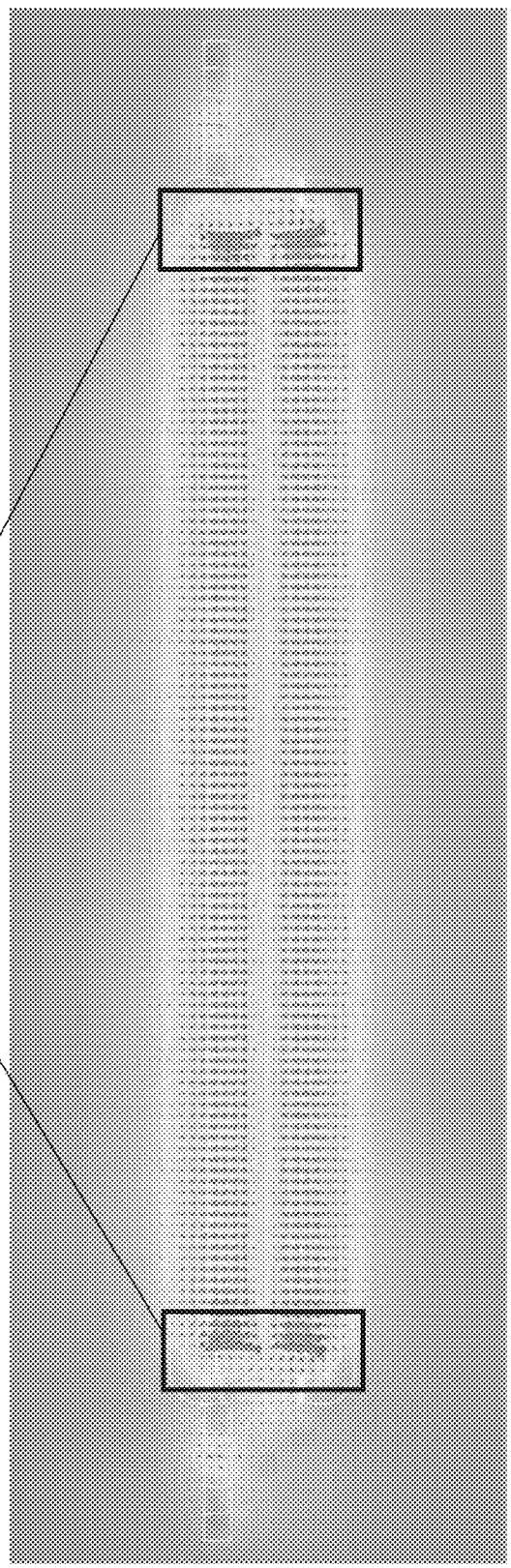

FIG. 144 shows the corresponding magnetic field plot of the device shown in FIG. 143.

Figure 145:
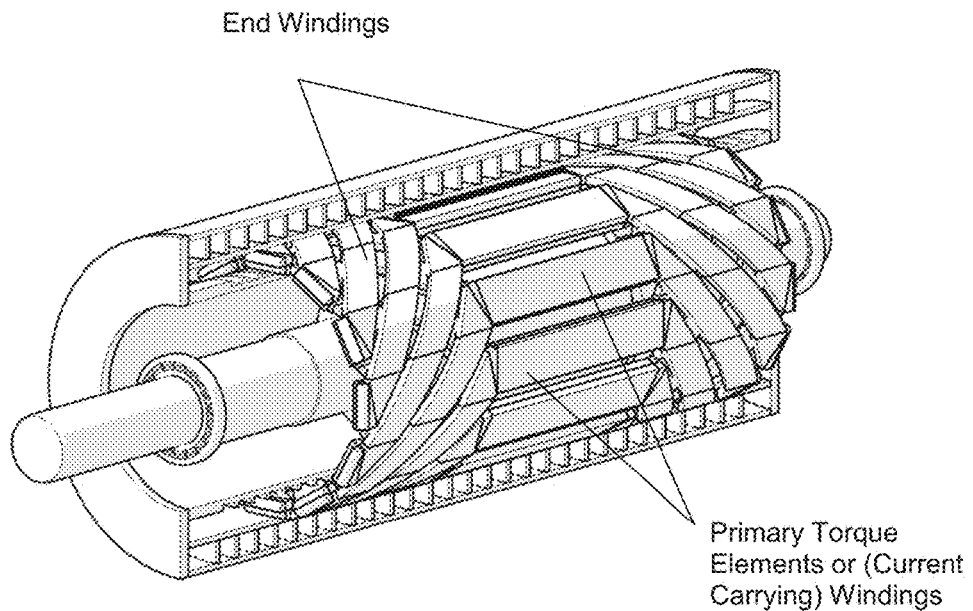

FIG. 145 shows an embodiment of the previously disclosed permanent magnet device incorporating a revised 6 phase winding.

Figure 146:
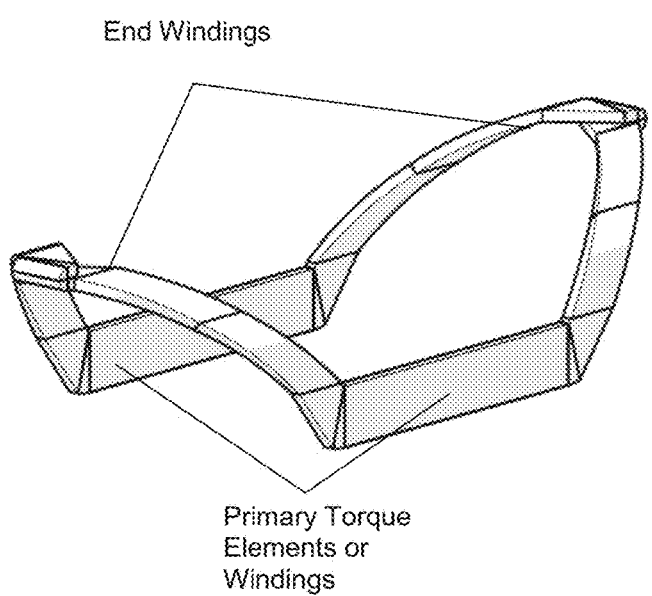

FIG. 146 is a detailed view of a single layer from one phase of the current carrying windings depicted in the embodiment illustrated in FIG. 145.

Figure 147:
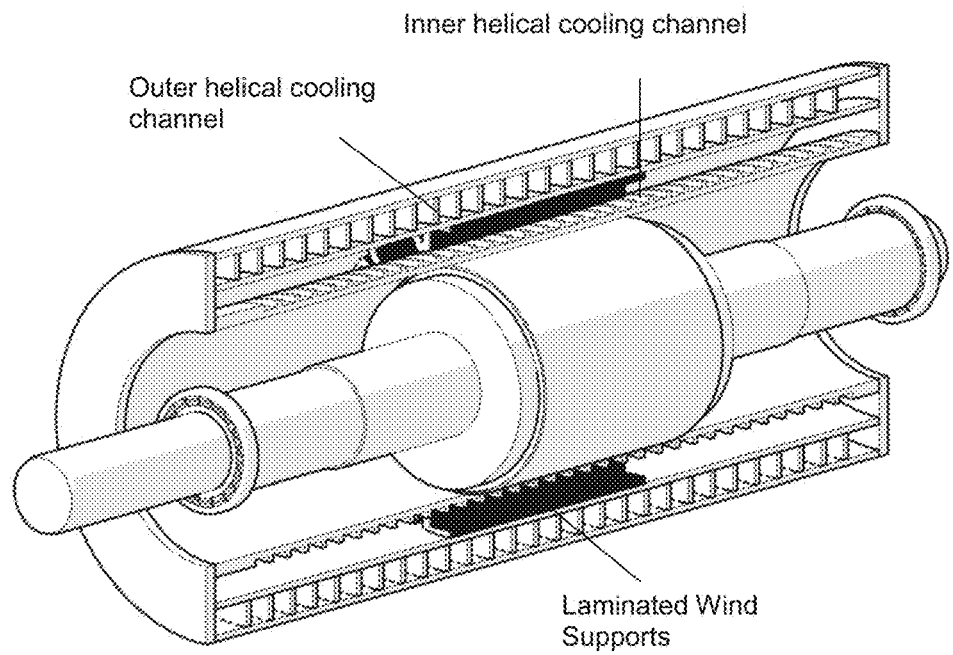

FIG. 147 is an isometric view of the device of FIG. 145 without the current carrying windings.

Figure 148:
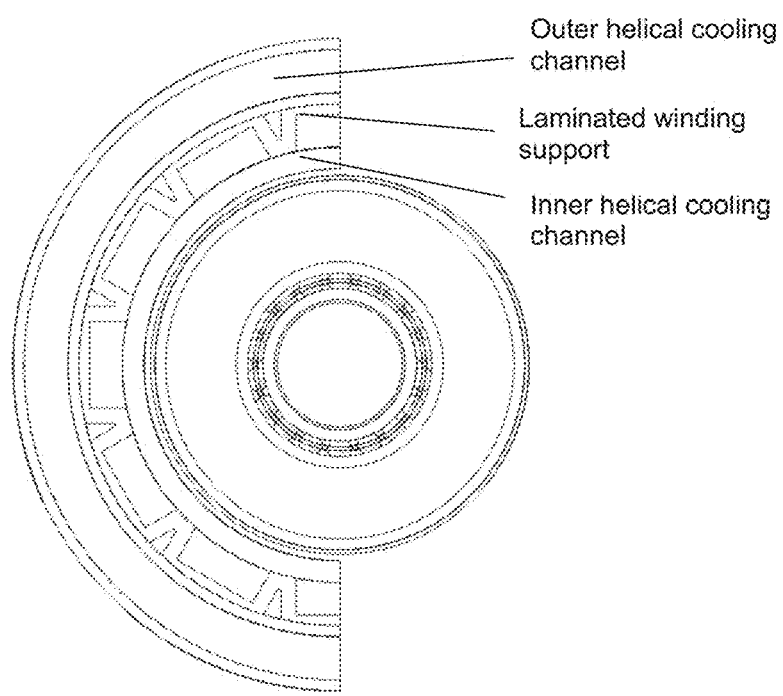

FIG. 148 is a sectional end view of the device shown in FIG. 147, showing the start of the helical cooling channel.

Figure 149:
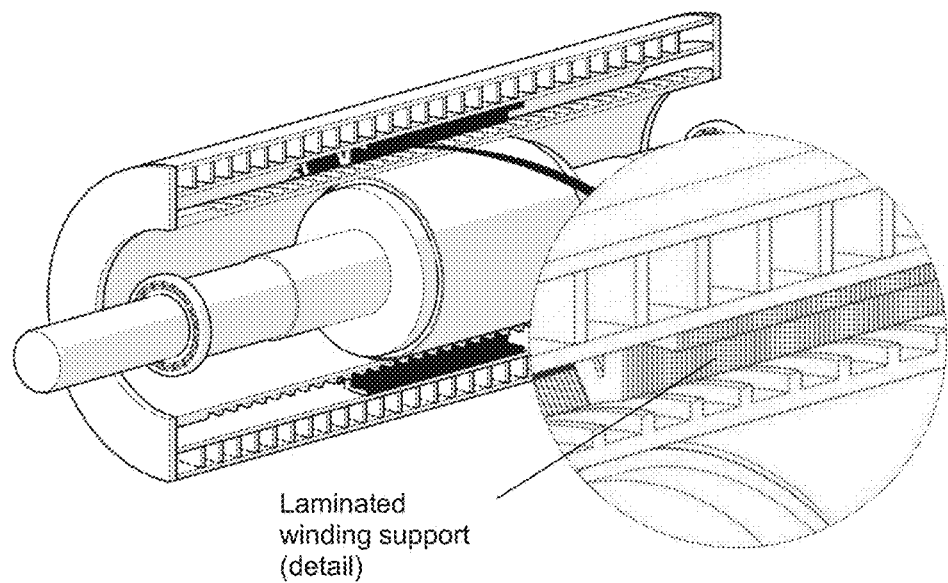

FIG. 149 is an alternate view of the embodiment of FIG. 147 showing an additional detail view of the laminated coil support structure in between the helical cooling channels.

Figure 150:
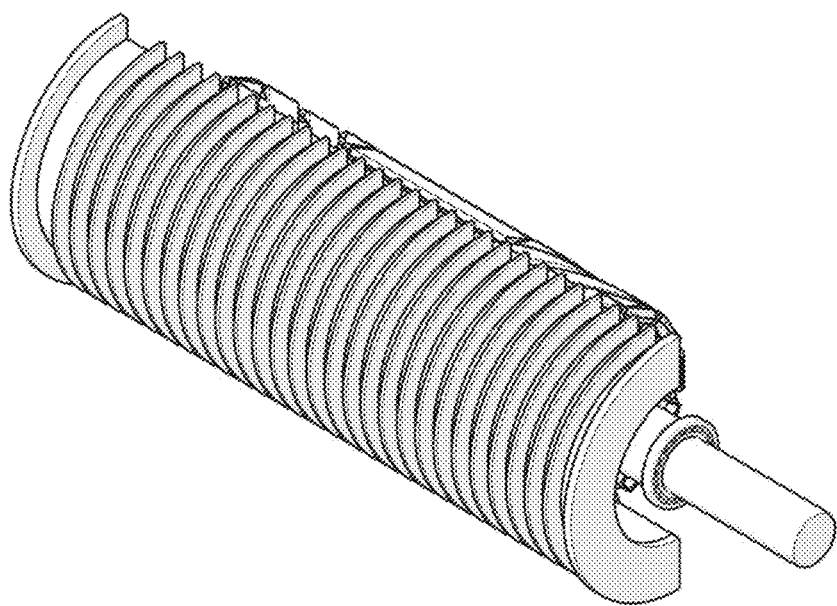

FIG. 150 shows the device shown in FIGS. 145 to 149 with the outer covering removed to show the outer cooling channel that forms a helical path along the axis of the device.

Figure 151:
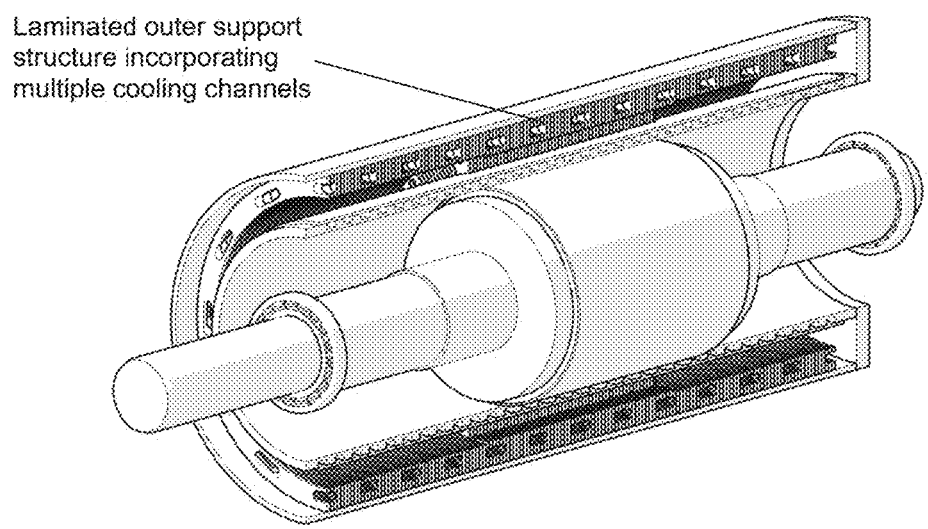

FIG. 151 shows a device where the outer structure consists of a series of laminated plates to minimise loss due to parasitic eddy currents.

Figure 152:
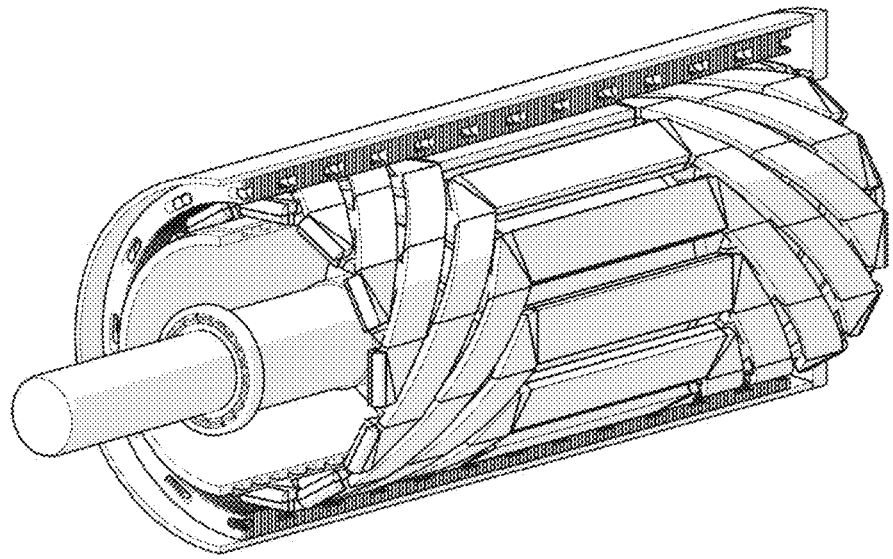

FIG. 152 shows the device shown in FIG. 151 with the current carrying windings in place.

Figure 153:
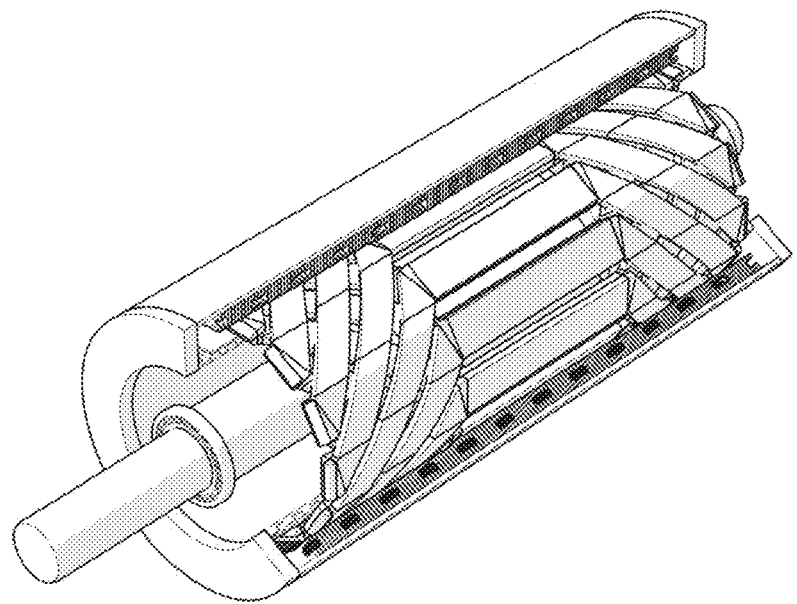

FIG. 153 shows a different semi-sectional view of the device shown in FIG. 152.

Figure 154:
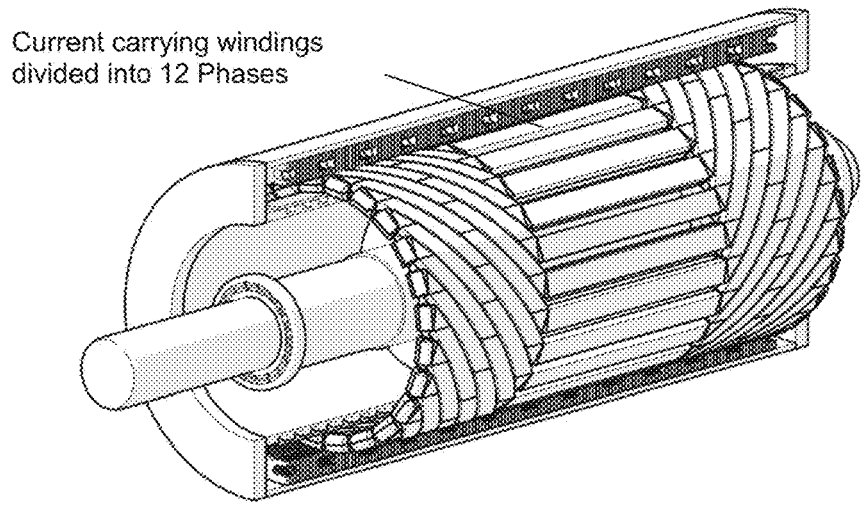

FIG. 154 illustrates an embodiment similar to that shown in FIG. 152 but with the current carrying windings further divided into 12 Phases.

Figure 155:
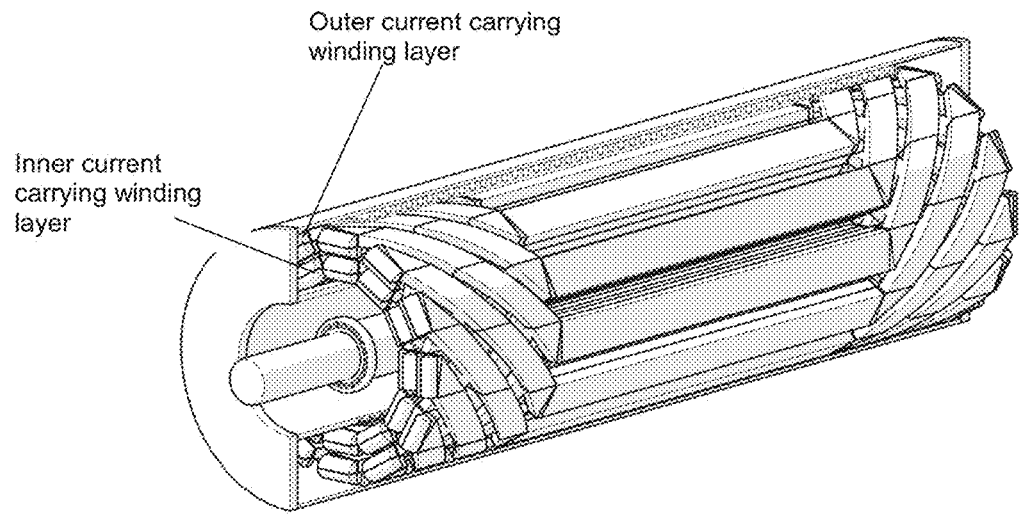

FIG. 155 shows an embodiment of the permanent magnet device where an additional layer of current carrying windings has been included.

Figure 156:
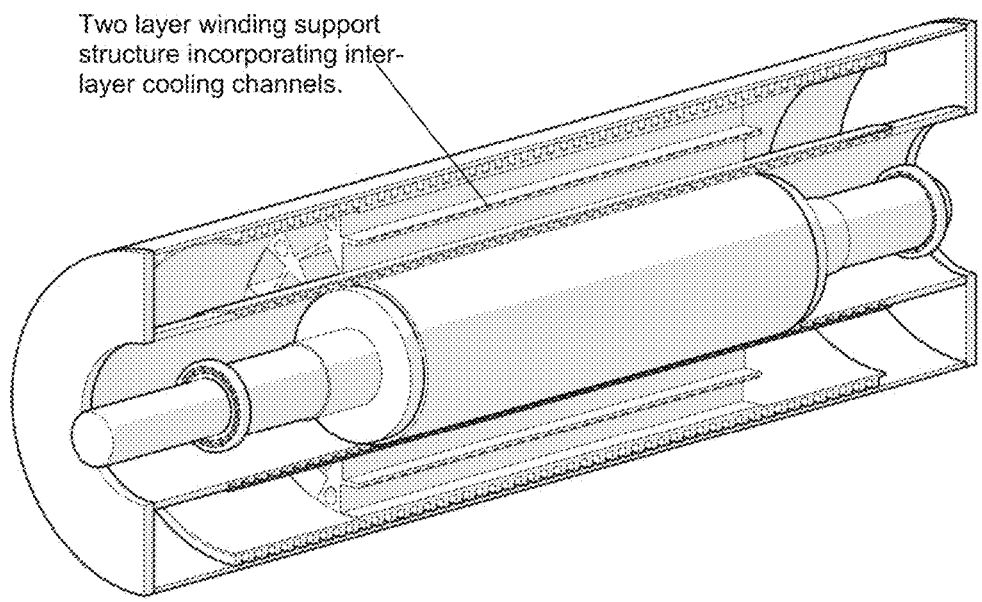

FIG. 156 is a half sectional view of the embodiment of FIG. 155 with the current carrying windings removed showing the three layers of helical cooling channels in the winding support structure.

Figure 157:
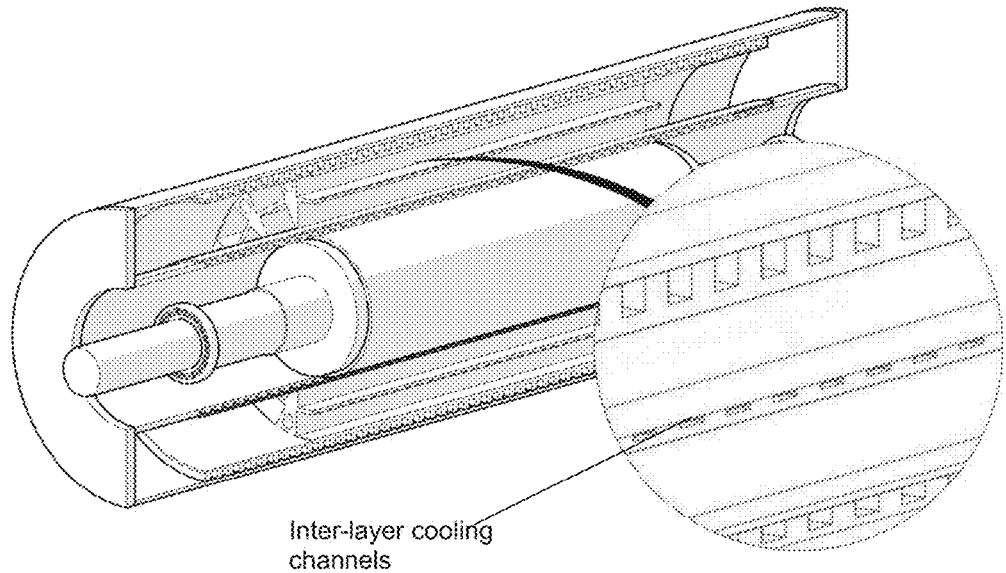

FIG. 157 shows the embodiment of FIG. 156 with an additional detail view showing the three sets of cooling channels.

Figure 158:
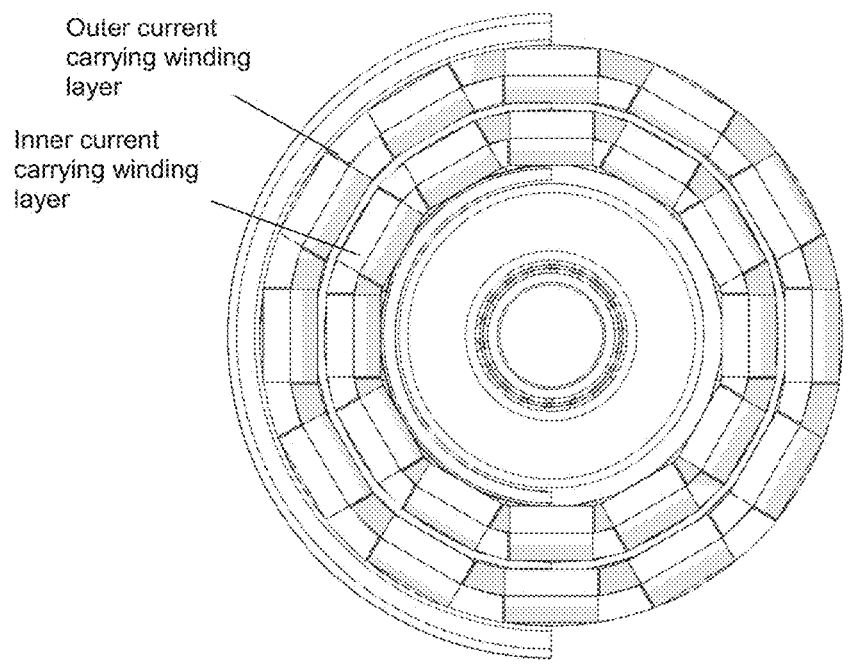

FIG. 158 is a semi-sectional end view of the multi-layer current carrying windings shown in FIG. 155.

Figure 159:
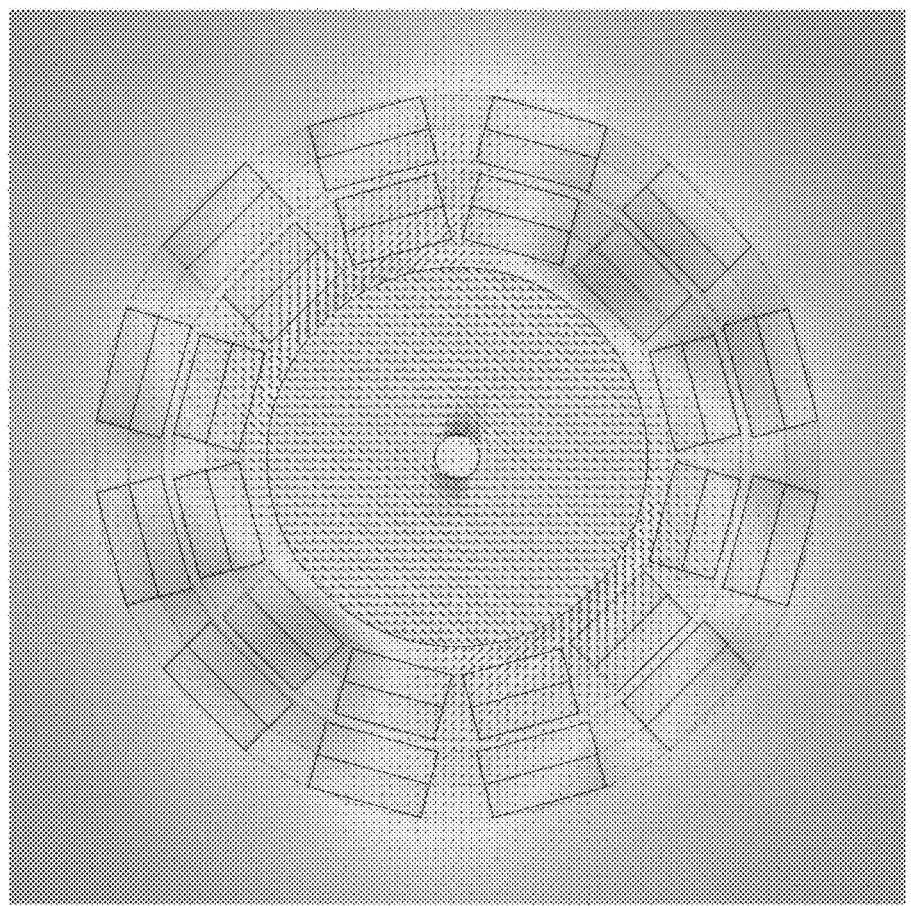

FIG. 159 is a plot of the magnetic field produced by the two layer device shown in FIG. 158.

Figure 160:
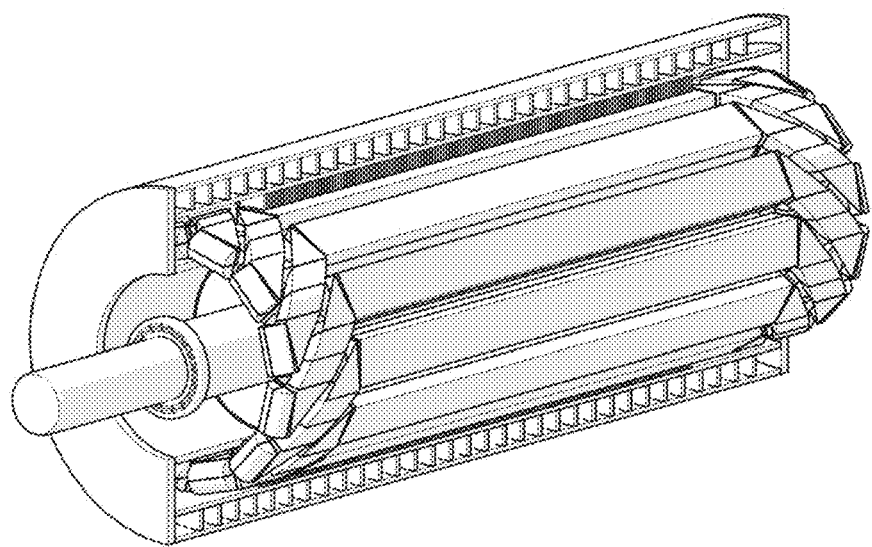

FIG. 160 shows a 4 Pole variation of the single layer permanent magnet device incorporating the revised end windings and cooling channels.

Figure 161:
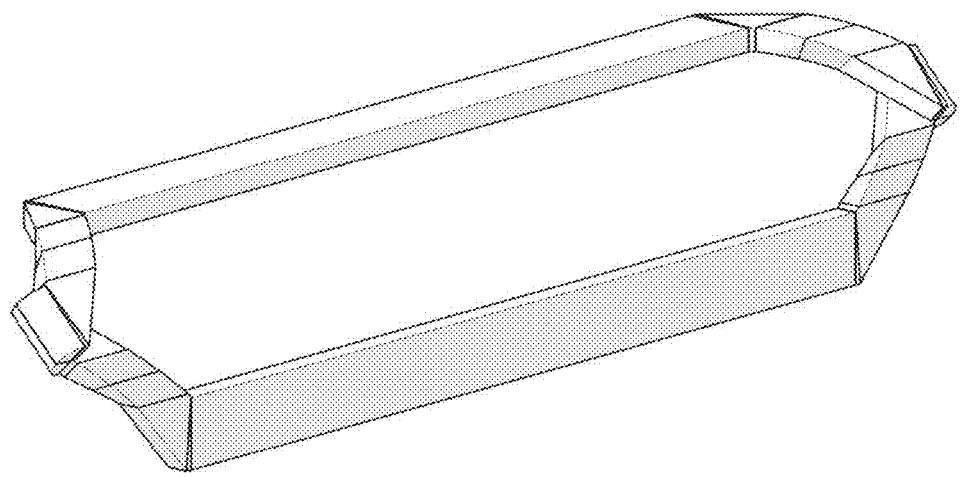

FIG. 161 shows a single layer from one phase of the 4 Pole current carrying windings illustrated in FIG. 160.

Figure 162:
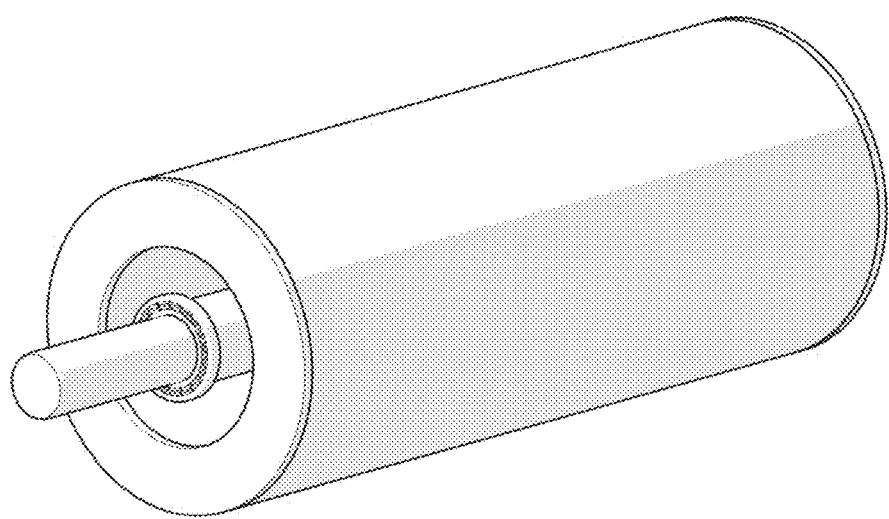

FIG. 162 shows a permanent magnet motor of the type shown in this document with the support and cooling structures in place.

Figure 163:
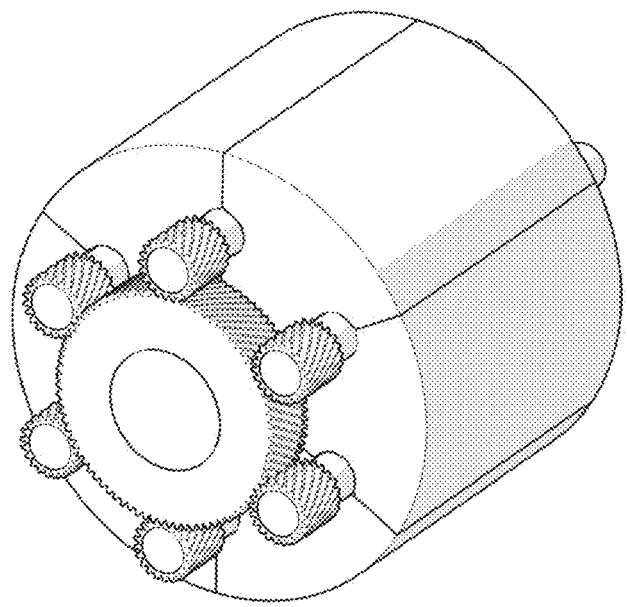

FIG. 163 shows a multi-rotor toroidal style motor/generator according to an aspect of the present invention.

Figure 164:
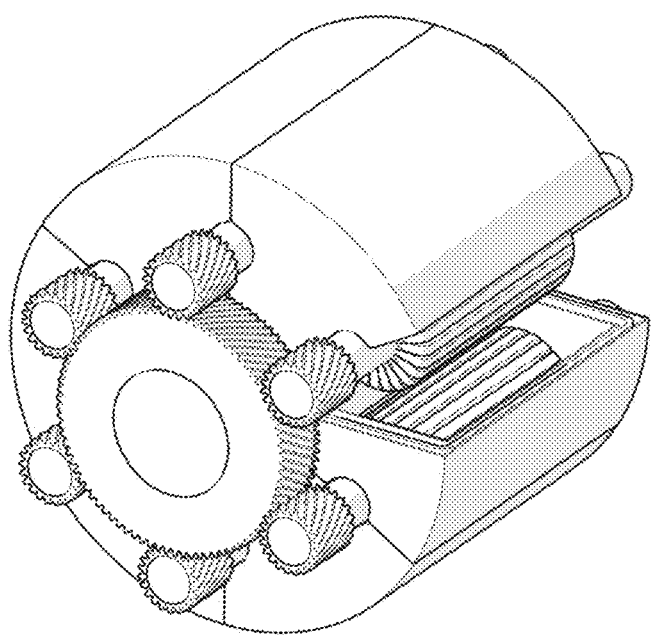

FIG. 164 shows the embodiment of FIG. 163 with one half section of one toroidal segment removed to show the internal current carrying rotor windings.

Figure 165:
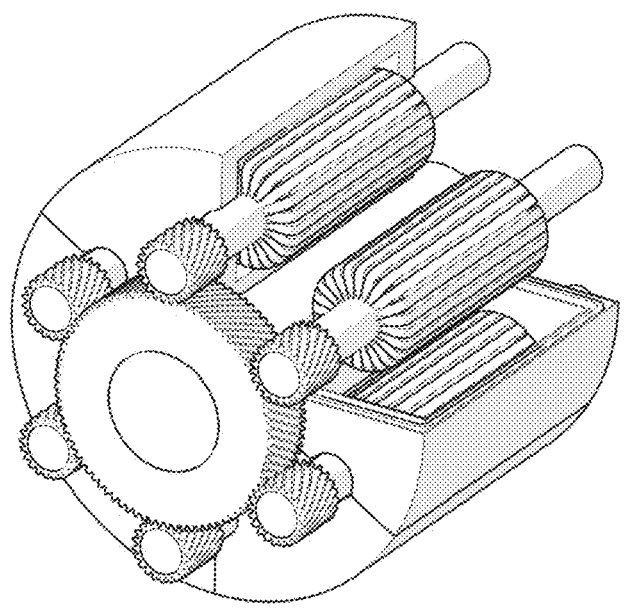

FIG. 165 shows a quarter sectional view of FIG. 163 showing the internal rotor windings in greater detail.

Figure 166:
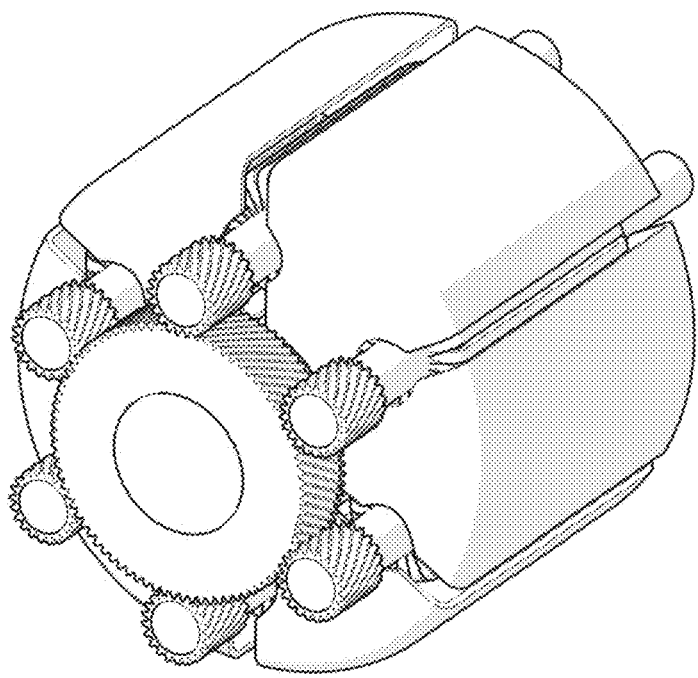

FIG. 166 shows an embodiment of the multi-rotor toroidal drive system with gaps between adjacent winding segments of the toroid shown.

Figure 167:
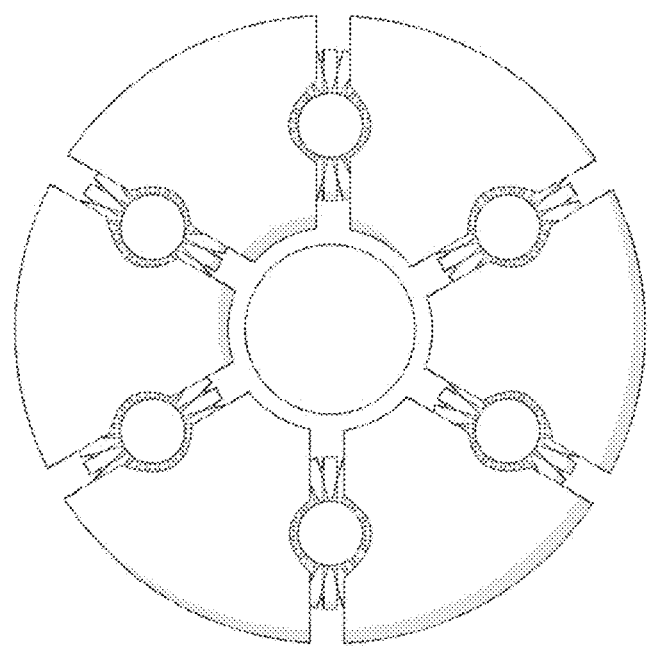

FIG. 167 shows an end view of the embodiment shown in FIG. 166 that shows the gaps between successive segments of the toroidal windings.

Figure 168:
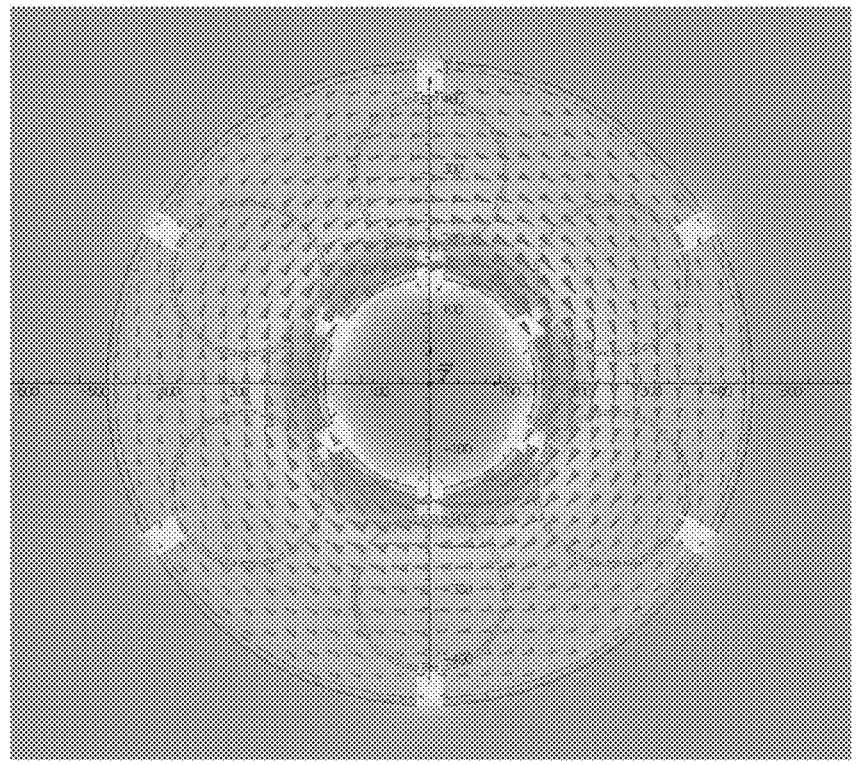

FIG. 168 is a plot of the magnetic field produced by the gapped toroidal windings shown in FIG. 166.

Figure 169:
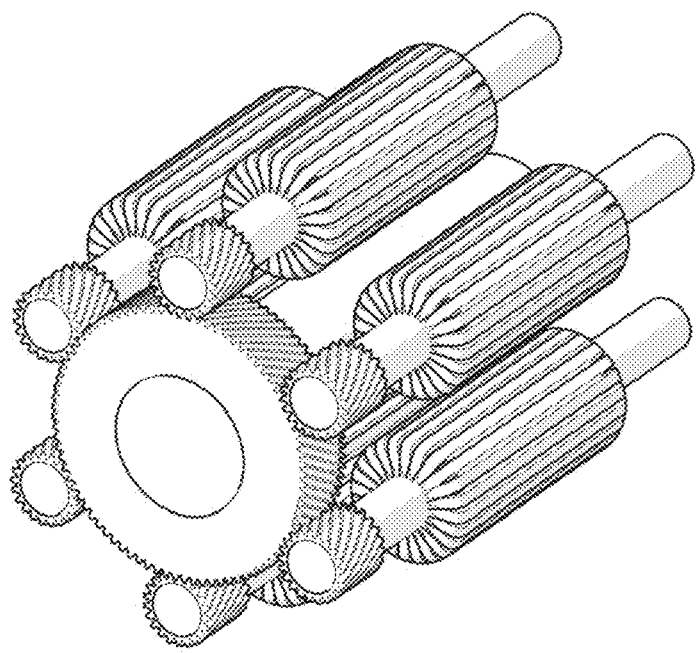

FIG. 169 is an isometric view of the internal rotor assemblies of the devices shown in FIG. 163 and FIG. 165.

Figure 170:
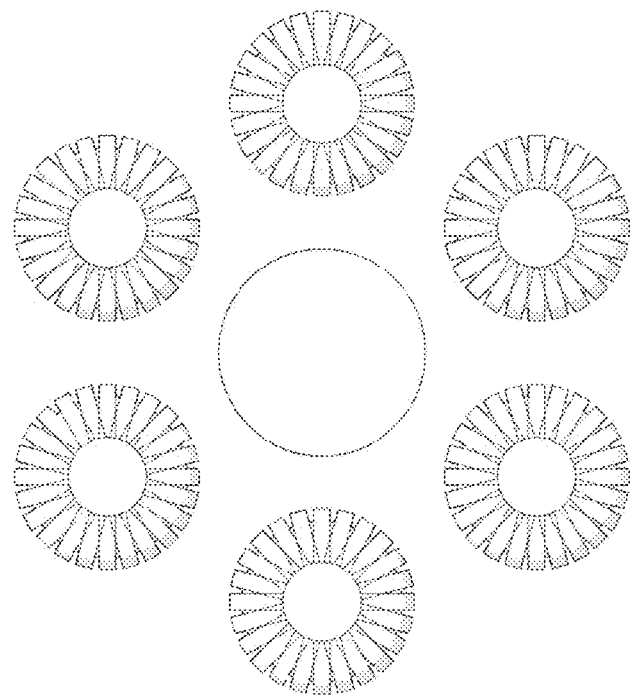

FIG. 170 is an end view of the multi-rotor assembly shown in FIG. 168.

Figure 171:
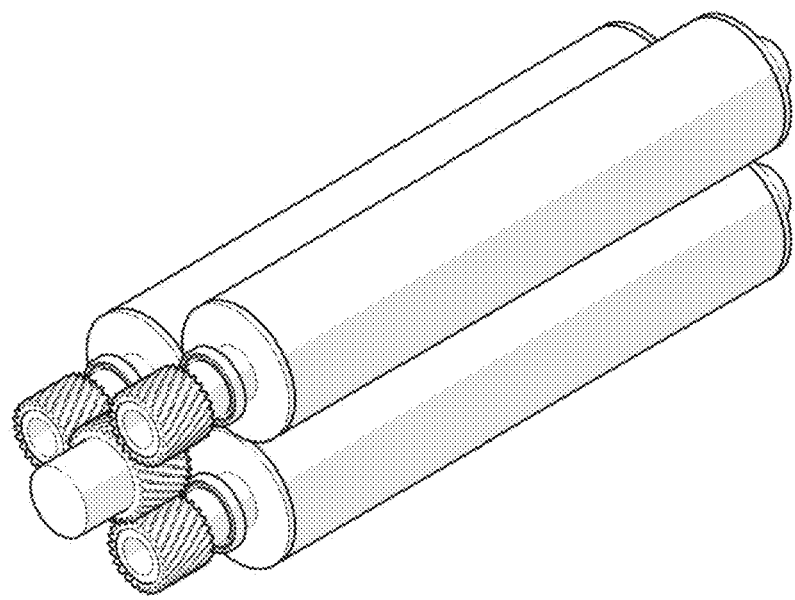

FIG. 171 shows a 3-rotor toroidal permanent magnet motor/generator that incorporates the revised end windings and the channels for liquid cooling of the current carrying windings.

Figure 172:
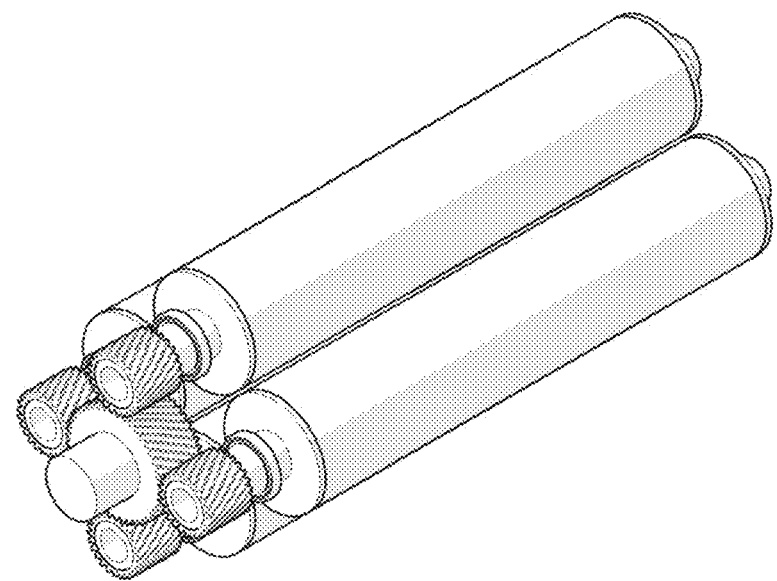

FIG. 172 shows a 4-rotor toroidal permanent magnet motor/generator that incorporates the revised end windings and the channels for liquid cooling of the current carrying windings.

Figure 173:
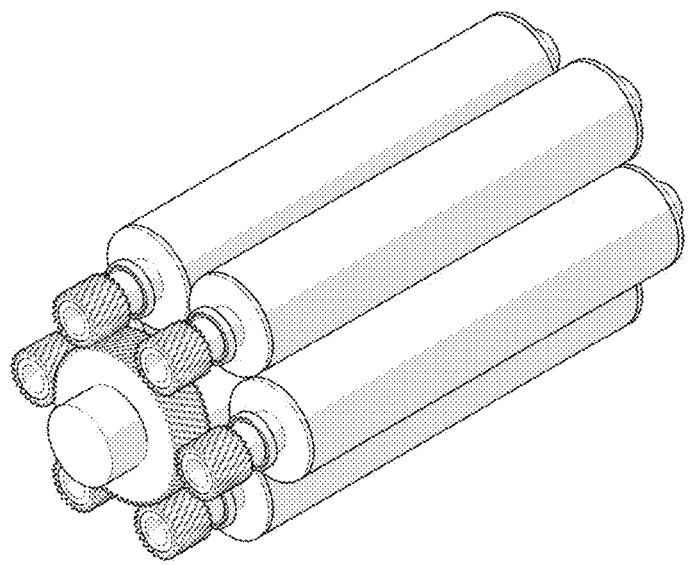

FIG. 173 shows a 6-rotor toroidal permanent magnet motor/generator that incorporates the revised end windings and the channels for liquid cooling of the current carrying windings.

Figure 174:
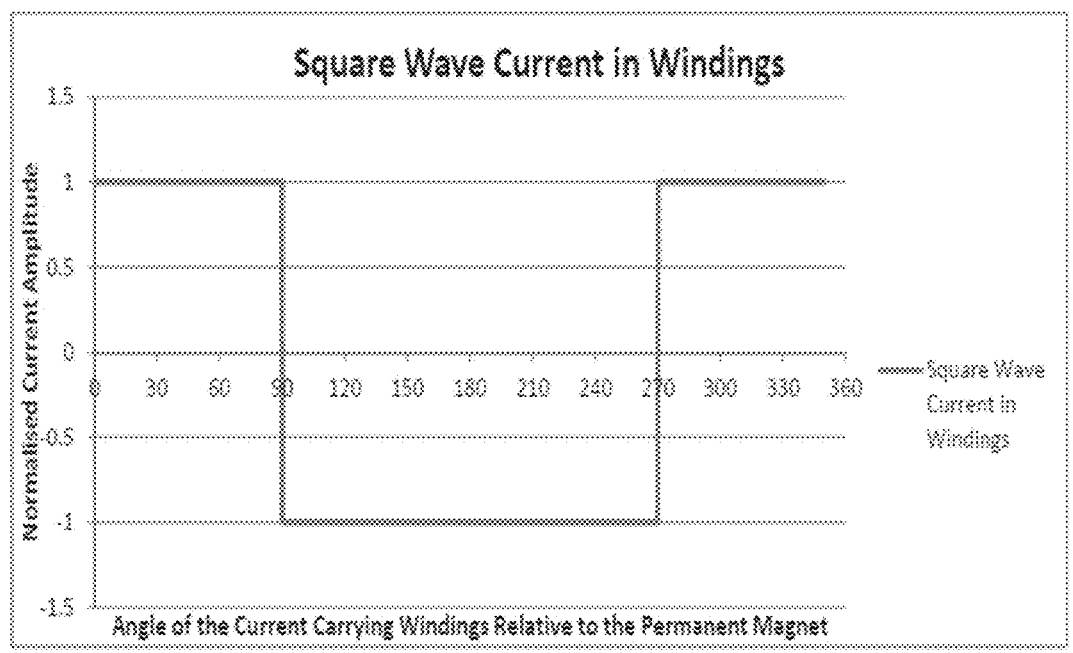

FIG. 174 is a graphical illustration of the default square wave current pattern intended in preferred embodiments presented.

Figure 175:
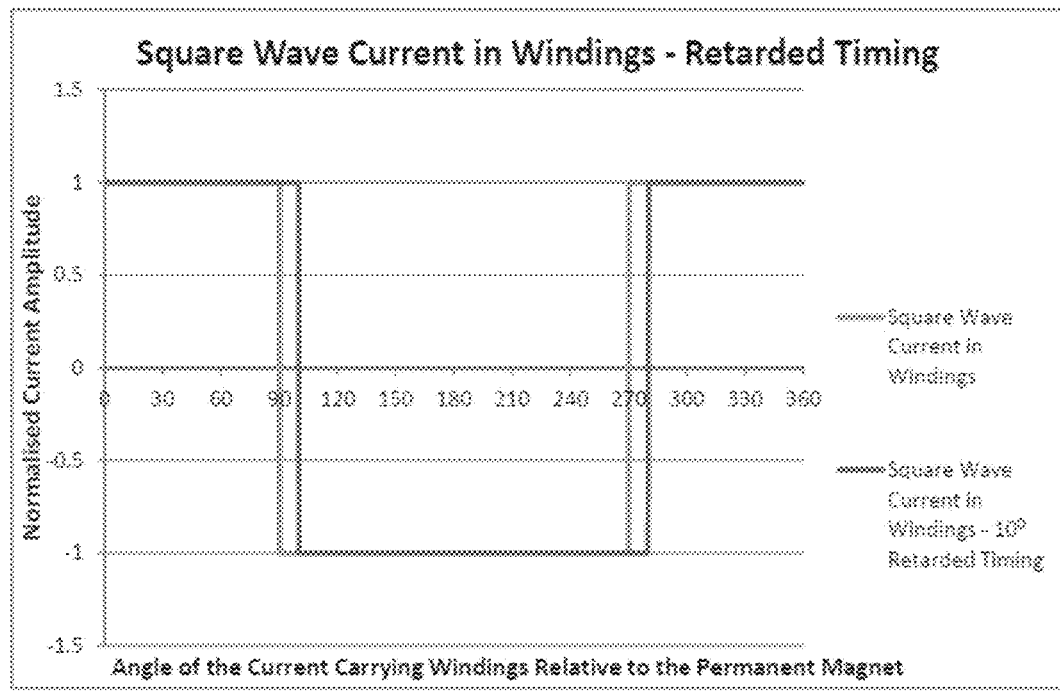

FIG. 175 is a graphical illustration of square wave current delivery with the timing of the current reversal retarded relative to the timing of FIG. 174.

Figure 176:
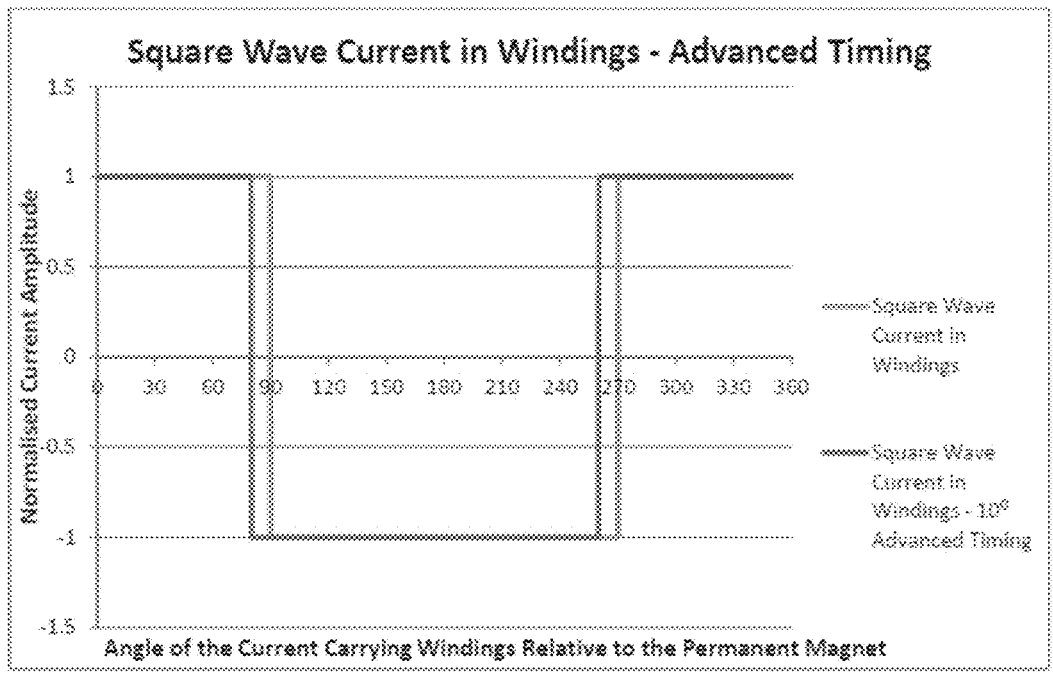

FIG. 176 is a graphical illustration of square wave current delivery with the timing of the current reversal advanced relative to the timing of FIG. 174.

Figure 177:
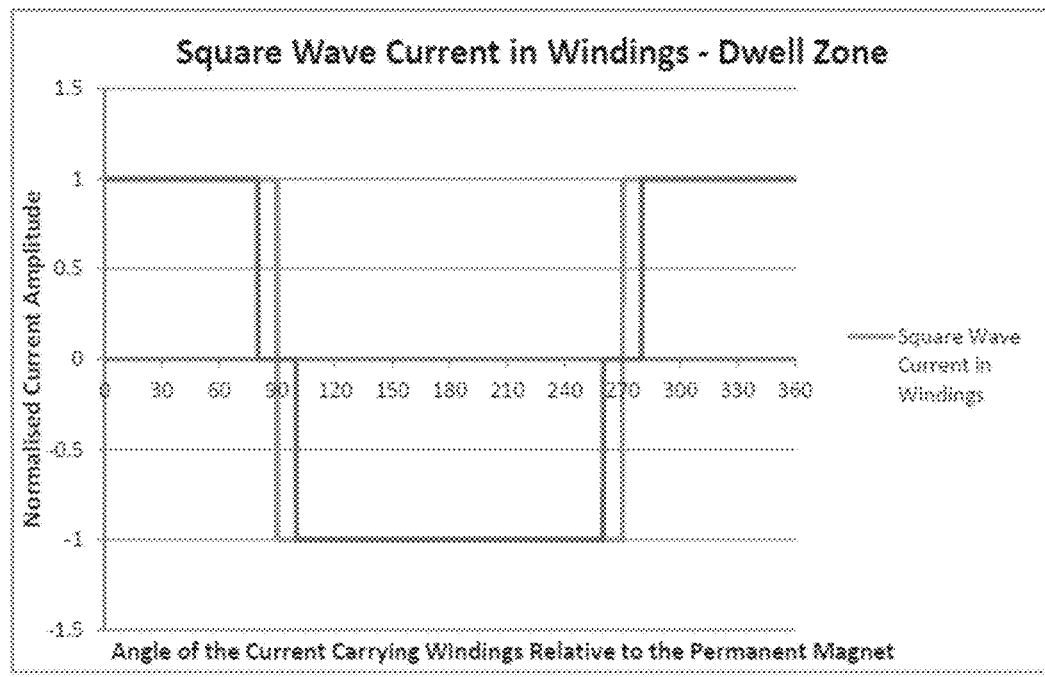

FIG. 177 is a graphical illustration of square wave current delivery with a dwell zone of during current reversal where no current is flowing in the windings.

Figure 178:
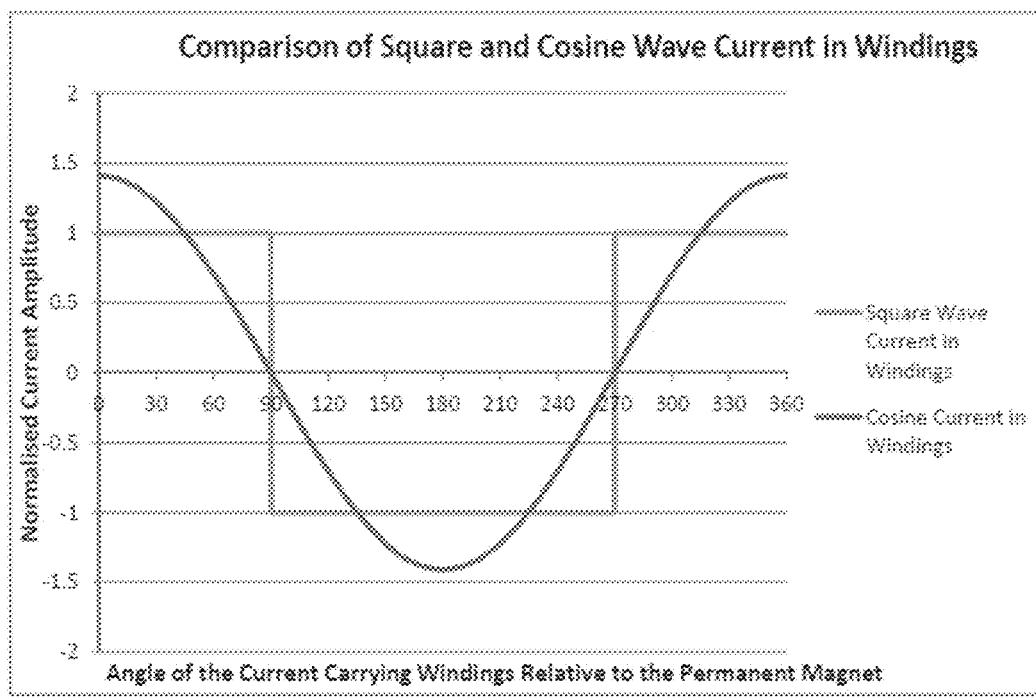

FIG. 178 is a graphical illustration of a comparison between square wave current delivery and the equivalent power current waveform as a cosine wave for sinusoidal current delivery.

Figure 179:
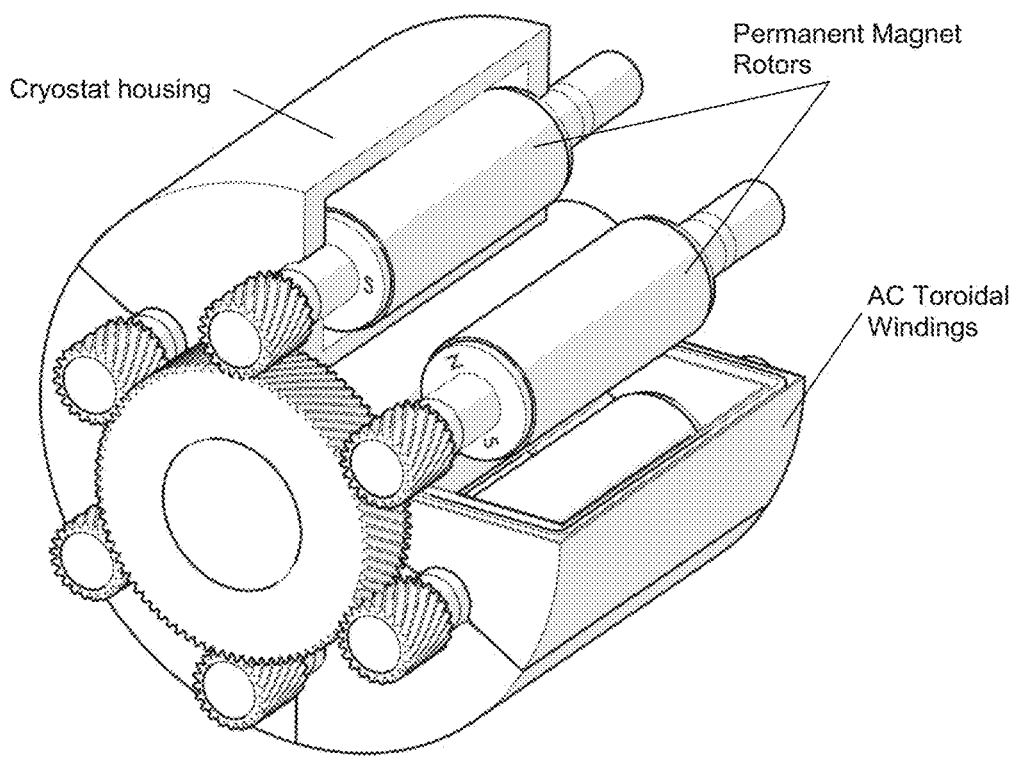

FIG. 179 illustrates an embodiment of the toroidal technology where the toroidal background windings are powered by an AC source resulting in a background field that alternates in polarity. The rotors are constructed from permanent magnet material.

Figure 180:
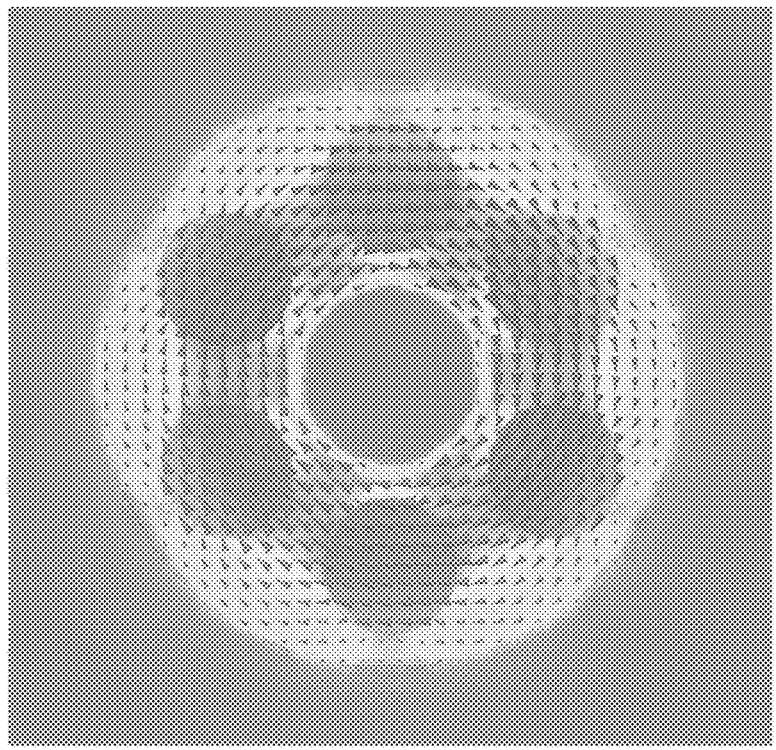

FIG. 180 is a magnetic field plot of the device shown in FIG. 179.

Figure 181:
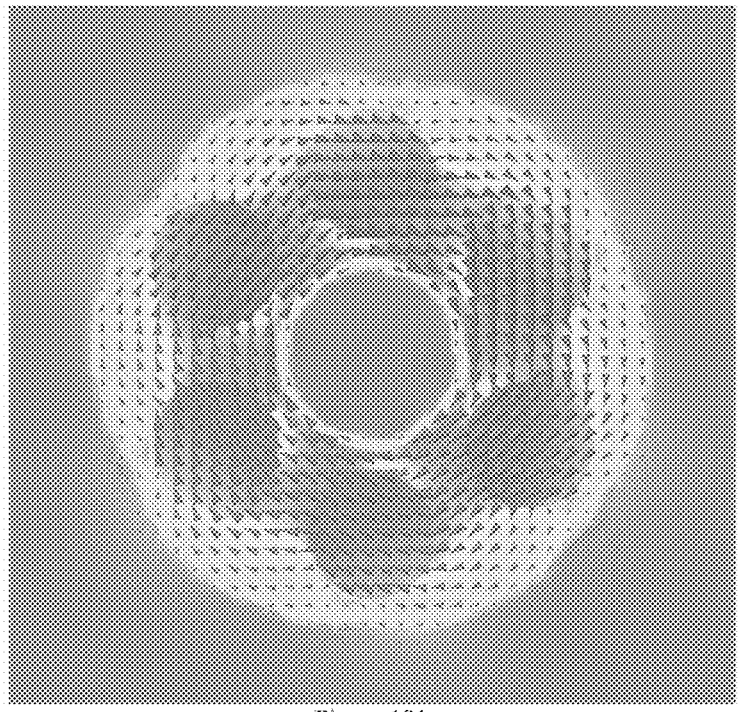

FIG. 181 is a magnetic field plot of the device shown in FIG. 179 with the permanent magnet rotors shown rotated 45 degrees relative to the tangential direction of the magnetic field from the toroidal background windings.

Figure 182:
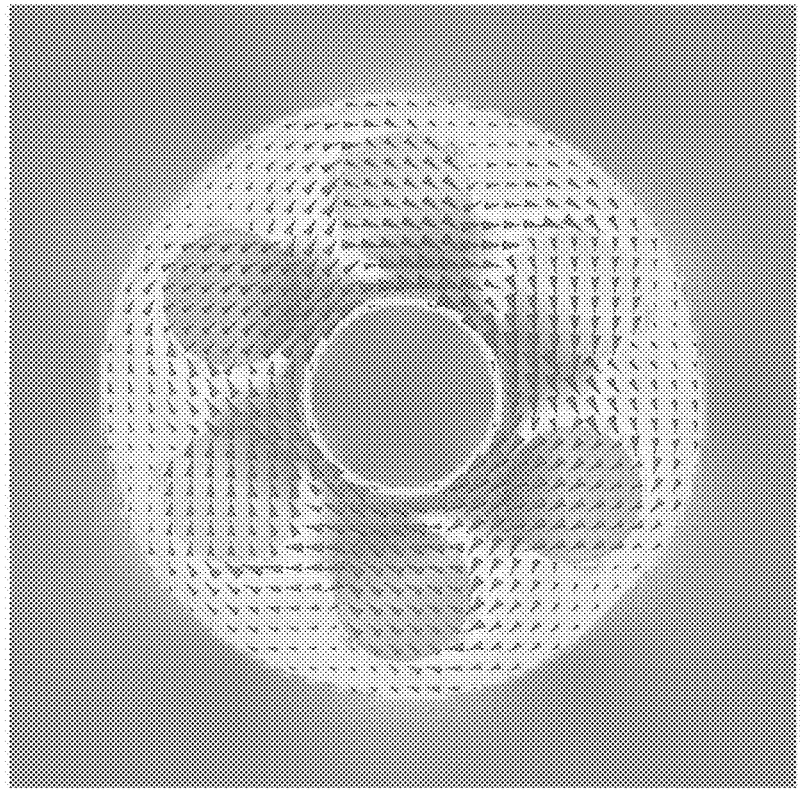

FIG. 182 is a magnetic field plot of the device shown in FIG. 179 with the permanent magnet rotors shown rotated 90 degrees relative to the tangential direction of the magnetic field from the toroidal background windings.

Figure 183:
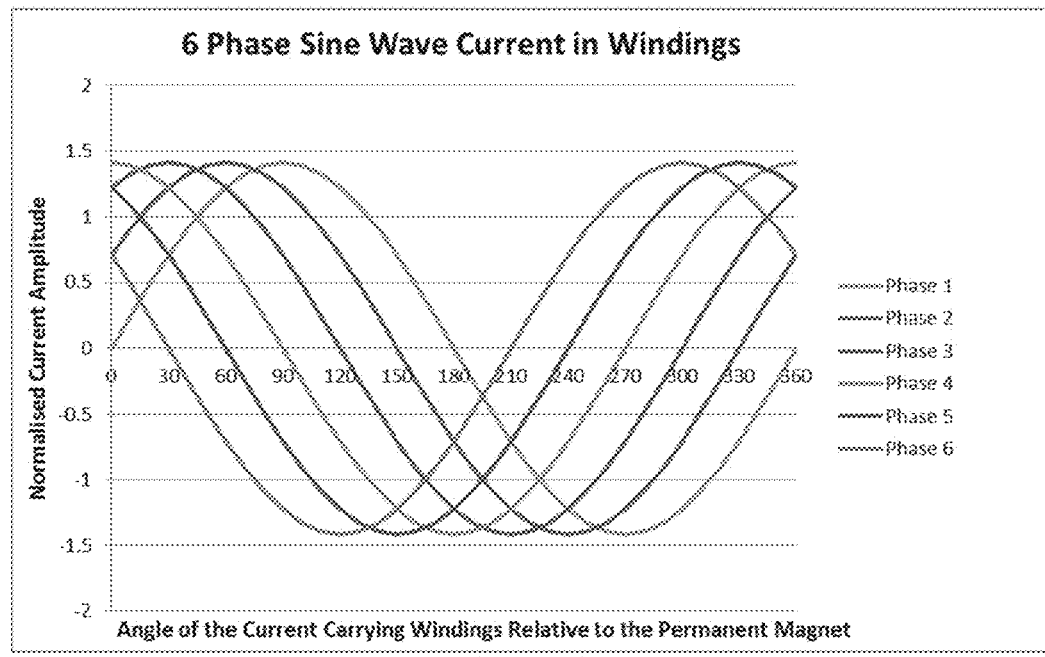

FIG. 183 is a graphical illustration of a potential sinusoidal current waveform in the current carrying windings showing the required phase shift for a 2 Pole, 6 Phase device.

Figure 184:
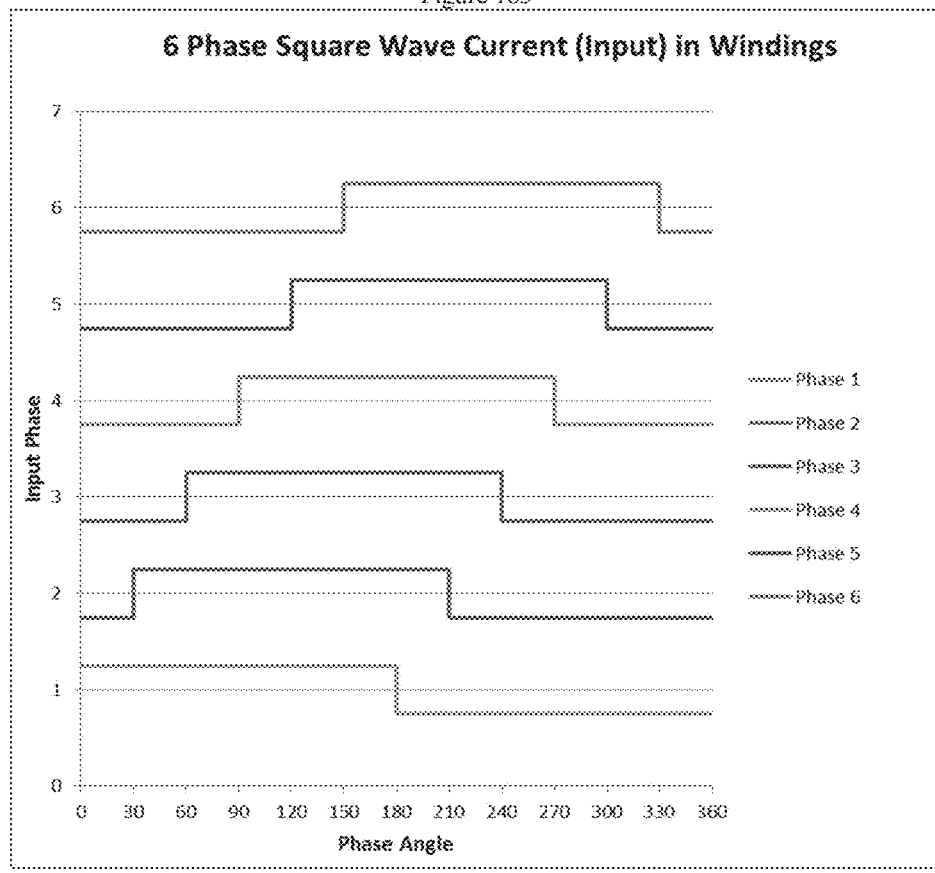

FIG. 184 is a graphical illustration of a potential square current waveform in the current carrying windings showing the required phase shift for a 2 Pole, 6 Phase device.

Figure 185:
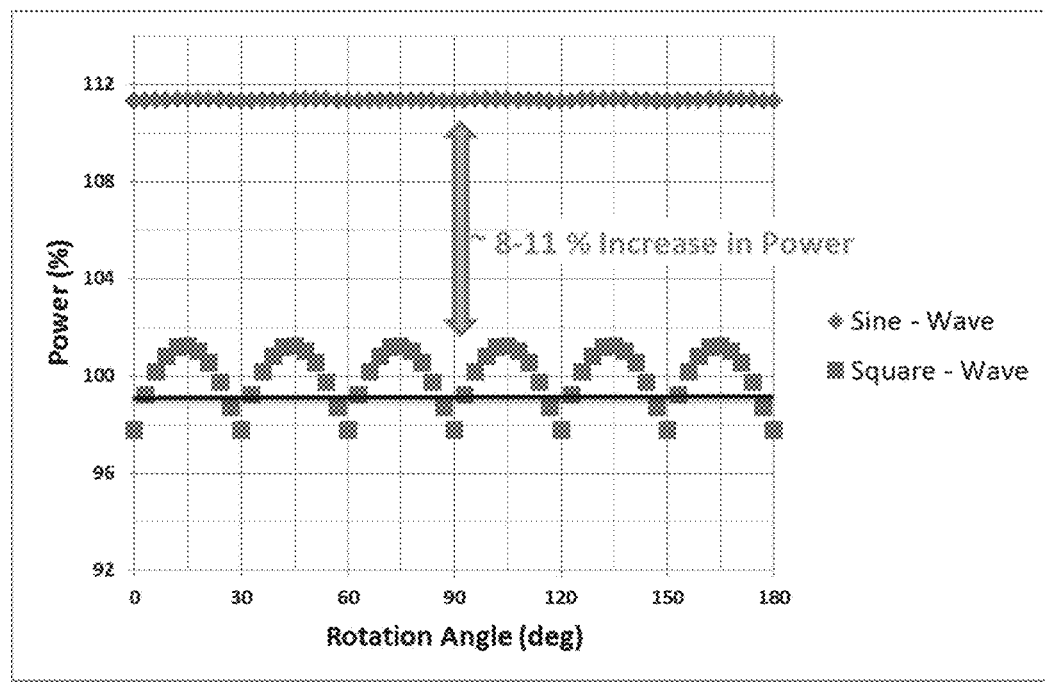

FIG. 185 is a graphical illustration showing the difference in output power from a device operating with square wave current in the windings vs. sine wave current in the windings.

Figure 186:
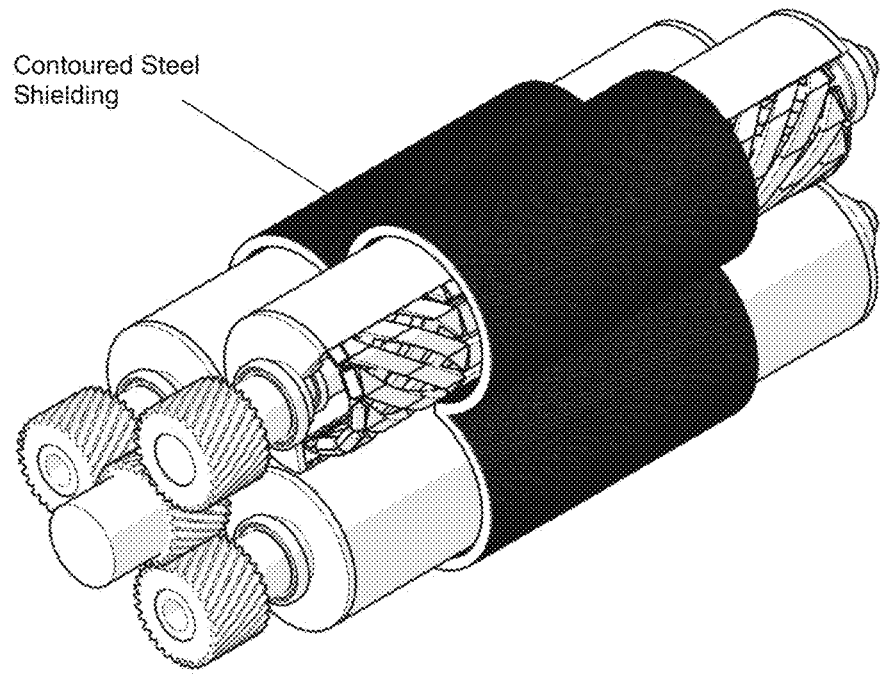

FIG. 186 shows a 3-rotor permanent magnet toroidal machine with a laminated steel shield that follows the external contours of the 3-rotor system.

Figure 187:
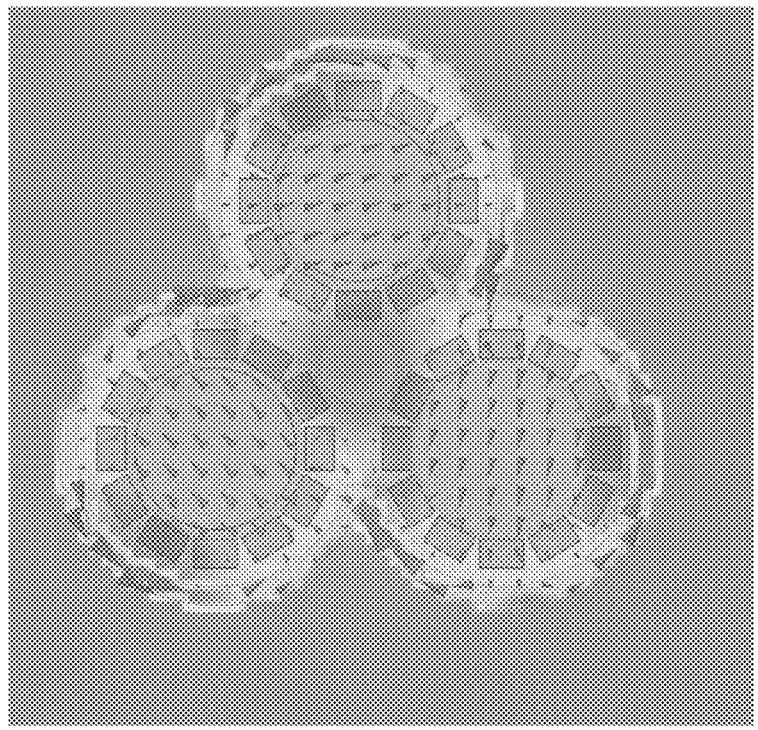

FIG. 187 is a magnetic field plot of a 3 rotor toroidal device shown in FIG. 186 with additional steel shielding that follows the external contours of the machine.

Figure 188:
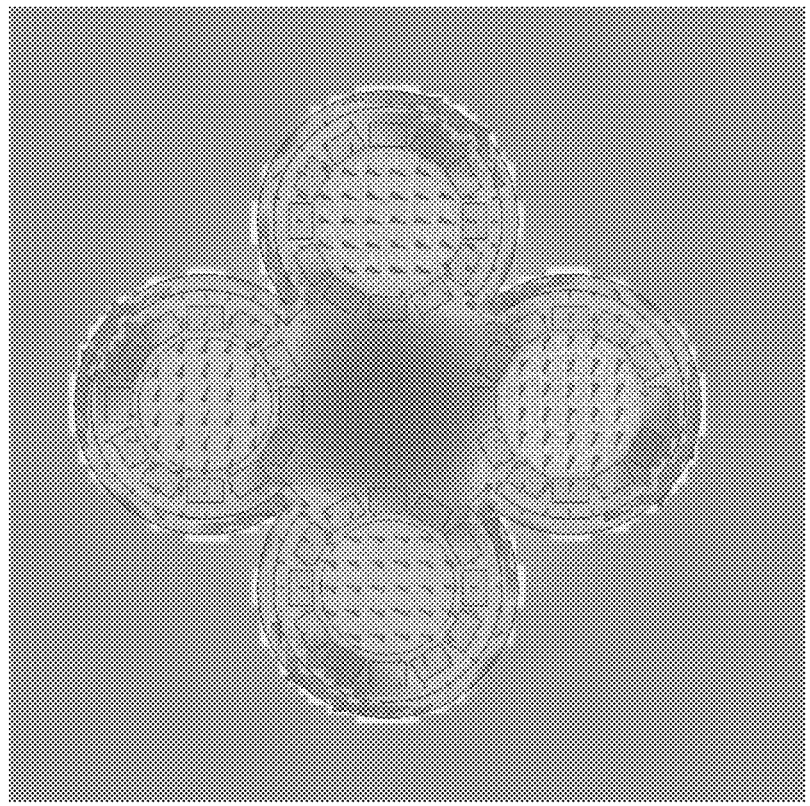

FIG. 188 is a magnetic field plot of a 4 Rotor Toroidal Device with additional steel shielding that follows the external contours of the machine.

Figure 189:
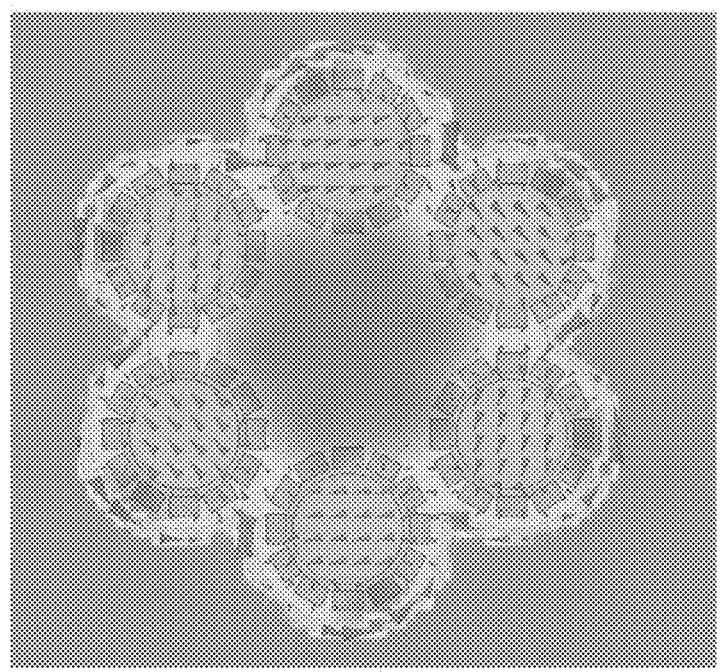

FIG. 189 is a magnetic field plot of a 6 Rotor Toroidal Device with additional steel shielding that follows the external contours of the machine.

Figure 190:
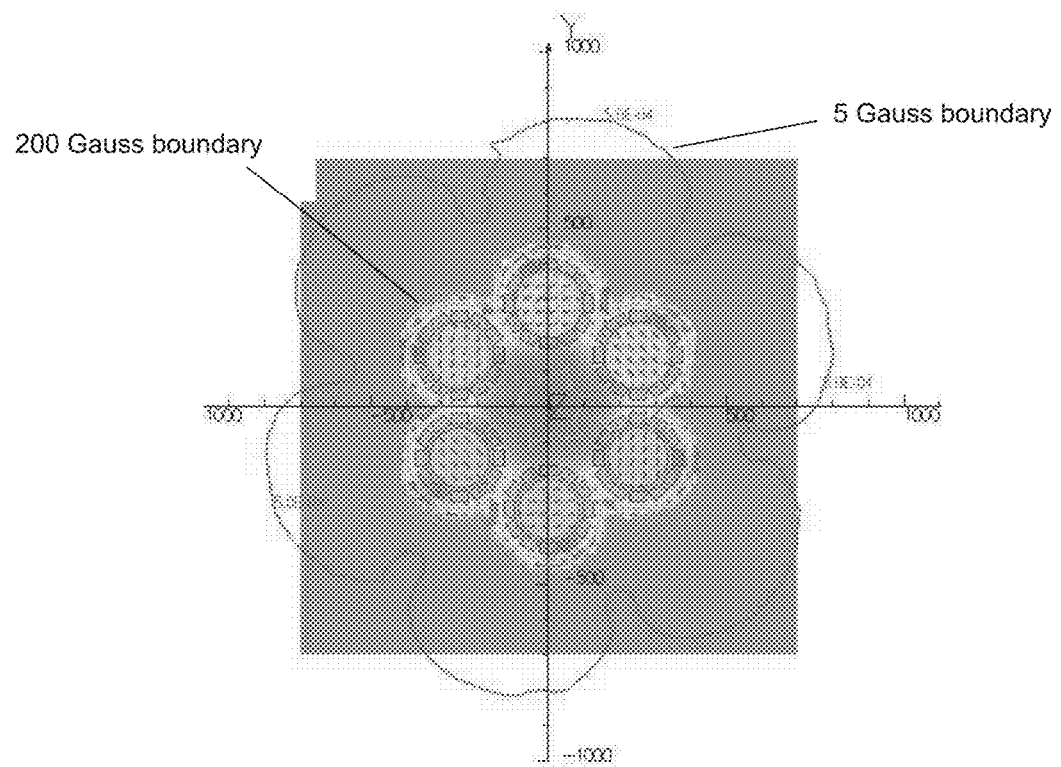

FIG. 190 is a magnetic field plot of the 6 Rotor Toroidal Device with additional steel shielding shown in FIG. 189 but with the 200 Gauss and 5 Gauss magnetic field line boundaries indicated to show the containment of the magnetic field.

Figure 191:
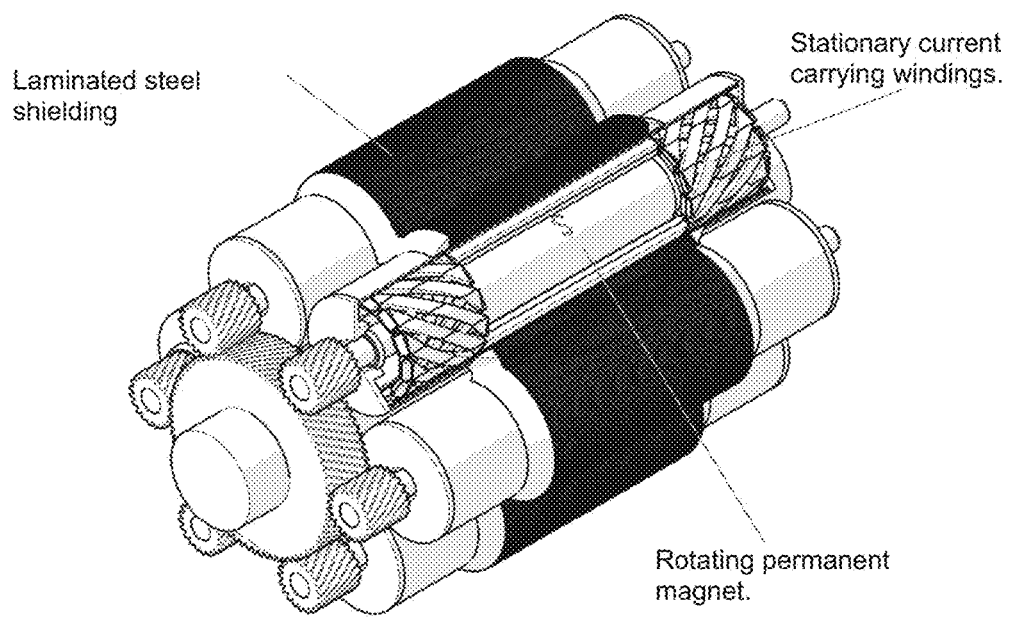

FIG. 191 is an isometric view of a brushless permanent magnet cluster assembly with 6 Rotors.

Figure 192:
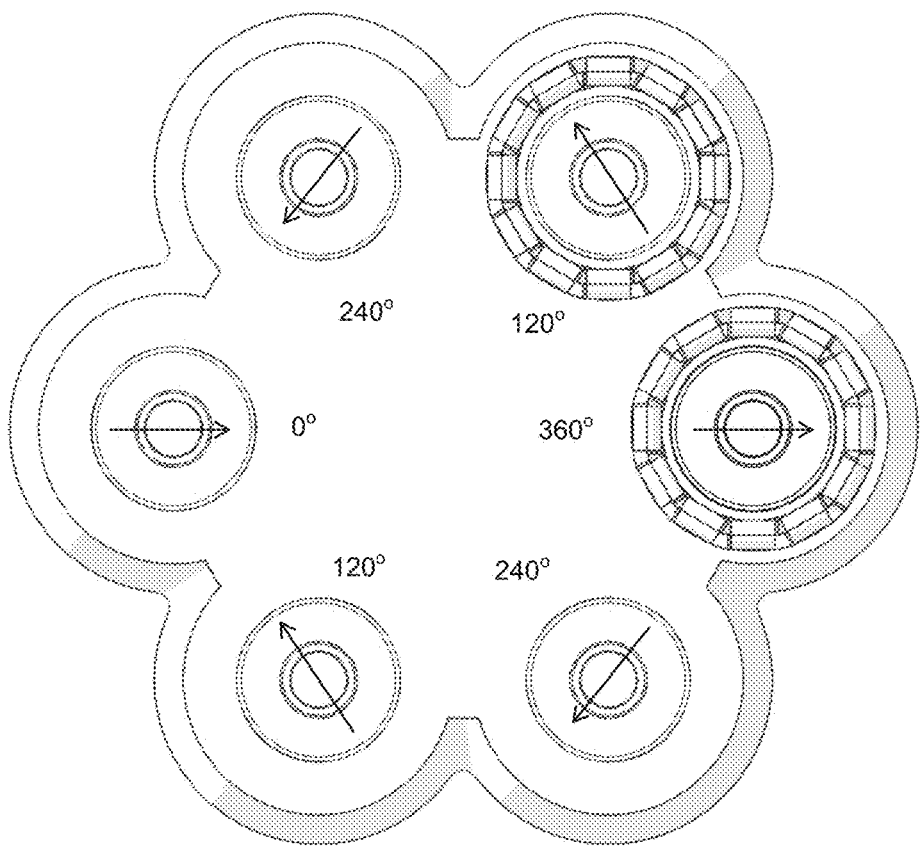

FIG. 192 is an end view of the device shown in FIG. 191 with the arrows and angles indicating the relative polarities of the successive permanent magnets within the cluster assembly at one position of rotation.

Figure 193:
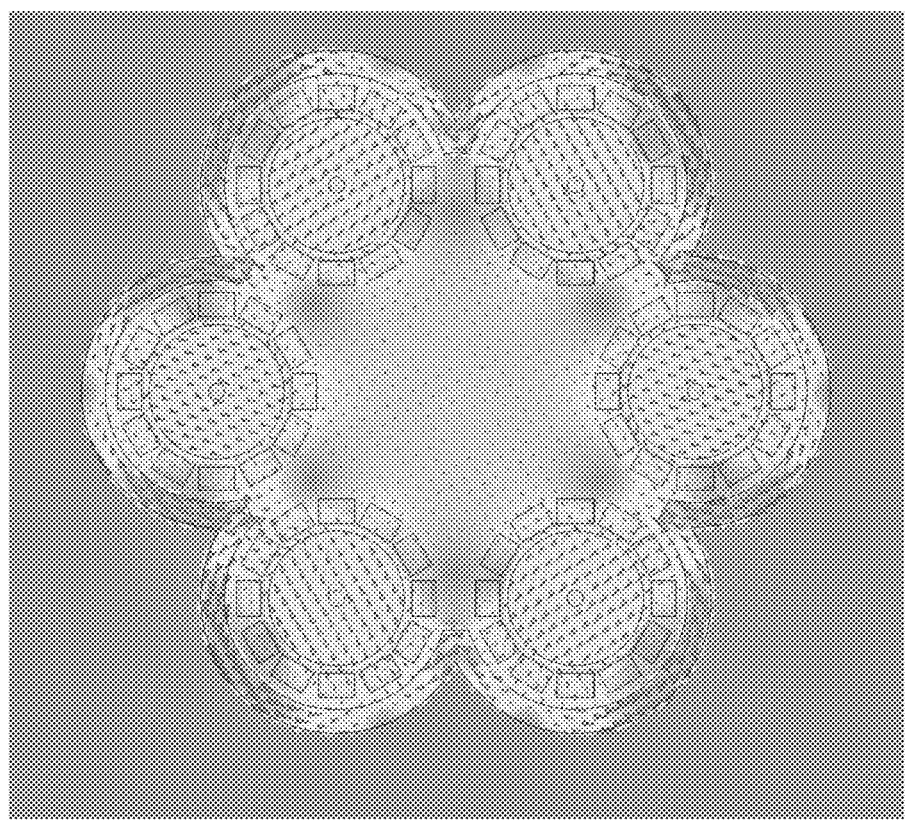

FIG. 193 is a magnetic field plot of the device shown in FIG. 191 for a single rotor position.

Figure 194:
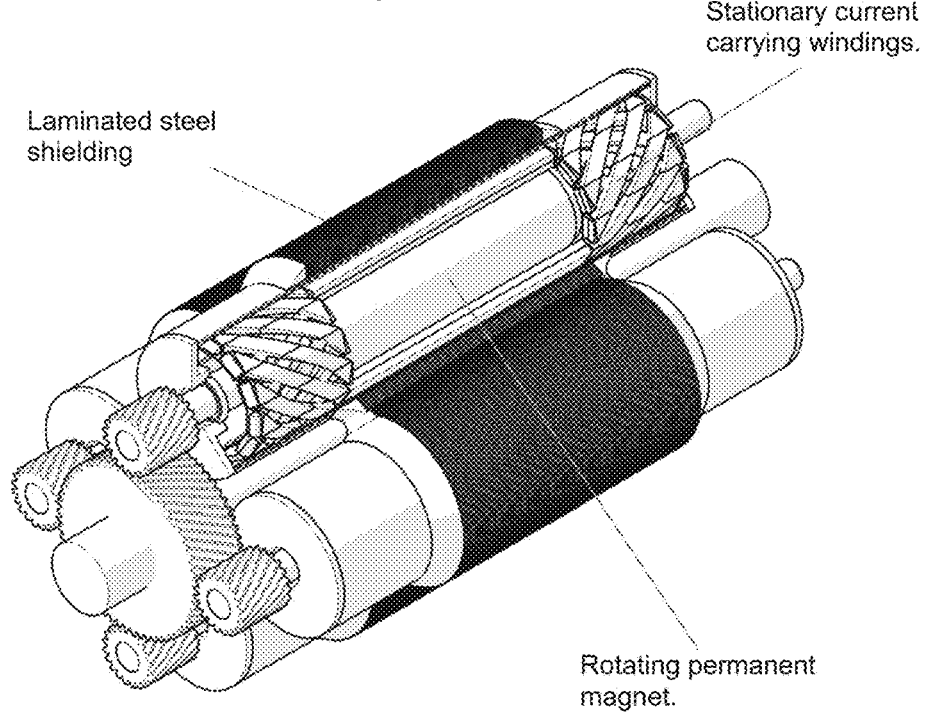

FIG. 194 is an isometric view of a brushless permanent magnet cluster assembly with 4 Rotors.

Figure 195:
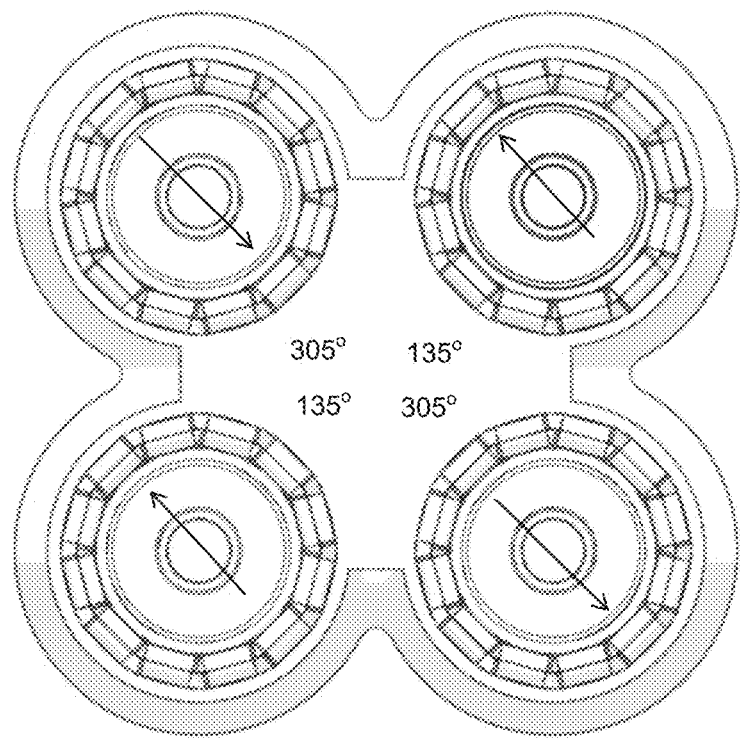

FIG. 195 is an end view of the device shown in FIG. 194 with the arrows and angles indicating the relative polarities of the successive permanent magnets within the cluster assembly at one position of rotation.

Figure 196:
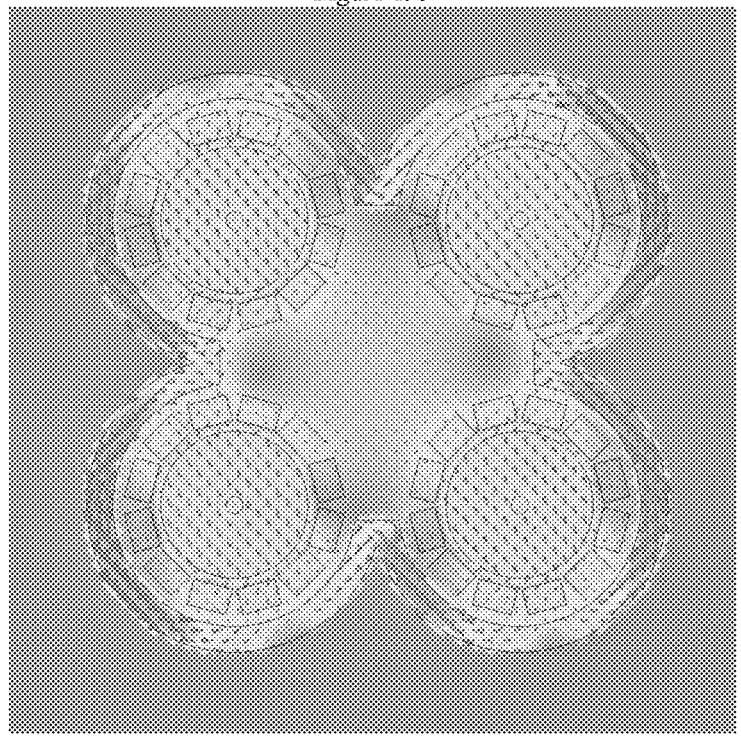

FIG. 196 is a magnetic field plot of the device shown in FIG. 194 for a single rotor position.

Figure 197:
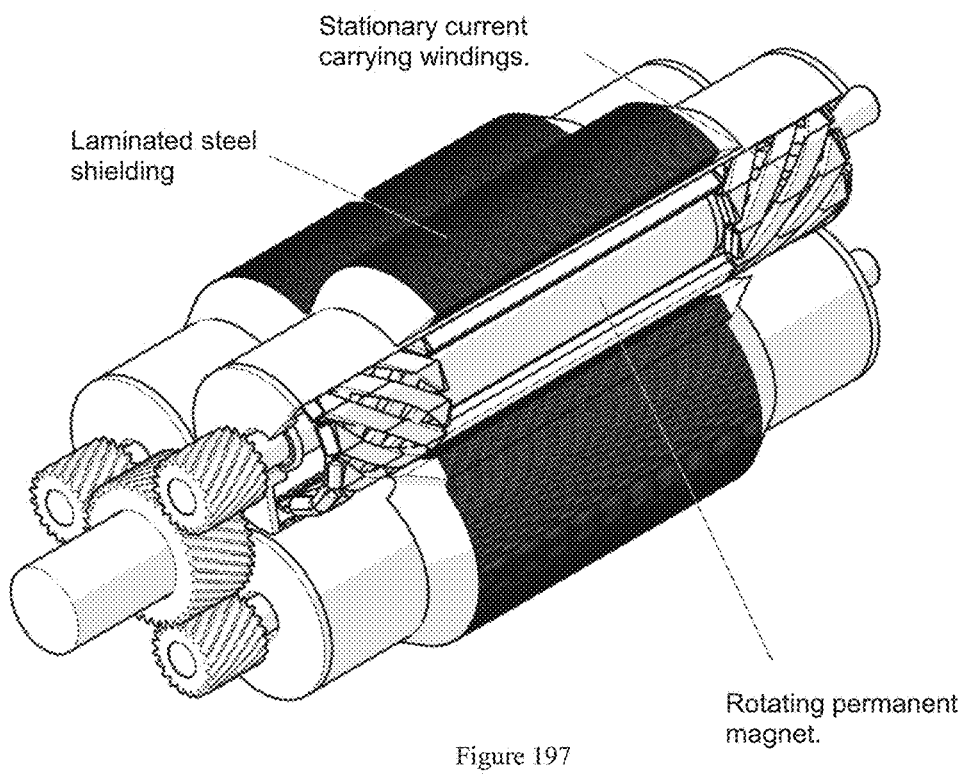

FIG. 197 is an isometric view of a brushless permanent magnet cluster assembly with 3 Rotors.

Figure 198:
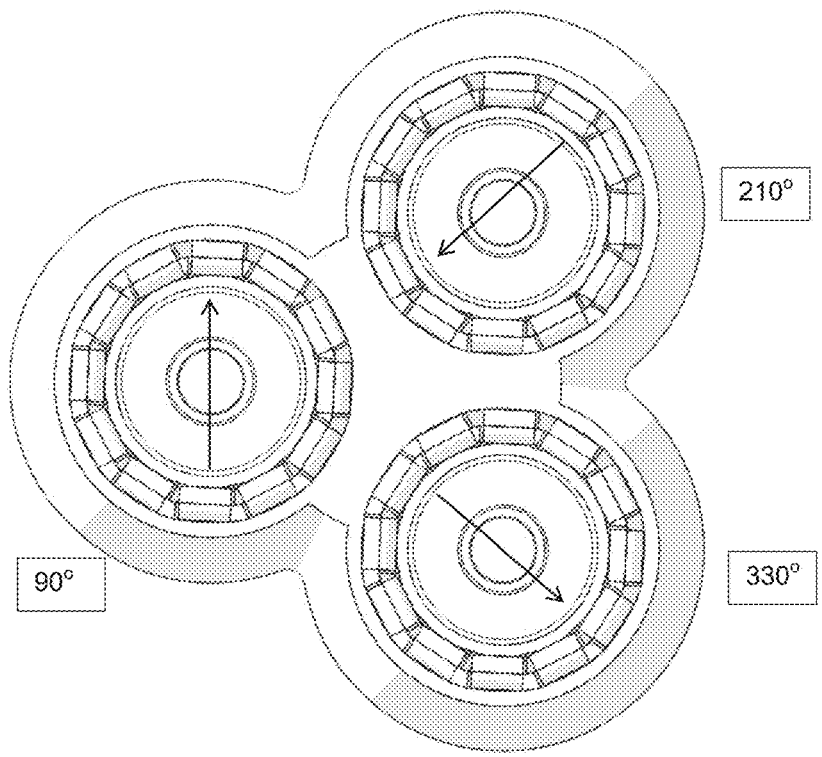

FIG. 198 is an end view of the device shown in FIG. 197 with the arrows and angles indicating the relative polarities of the successive permanent magnets within the cluster assembly at one position of rotation.

Figure 199:
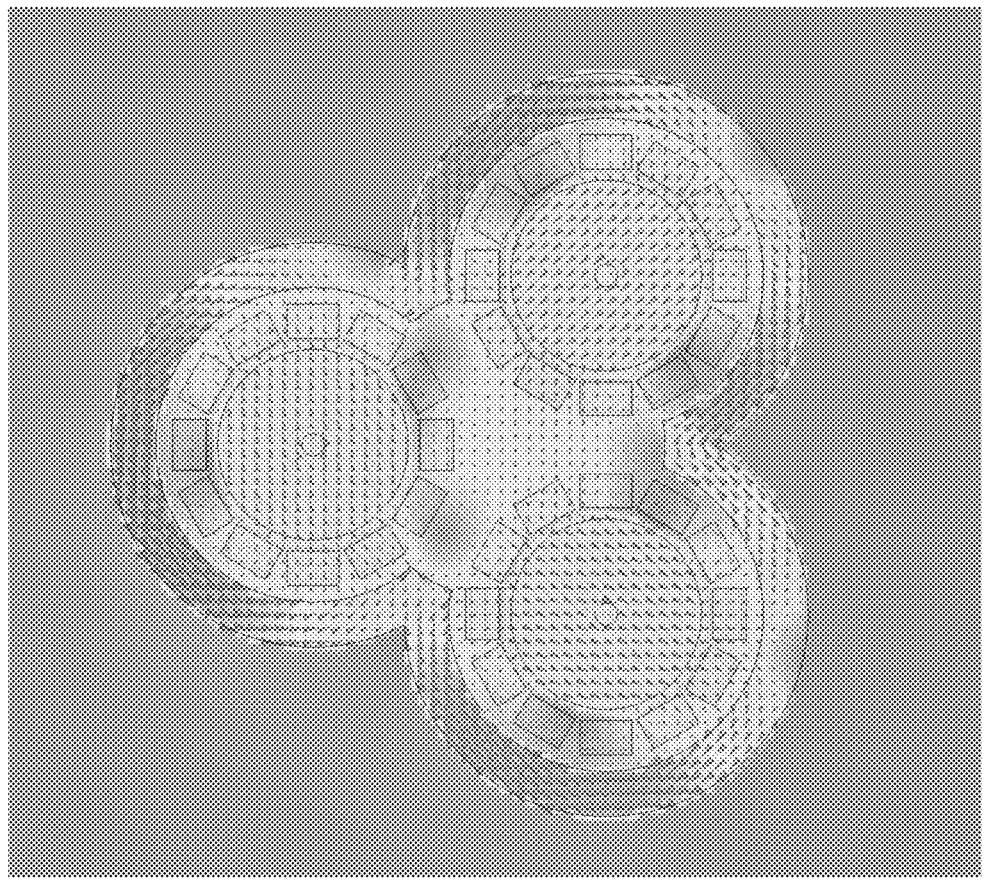

FIG. 199 is a magnetic field plot of the device shown in FIG. 197 for a single rotor position.

Figure 200:
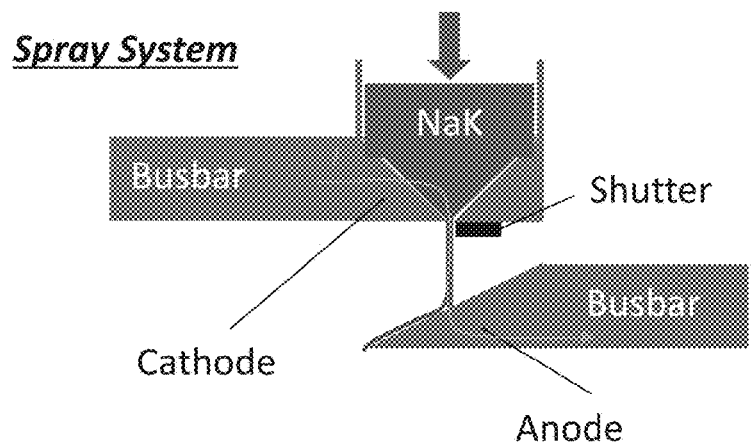
Figure 200:
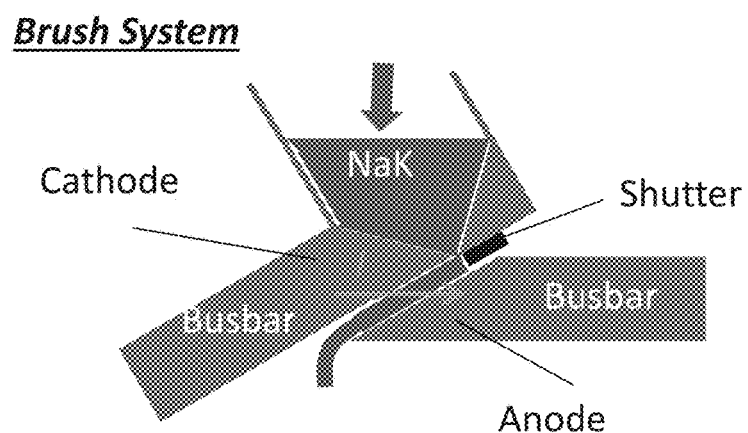

FIG. 200 shows two basic forms of liquid metal switch based on either a spray of liquid metal material or a pressurised film of liquid metal material.

Figure 201:
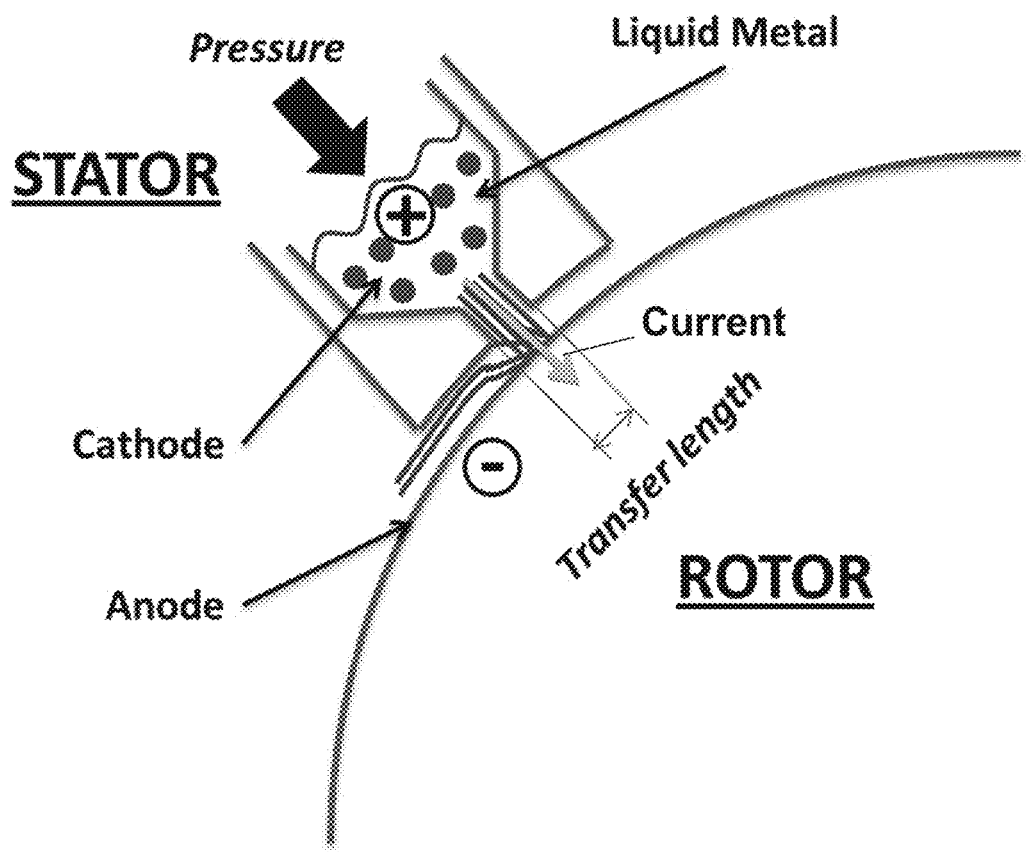

FIG. 201 illustrates a spray system liquid metal switch or contact between a stationary cathode and a rotating anode.

Figure 202:
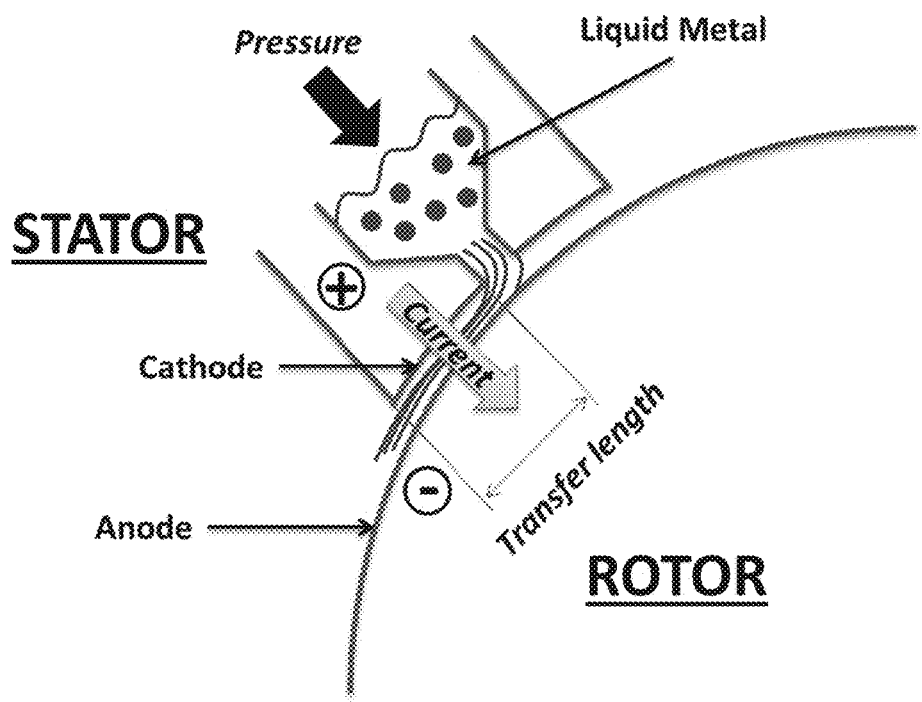

FIG. 202 illustrates a brush system liquid metal switch or contact between a stationary cathode and a rotating anode.

Figure 203:
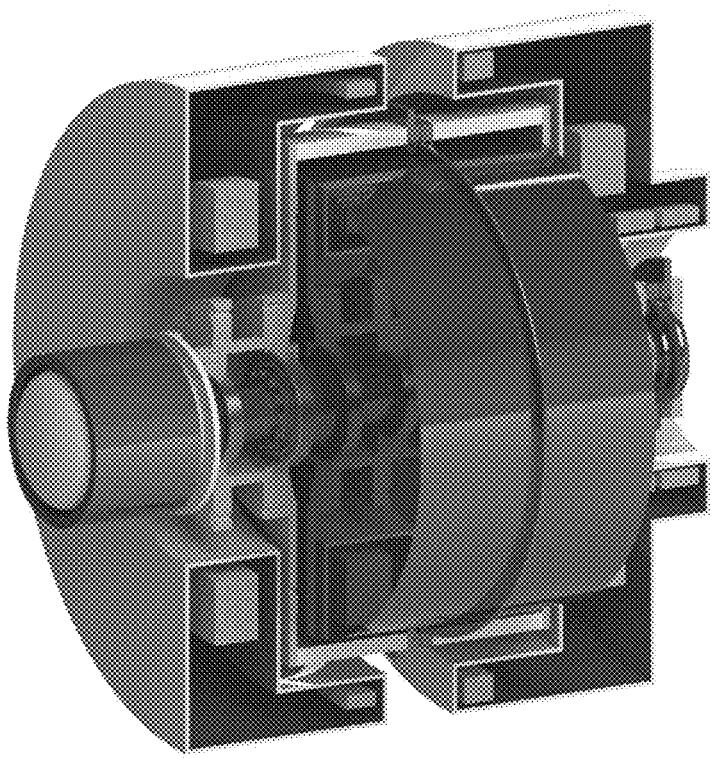

FIG. 203 is an isometric view of a homopolar device where the rotor is also an energy storage flywheel.

Figure 204:
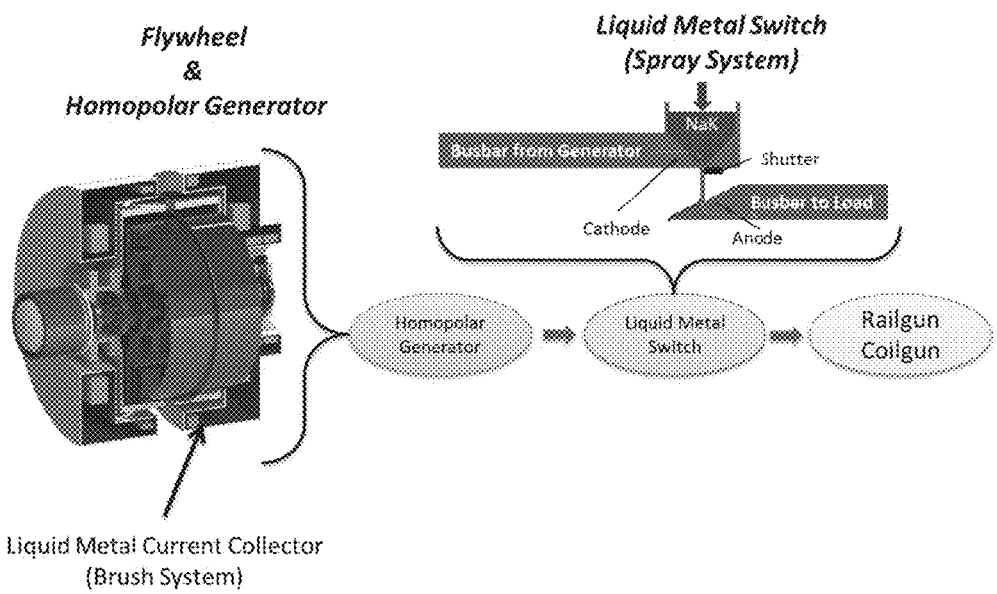

FIG. 204 is a schematic view of a pulse power system incorporating the device of FIG. 203 where the final control of the output electrical energy pulse is performed by a separate and stationary liquid metal switch.

Figure 205:
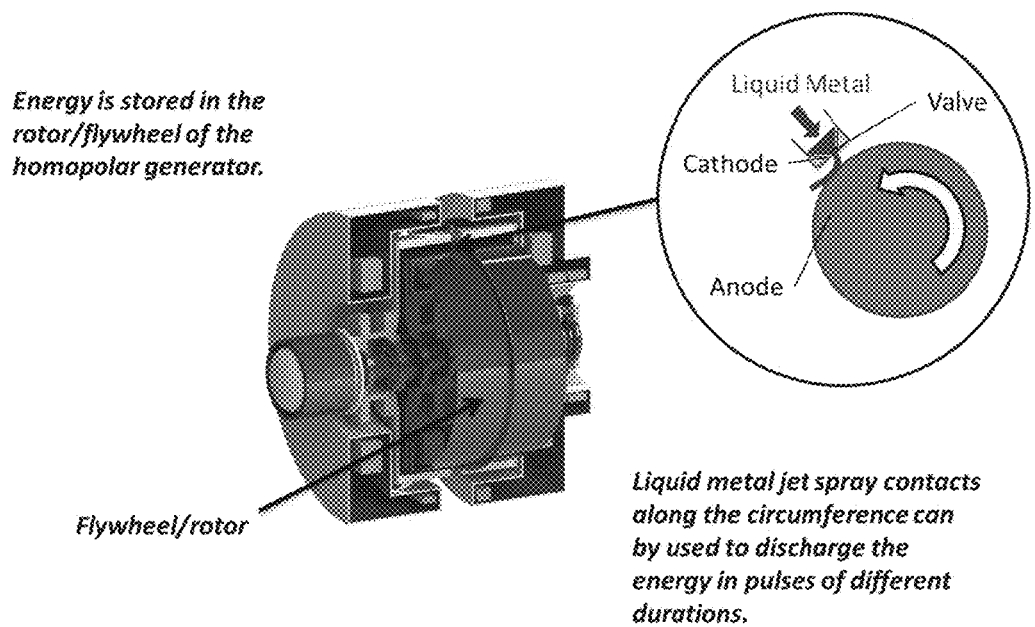

FIG. 205 is a schematic view of a pulse power system where the liquid metal switch is integrated into the homopolar generator/flywheel assembly.

Figure 206:
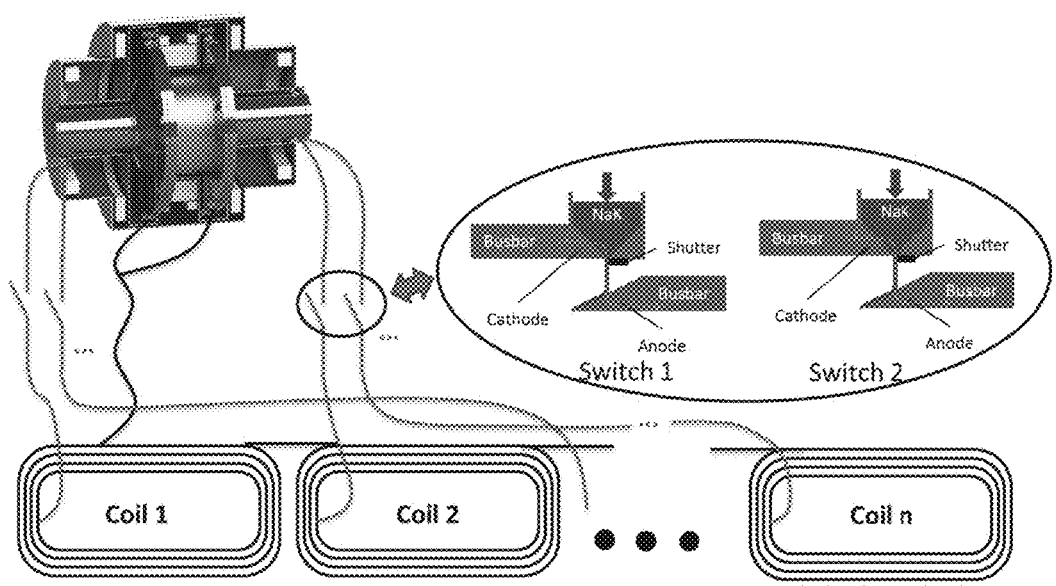

FIG. 206 is a schematic view of a twin disc pulse power system for the supply of sequential pulses of electrical power to a series of stator coils in a linear motor.

Figure 207:
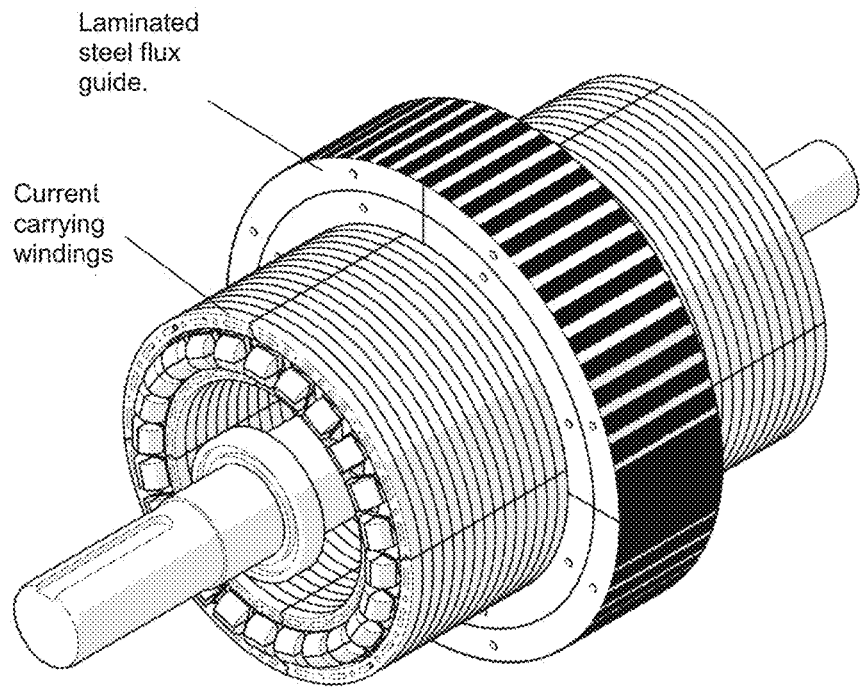

FIG. 207 is an isometric view of a typical embodiment of a permanent magnet motor/generator that includes both laminated steel flux guides and laminated aluminium winding supports.

Figure 208:
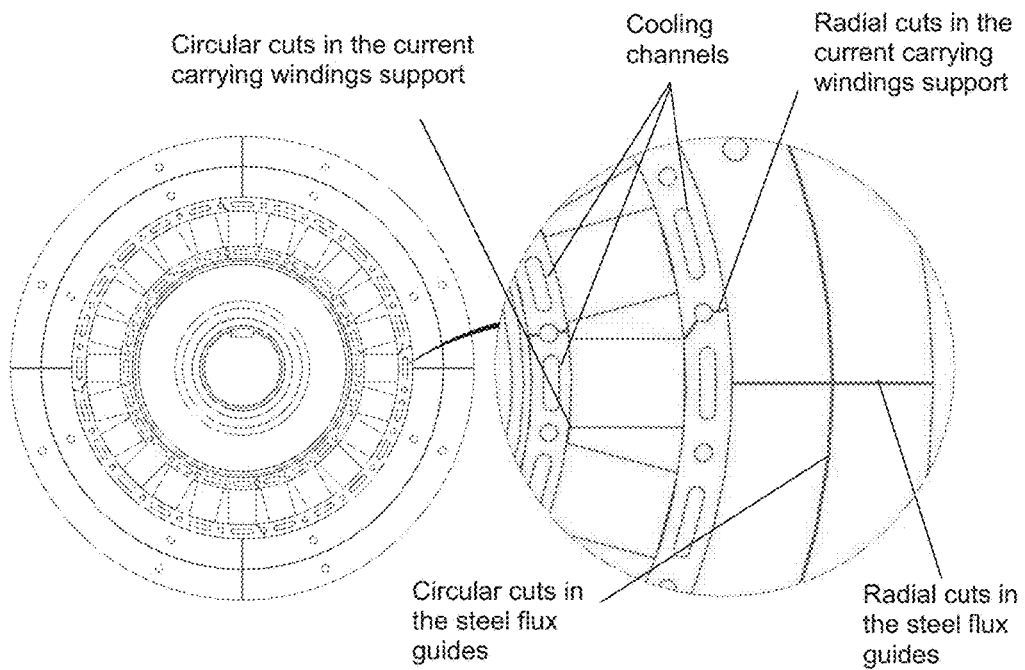

FIG. 208 is an end view of the embodiment of FIG. 207 that shows the detail of the circular and radial isolating cuts in the winding support and steel flux guides to reduce eddy current loss.

Figure 209:
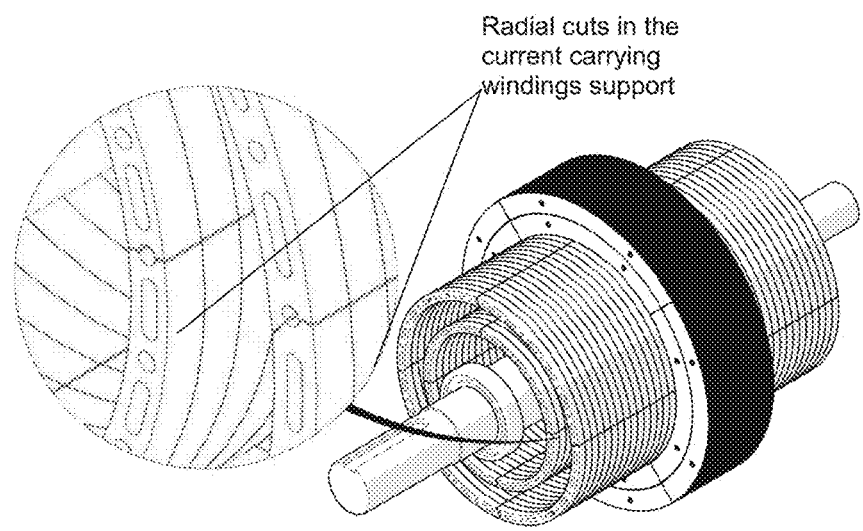

FIG. 209 is an isometric view with a detailed call-out of the radial isolating cuts at the end of the aluminium winding support structure.

Figure 210:
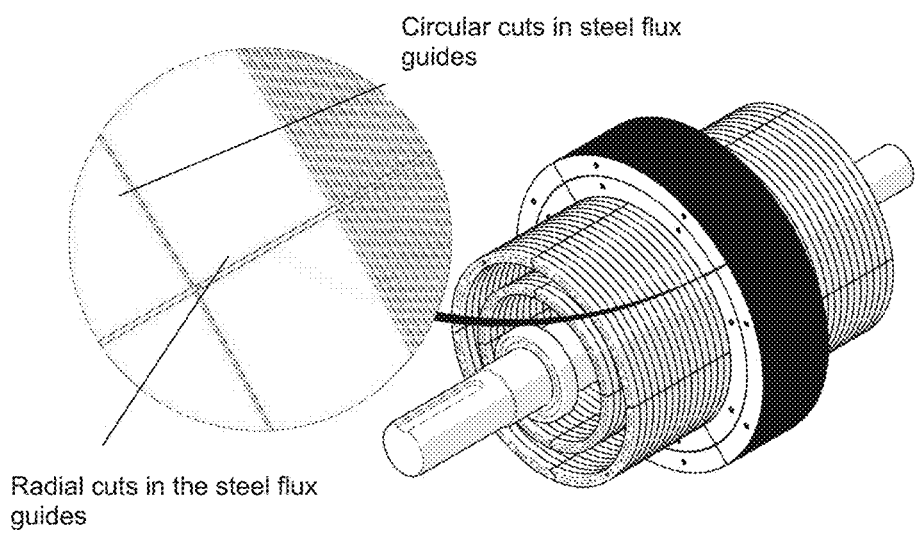

FIG. 210 is an isometric view with a detailed call-out of the circular and radial cuts applied to the steel flux guide.

Figure 211:
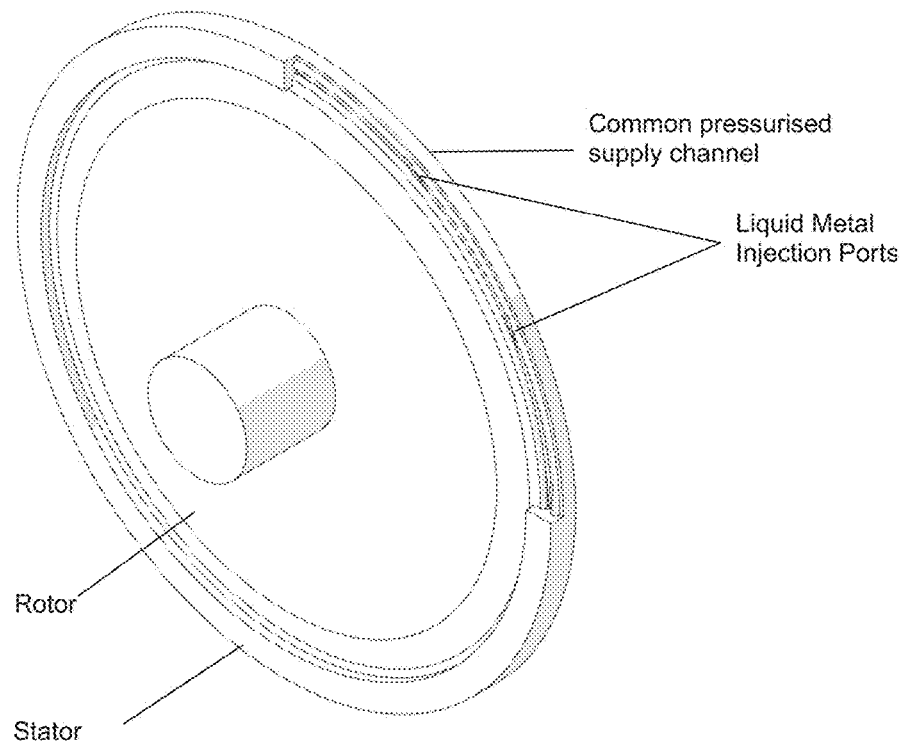

FIG. 211 is a semi-sectional view of the rotor and stator of a liquid metal current collector system.

Figure 212:
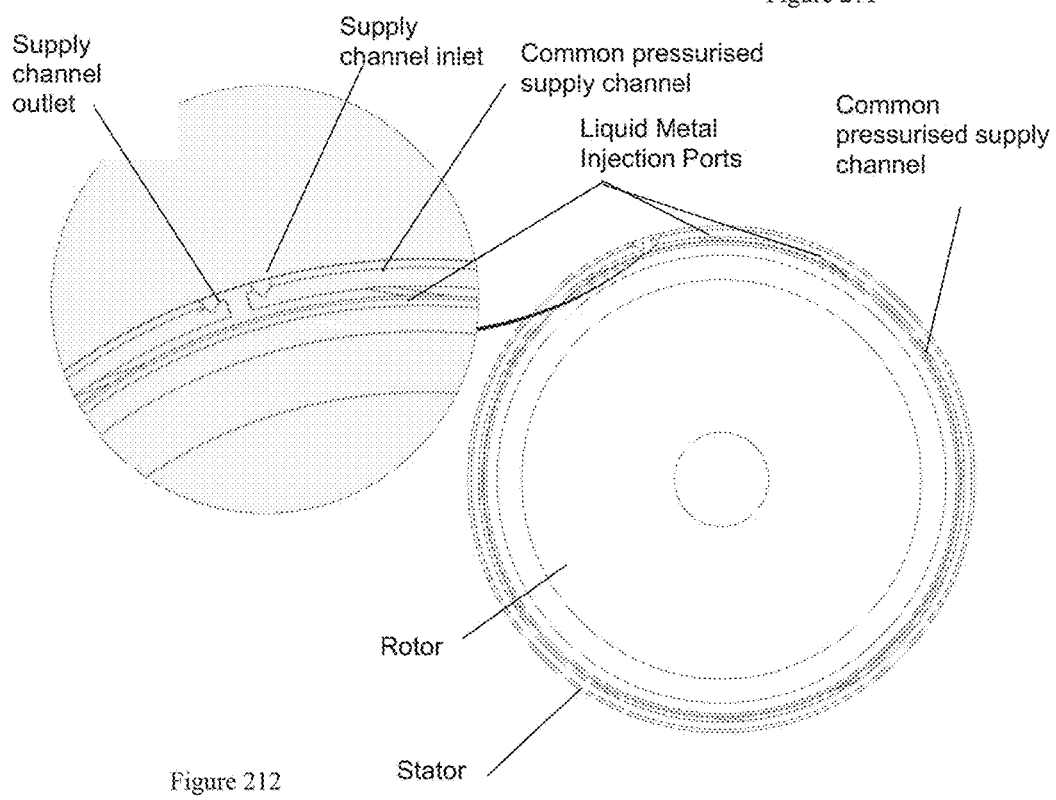

FIG. 212 is a half sectional side view of the embodiment of FIG. 211.

Figure 213:
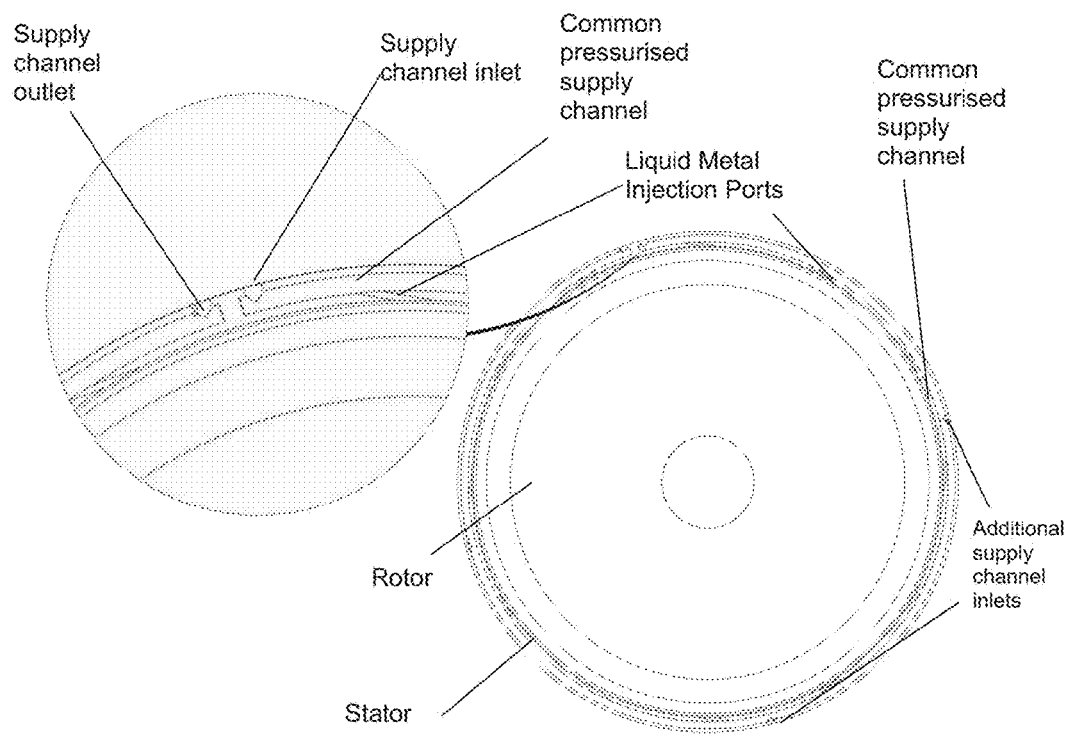

FIG. 213 is a further sectional variation of the embodiment of FIG. 211.

Figure 214:
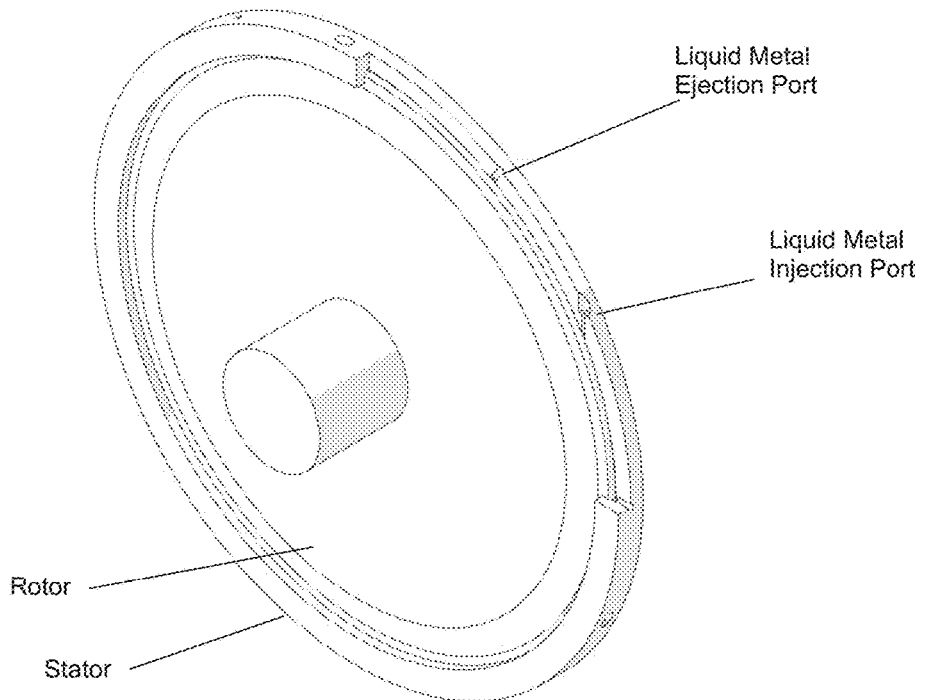

FIG. 214 is an alternative embodiment in which the angled injection ports are brought out to individual orifices on the outer edge of the stator.

Figure 215:
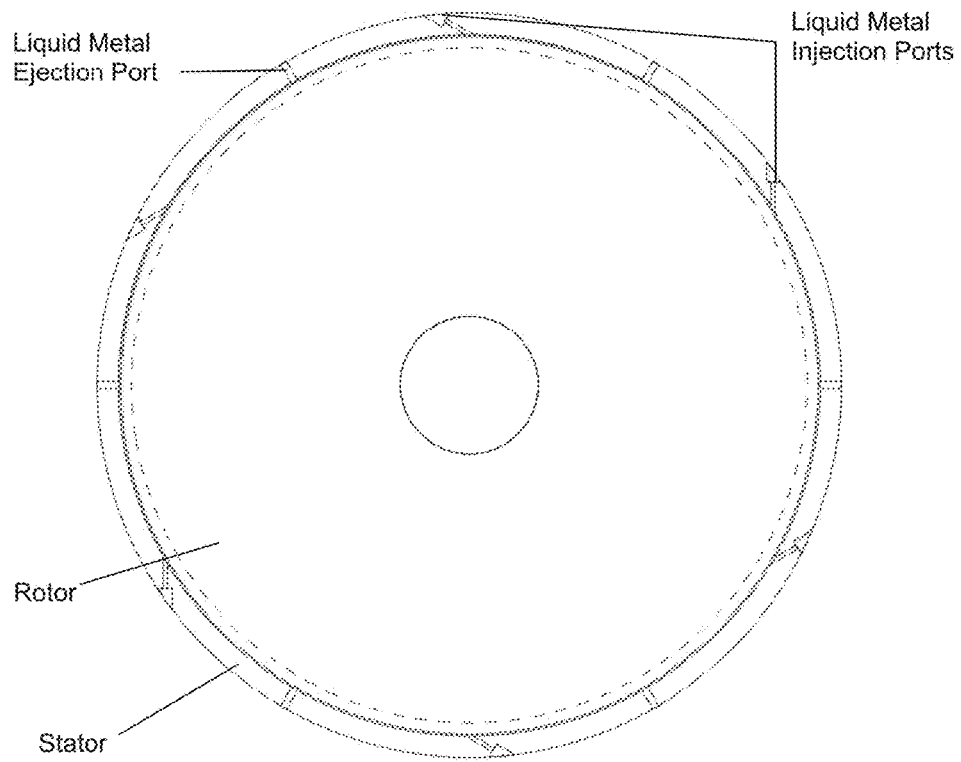

FIG. 215 is a half sectional side view of the embodiment of FIG. 214.

Figure 216:
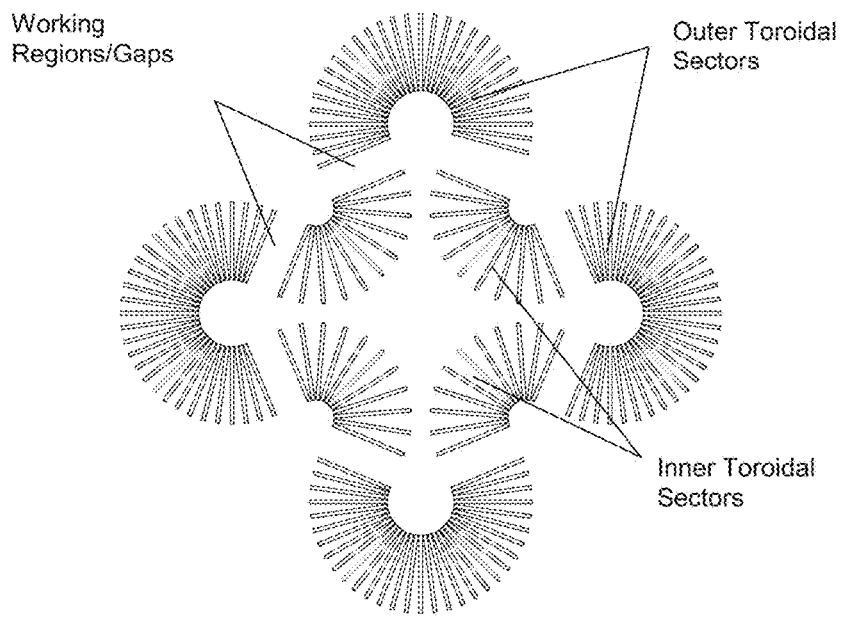

FIG. 216 is a schematic end view of a star arrangement of toroidal winding sections.

Figure 217:
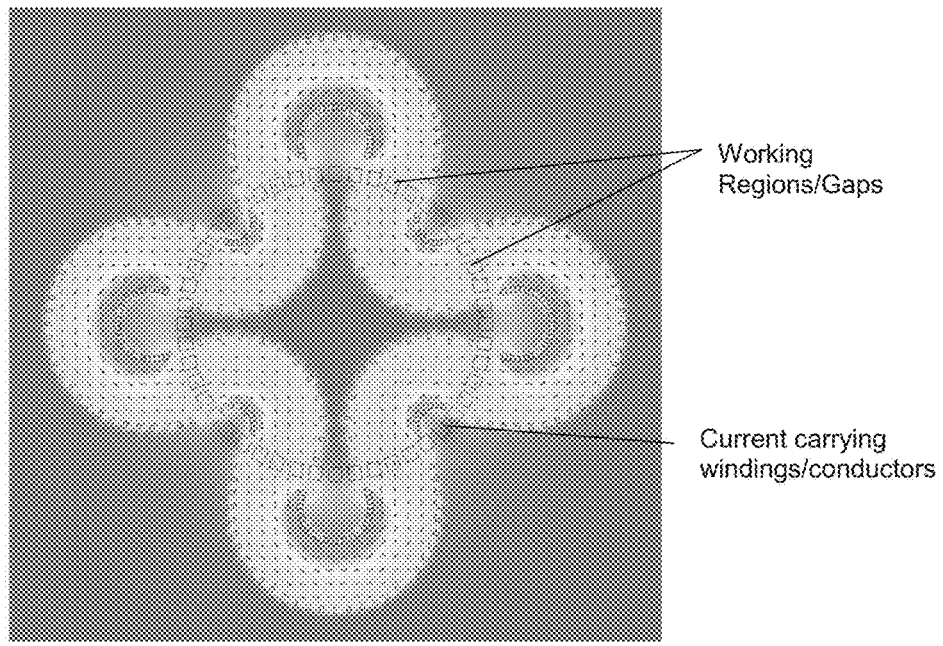

FIG. 217 is a plot of the magnetic field generated by the embodiment of FIG. 216 showing the orientation of the magnetic field through the current carrying conductors in the working region.

Figure 218:
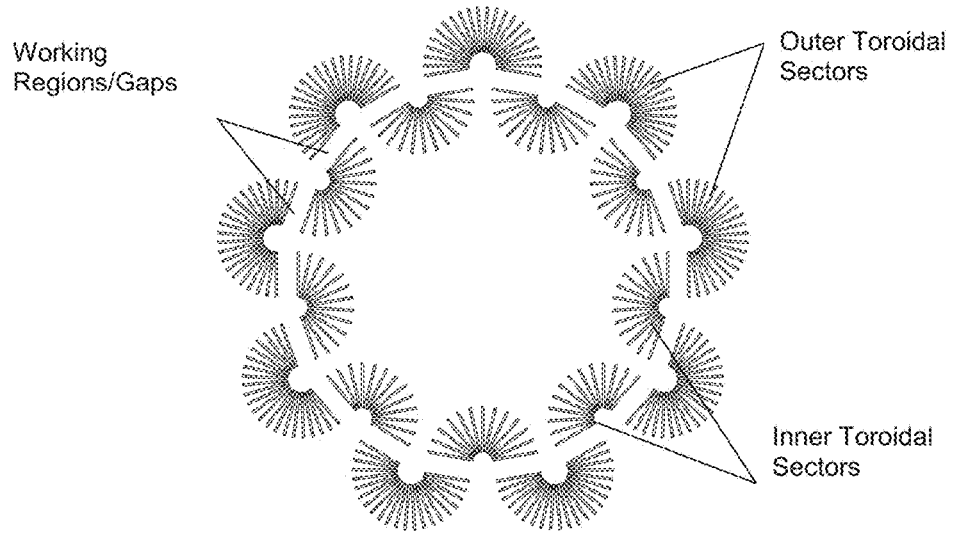

FIG. 218 is a variation of the embodiment shown in FIG. 216.

Figure 219:
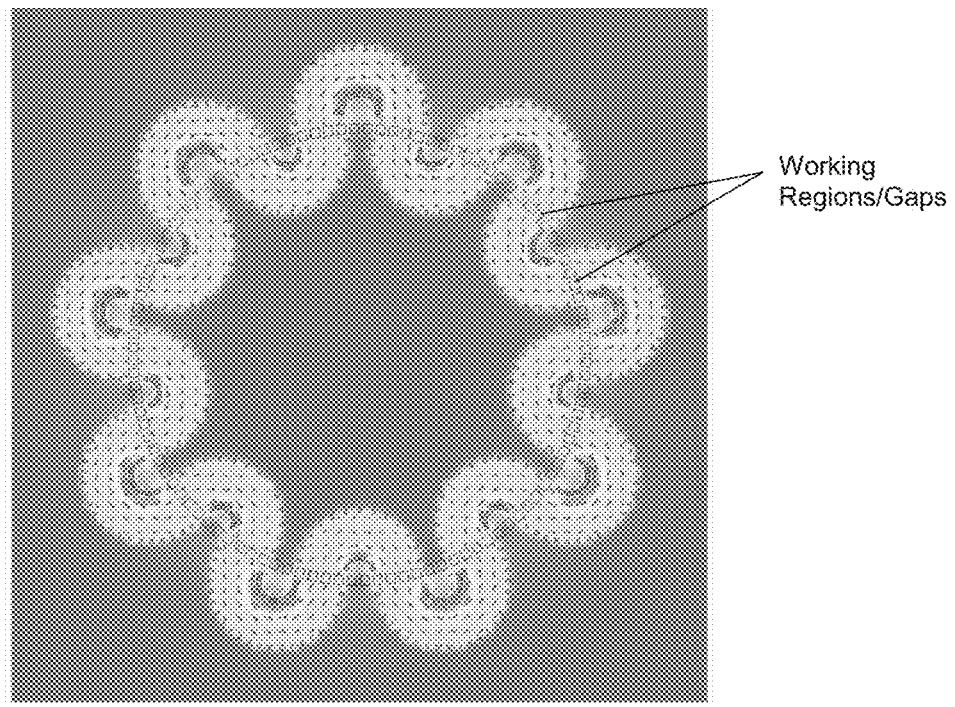

FIG. 219 is a magnetic field plot of the variation shown in FIG. 218.

Figure 220:
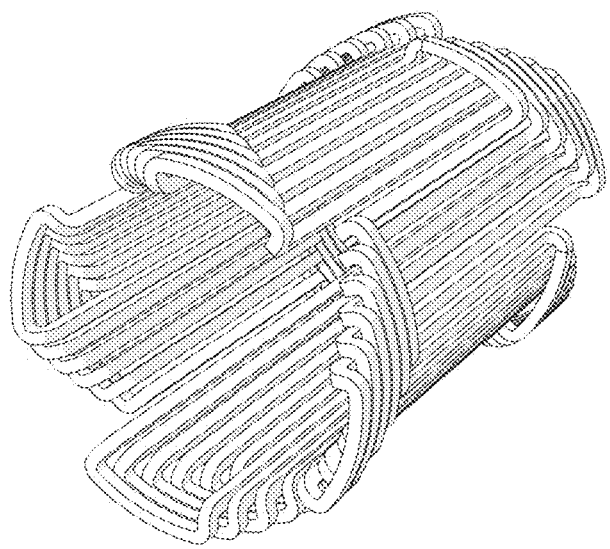

FIG. 220 is an isolated view of the rotor assembly of current carrying windings corresponding to the arrangement illustrated in FIG. 216.

Figure 221:
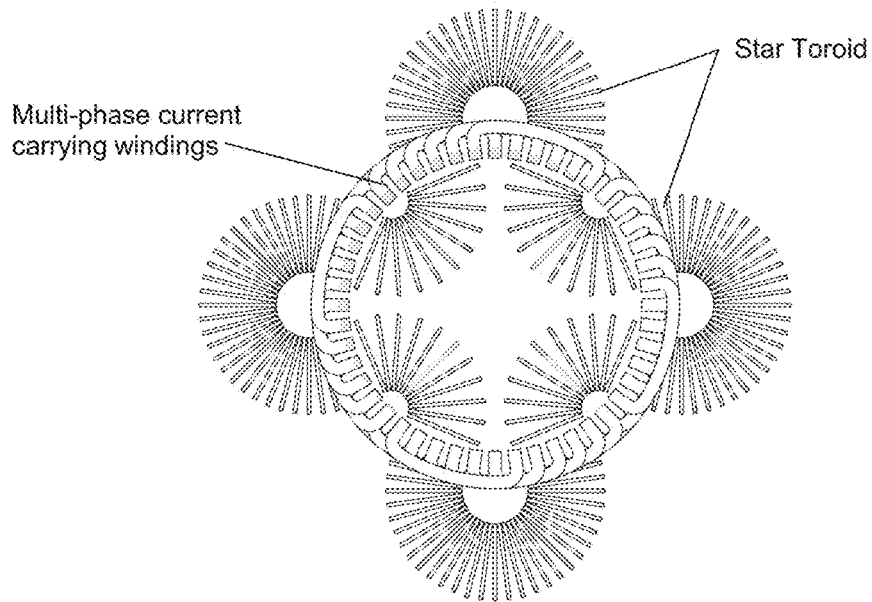

FIG. 221 is an end view of a complete embodiment of the star toroidal device consisting of the toroidal sector assembly of FIG. 216 combined with the rotor assembly shown in FIG. 220.

Figure 222:
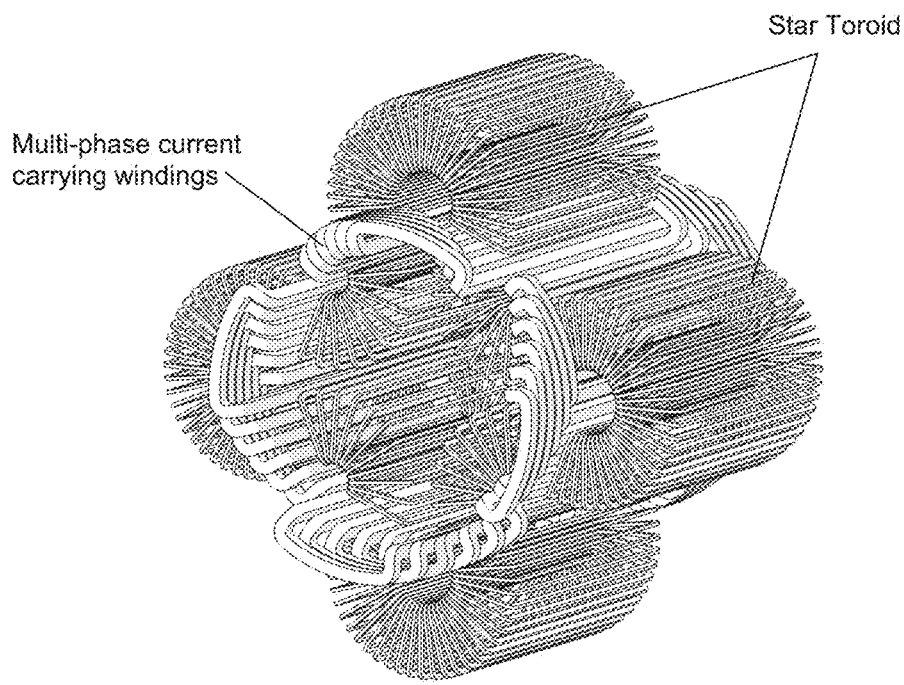

FIG. 222 is an isometric view of the complete embodiment of FIG. 221.

Figure 223:
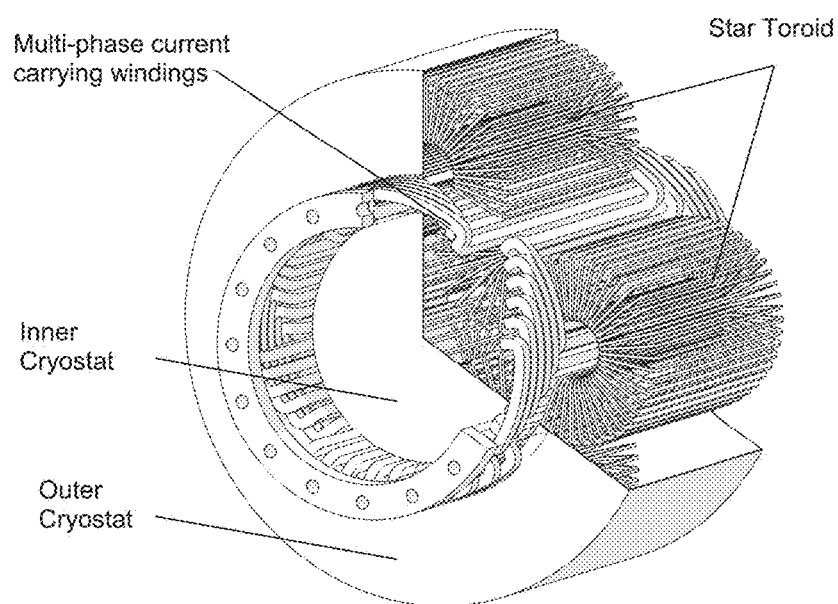

FIG. 223 shows the embodiment of FIG. 221 showing partially sectioned inner and outer cryostats for the superconducting star toroidal assembly and a support structure for the rotor assembly that contains the current carrying windings.

Figure 224:
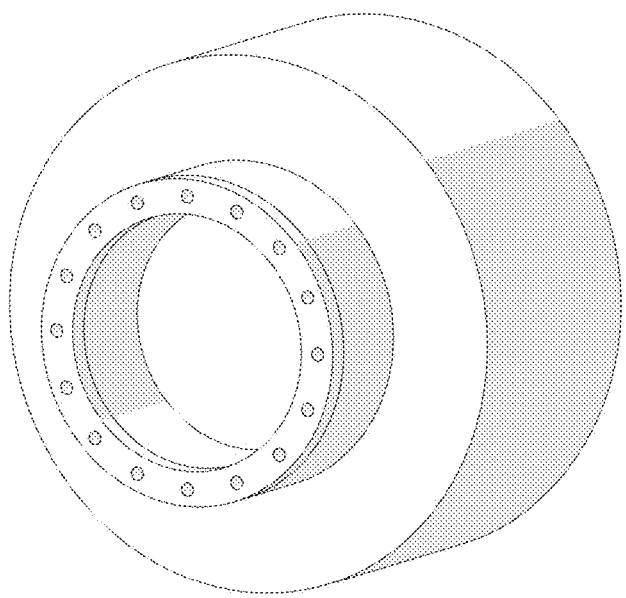

FIG. 224 shows the complete cryostat and rotor assembly of FIG. 223.

Figure 225:
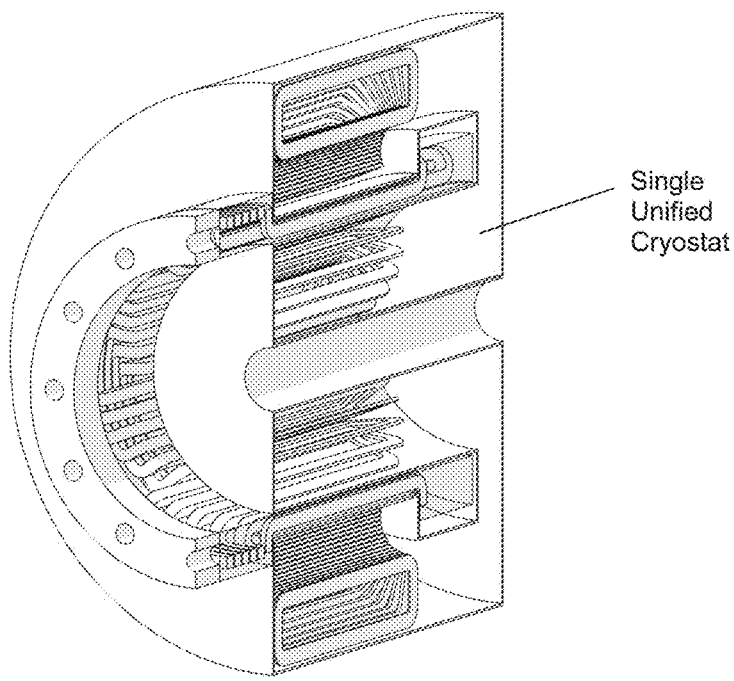

FIG. 225 is a half sectional view of an embodiment where the inner and outer star toroidal sectors are housed in one joined cryostat.

Figure 226:
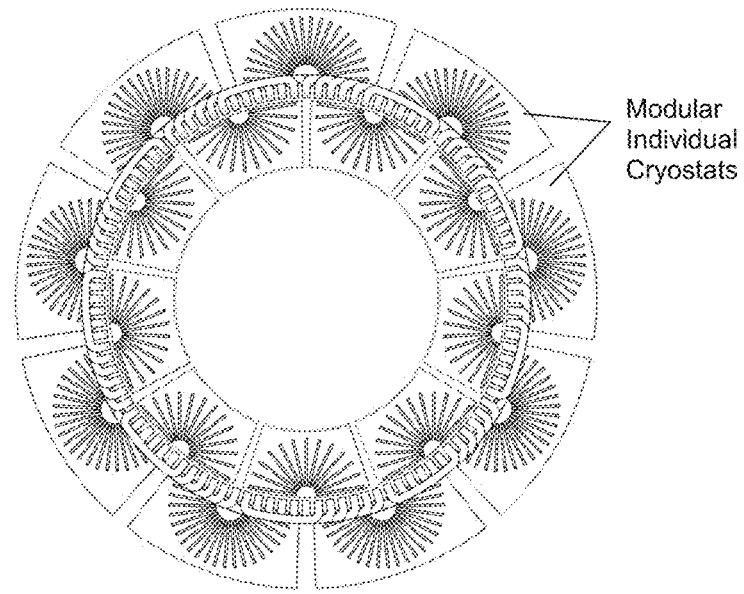

FIG. 226 shows a complete 18 pole embodiment with each of the inner and outer star toroidal sectors housed in modular style individual cryostat.

Figure 227:
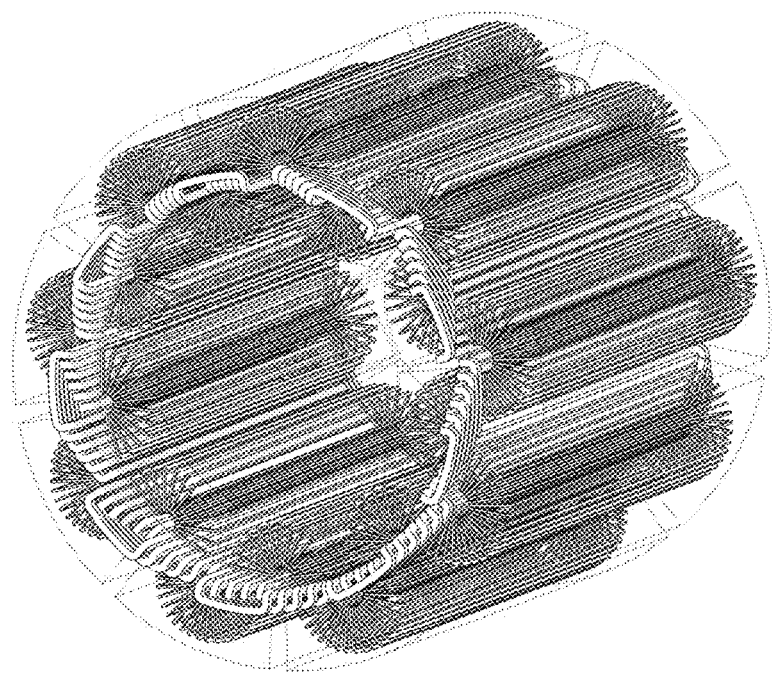

FIG. 227 shows an isometric view of the complete 18 pole device shown in FIG. 226 with the outlines of the modular cryostat elements shown.

Figure 228:
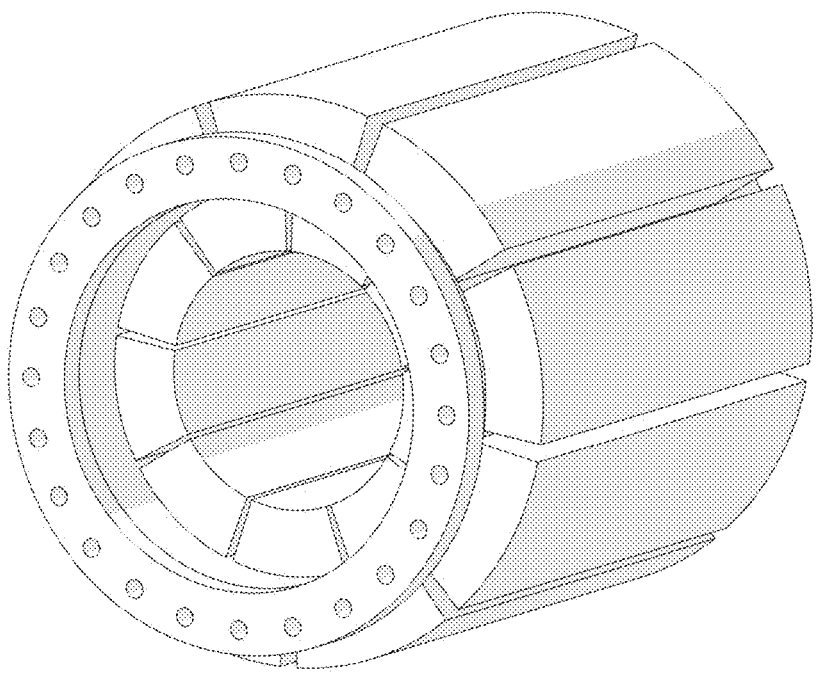

FIG. 228 shows an external isometric view of the embodiment of FIG. 226.

Figure 229:
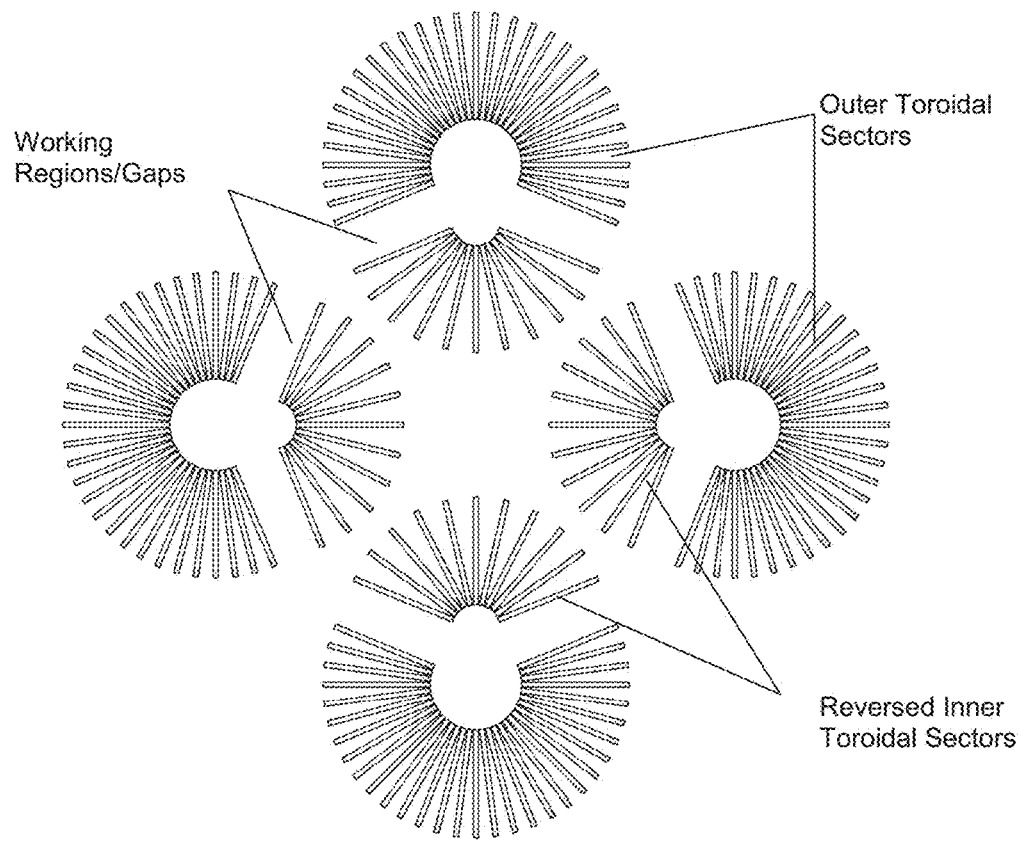

FIG. 229 shows a variation of the star toroidal device in which the inner toroidal sectors have been rotated 45 degrees such that each magnetic pole pair is now created by a magnetic field directed around a single set of inner and outer toroid sectors.

Figure 230:
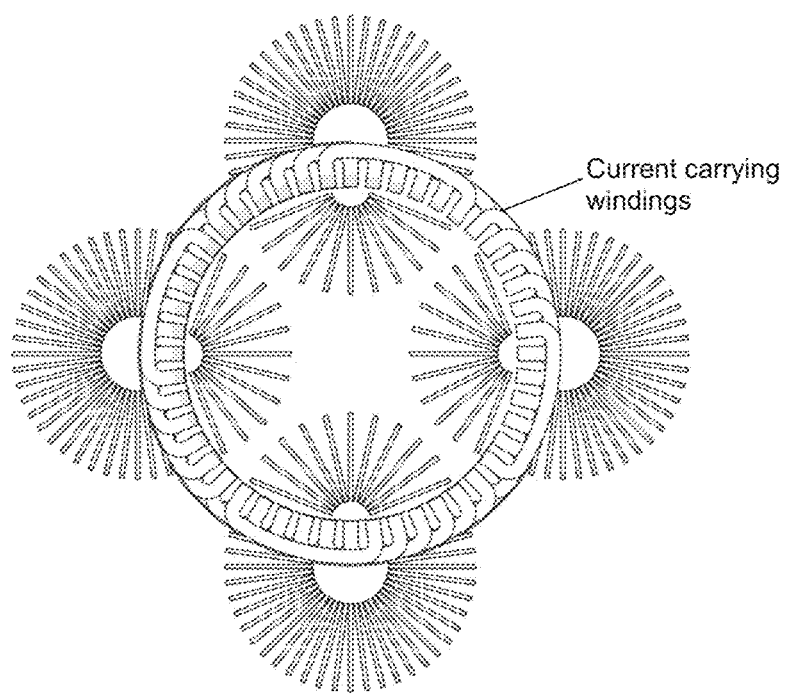

FIG. 230 shows the embodiment of FIG. 229 with the toroidal sectors and the current carrying rotor windings.

Figure 231:
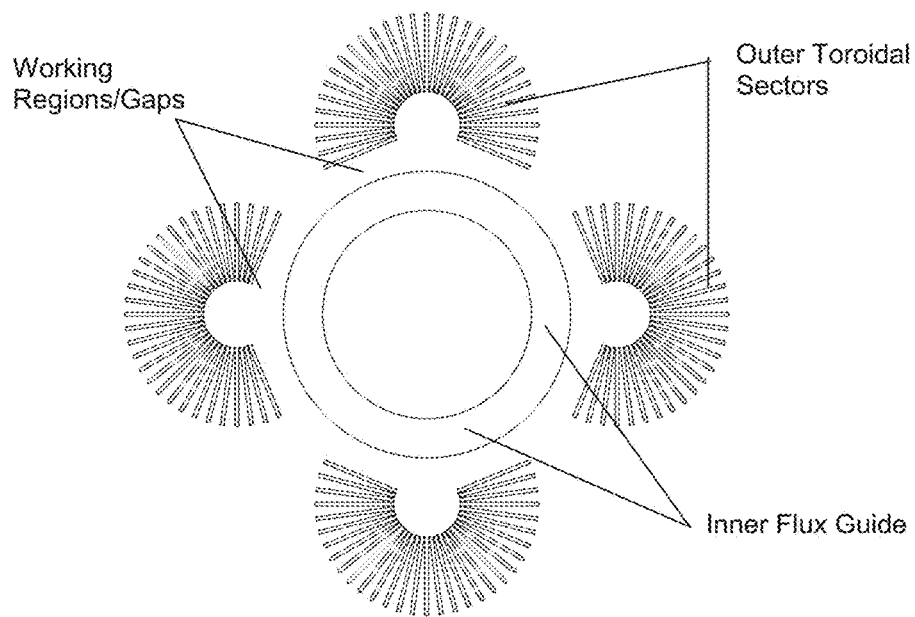

FIG. 231 shows a variation of the embodiment illustrated in FIG. 229 where the internal toroidal sectors have been replaced with a ring of steel or ferromagnetic material that guides the magnetic field between successive outer toroidal sectors.

Figure 232:
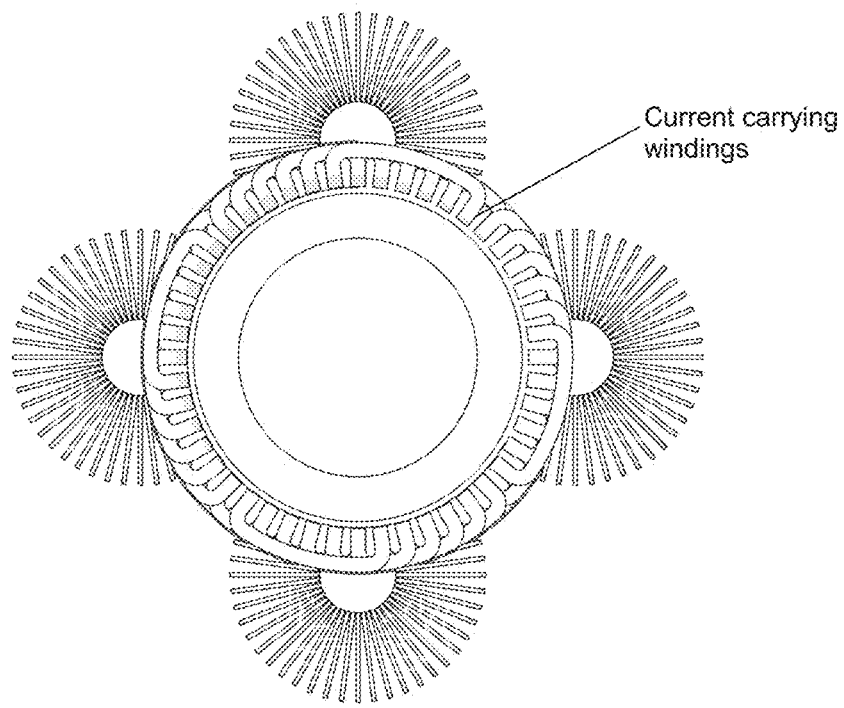

FIG. 232 shows the embodiment of FIG. 231 with the current carrying rotor windings added.

Figure 233:
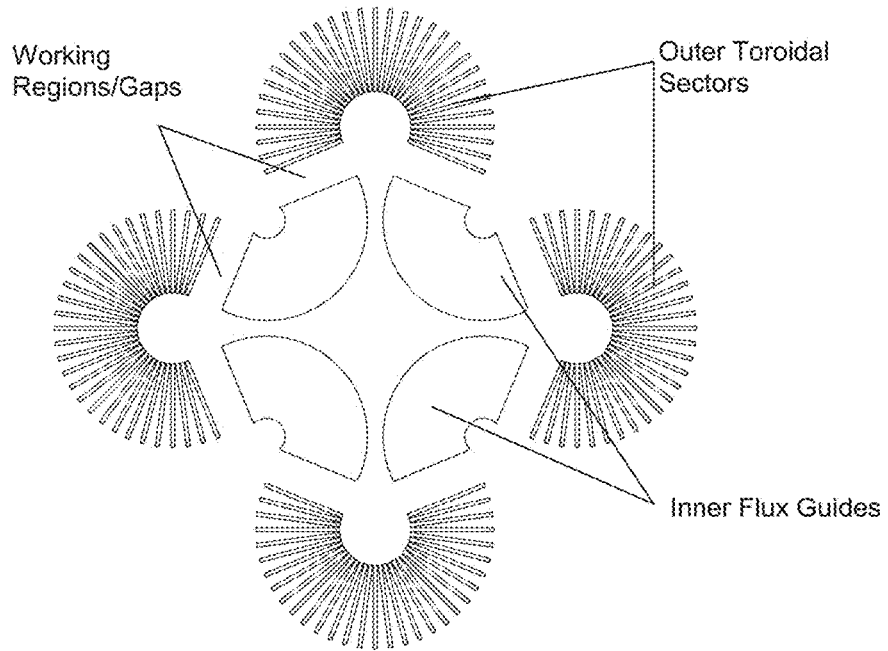

FIG. 233 illustrates a further variation where the internal steel flux guides are shaped like circular sectors to direct magnetic field between successive toroidal elements.

Figure 234:
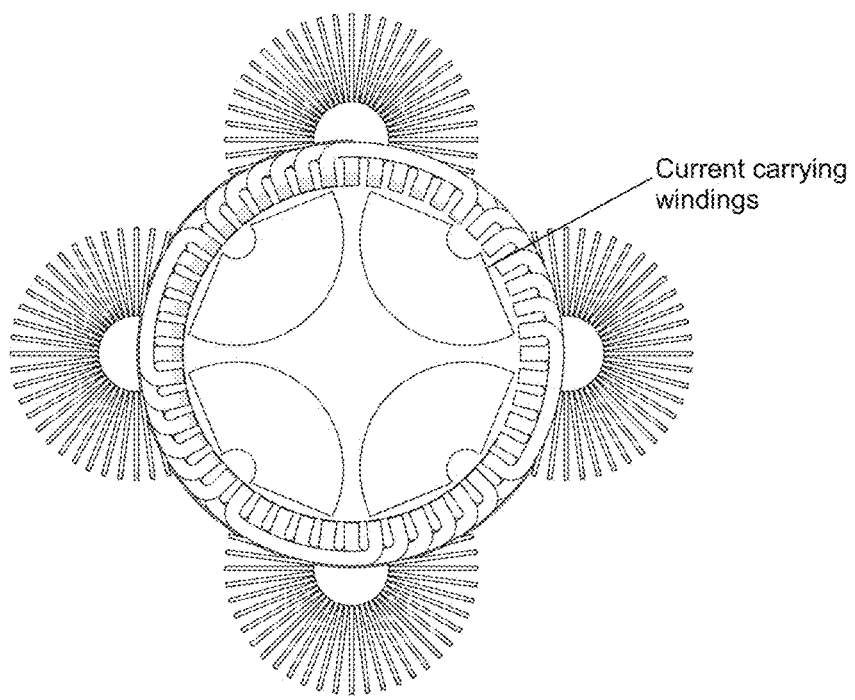

FIG. 234 shows the embodiment of FIG. 233 with the current carrying rotor windings added.

Figure 235:
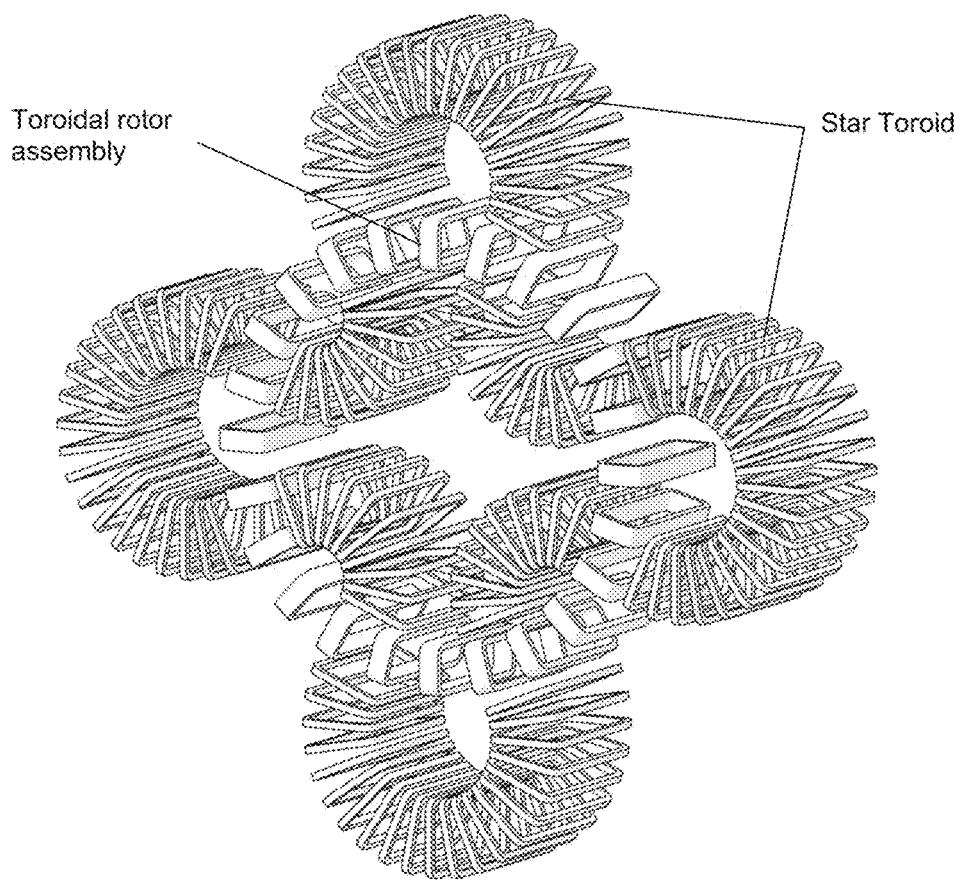

FIG. 235 illustrates an alternative embodiment that utilises the star toroidal assembly to produce a background field in which an inner circular toroid is positioned and rotates.

Figure 236:
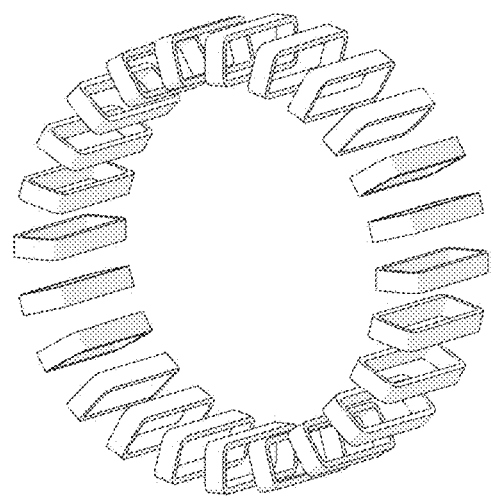

FIG. 236 shows the inner toroidal rotor assembly isolated from the assembly of FIG. 235.

Figure 237:
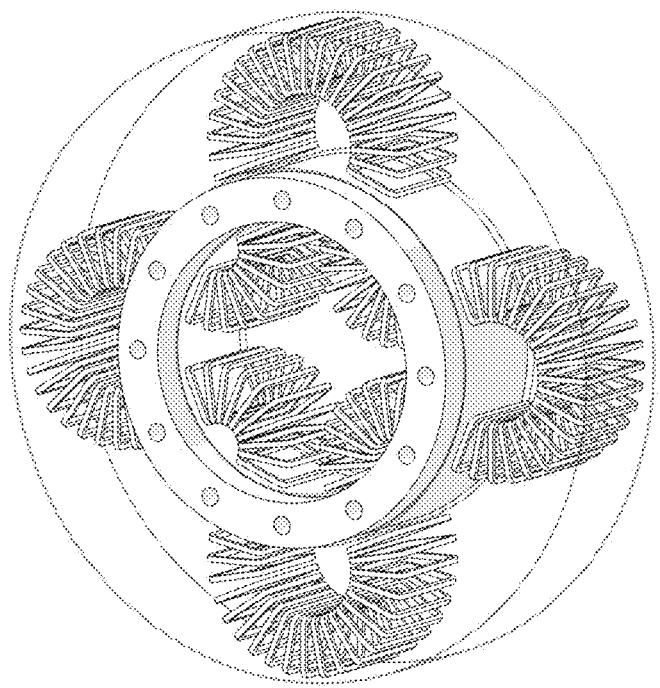

FIG. 237 shows the embodiment of FIG. 235 showing the support structure for the inner toroidal rotor and the extents of the cryostat structure for the Star toroidal assembly.

Figure 238:
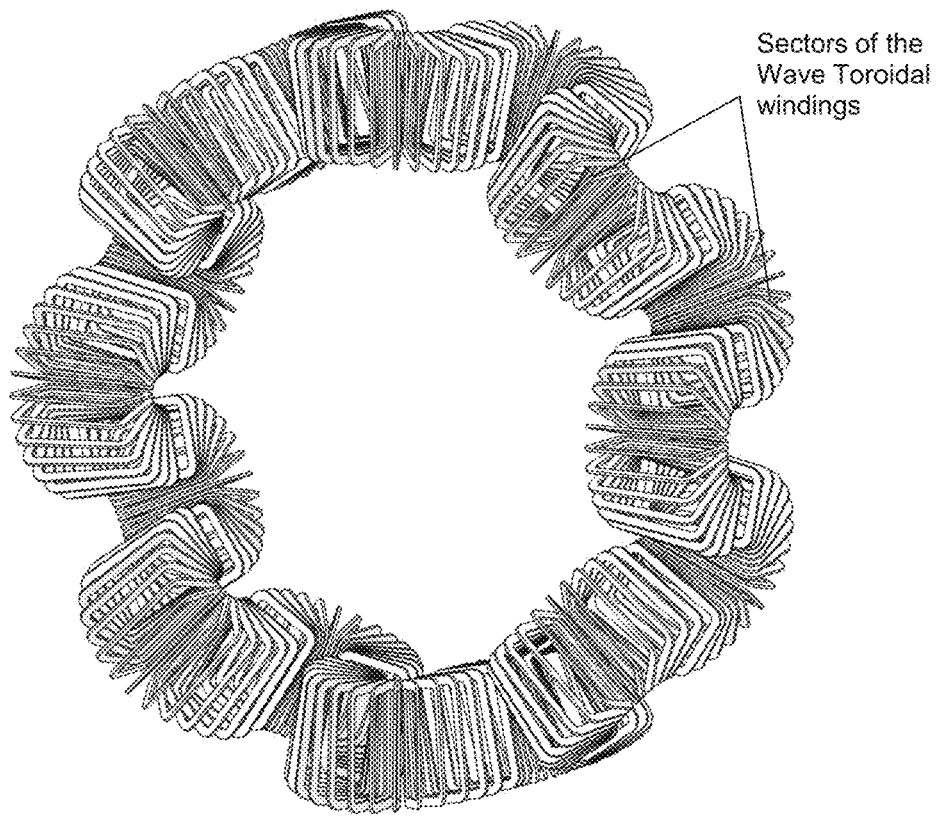

FIG. 238 illustrates a wave toroidal arrangement of coils that produce the background field of alternating axial polarity around the working circumference of the device.

Figure 239:
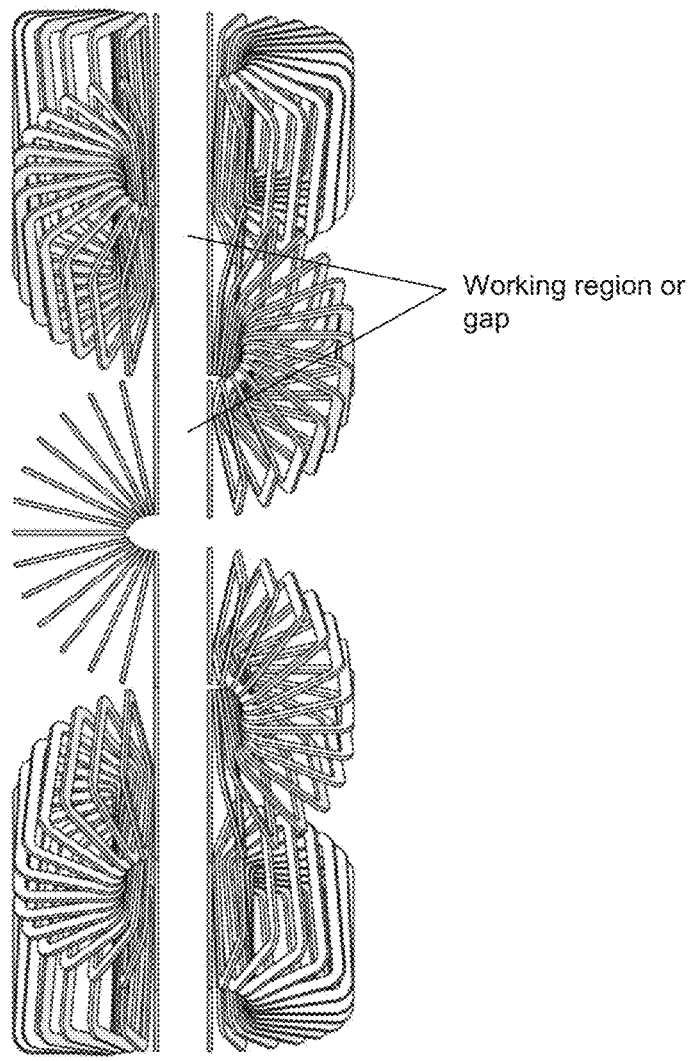

FIG. 239 is a side view of the wave toroidal coils that shows the gap between the two halves where the current carrying conductors/windings are placed.

Figure 240:
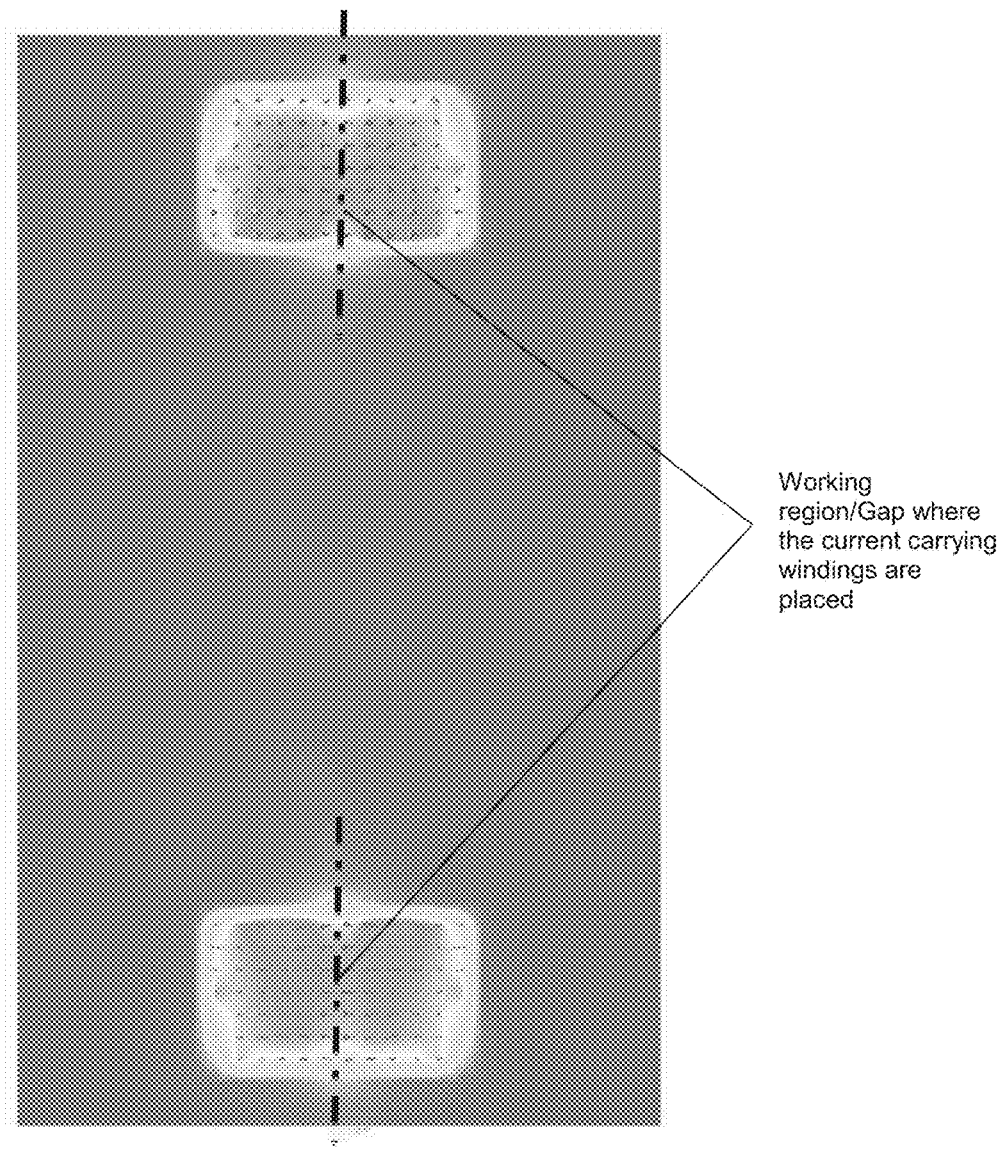

FIG. 240 is a sectional plot of the magnetic field produced across the working gap of the coils shown in FIG. 238 and FIG. 239.

Figure 241:
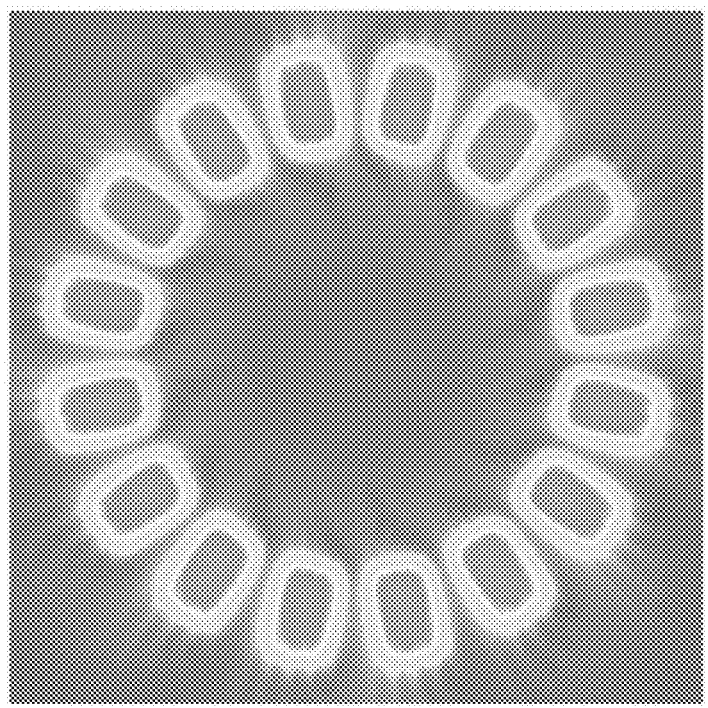

FIG. 241 is a plot of the magnetic field strength in the location of the working gap around the circumference of the device illustrated in FIG. 238.

Figure 242:
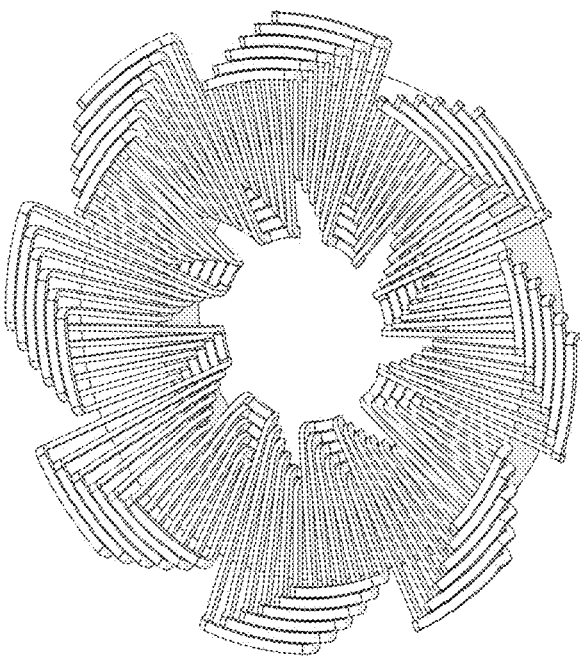

FIG. 242 shows the current carrying windings isolated from the wave toroid illustrated in FIG. 238.

Figure 243:
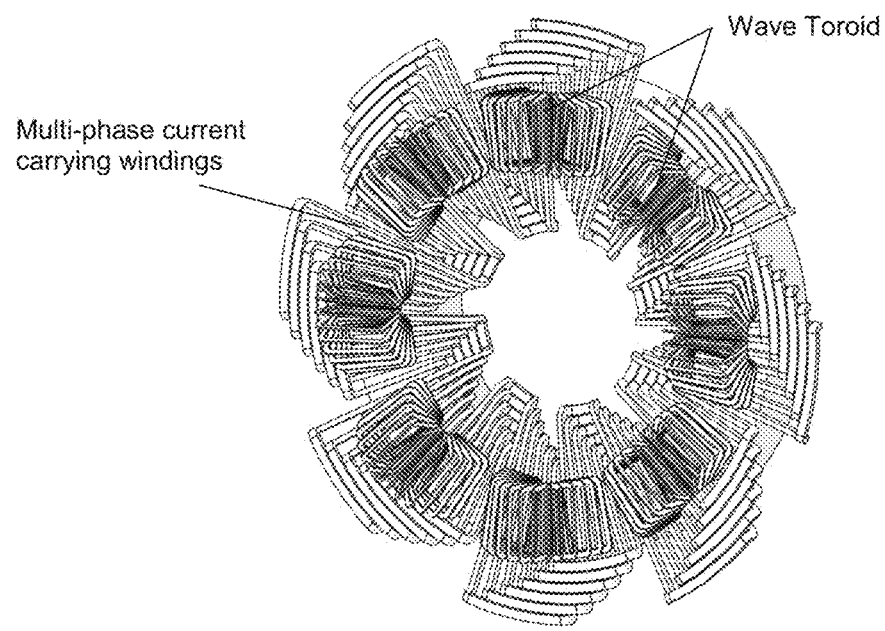

FIG. 243 shows the wave toroidal coil assemblies of FIG. 238 have been combined with the rotor assembly of FIG. 242 to form a completed device.

Figure 244:
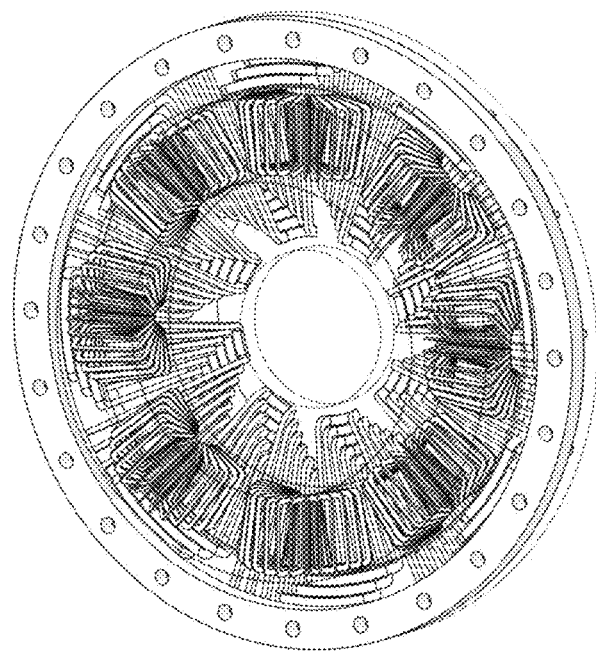

FIG. 244 shows the completed device of FIG. 243 with the rotor support structure added and the boundaries of the cryostats that encapsulate the wave toroidal coils outlined.

Figure 245:
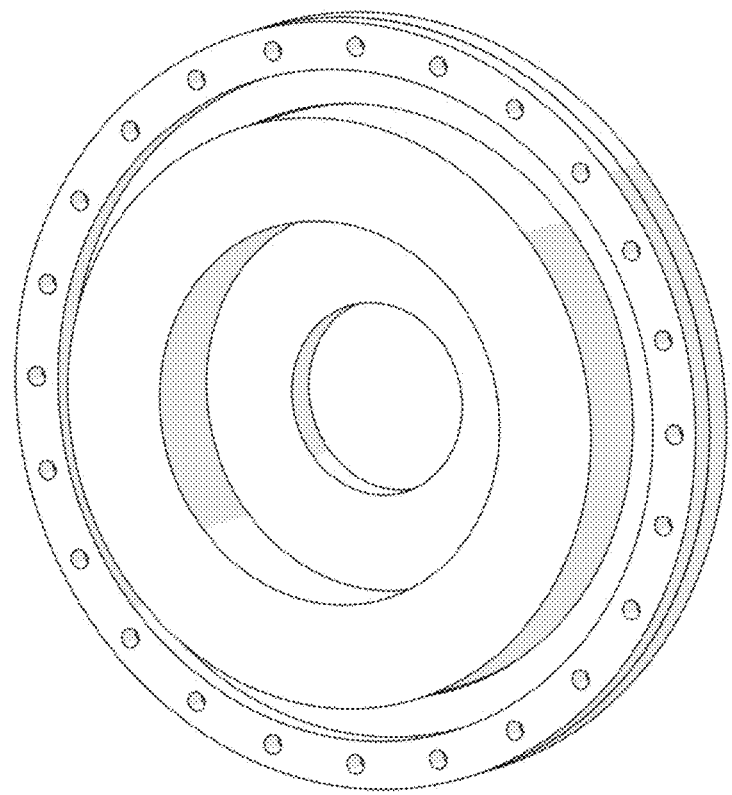

FIG. 245 shows an external view of the cryostat and rotor assembly shown in FIG. 244.

Figure 246:
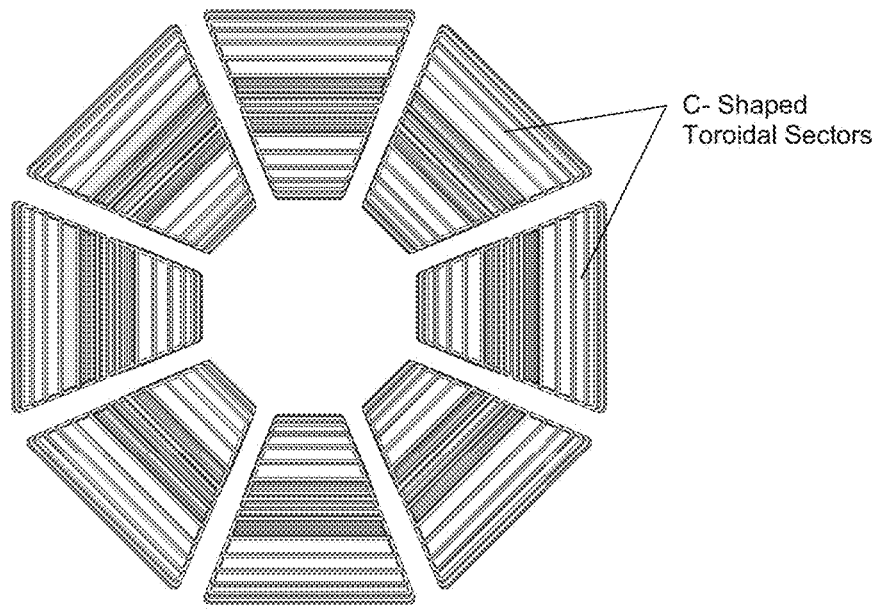

FIG. 246 shows a front view of the background field coils of a C-shaped toroidal device.

Figure 247:
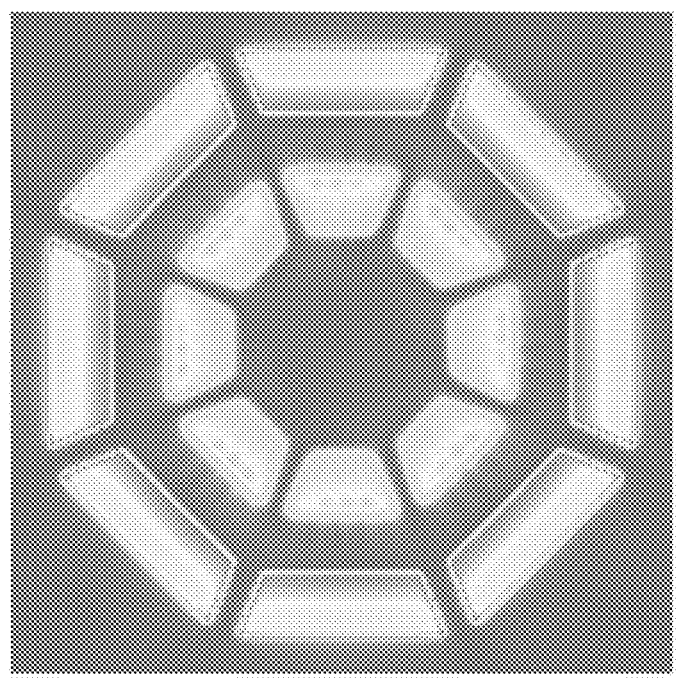

FIG. 247 is a magnetic field plot of the C-shaped toroidal coils illustrated in FIG. 246.

Figure 248:
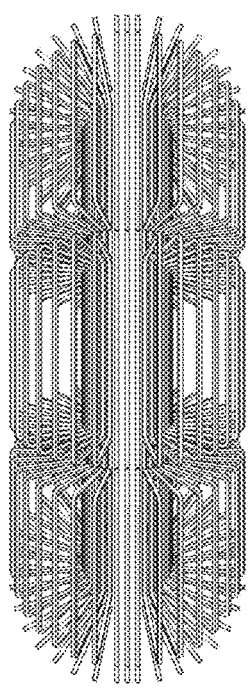

FIG. 248 is an end view of the C-shaped toroidal coils of FIG. 246.

Figure 249:
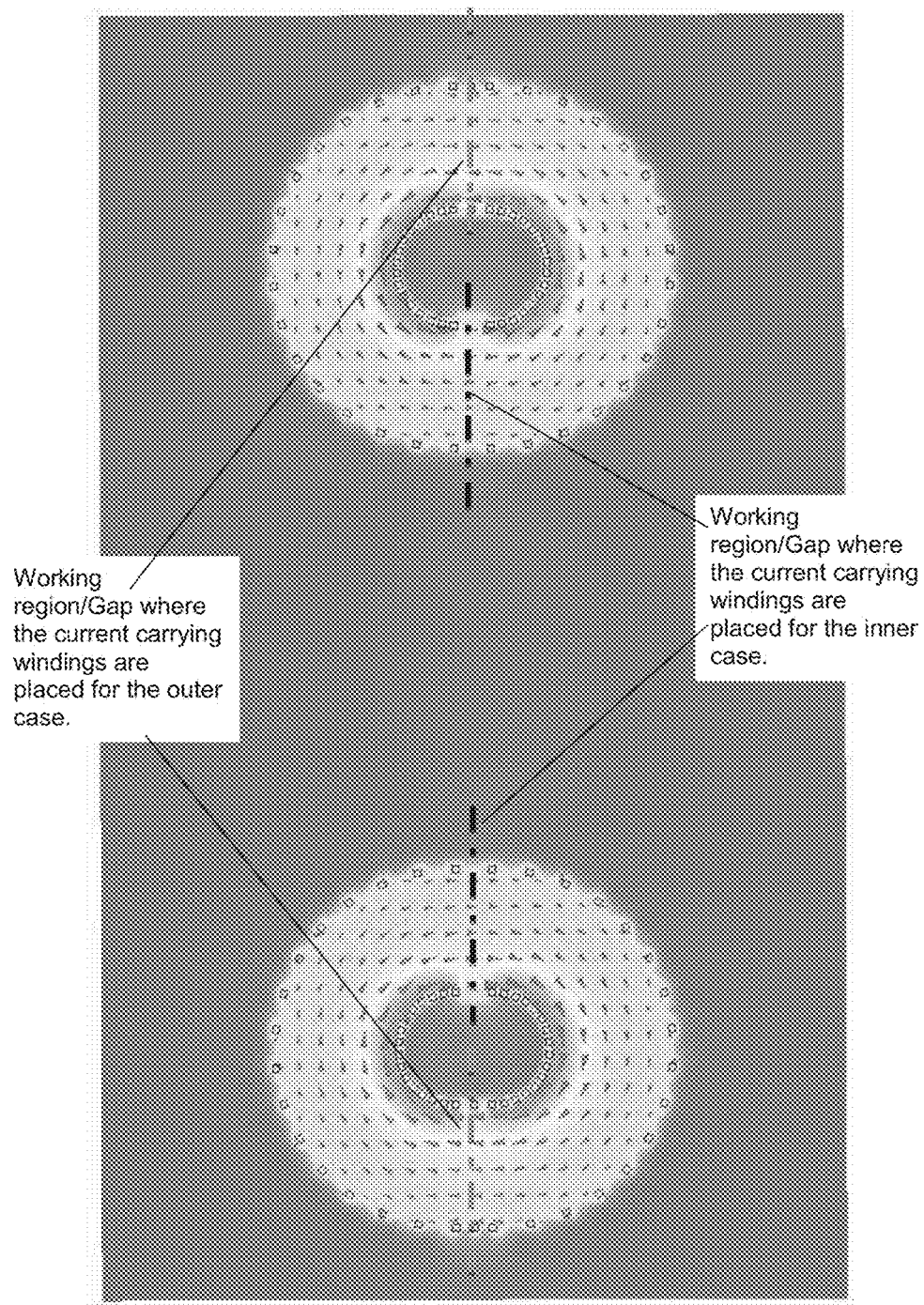

FIG. 249 is a plot of the magnetic field in one sector of the C-shaped toroidal device.

Figure 250:
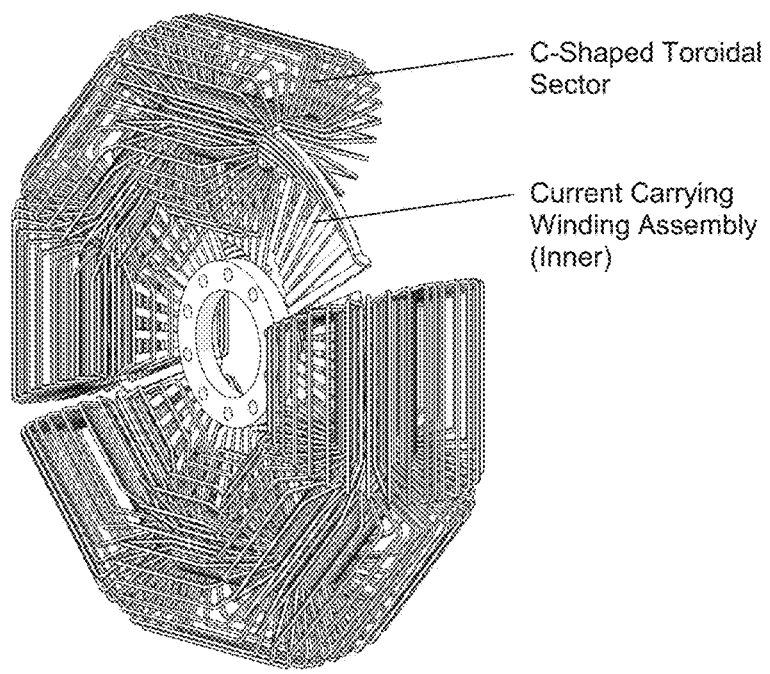

FIG. 250 illustrates a C-Shaped toroidal device complete with both the C-shaped wedge toroidal coils that produce the background magnetic field and the multi-phase current carrying rotor assembly similar to that employed in the wave toroidal Device. One C-shaped segment has been removed for clarity.

Figure 251:
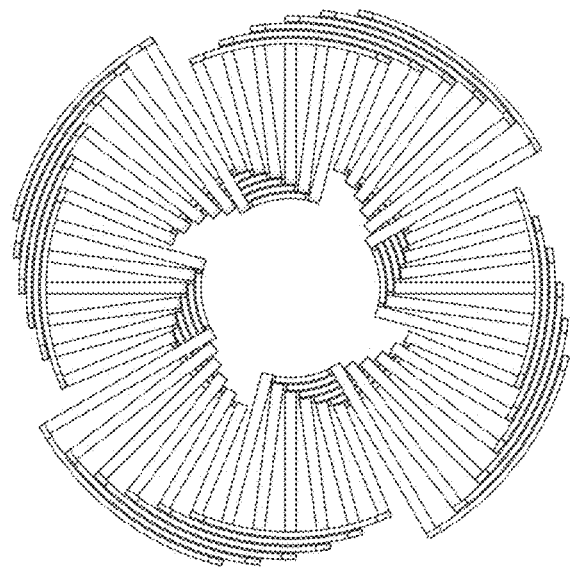

FIG. 251 shows the multi-phase rotor windings of FIG. 250 shown in isolation.

Figure 252:
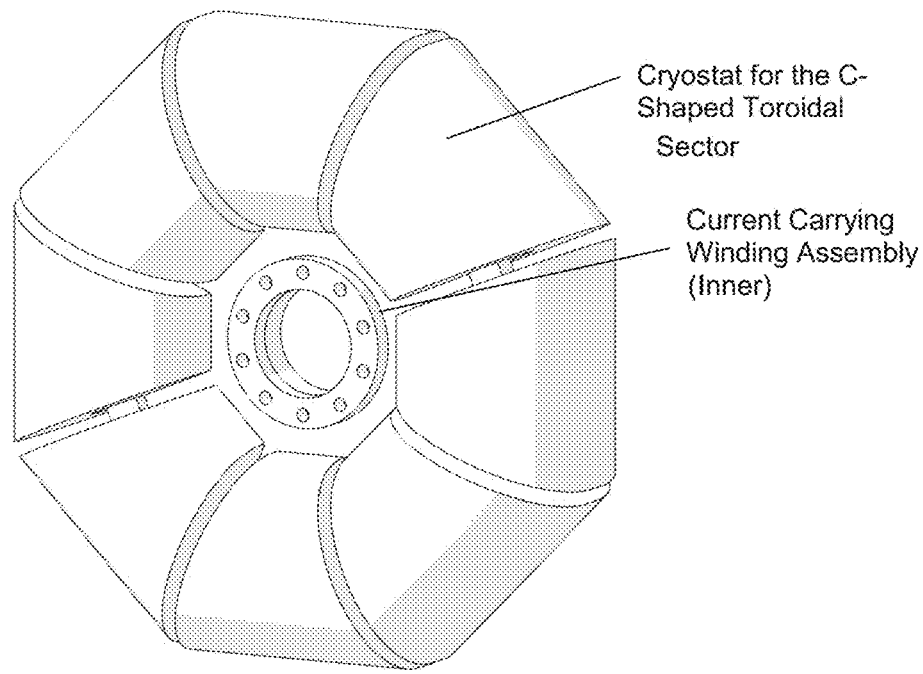

FIG. 252 shows the complete device of FIG. 250 shown with the cryostat for the C-shaped coils and the rotor support assembly in place.

Figure 253:
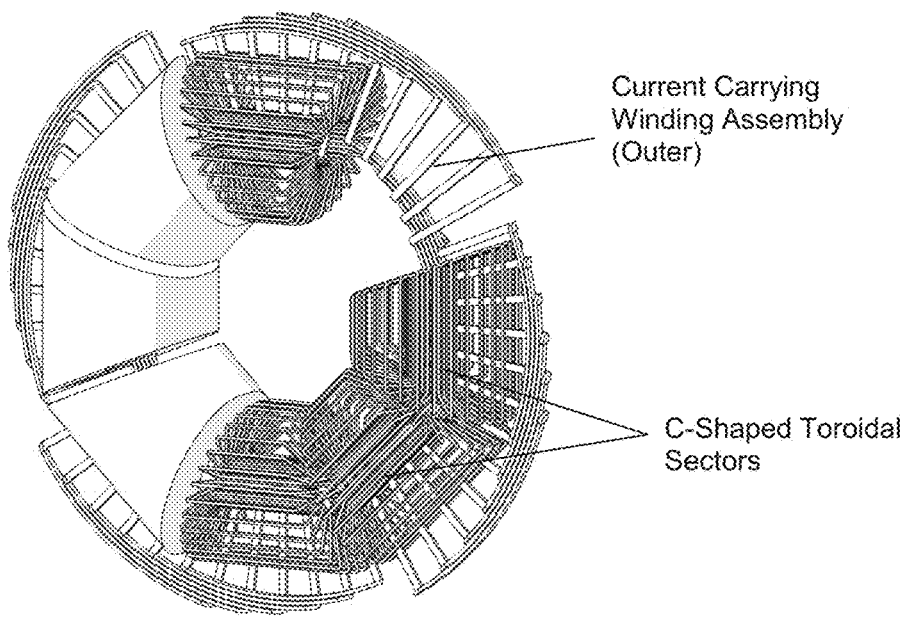

FIG. 253 shows a further embodiment where the working region has been shifted to the outer side of the C-shaped toroids.

Figure 254:
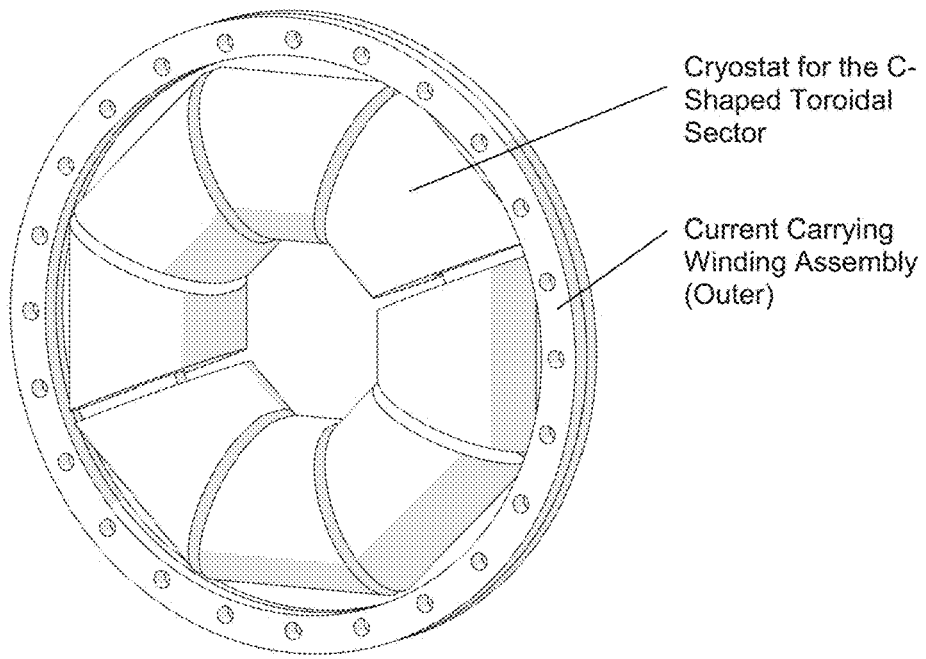

FIG. 254 shows the embodiment of FIG. 253 shown with the cryostat for the C-shaped coils and the rotor support assembly in place.

Figure 255:
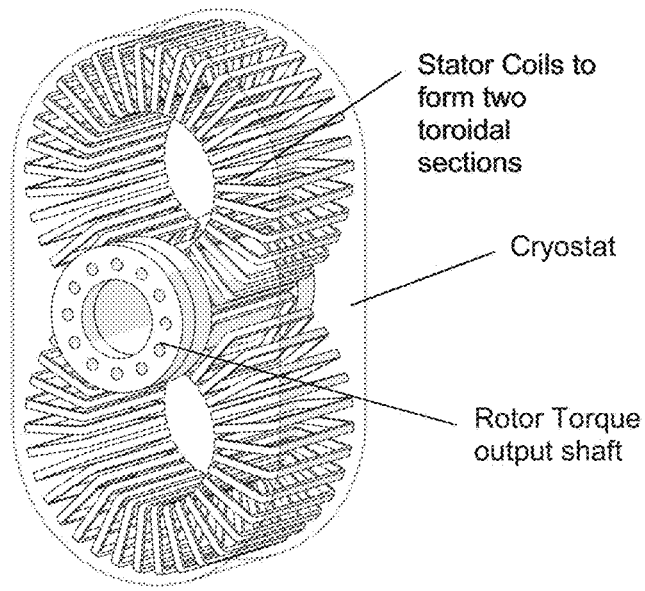

FIG. 255 shows a device similar to that discussed in the star toroidal section but adapted for operation as a 2-pole device.

Figure 256:
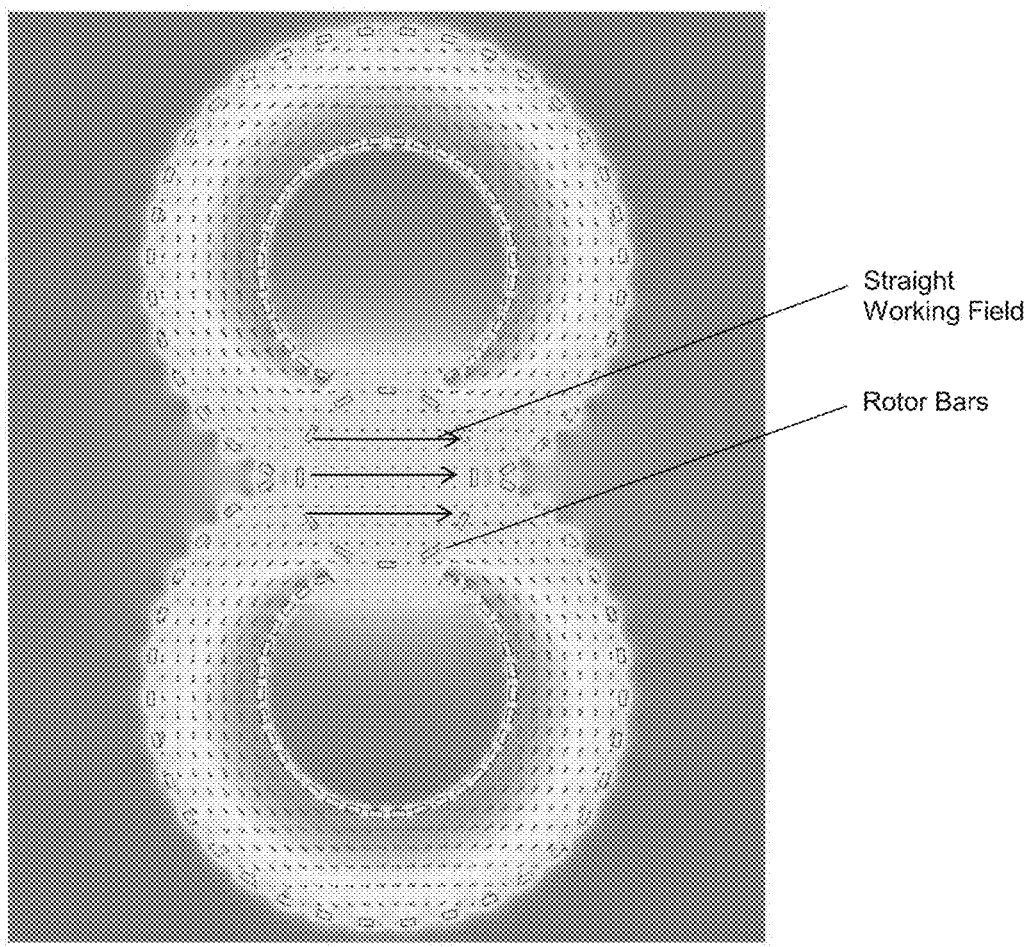

FIG. 256 shows the magnetic field profile of the 2 pole stator winding of the embodiment illustrated in FIG. 255.

Figure 257:
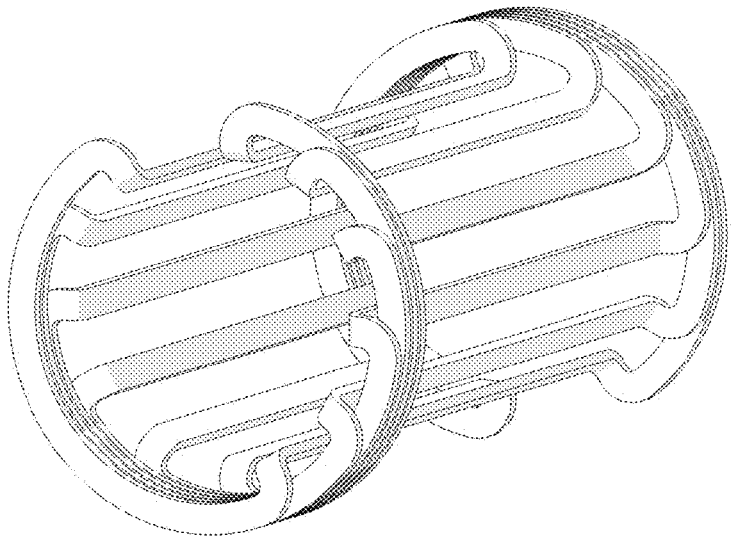

FIG. 257 shows the multi-phase rotor windings isolated from the complete assembly of the 2 Pole Toroidal device illustrated in FIG. 255.

Figure 258:
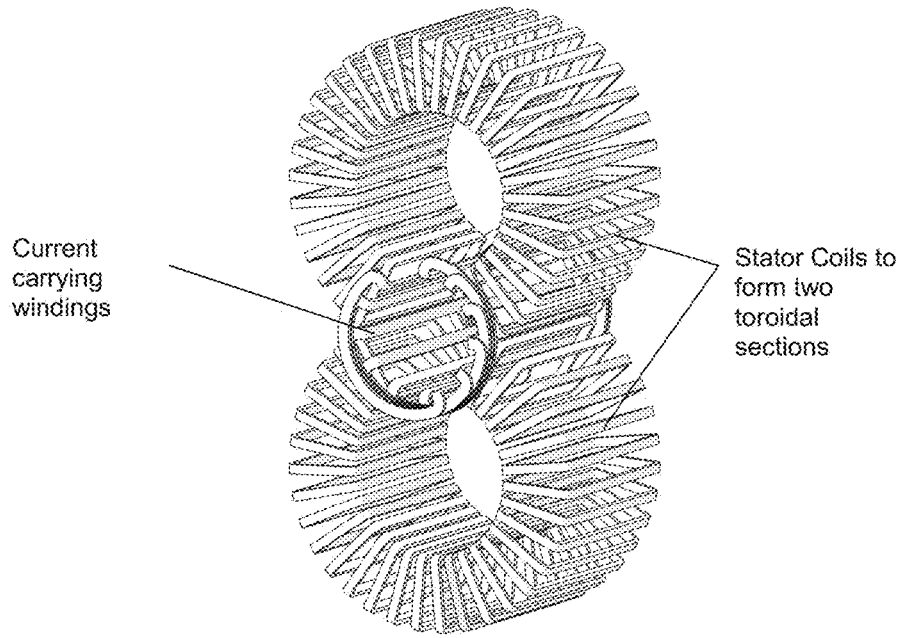

FIG. 258 shows the 2 Pole Toroidal device with rotor and stator windings forming two toroidal sectors.

Figure 259:
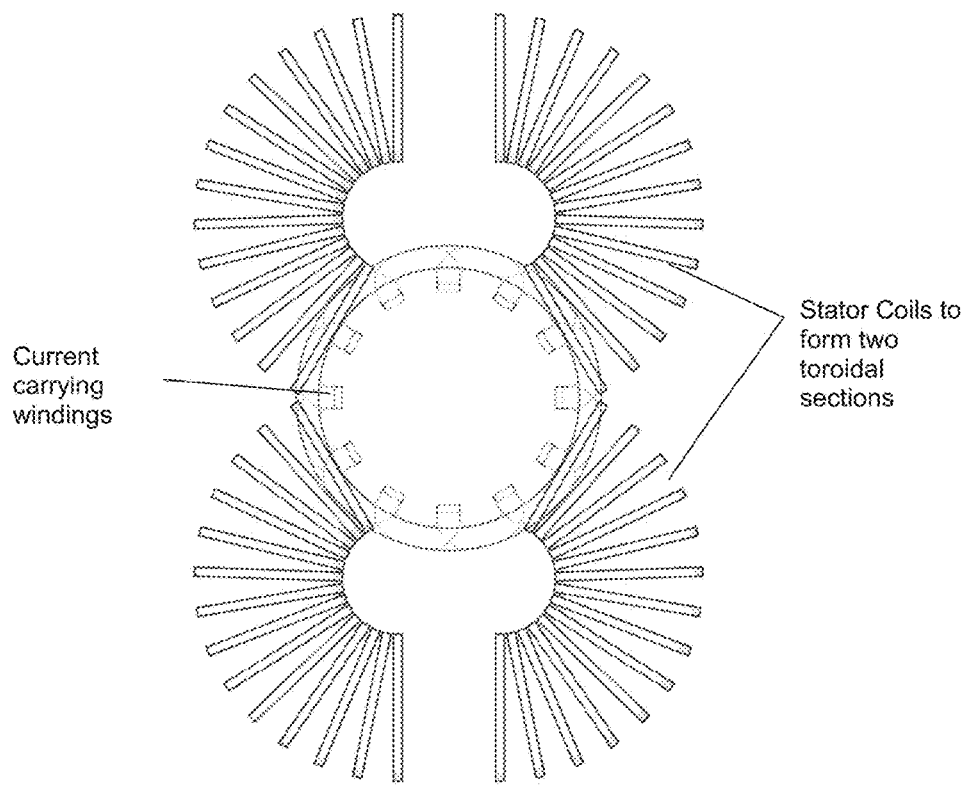

FIG. 259 shows an alternative 2 Pole toroidal device stator layout.

Figure 260:
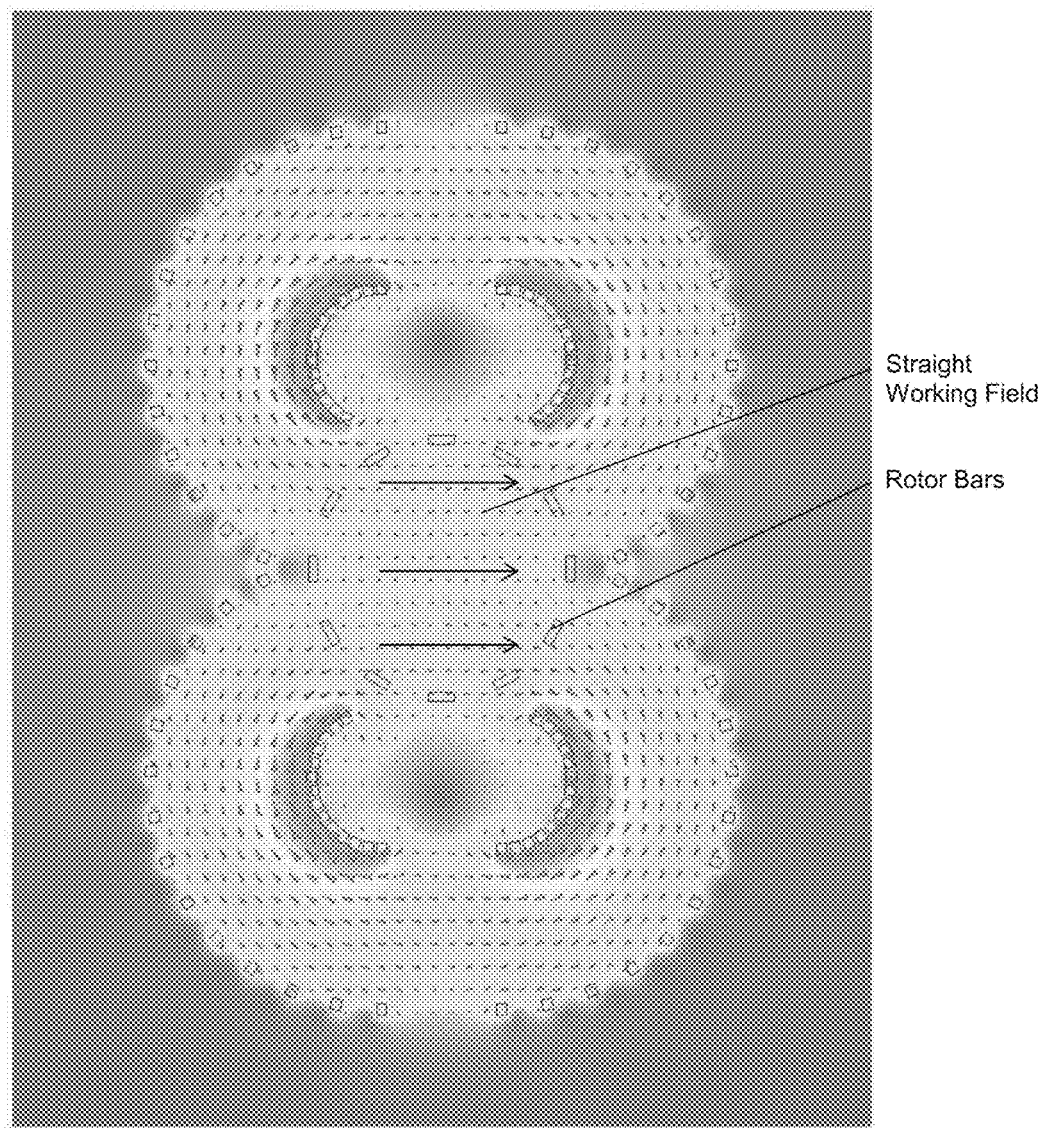

FIG. 260 is a field plot of the device illustrated in FIG. 259.

Figure 261:
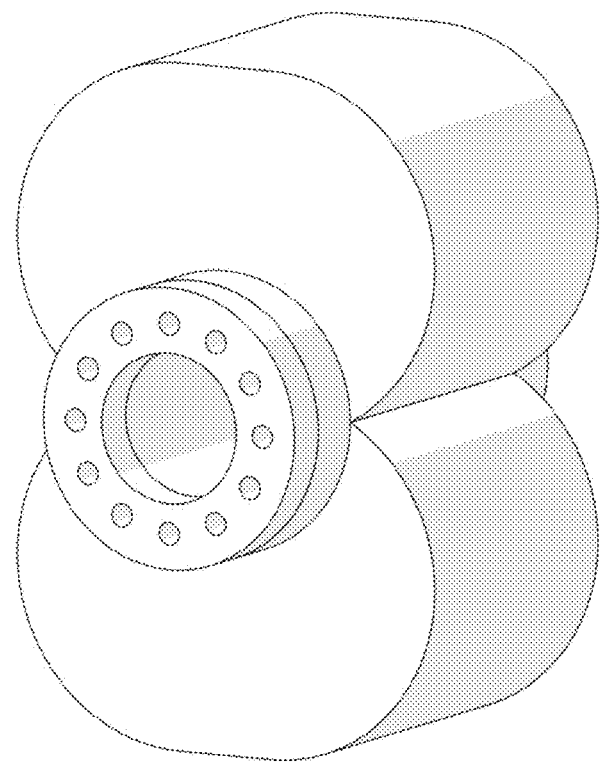

FIG. 261 shows the alternative 2 Pole toroidal device layout with cryostat.

Figure 262:
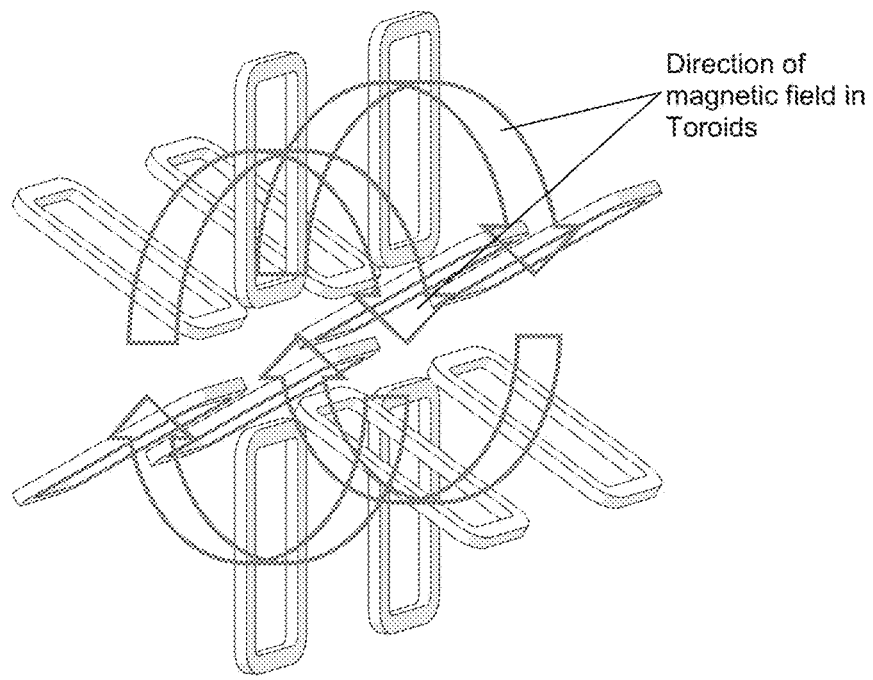

FIG. 262 shows a toroidal drive formed by using 3 toroidal assemblies of race track coils.

Figure 263:
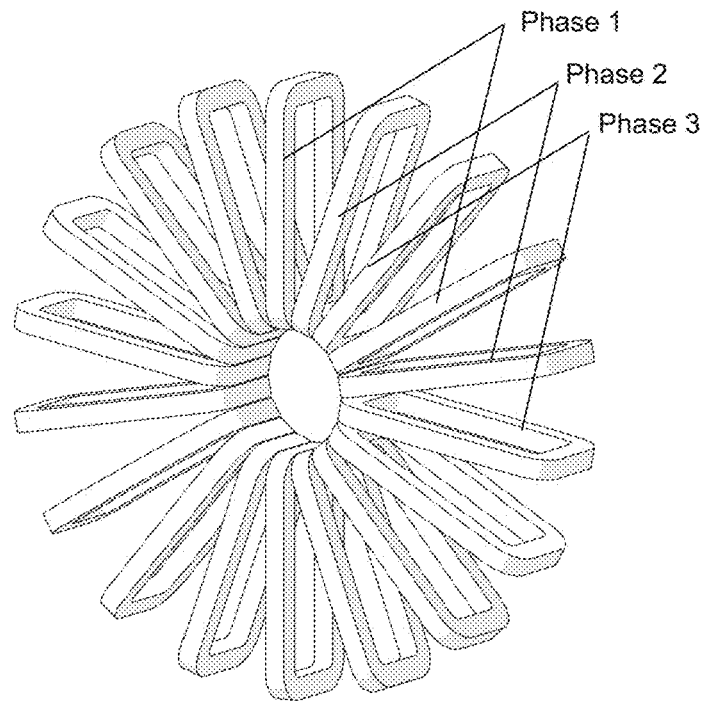

FIG. 263 shows the rotor coils of the toroidal drive illustrated in FIG. 262.

Figure 264:
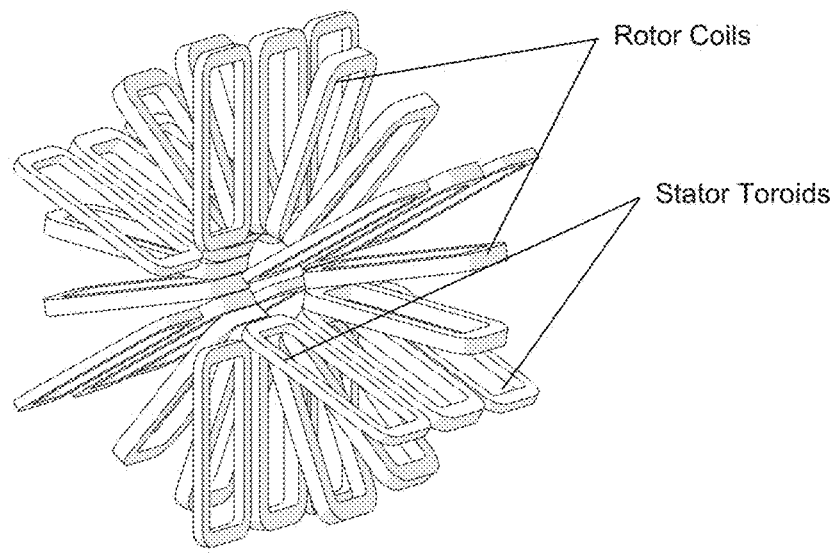

FIG. 264 shows both the rotor and stator coils of 3 toroidal layer drive.

Figure 265:
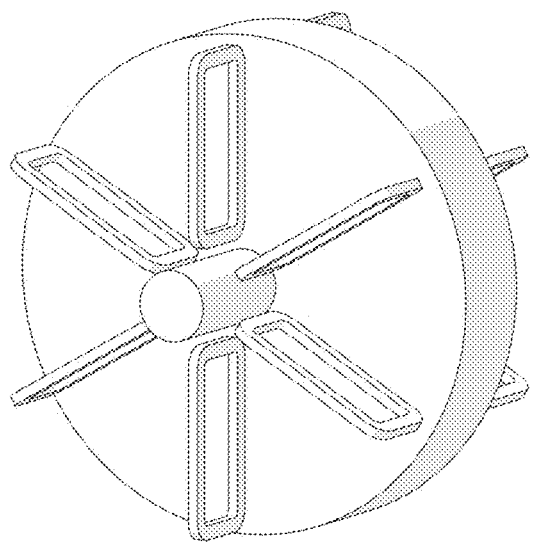

FIG. 265 shows the completed device of FIG. 264 with the rotor support structure shown.

Figure 266:
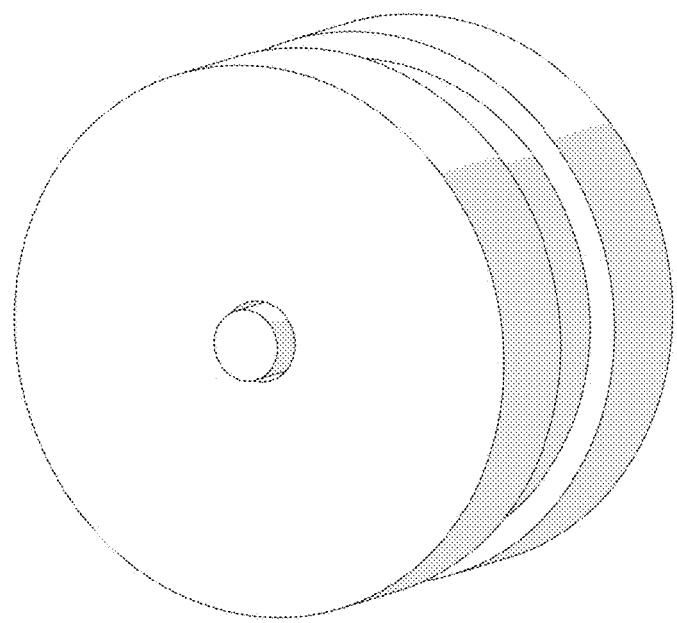

FIG. 266 shows the completed device of FIG. 264 with the cryostats for the stationary outer toroids shown.

Figure 267:
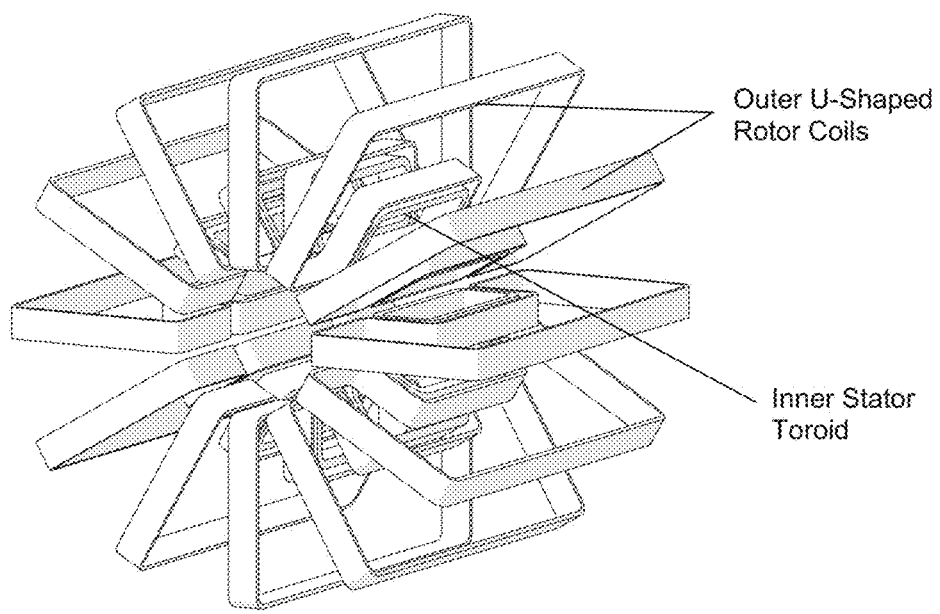

FIG. 267 illustrates a variant device having a central toroid of superconducting racetrack coils to generate a large toroidal magnetic field and an outer toroid that is comprised of coils that are 'U-shaped' that sit over the smaller racetrack toroid.

Figure 268:
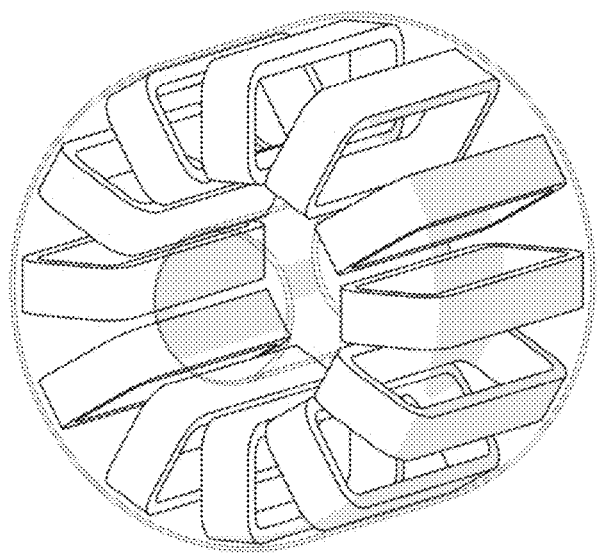

FIG. 268 shows a U-Shaped toroidal drive of FIG. 267 with the inner stator coils isolated and the boundaries of the cryostat shown.

Figure 269:
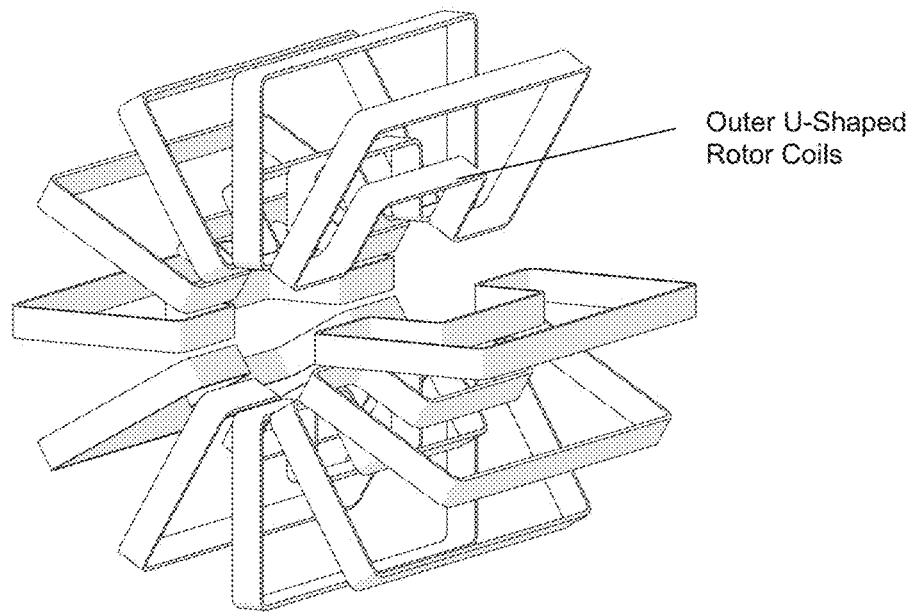

FIG. 269 shows the U-Shaped toroidal drive of FIG. 267 with the rotor toroid shown.

Figure 270:
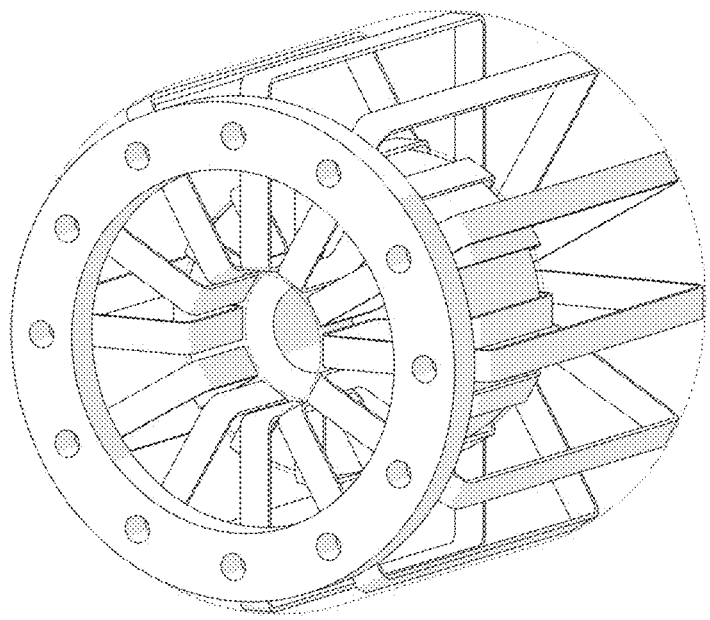

FIG. 270 shows the U-Shaped toroidal drive of FIG. 267 with the supporting structure of the rotor shown.

Figure 271:
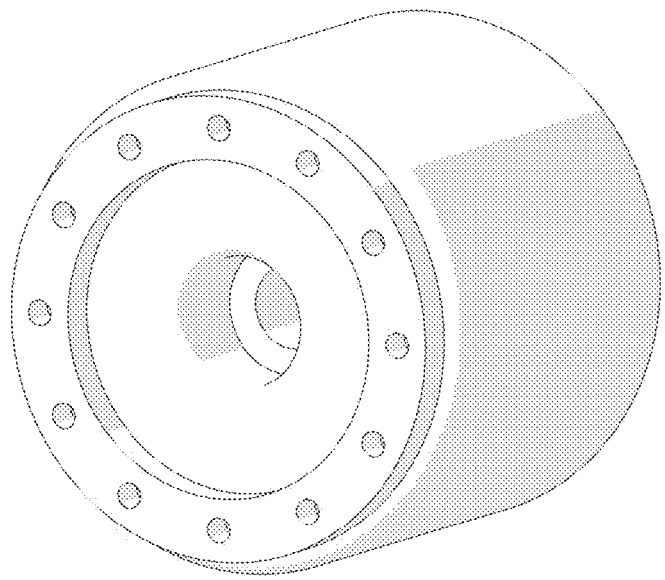

FIG. 271 shows the showing the completed external assembly of the U-Shaped toroidal drive of FIG. 267.

Figure 272:
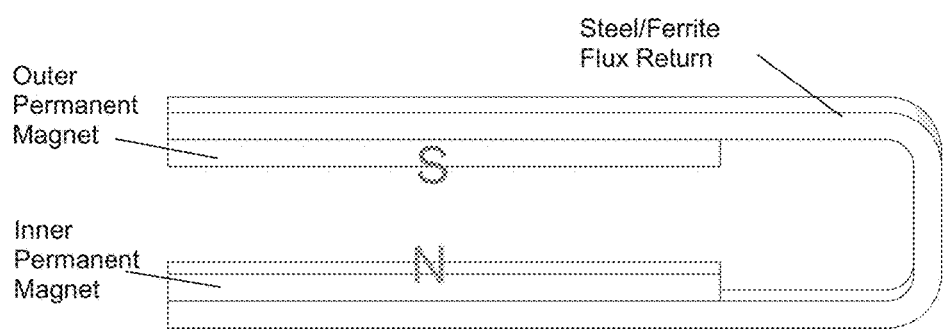

FIG. 272 is a schematic illustration of a single pole element of the permanent magnet and steel assembly that produces a background magnetic field.

Figure 273:
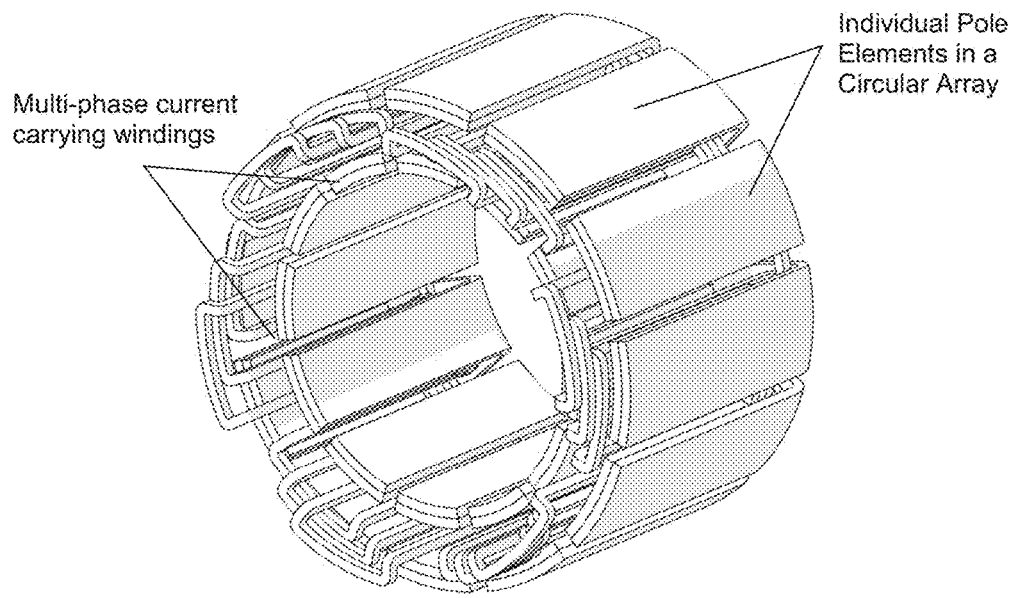

FIG. 273 shows a complete C-Drive assembly consisting of twelve magnetic pole elements and three electrical phases of current carrying windings.

Figure 274:
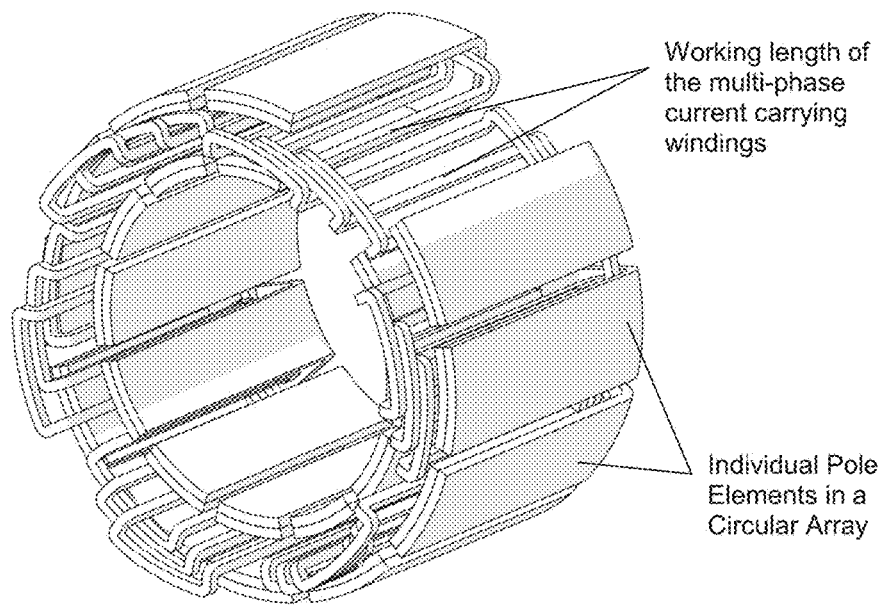

FIG. 274 shows the completed assembly of FIG. 273 with one pole element removed to display the current carrying windings.

Figure 275:
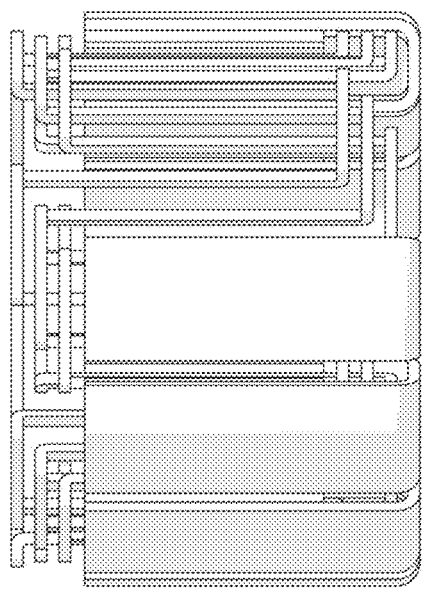

FIG. 275 is an end view of the device illustrated in FIG. 274.

Figure 276:
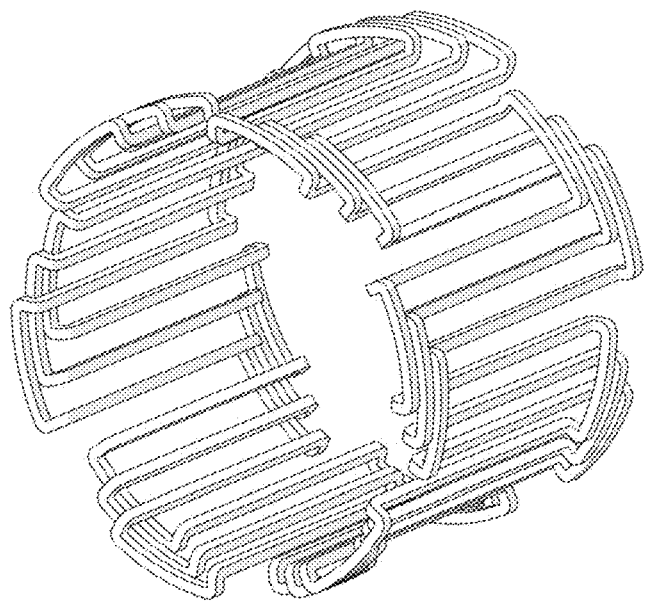

FIG. 276 shows the multi-phase current carrying windings from the embodiment of FIG. 274 isolated from the rest of the assembly.

Figure 277:
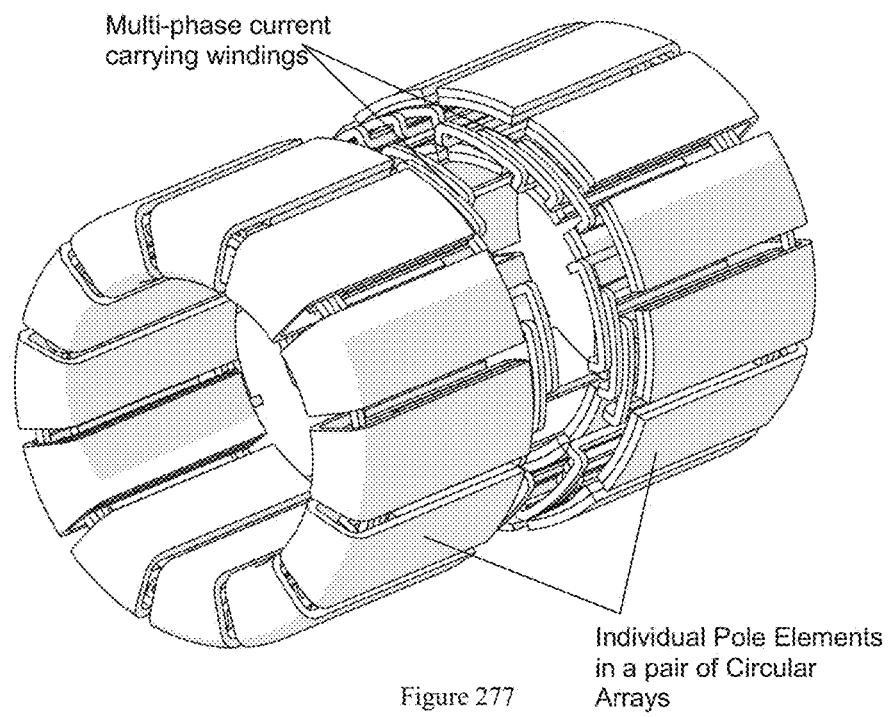

FIG. 277 shows an embodiment consisting of two C-Drive motor/generators mounted on the same axis of rotation.

Figure 278:
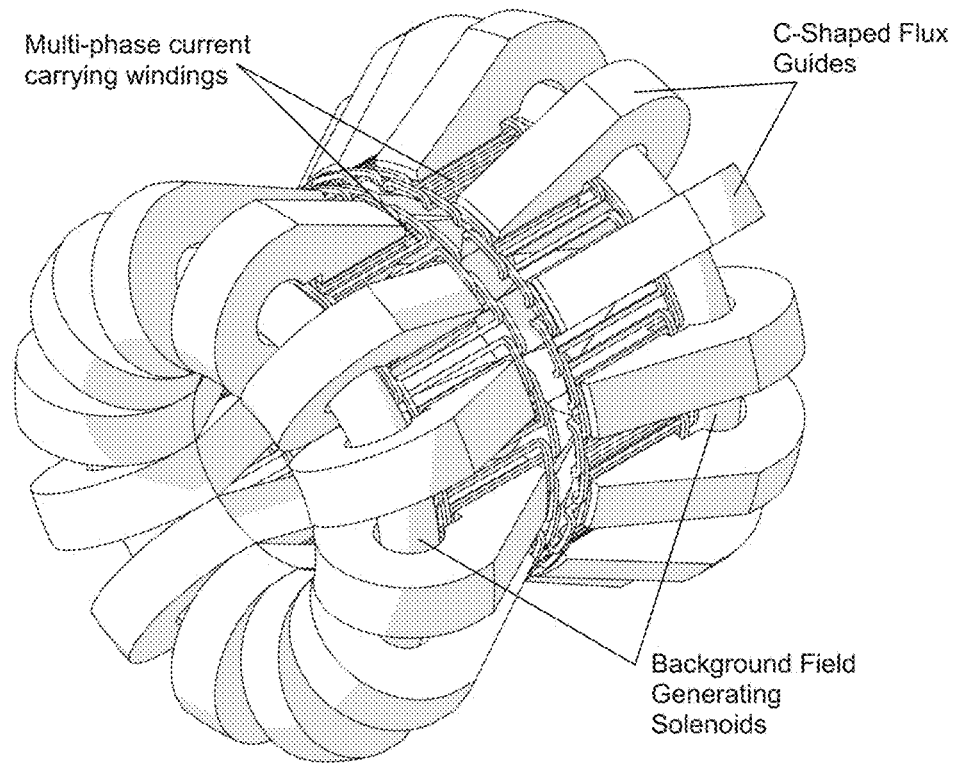

FIG. 278 shows a complete electromagnetic C-Drive embodiment featuring the electromagnetic coils and steel flux guides that generate and direct the background magnetic field, as well as the current carrying windings that operate or rotate through the air gap.

Figure 279:
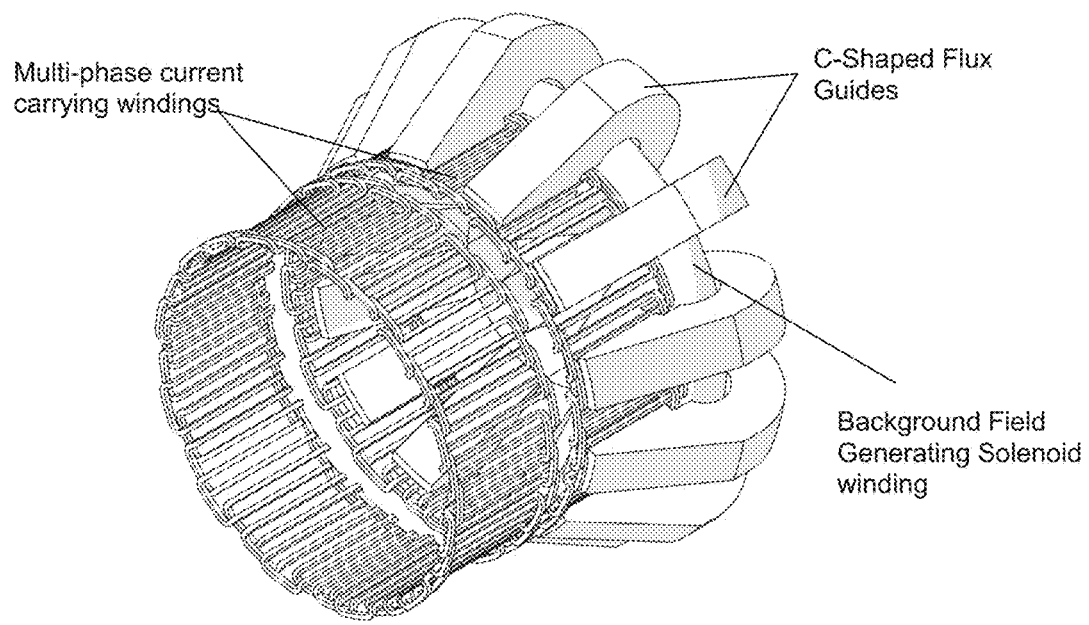

FIG. 279 shows the embodiment of FIG. 278 with one of the electromagnetic background field assemblies removed to show the details of the multi-phase current carrying windings.

Figure 280:
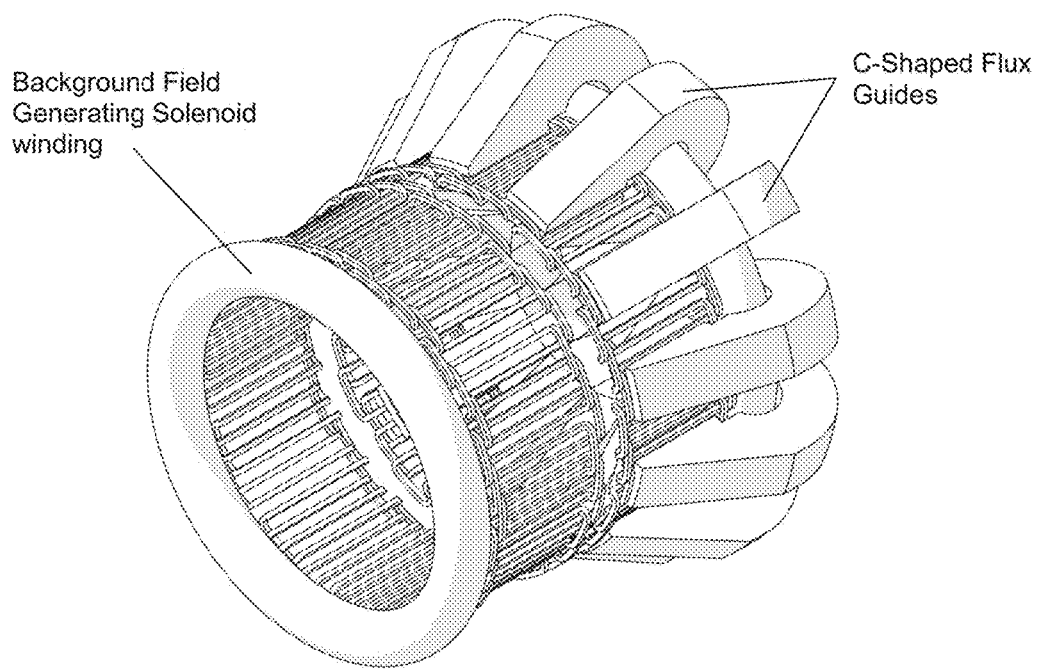

FIG. 280 shows the embodiment of FIG. 278 with one of the steel/ferrite based flux guides removed to show the background field generating solenoid.

Figure 281:
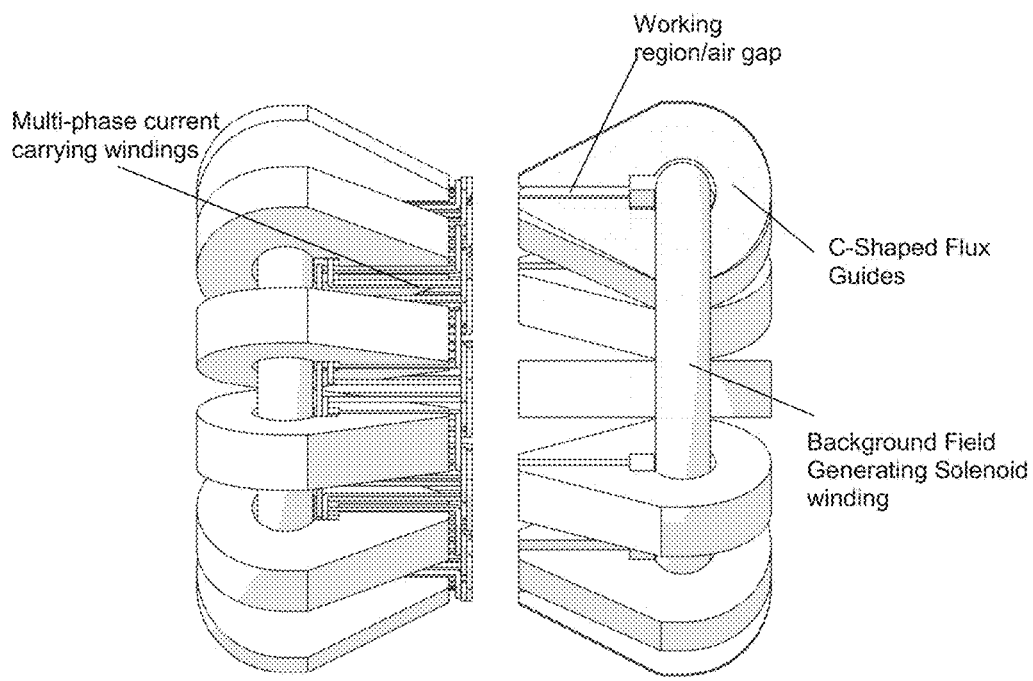

FIG. 281 is an end view of the device of FIG. 278.

Figure 282:
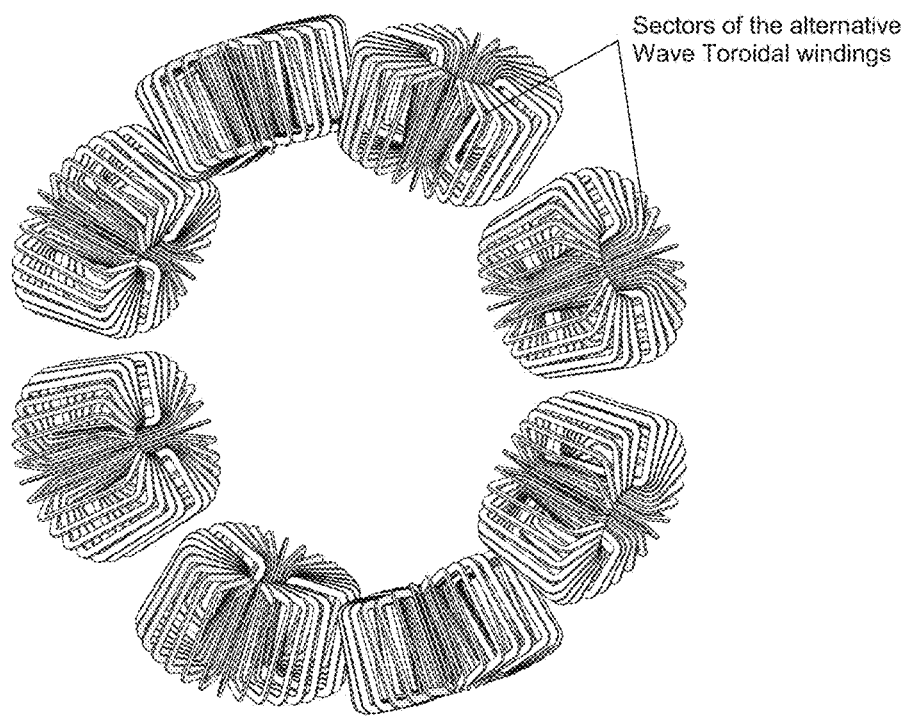

FIG. 282 shows an alternative arrangement of the wave toroidal sectors.

Figure 283:
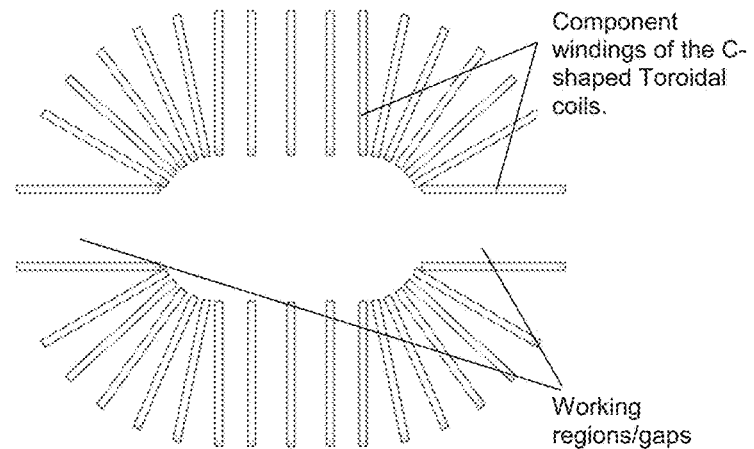

FIG. 283 is an end view of one of the revised C-Shaped sectors of the alternative C-shaped Toroidal device embodiment.

Figure 284:
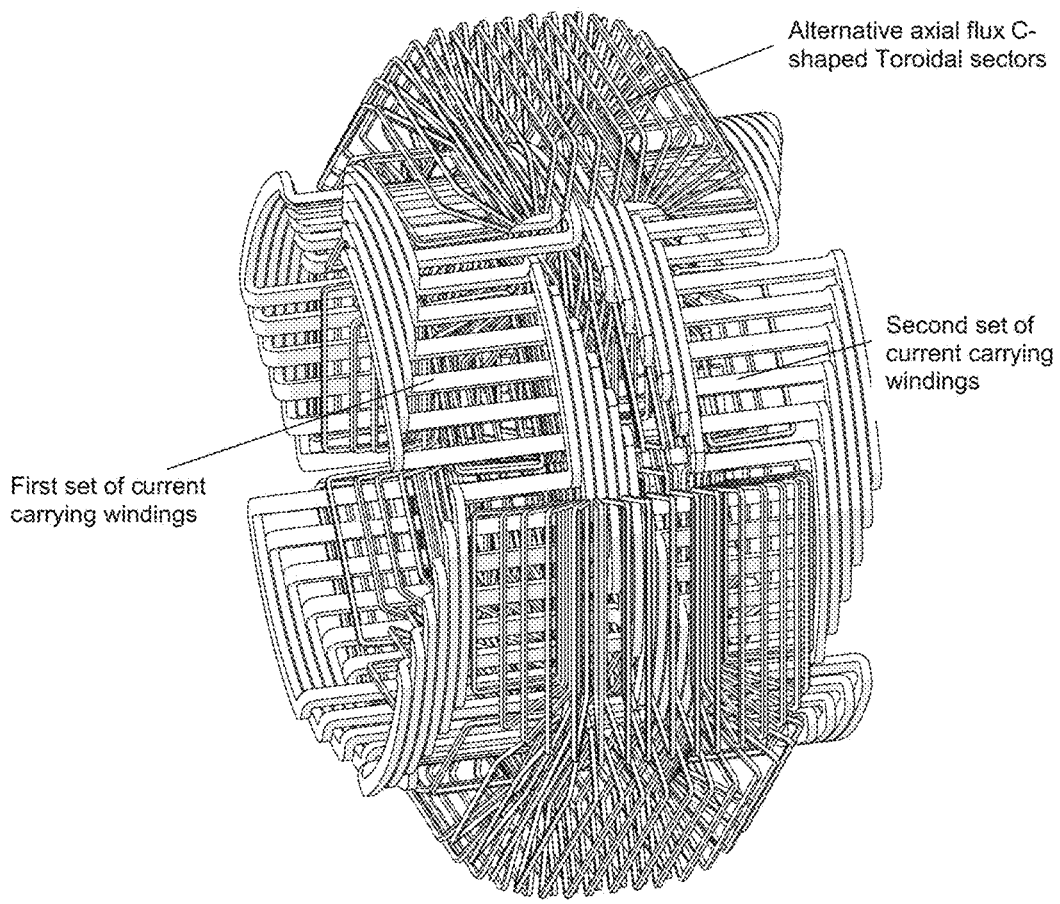

FIG. 284 shows the complete alternative radial flux version of the C-shaped Toroidal device.

Figure 285:
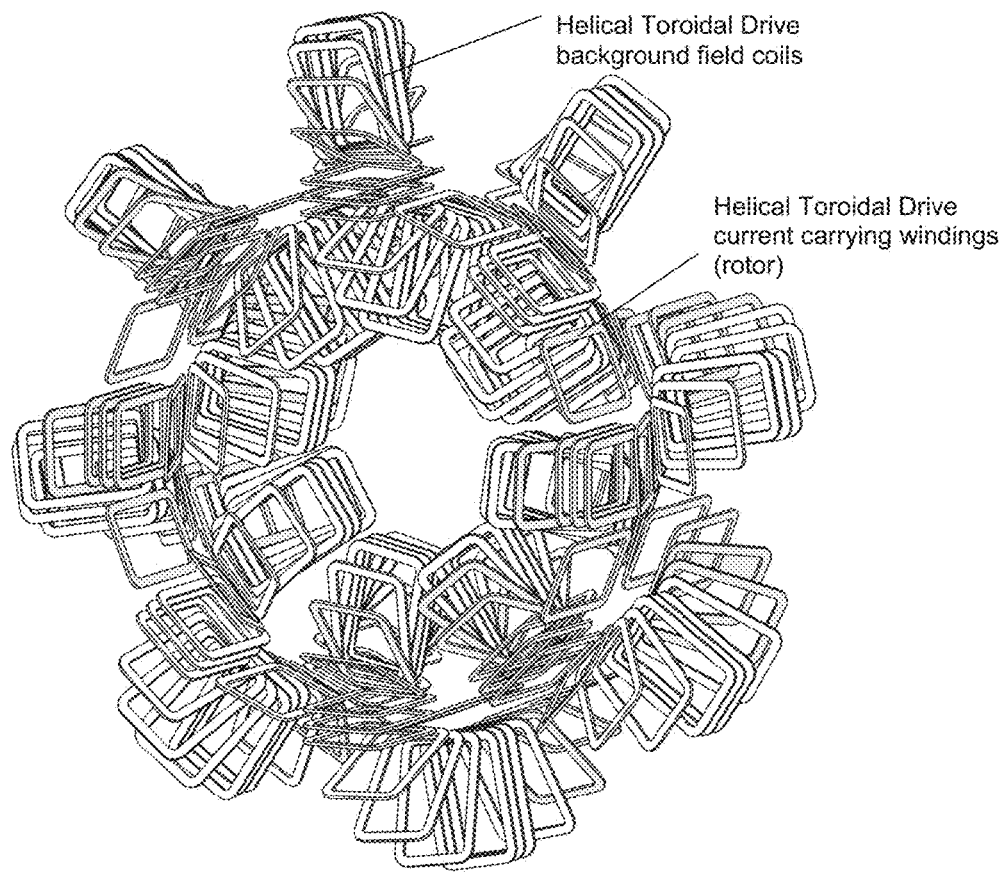

FIG. 285 shows a radial flux embodiment of the helical toroidal drive.

Figure 286:
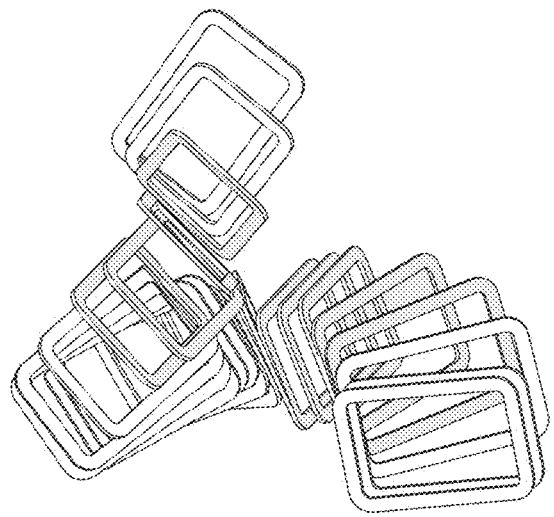

FIG. 286 shows a single helical element of the background field creating coils from the embodiment depicted in FIG. 285 that shows how the windings progress in a helix around a circular path.

Figure 287:
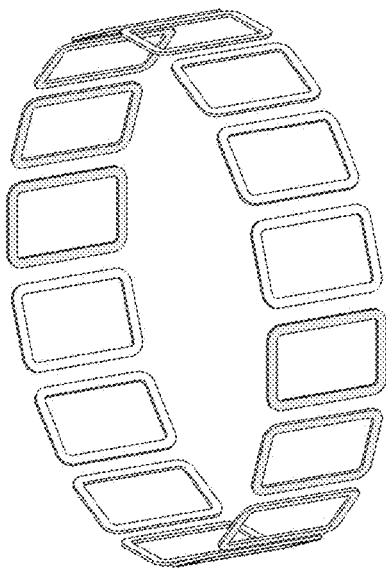

FIG. 287 shows an isolated single phase of the current carrying windings depicted for the radial flux embodiment of FIG. 285.

Figure 288:
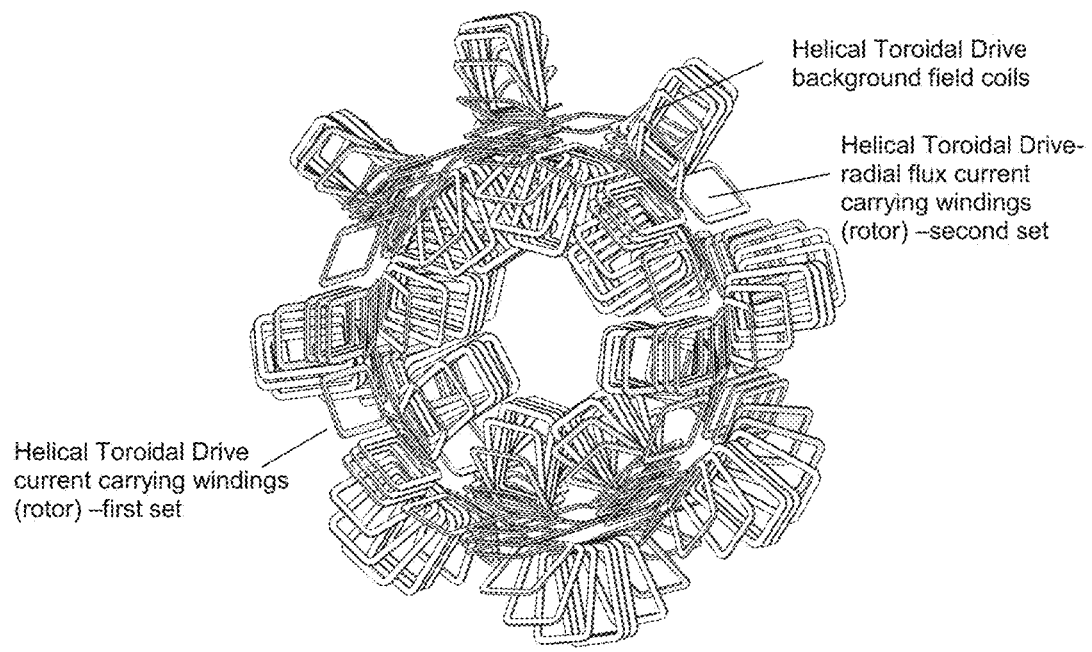

FIG. 288 shows a radial flux embodiment of the helical toroidal drive similar to that depicted in FIG. 285 but with current carrying windings at either end of the device.

Figure 289:
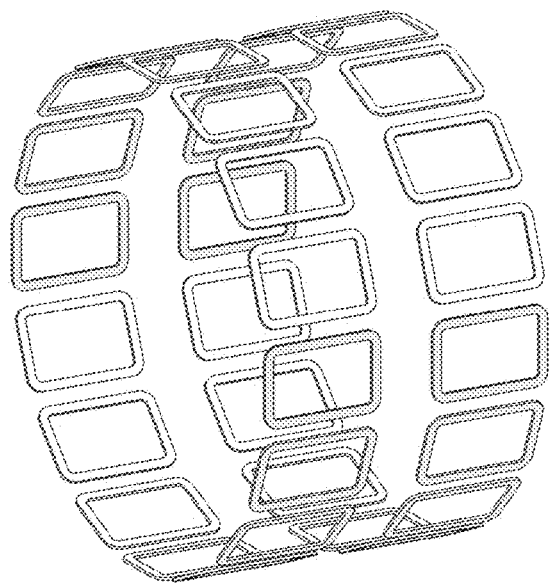

FIG. 289 shows two sets of isolated single phase current carrying windings depicted for the radial flux embodiment of FIG. 288.

Figure 290:
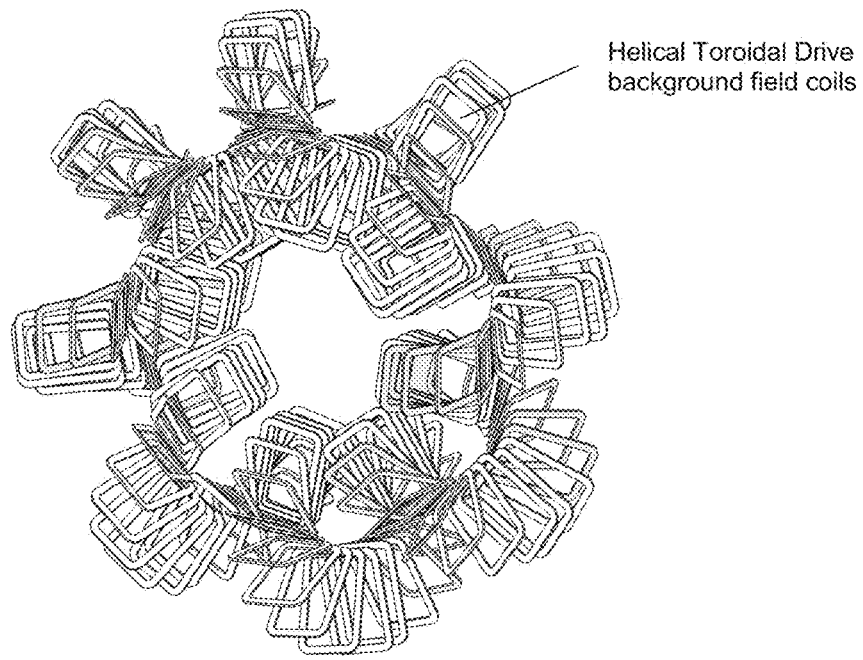

FIG. 290 shows the helical toroid configured for operation as an axial flux machine (vertical working regions/gaps).

Figure 291:
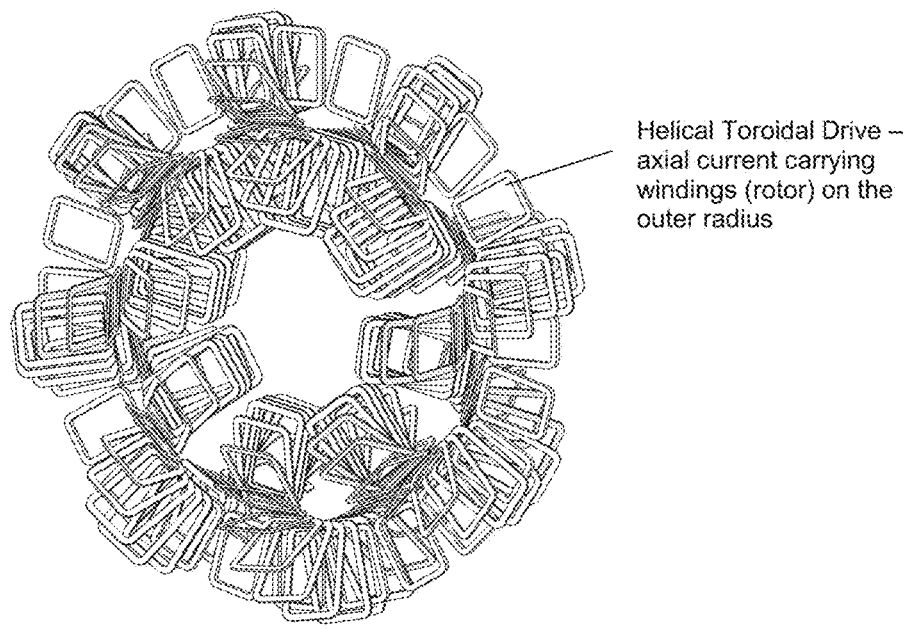

FIG. 291 shows the Helical Toroid of FIG. 290 combined with a series of current carrying windings on the outer radius of the device.

Figure 292:

FIG. 292 shows an isolated single phase of the current carrying windings depicted for the axial flux embodiment of FIG. 291.

Figure 293:
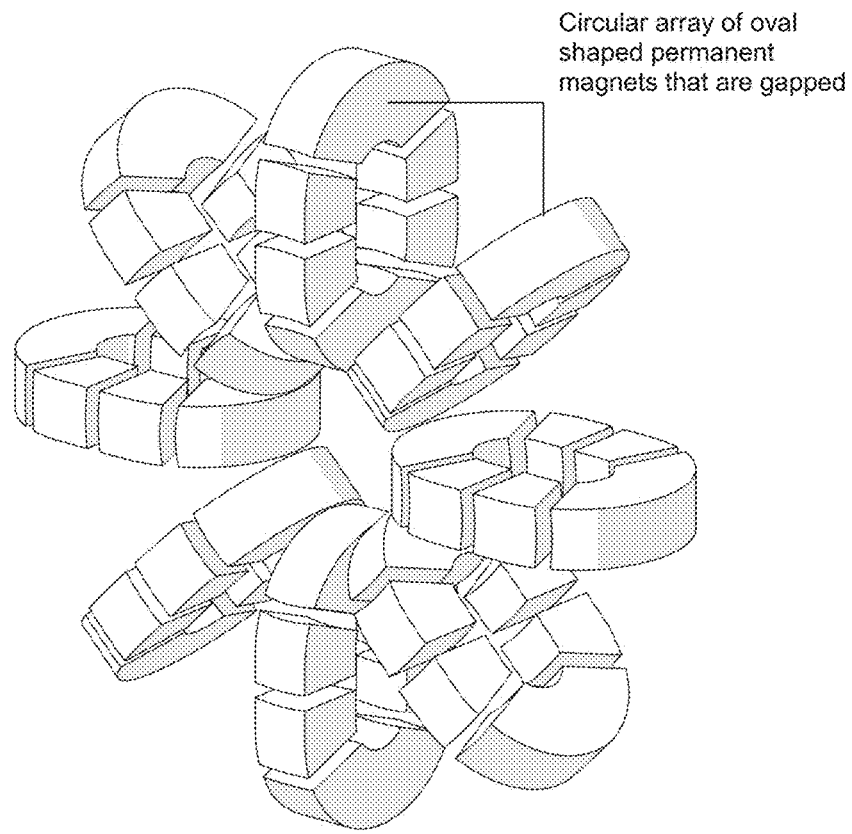

FIG. 293 shows a circular array of oval shaped permanent magnets through which current carrying windings rotate.

Figure 294:
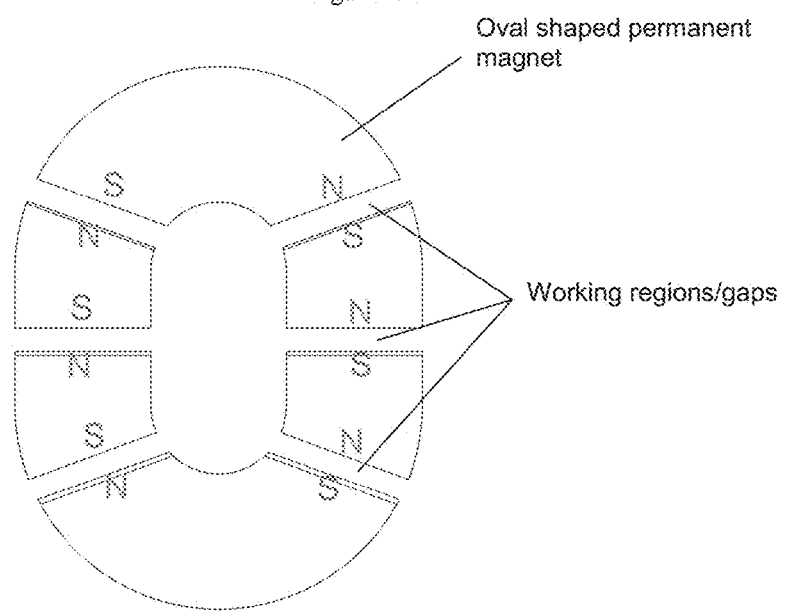

FIG. 294 shows an individual oval shaped permanent magnet from the circular array shown in FIG. 293 showing the positioning of the gaps.

Figure 295:
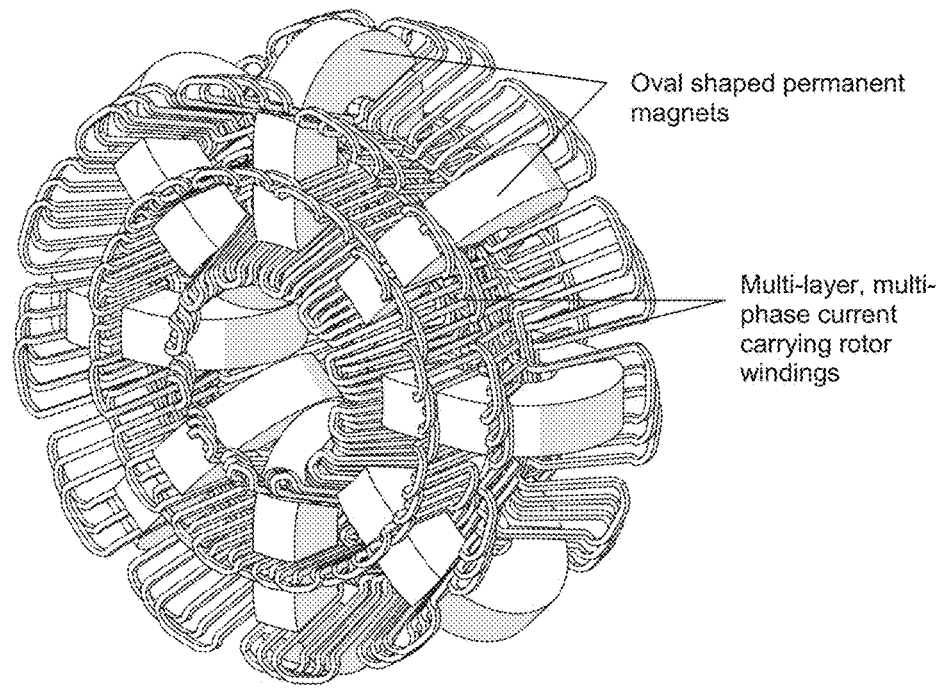

FIG. 295 shows a complete Multi-gapped permanent magnet device with three layers of multi-phase current carrying windings positioned in the gaps on either side of the device.

Figure 296:
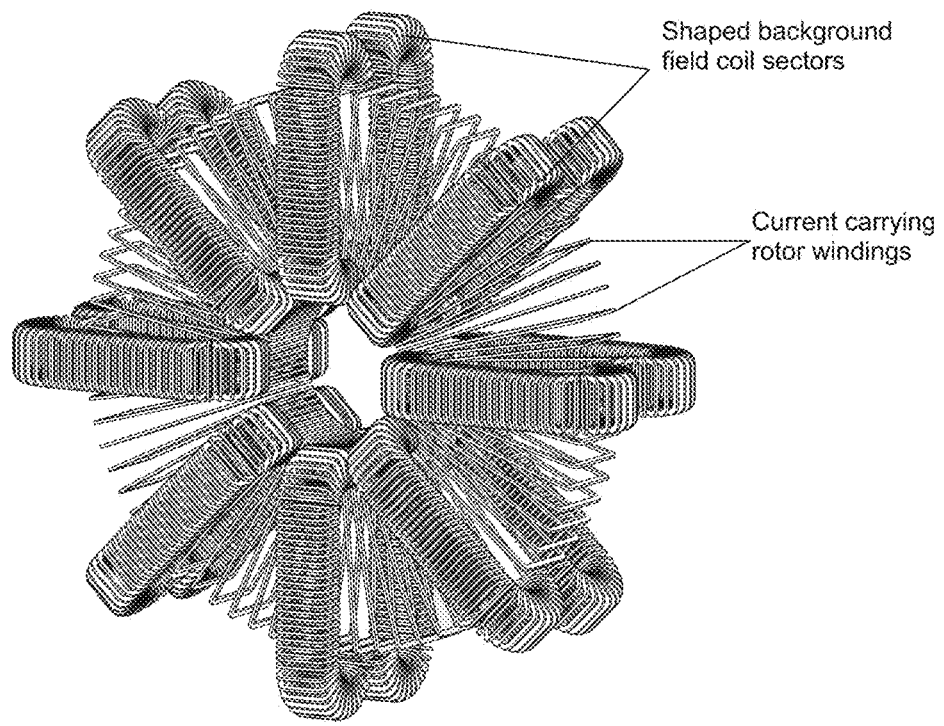

FIG. 296 shows an embodiment of the DC Drive consisting of a circular array of shaped coils that direct magnetic field in to a working region in which a set of rotating current carrying windings are placed.

Figure 297:
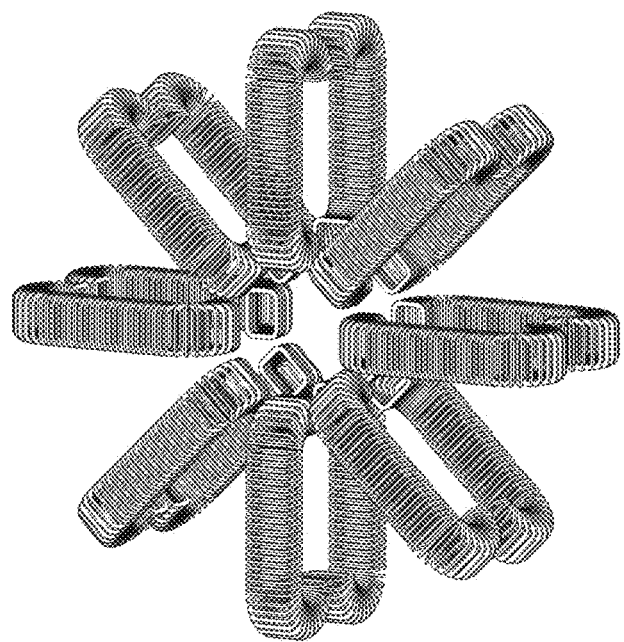

FIG. 297 shows the circular array of shaped background field producing windings of FIG. 286 shown in isolation.

Figure 298:
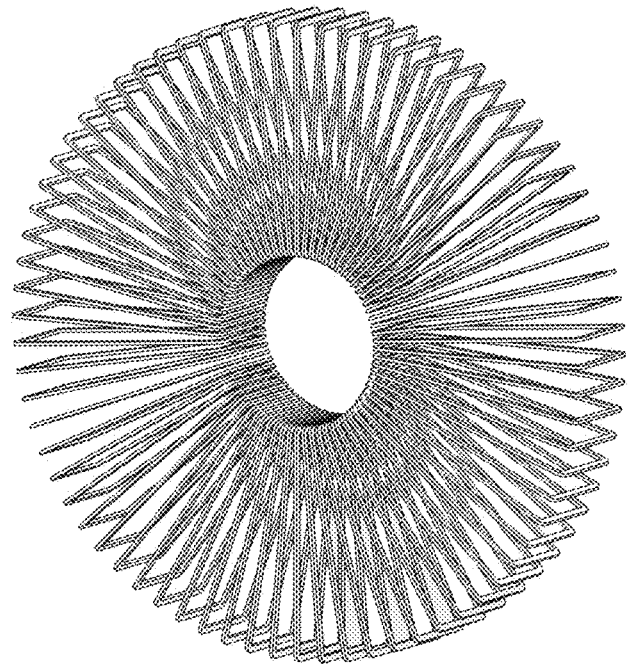

FIG. 298 shows the current carrying rotor assembly of FIG. 296 consisting of multiple phases of racetrack coil windings shown in isolation.

Figure 299:
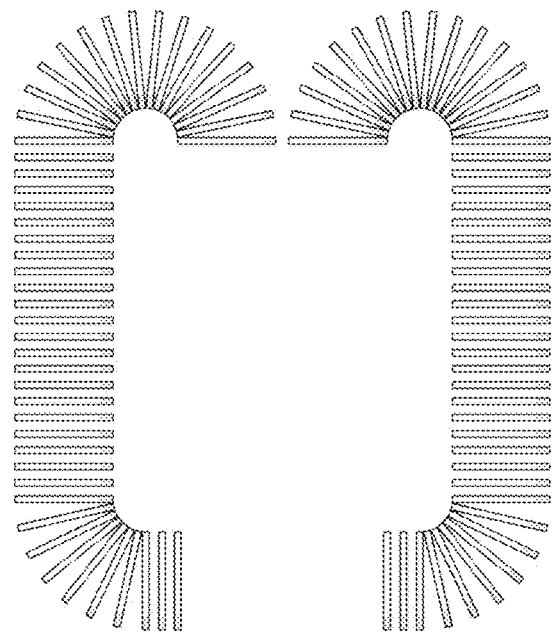

FIG. 299 is an end view of one set of the shaped coils from FIG. 296.

Figure 300:
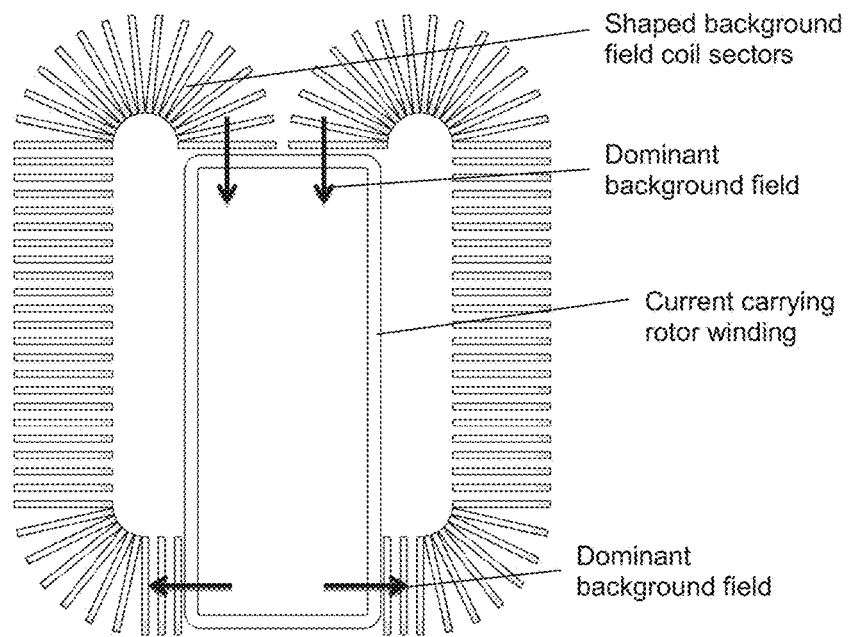

FIG. 300 shows the shaped coils of FIG. 299 with a current carrying racetrack winding shown.

Figure 301:
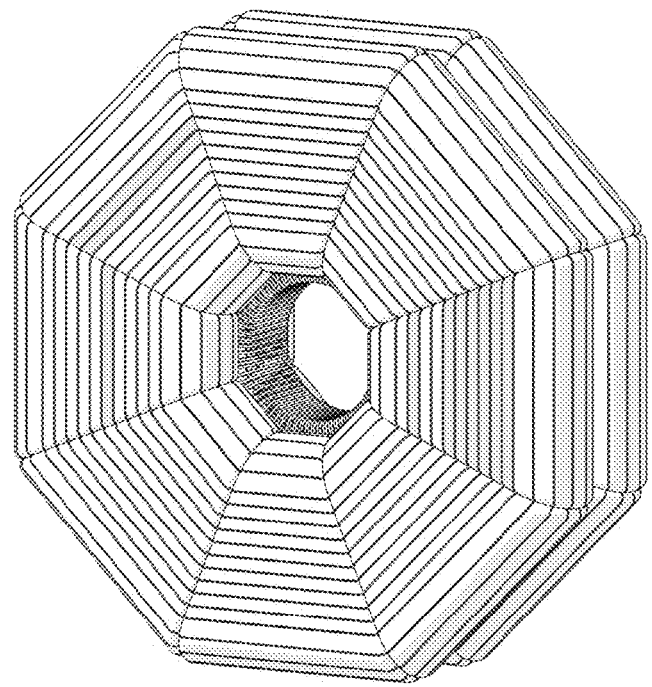

FIG. 301 shows a variation of the embodiment of FIG. 296 where the background field producing coils are more wedge shaped and interlock more completely.

Figure 302:
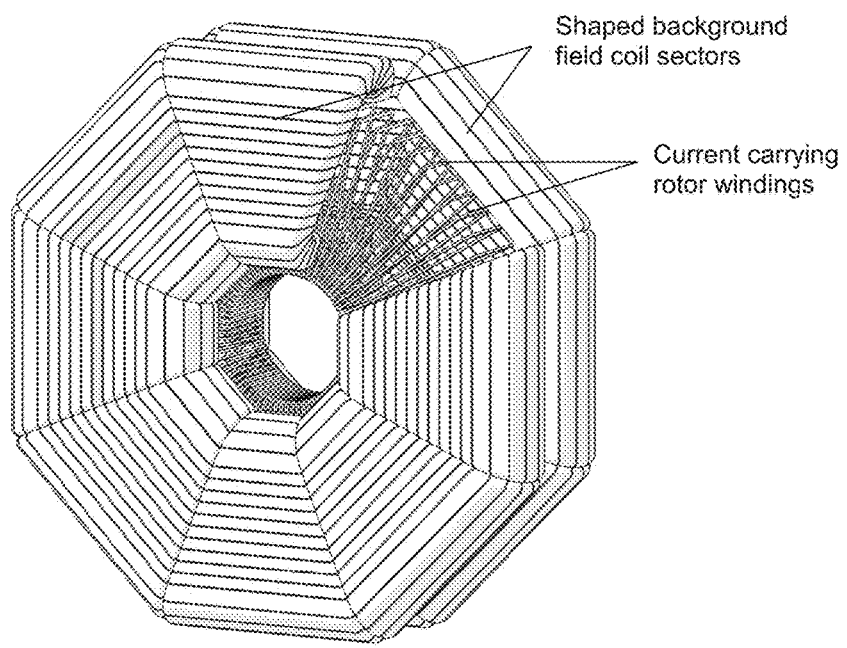

FIG. 302 shows the embodiment of FIG. 301 with one sector from one side of the now wedge shaped background field coils removed to show the current carrying windings.

Figure 303:
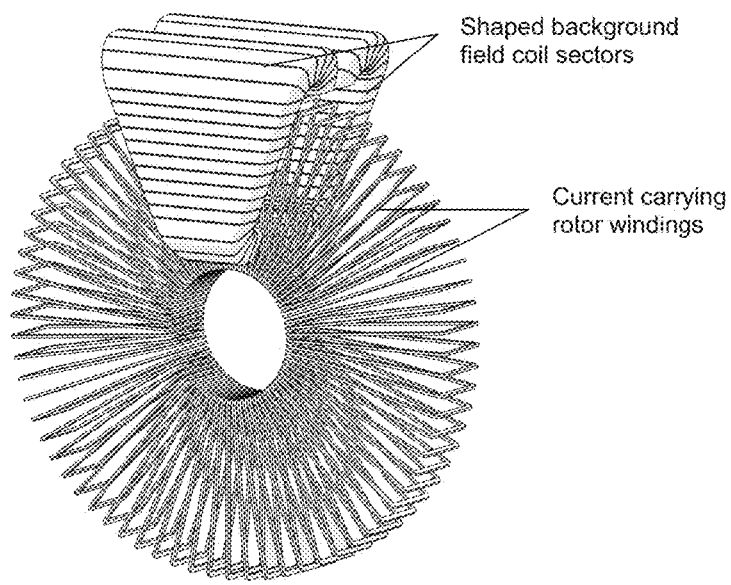

FIG. 303 shows the current carrying windings of FIG. 301 shown with one sector of the wedge shaped coils for context.

Figure 304:
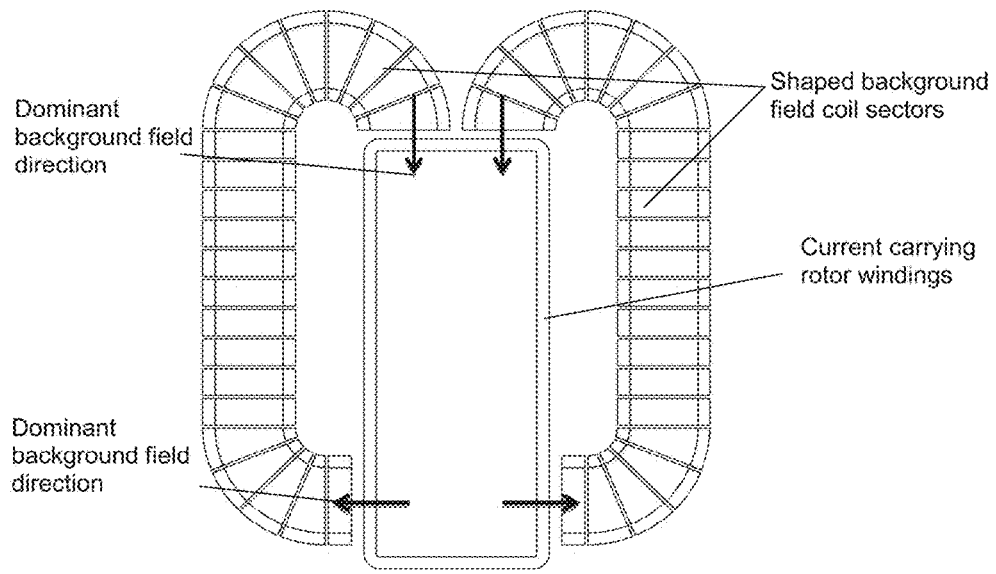

FIG. 304 shows a cross section of one sector of the wedge shaped variation presented in FIG. 303 showing both the background field producing windings and the current carrying rotor 305.

Figure 305:
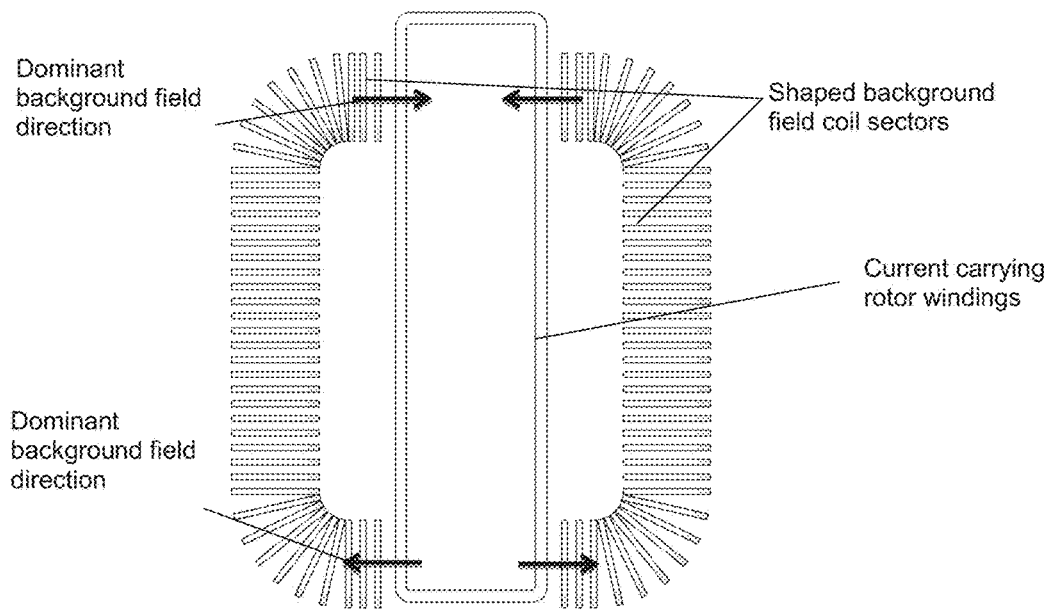

FIG. 305 shows a further variation in the positioning of the background field producing coils of the devices in FIG. 296 and FIG. 301.

Figure 306:
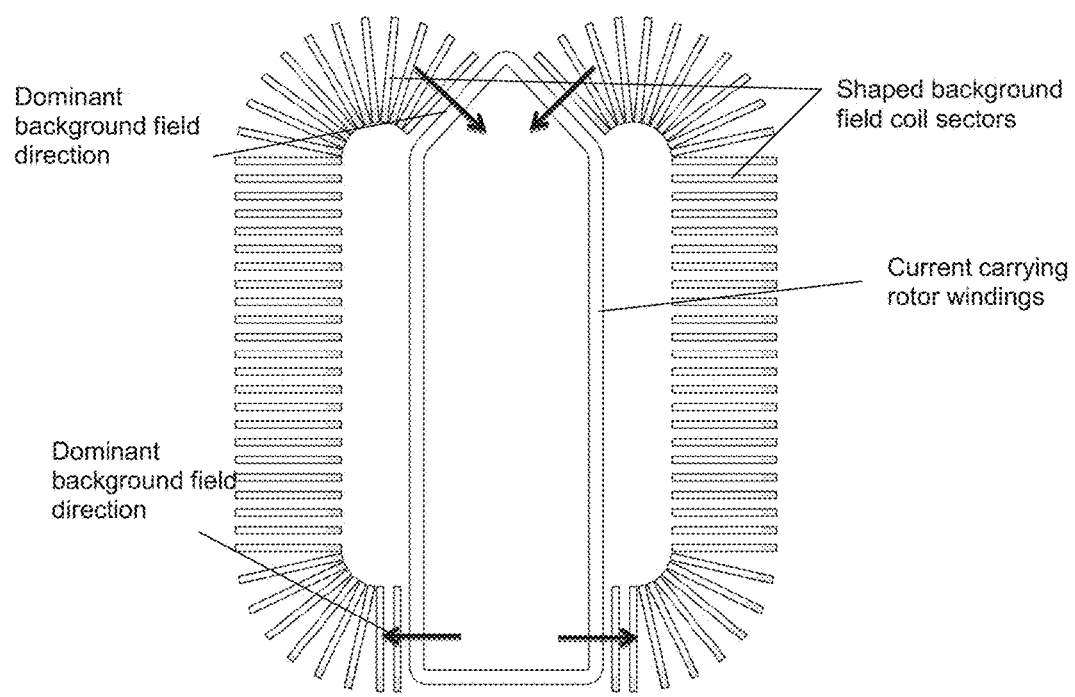

FIG. 306 shows a further variation in the positioning of the background field producing coils of the devices in FIG. 296 and FIG. 301.

Figure 307:
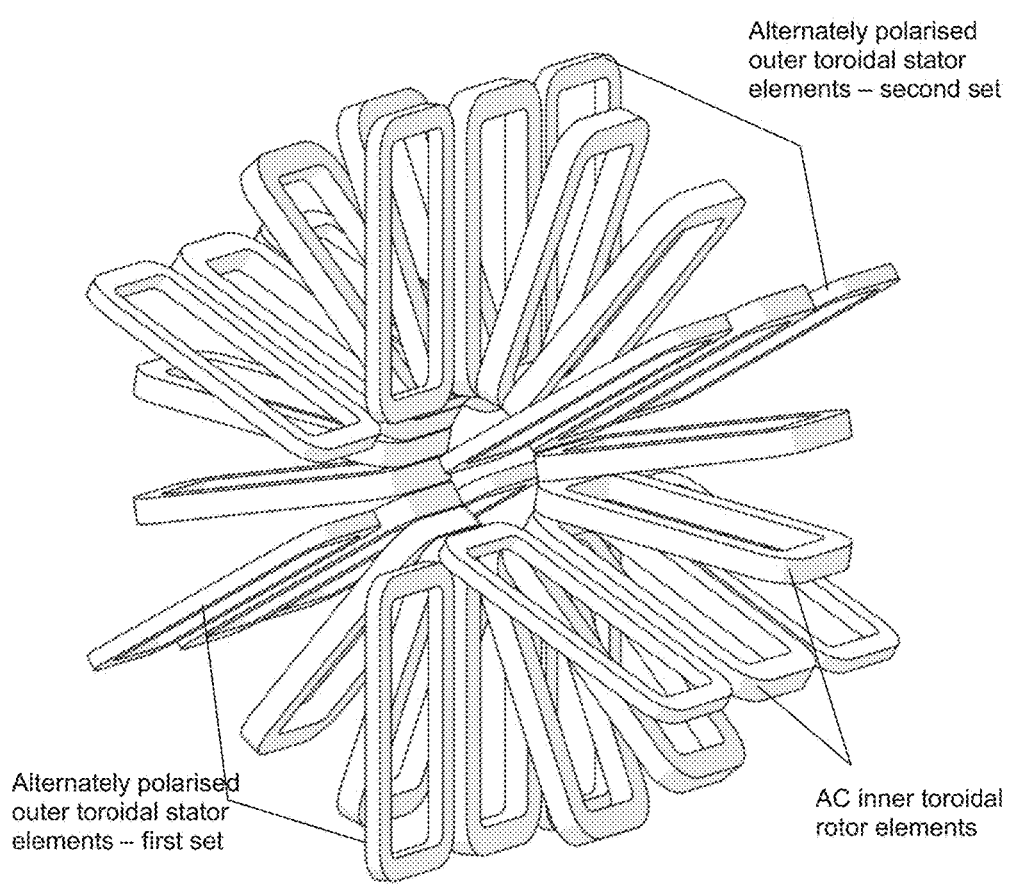

FIG. 307 shows a variation of the 3 toroidal layer device where coil elements of the two outer toroidal layers alternate in polarity and the inner rotor layer operates on AC current.

Figure 308:
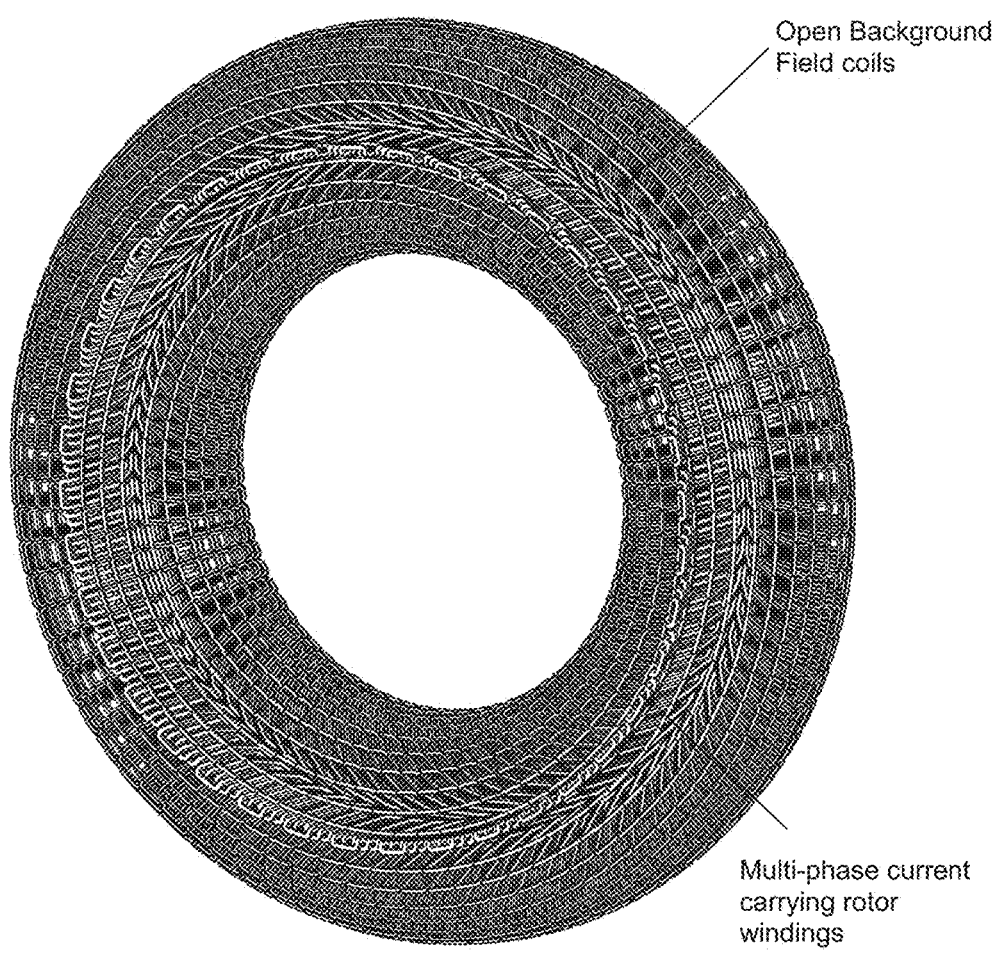

FIG. 308 shows a radial flux embodiment of the C-shape Toroidal device that is an 80 Pole device featuring background field coils constructed from discrete sets of wedge shaped 'racetrack' style windings.

Figure 309:
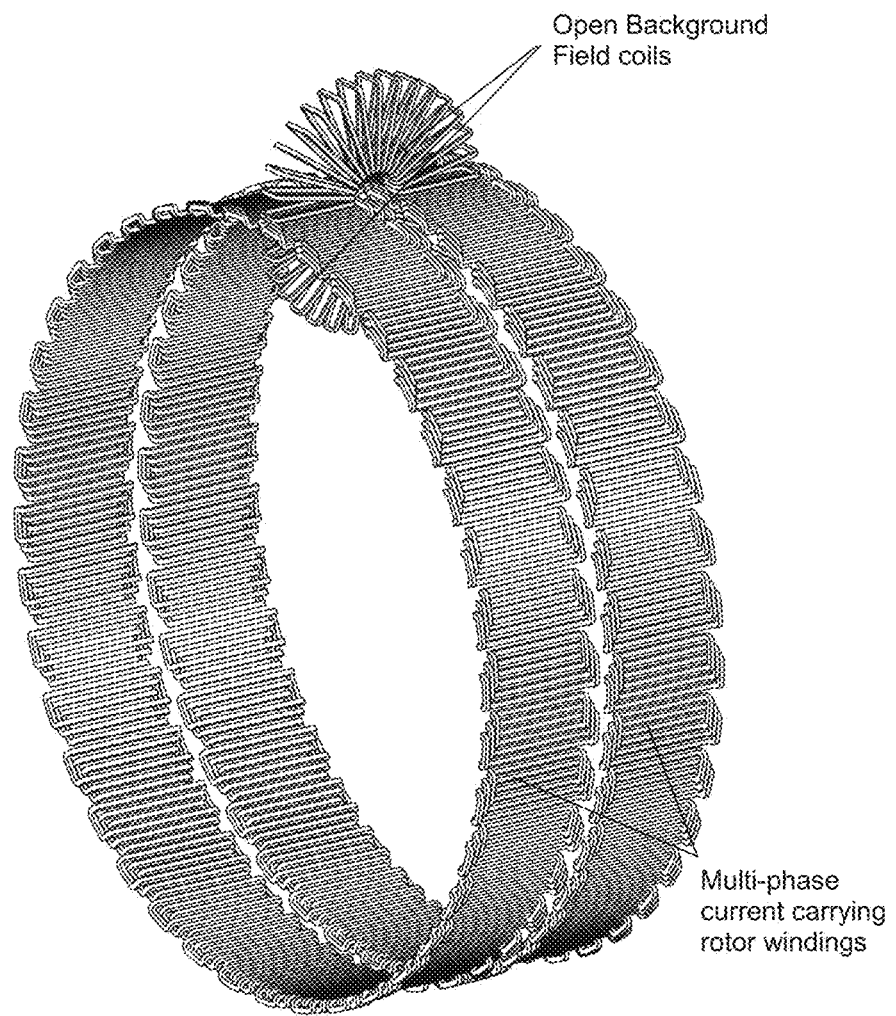

FIG. 309 shows the C-shape toroidal device of FIG. 308 with all but one of the background field producing coils removed in order to show the arrangement of the two sets of bedstead style multi-phase current carrying windings.

Figure 310:
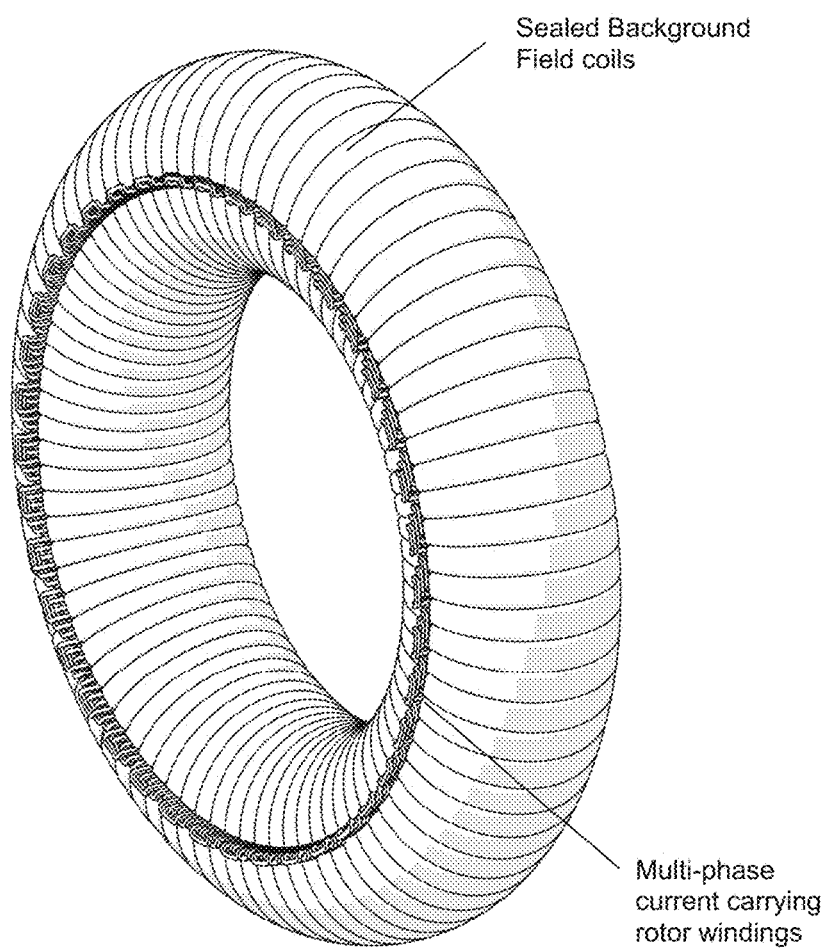

FIG. 310 shows a radial flux C-shaped device similar to that depicted in FIG. 308 but with the background field coil sets shown as continuous wedge shaped windings rather than arrangements of discrete sub-coils.

Figure 311:
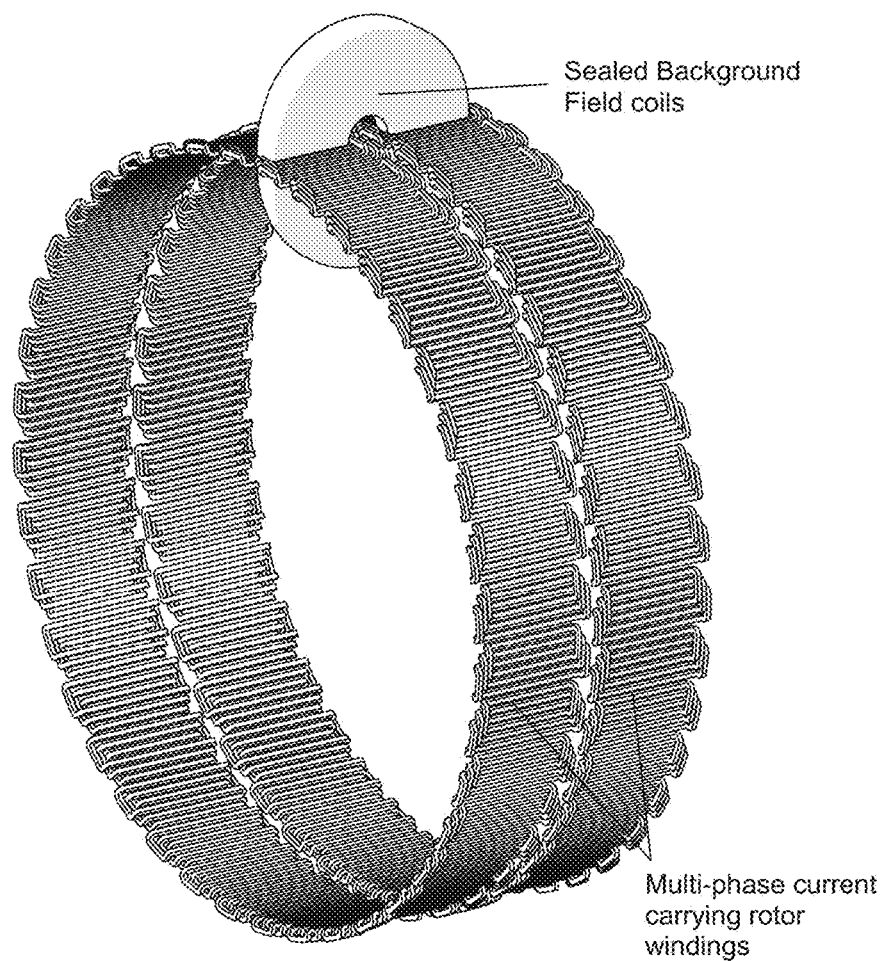

FIG. 311 shows the current carrying windings of the device of FIG. 310 with one sector of the pole pair shown to indicate placement of the windings.

Figure 312:
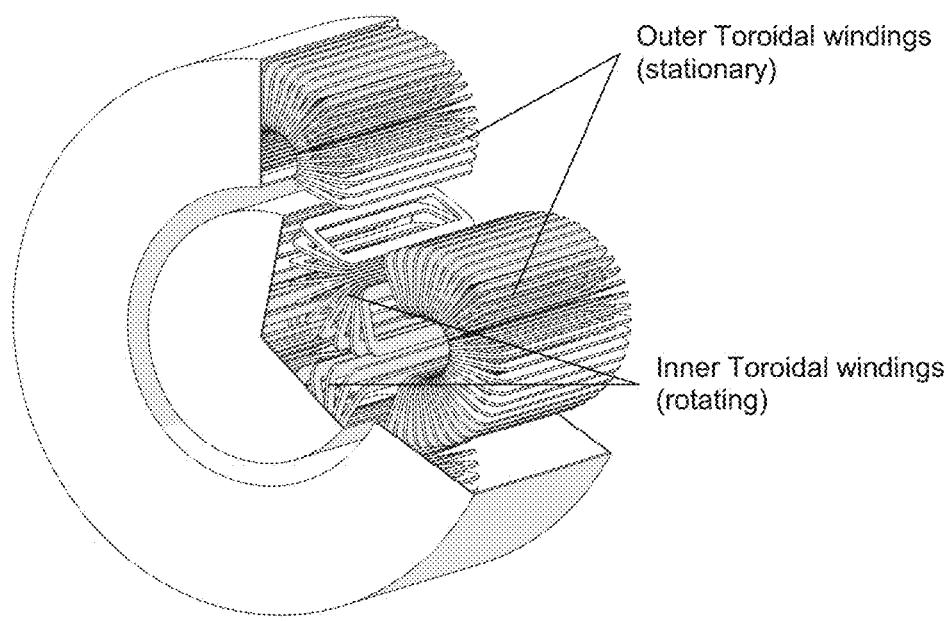

FIG. 312 shows an alternative arrangement of the star toroidal device where the internal toroidal sectors rotate.

Figure 313:
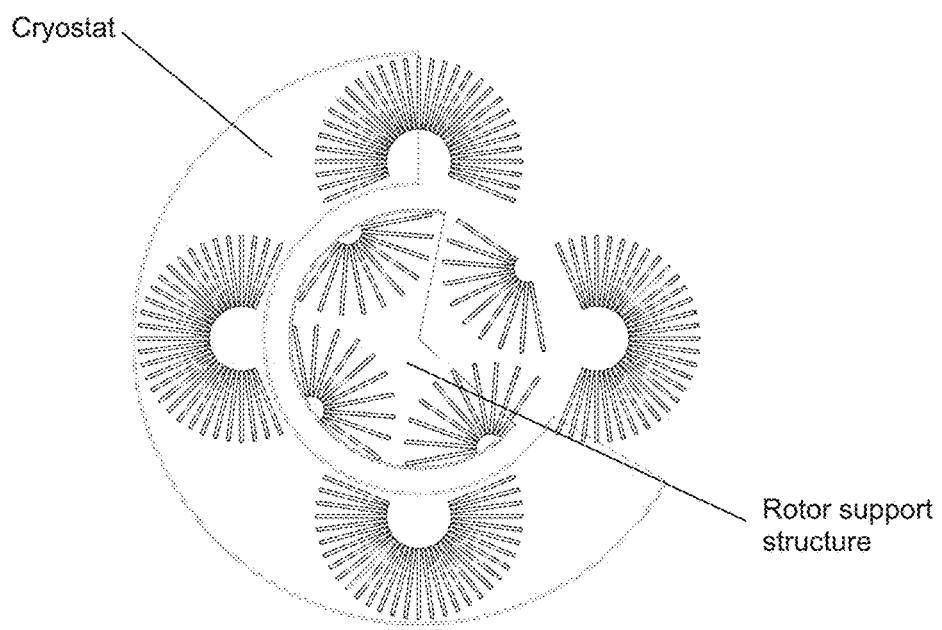

FIG. 313 is an end view of the star toroidal device illustrated in FIG. 312.

Figure 314:
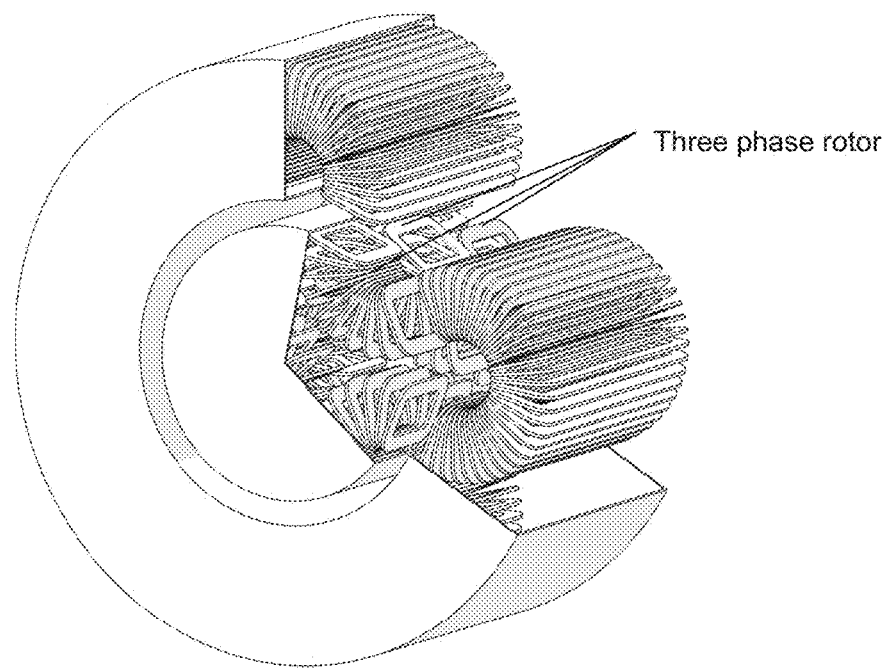

FIG. 314 is an alternative arrangement of a star toroidal device with a three phase inner toroidal rotor.

Figure 315:
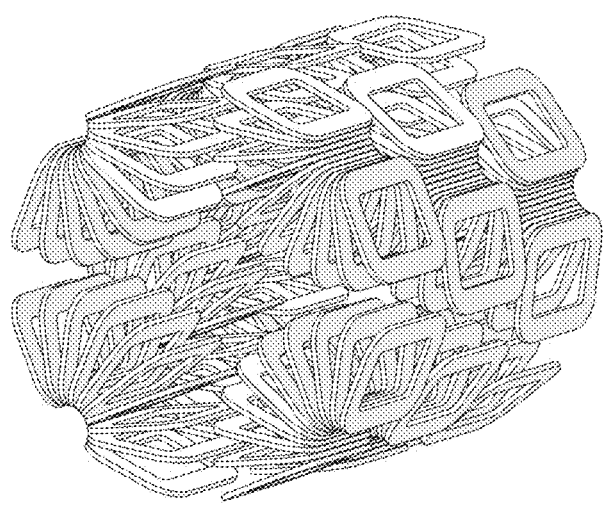

FIG. 315 shows a 3d view of the inner toroidal 3 phase rotor winding of the device illustrated in FIG. 312.

Figure 316:
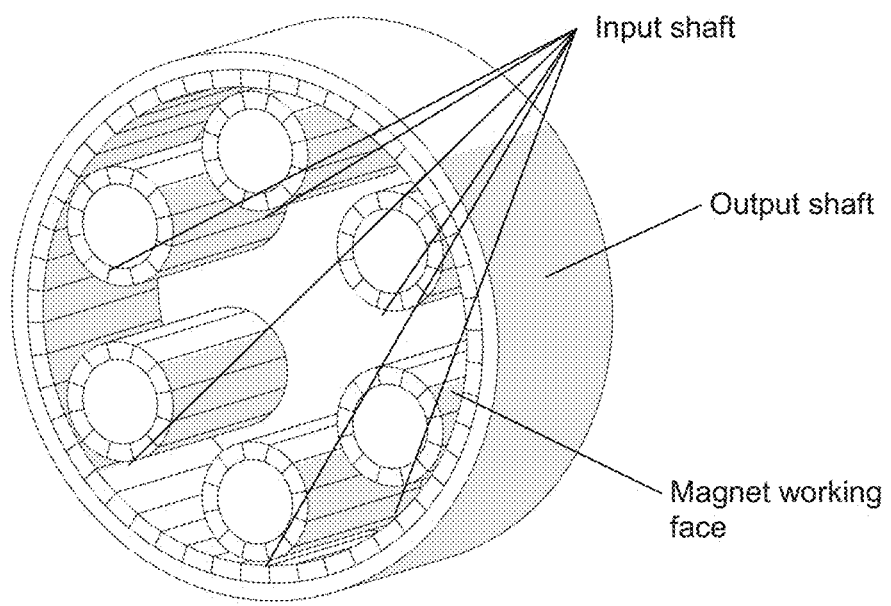

FIG. 316 depicts a magnetic gearbox utilising permanent magnet segments mounted to an input shaft and output shaft with alternate polarity such that mechanical torque is transferred between the input and output without mechanical contact by way of magnetic forces.

Figure 317:
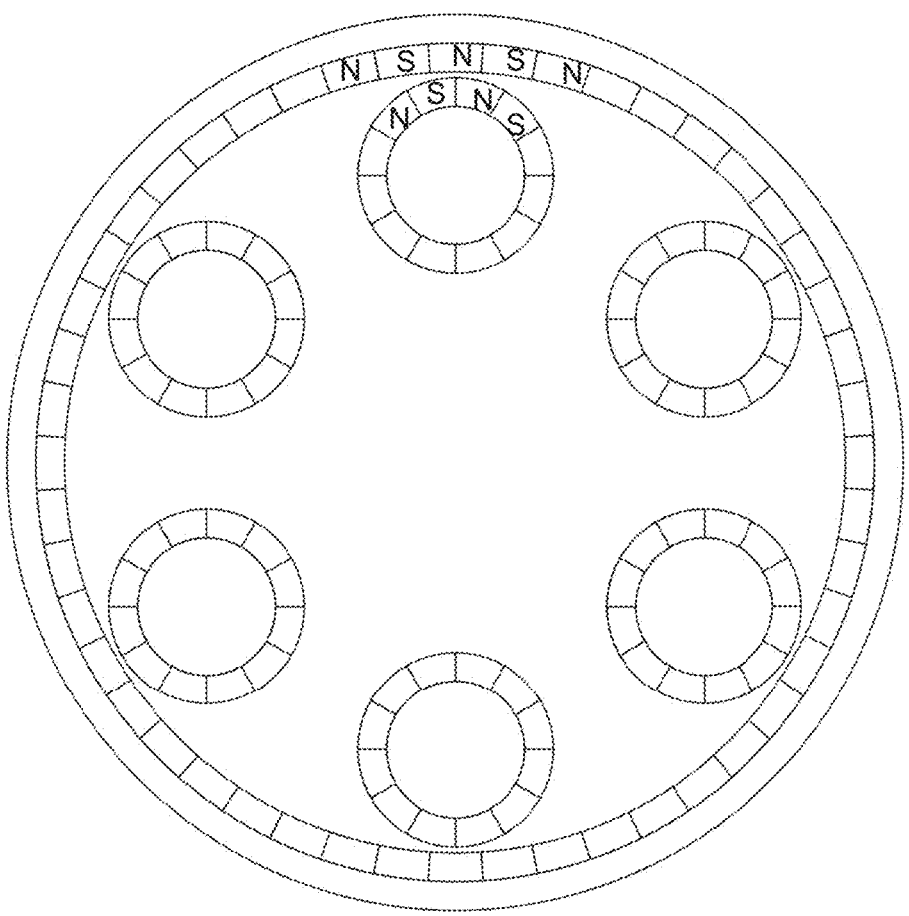

FIG. 317 is an end view of the magnetic gearbox illustrated in FIG. 316 showing magnetic polarity for a segment.

Figure 318:
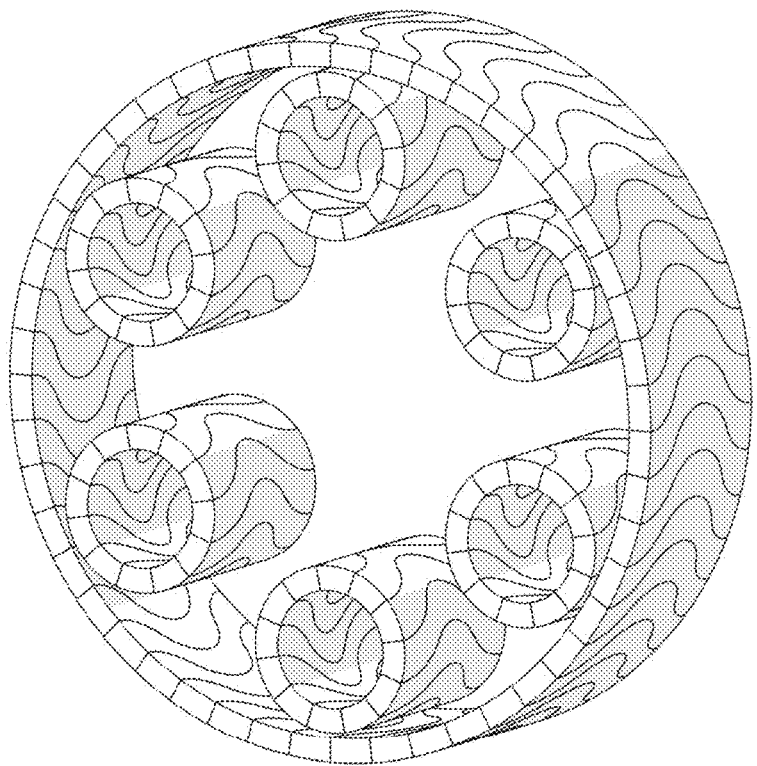

FIG. 318 shows a variation of the device of FIG. 316 there the previously straight wedges of permanent magnetic material are now 'S-shaped' or feature a series of bends along the length of the inner and outer gear elements.

Figure 319:
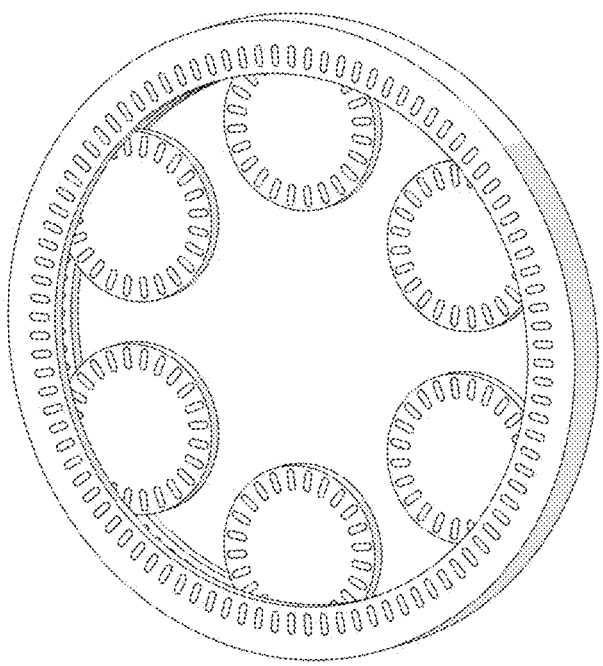

FIG. 319 depicts an axial style embodiment of the magnetic gear system.

Figure 320:
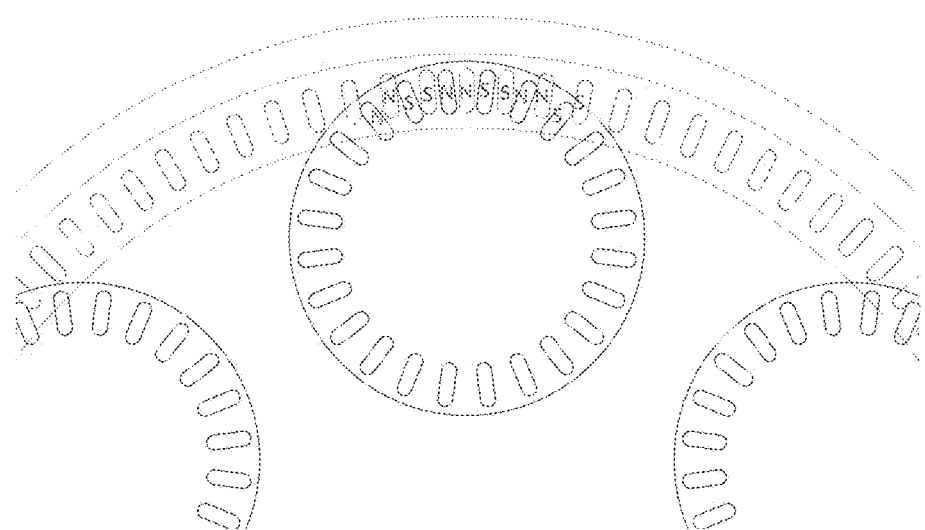

FIG. 320 depicts a detail view of the device of FIG. 319 indicating directions of relative magnetisation.

Figure 321:
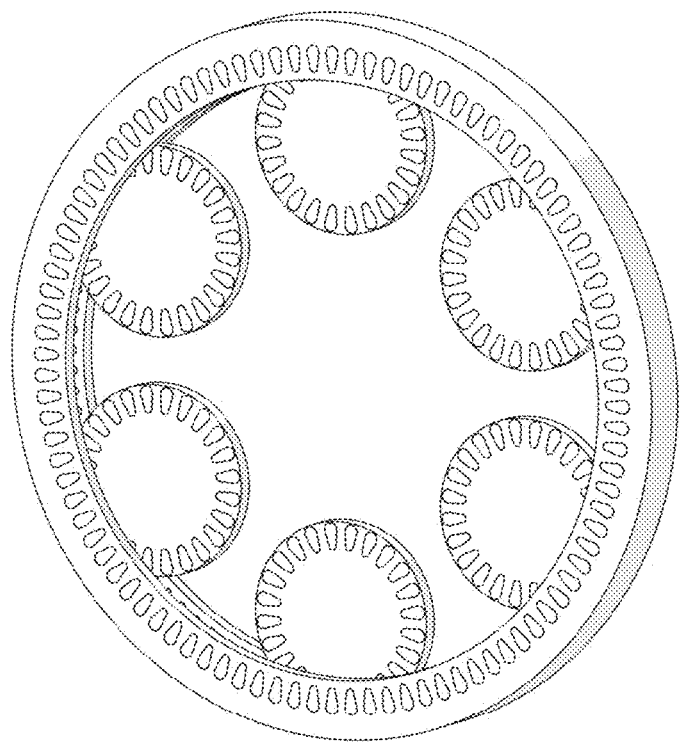

FIG. 321 depicts an axial style embodiment similar to that of FIG. 319 but with wedge shaped permanent magnetic elements.

Figure 322:
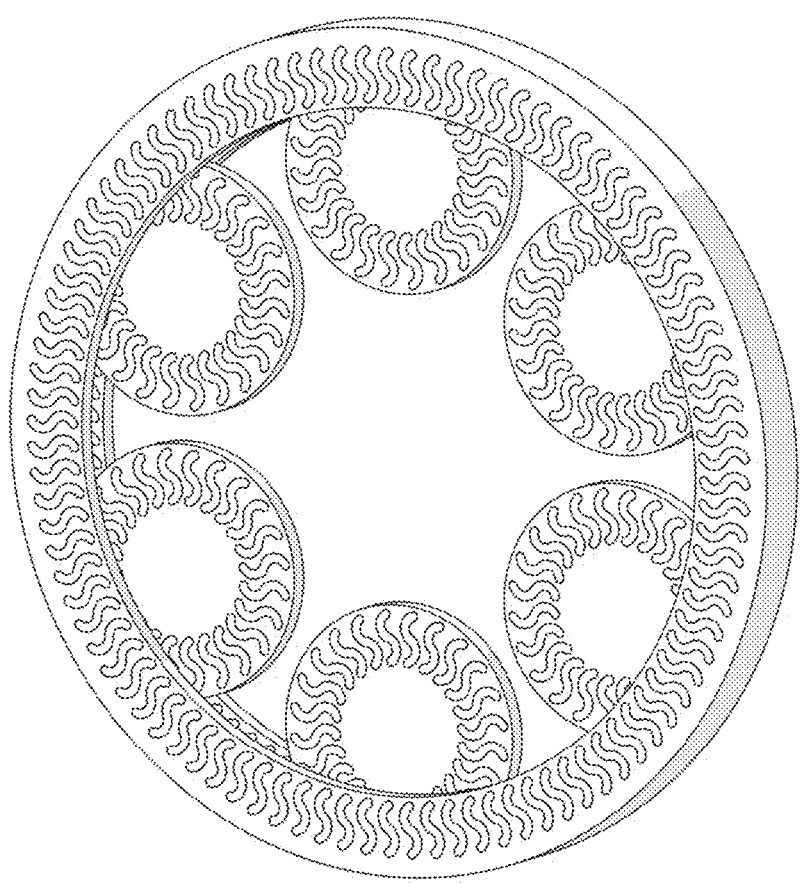

FIG. 322 depicts a further variation of the device shown in FIG. 319 where the permanent magnetic elements are 'S-shaped' or feature a series of bends to reduce the volume of the device.

DESCRIPTION OF EMBODIMENTS

According to particularly preferred embodiments of the present invention, improvements in electromagnetic devices using reciprocating or rotating elements in a magnetic field are provided.

FIGS. 1 to 5 are directed towards illustration of the general principle of a current carrying bar 10 in a driving background magnetic field (strength and direction indicated by arrows) and the production of large forces on the current carrying bar 10.

A conductive bar 10 that is carrying current is placed in a background magnetic field of predominately uniform field strength. The current in the bar 10 produces a force on the bar 10 that will result in motion if the bar 10 is free to move or pivot about a point. This current in the bar 10 produces field around the current carrying path through the bar 10. If the strength of the field surrounding the bar 10 beyond its outermost diameter or edge is greater than the strength of the background field then the bar produces a very large force. This can be used to increase the power and efficiency of electromechanical devices.

Figure 1:
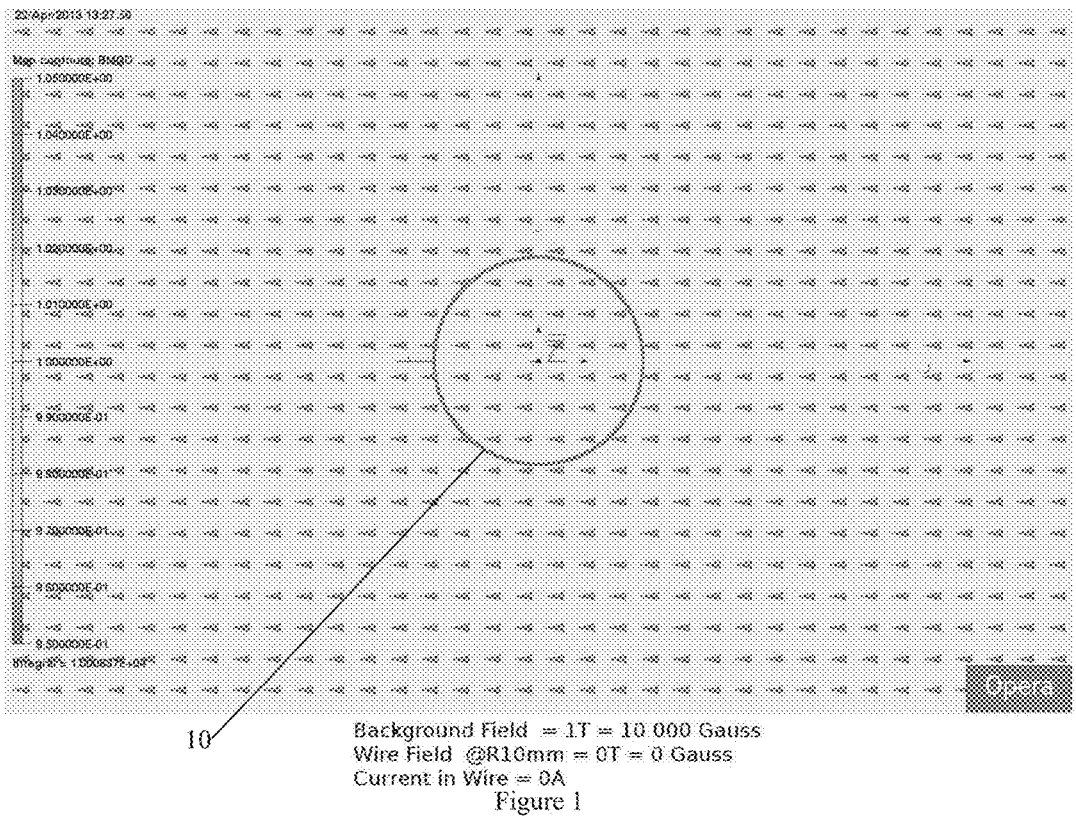
FIG. 1 is a magnetic field plot with an end view of a conductor carrying no current in a uniform background field of one Tesla showing that the background field cuts through the conductor inducing a voltage.

FIG. 1 is a magnetic field plot showing an end view of a conductor bar 10 carrying no current in a uniform background field of 1 T. In this example, the bar 10 is produces a smaller force reaction because there is no field around the bar 10 and the background field cuts through the conductor bar as indicated by the arrows of the field present through the bar 10.

Figure 2:
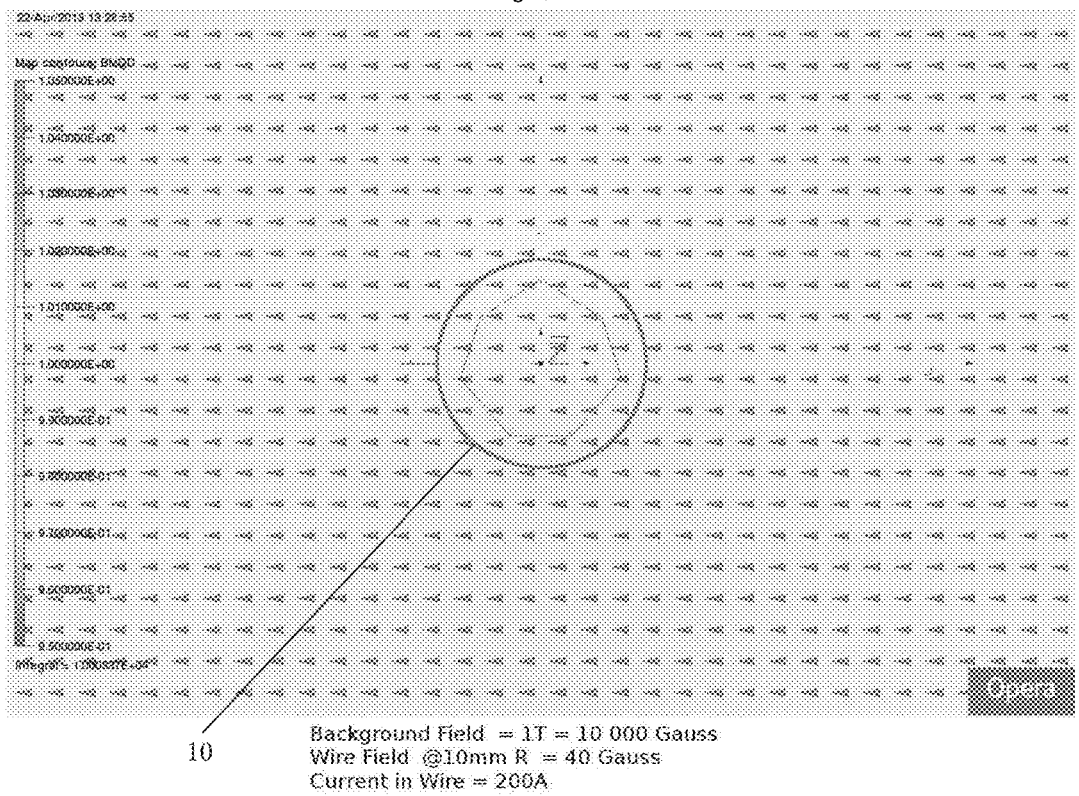
FIG. 2 is a magnetic field plot similar to FIG. 1 with the conductor carrying a 200 amp current in a uniform background field of one Tesla with the conductor experiencing a small force reaction.

FIG. 2 is a magnetic field plot showing an end view of a conductor bar 10 carrying a 200 A current in a uniform background field of 1 T. In this example, the bar 10 produces a smaller force reaction due to the low strength of the field around the bar which is illustrated via the shading in the background field.

Figure 3:
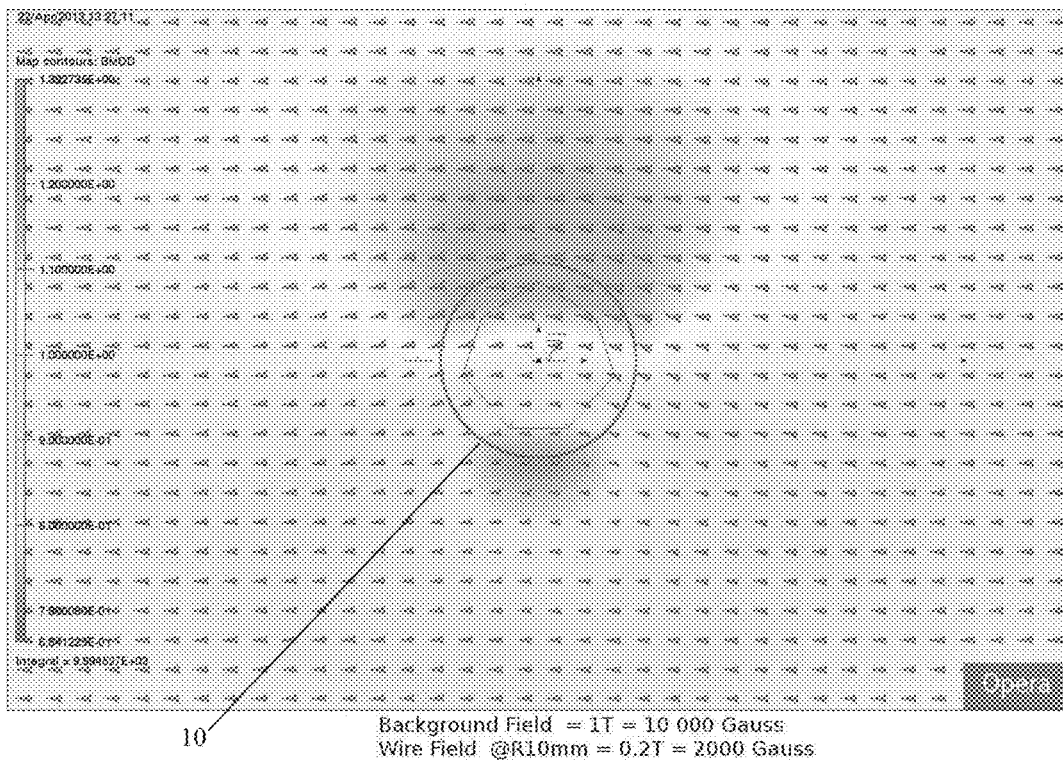
FIG. 3 is a magnetic field plot similar to FIG. 1 with a magnetic field strength around the conductor of approximately 0.2 Tesla in a uniform background field of one Tesla with the conductor experiencing a comparatively small force reaction.

FIG. 3 is a magnetic field plot showing an end view of a current carrying conductor bar with magnetic field strength around the conductor of around 0.2 T in a uniform background field of 1 T. Again, although the magnetic field of the bar 10 is more prominent in this example, the bar 10 produces a smaller force reaction due to the low strength of the field around the bar 10.

Figure 4:
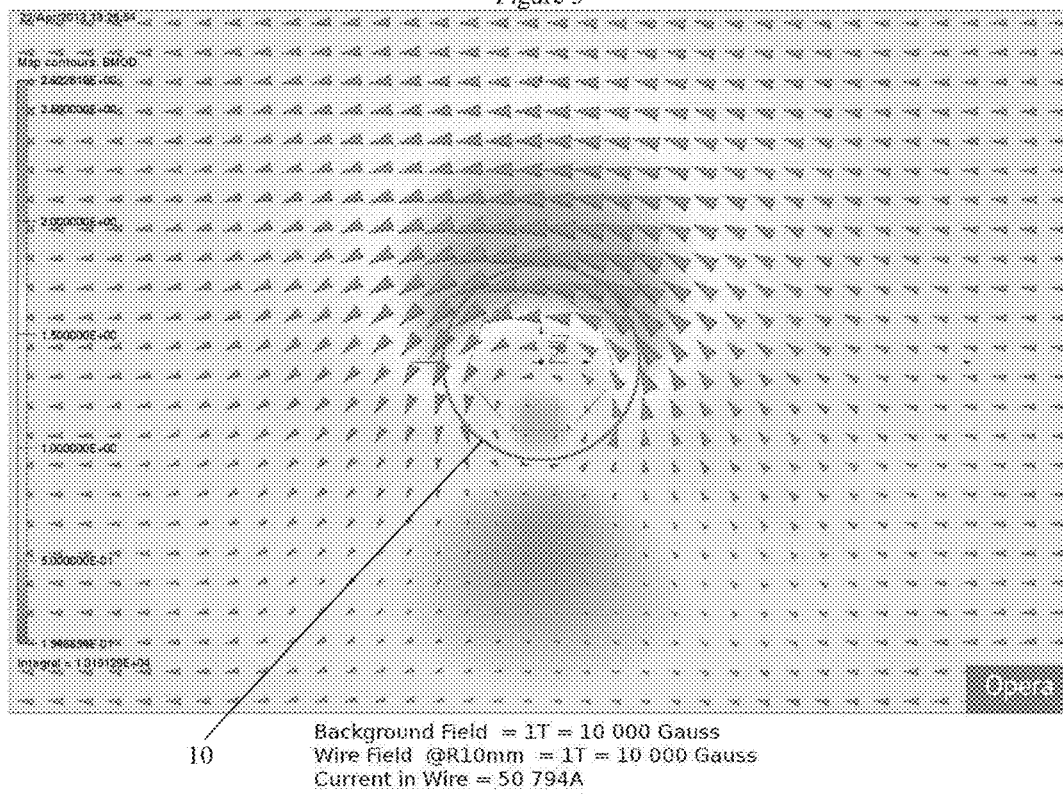
FIG. 4 is a magnetic field plot similar to FIG. 1 with a magnetic field strength around the conductor of approximately 1 Tesla in a uniform background field of one Tesla with the conductor experiencing a large force reaction.

FIG. 4 is a magnetic field plot showing an end view of a current carrying conductor bar 10 with magnetic field strength around the conductor bar 10 of around 1 T in a uniform background field of 1 T. In this example, the bar 10 produces a large force reaction due to the equal strength of the field around the bar 10 as illustrated by the arrows of the background magnetic field being deflected by the bar field around the bar 10 rather than through the bar 10.

Figure 5:
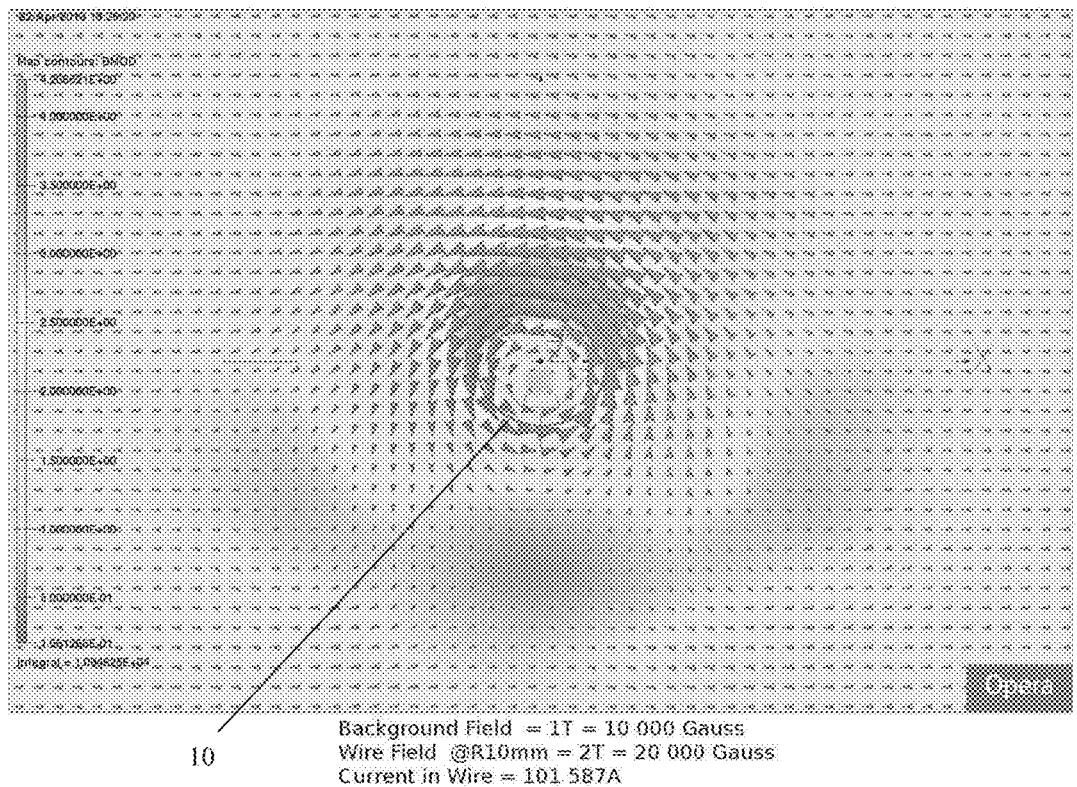
FIG. 5 is a magnetic field plot similar to FIG. 1 with a magnetic field strength around the conductor of approximately 2 Tesla in a uniform background field of one Tesla with the conductor experiencing a very large force reaction.

FIG. 5 is a magnetic field plot showing an end view of a current carrying conductor bar 10 with magnetic field strength around the conductor bar 10 of around 2 T in a uniform background field of 1 T. In this example, the bar 10 produces a very large force reaction due to the high strength of the field around the bar 10.

FIGS. 6 to 13 are directed towards two and three coil reciprocating systems.

Figure 12:
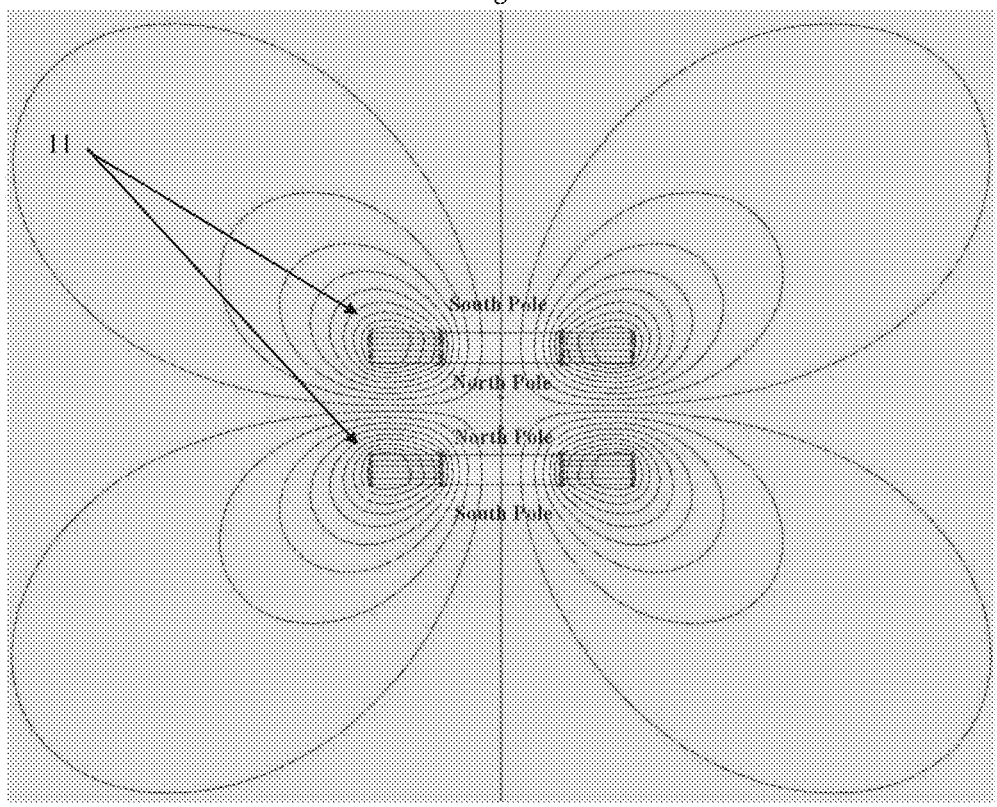
FIG. 12 is a magnetic field profile of a pair of identical pancake coils with the same input power.
Figure 13:
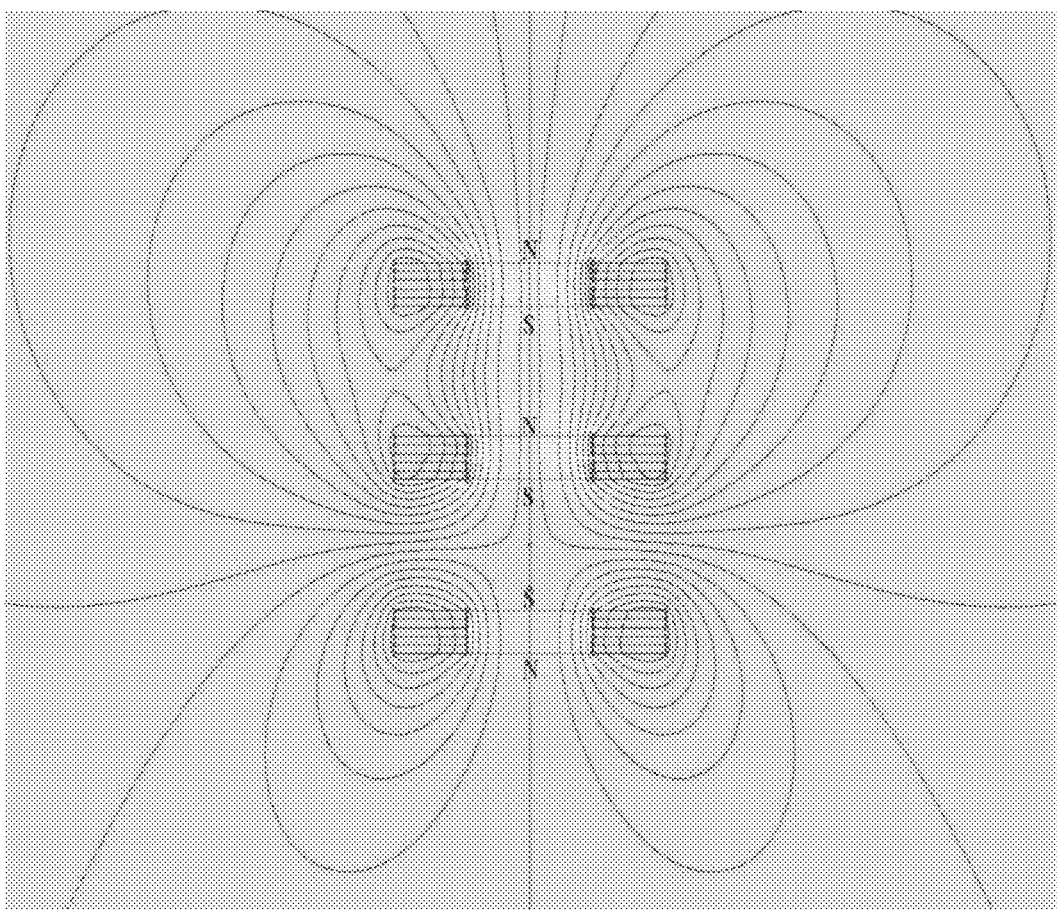
FIG. 13 is a magnetic field profile of a three pancake coil arrangement showing a pair of stationery outer coils and a moving central coil.

These figures illustrate a reciprocating style engine comprised of either two or three superconducting coils 11, either one reciprocating coil reacting against one stationary coil such as is illustrated in FIG. 12 or between two stationary coils as illustrated in FIG. 13. If each of the coils in the assembly possesses equal field strength, then relative motion between the stationary coil sets will produce a large force reaction.

The fundamental components of the motor involve the use of superconducting coils. The coils experimented with to date have made up of a series of pancake wound coils that use 1G HTS BSCCO tape. These coils have two primary properties that made them of use; specifically, they exhibit near-zero electrical resistance when cooled below their critical temperature thus behaving as a near perfect inductor, and the current density (and hence the magnetic field achievable) is far in excess of that achievable using conventional copper coils of similar size.

Another important aspect of this design is the nature of electro-motive force or EMF. Put simply, EMF is the voltage developed in a conductor in response to a changing magnetic field. The property of EMF is most prominently used in electrical generators where a moving field source is used to induce a voltage in an electromagnetic coil. In electromagnetic motors the process is inverted, in that a moving field is used to generate mechanical work. As a result of this motion, an EMF is produced in the electromagnetic coils in opposition to the direction of current flow, a so-called back-EMF.

As in conventional electric motors, the requirement remains for the interaction of a permanent field, either through a permanent magnet or coil with a constant current applied, and a changing field achieved through changes in supplied current direction in a moving coil. This change could be achieved either through either a physically or electronically commutated direct current supply or an alternating current supply.

Primary experimentation has involved a coil configuration consisting of three HTS coils of like form, with two coils acting as the stator elements and the third being subjected to alternating polarity of current. The coils represent an evolution in terms of design initially consisting of a single layer progressing to the current final form of 4 single layers joined in series to form a pancake coil. This progression resulted partially through experimentation and in contrast with conventional copper coils where the optimum cross section (in terms of field strength vs resistance due to wire length) is square. There was some question as to whether this guideline would apply to HTS coils where resistance is a non-issue. The trend away from thinner coils to coils with a wider cross section was primarily to obtain maximum field strength from a given length of wire while staying within the parameters of current coil fabrication technology.

Figure 6:
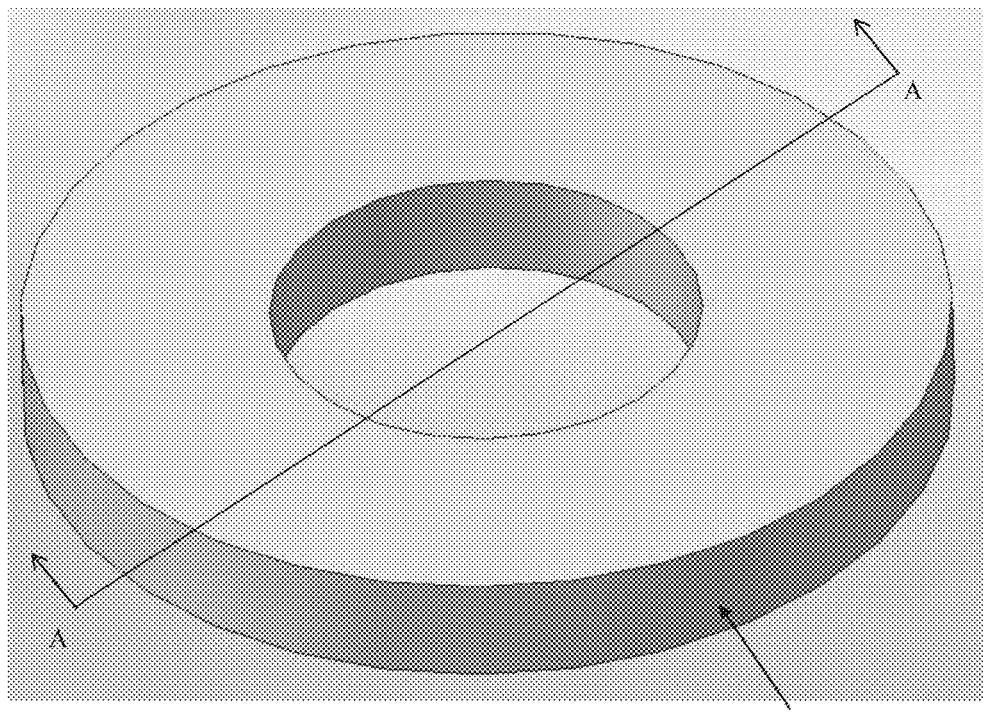
FIG. 6 is an isometric three-dimensional image of a preferred high temperature superconducting pancake coil according to a preferred embodiment of the present invention.
Figure 7:
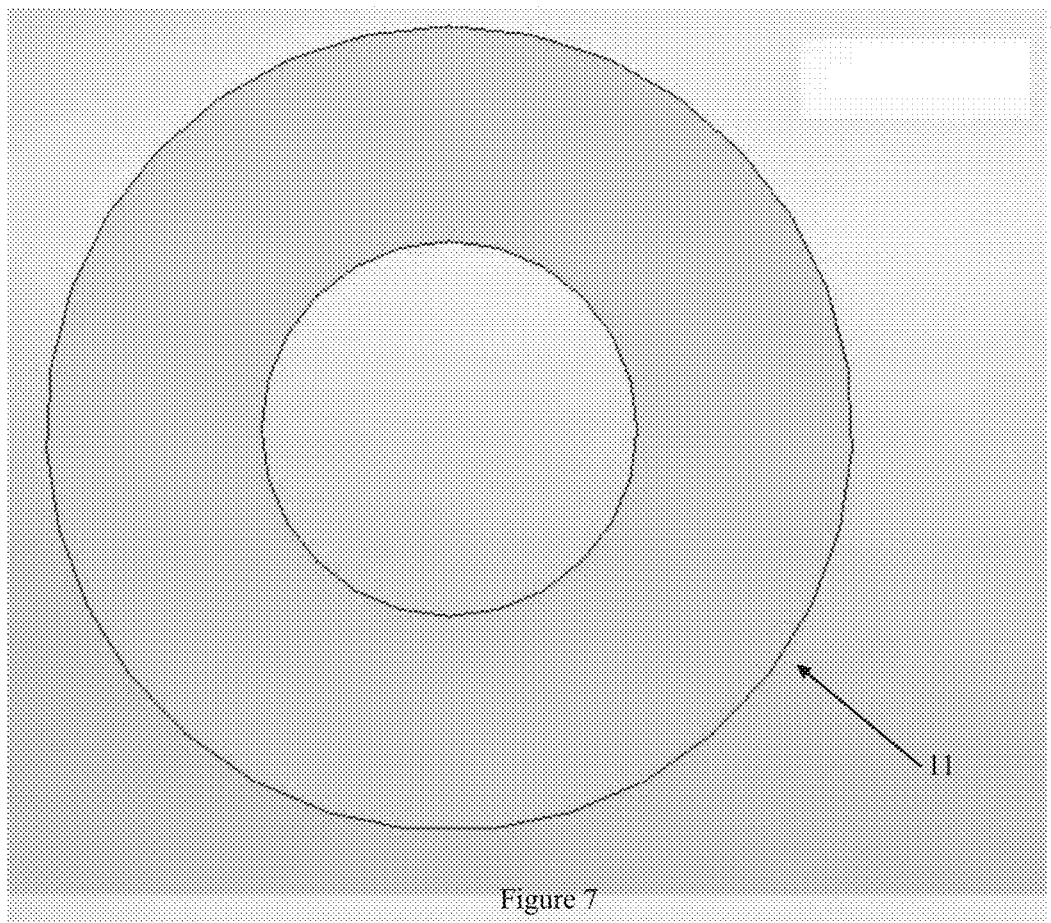
FIG. 7 is a top view of the pancake coil illustrated in FIG. 6.
Figure 8:
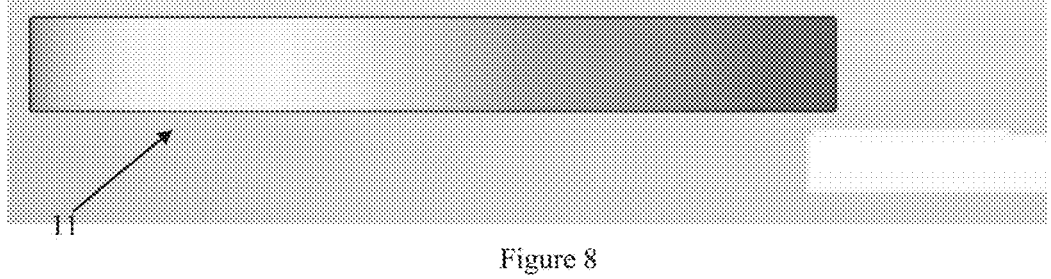
FIG. 8 is a side view of the pancake coil illustrated in FIG. 6.
Figure 9:
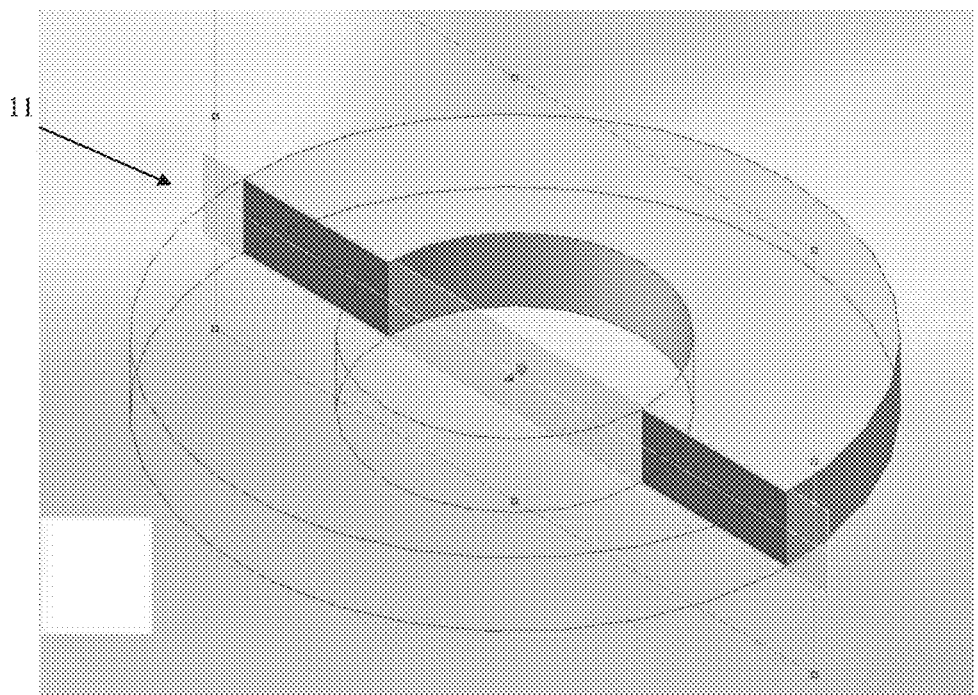
FIG. 9 is a cross sectional view of the pancake coil illustrated in FIG. 6 along line A-A illustrating the viewing plane for magnetic field lines.

A preferred pancake coil is illustrated in FIGS. 6 to 8 and in cross-section in FIG. 9.

Figure 10:
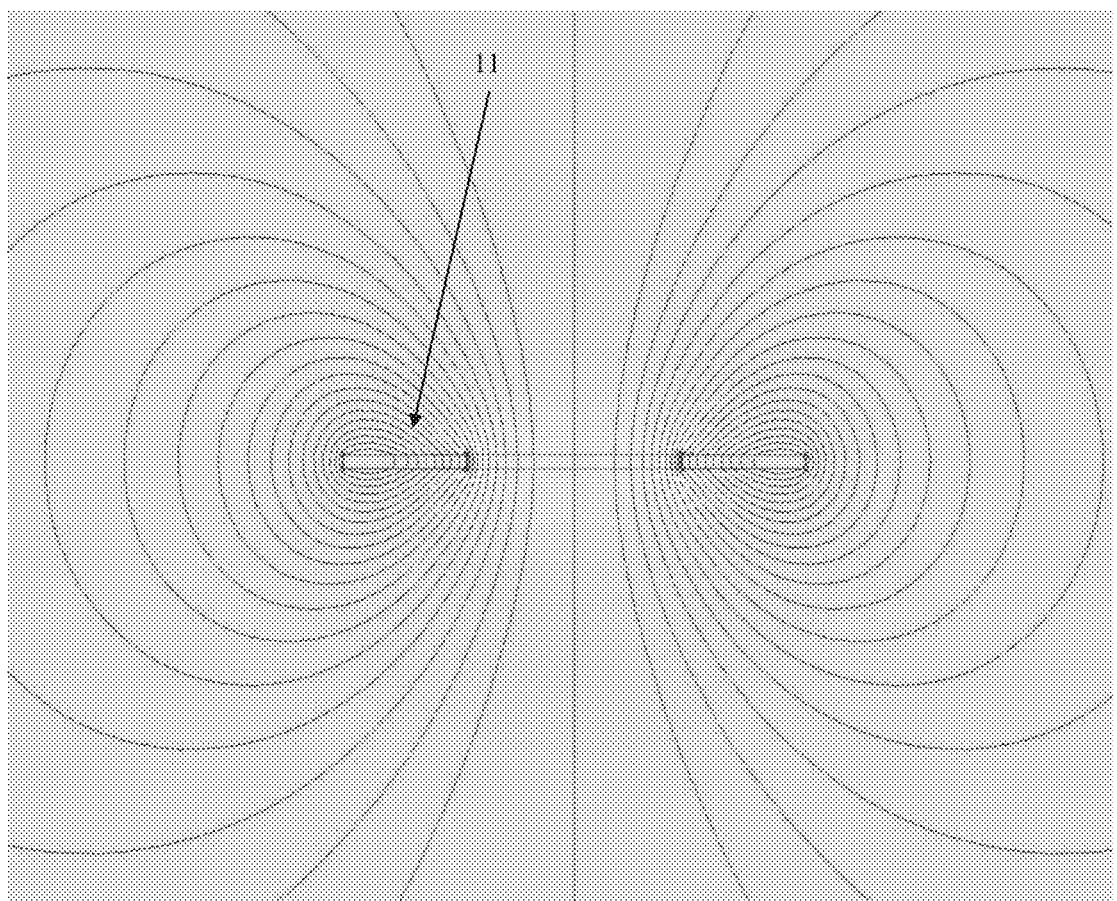
FIG. 10 is an axisymmetric magnetic field profile of a single pancake coil, similar to that illustrated in FIG. 6.
Figure 11:
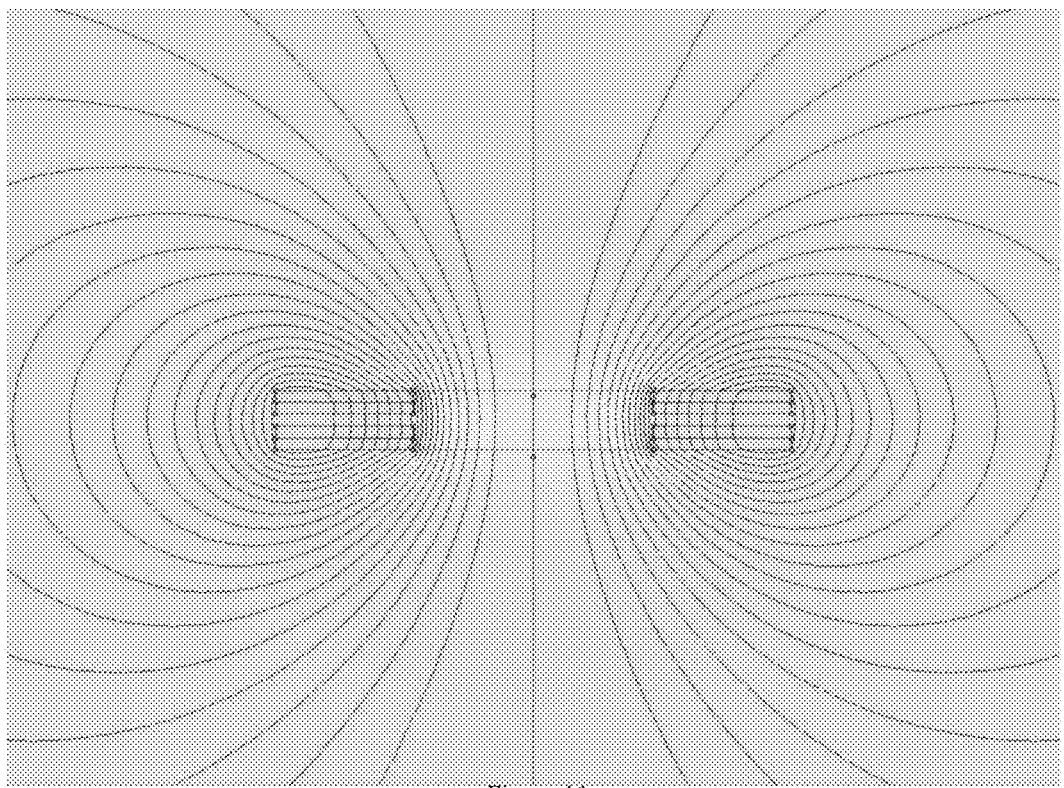
FIG. 11 is a magnetic field profile of a pancake coil assembly incorporating four pancake coil layers with additional gaps to improve coil cooling according to a preferred embodiment of the present invention.

FIG. 10 shows the axisymmetrical magnetic field profile of a single pancake coil. Increasing the depth of the coil results in greater projection of the field when moving perpendicular to the surface of the coil. This is important as greater field projection leads to less variation in the force applied to the moving coil which in turn results in smoother power delivery along the stroke during the test apparatus. Therefore, a pancake coil such as that illustrated in FIG. 11 is preferred. That configuration includes 4 HTS pancake coil layers with additional gaps to improve coil cooling.

The three pancake coils used each had an outer diameter of 172-180 mm and an inner diameter of 80 mm. Each pancake consists of four coils to form the single pancake assembly. Each coil layer is approximately 4 mm wide with approximately a 4 mm gap between the inner two coils to facilitate better cooling, and providing better field performance. This all results in a total depth of 20 mm for each pancake. Each pancake has around 169 turns of HTS tape and the whole assembly was wound and fabricated by HTS-110 in New Zealand. The critical current (Ic), above which the coils would revert to a normal-conducting state is around 44 A @ 77K. While these dimensions are typical of the coils employed for the purposes of experimentation, it should be noted that the key consideration is that the dimensions and fields produced by the coils are equal for all the coil sets employed in the device. Provided this constraint is observed, equivalent results would be expected using any superconducting wire or coil geometry.

FIG. 12 shows two identical coils given the same input power. As illustrated, the field lines match and as a result, bend each other away without interruption of the adjacent field lines. They are, in effect, equal and opposite. The illustrated configuration shows the repelling case of the two coil arrangement.

With respect to the configuration illustrated in FIG. 13, the basic configuration involves three virtually identical coils acting along a single line of movement. Two of the coils form stators at the extremities of the stroke, with the third oscillating in a reciprocal fashion between the two stators. The extent of the middle coil's travel is determined by a crankshaft. The output of which is fed into a commutator, that controls the reversal of current every 180 degrees to the middle coil, and a combined torque transducer and brake assembly in order to measure the power output.

FIG. 13 also shows the magnetic field interaction of the 3 coil arrangement with the outer coils being the stationary coils and the inner coil is the moving coil.

A further variation of the previously described devices involves the production of rotating coils or wires that produce fields equal or greater than the background field in which they operate. FIGS. 14 to 29 are directed towards the use of equal/greater fields in a rotating configuration. In essence, the device consists of a set of coils that produce a background drive field. Within this region where the background drive field exists, another coil is placed and allowed to rotate about an axis perpendicular to the dominant direction of the background field.

Figure 14:
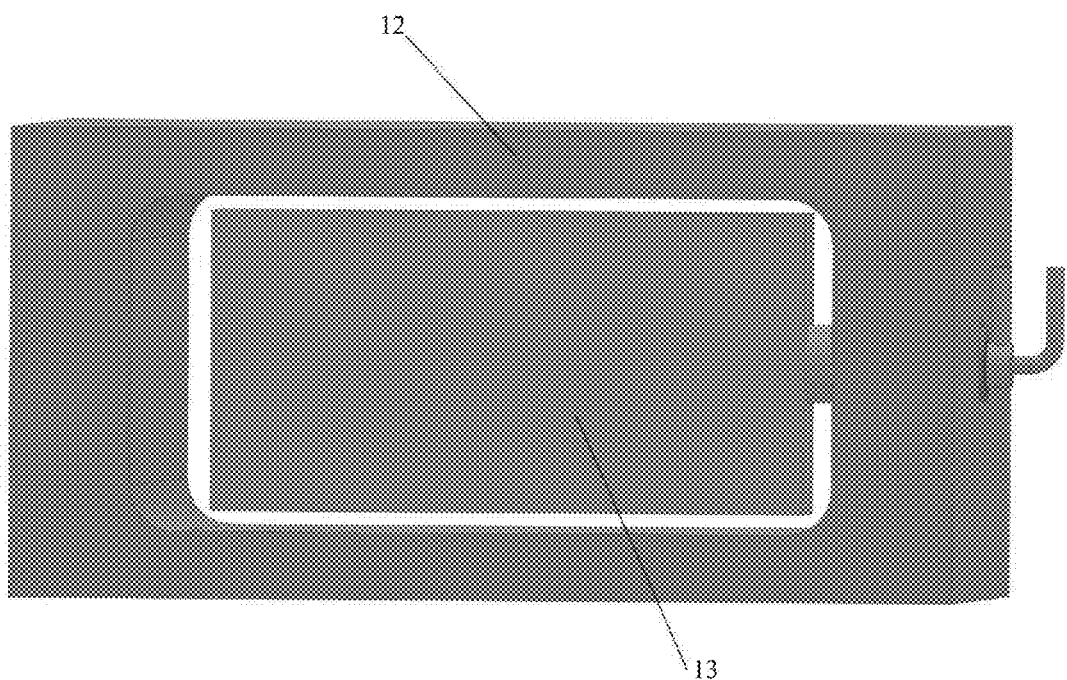
FIG. 14 is an isometric view of a cryostat assembly according to a preferred embodiment of the present invention with a rotating central cryostat located within a stationary cryostat, each containing at least one coil.

FIG. 14 shows the major components of a preferred embodiment of a rotating configuration of device according to the present invention including an outer stationary cryostat 12 containing the magnetic field generator or background field coils and a rotating cryostat 13 which contains the conductive element or rotating coil 14.

Figure 15:
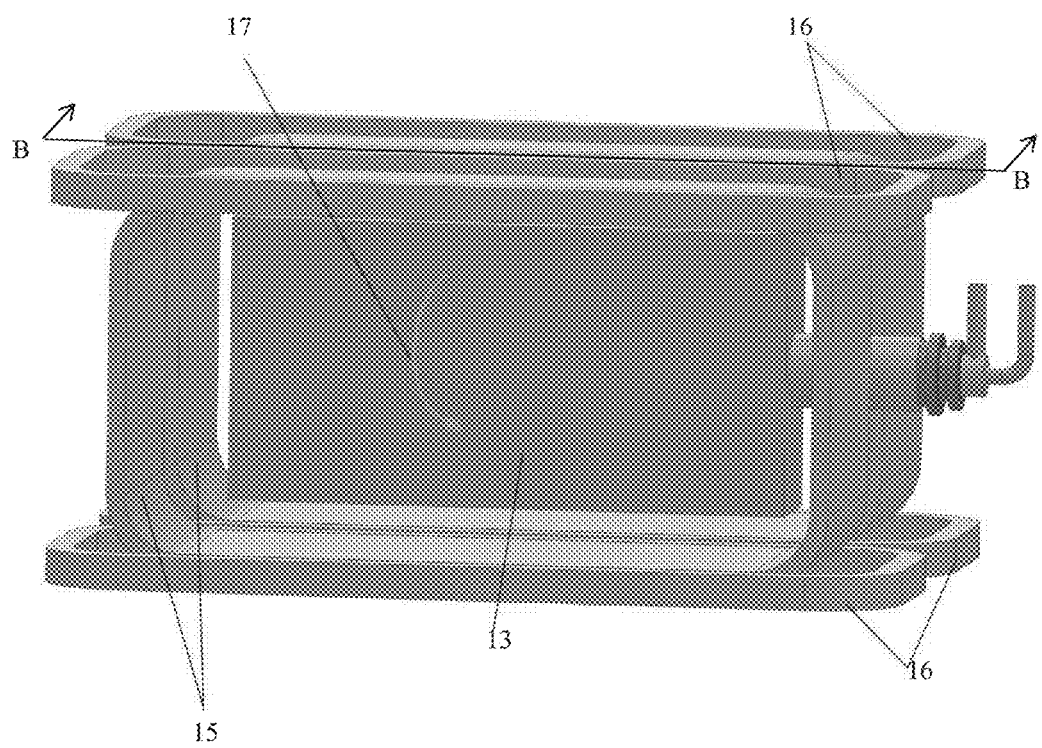
FIG. 15 is an isometric view of the assembly illustrated in FIG. 14 with the stationary cryostat removed to illustrate the coil configuration.

FIG. 15 shows the arrangement of the primary background field coils 15 and secondary field uniformity coils 16 that create the background field in which the rotating coil and cryostat assembly spin. The direction arrow 17 indicates the direction of rotation of the rotating cryostat 13 relative to the stationary field coils. The fixed cryostat for the primary 15 and secondary coils is not shown in the remaining Figures for the sake of clarity.

As with the previous examples, for a single wire or linear coil arrangement, the magnetic field strength around the rotation coil 14 should be larger than the background magnetic field in order to produce a larger force/torque from the coils.

In order to produce the high magnetic field strength around the perimeter of the rotating coil 14, the coil 14 is constructed from a material capable of very high current density—such as superconducting wire or bulks. The use of superconducting material for the rotating coil 14 necessitates a rotating cryostat 13 in order to ensure the coil is kept at the correct temperature to maintain its superconducting state.

The primary 15 and secondary 16 background field coils also require a stationary cryostat 12 if constructed using superconducting wire.

Components of the rotating cryostat 13, coil 14 and current delivery system (which is illustrated in detail in FIG. 18) are designed and constructed in a manner that minimises eddy current formation and loss. Strategies to combat eddy current loss include:

Use on non-conducting materials where possible (i.e. support structures and cryostat).

Lamination of conducting elements (buss bars, cooling bulks etc.) so as to minimise eddy current path formation.

Use of small wire cross-sections in the rotating coil.

Figure 16:
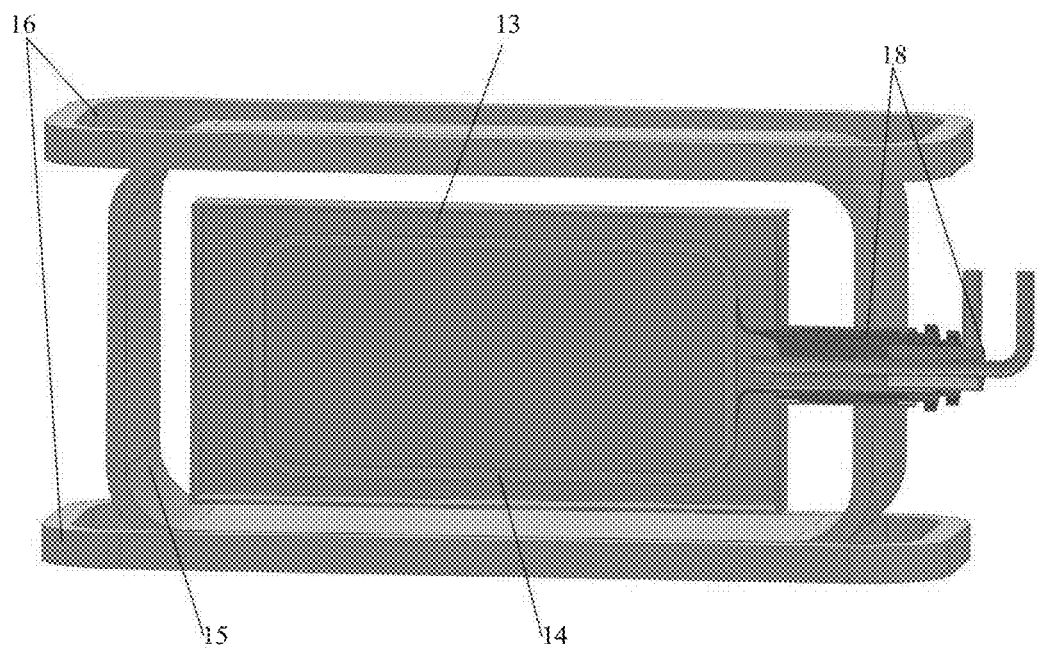
FIG. 16 is a sectional view of the assembly illustrated in FIG. 15 along line B-B.

FIG. 16 is a sectional view through the middle of the full assembly of the preferred rotating embodiment with the rotating coil 14 shown contained within the rotating cryostat 13 assembly. Also illustrated are the rotating cryogen and current systems 18.

In order for the rotating coil 14 of this illustrated embodiment to maintain continuous rotation when driven, the direction of current flow in the rotating coil 14 is reversed every 180 degrees. This reversal of current is timed to coincide when the rotating coil 14 is magnetically aligned with the fields produced by the primary drive coils 15 (the orientation of the rotating coil 14 that is shown above in FIG. 15).

In order to ensure that the strength of the magnetic field around the rotating conductive coil 14 is higher than that of the strength of the background drive magnetic field produced by the primary and secondary coils, the current waveform in the rotating coil should be as close to a square wave as possible. By rapidly charging the rotating coil 14 and maintaining the current in the rotating coil during rotation, the coil field strength won't be weaker than the background field at any point during the rotation except for the preferred instantaneous reversal period.

Figure 17:
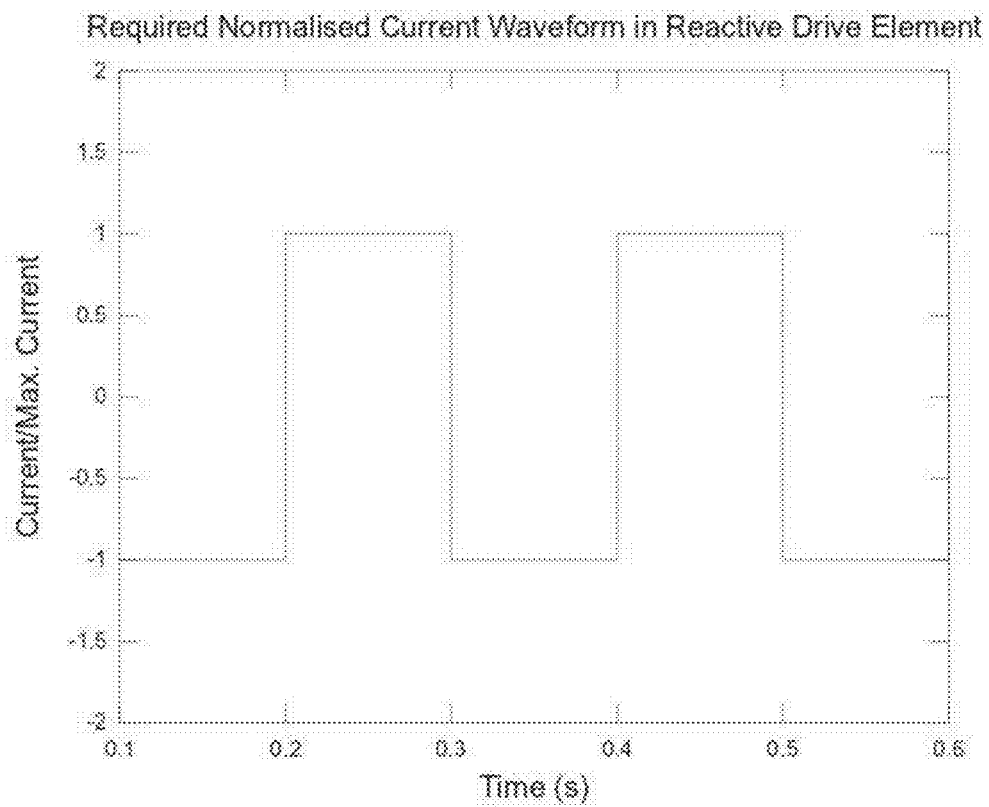
FIG. 17 shows a preferred current waveform used with the assembly illustrated in FIG. 14 in order to ensure that the field strength around the rotating wire is equal to or greater than the background field for as much of the driving period as possible.

FIG. 17 is a schematic illustration of the preferred current waveform in the rotating coil 14 (square wave) in order to ensure that the field strength around the rotating coil 14 is equal or greater than the background field for as much of the driving period as possible.

Another important consideration is that the rotating element is designed to have circuit properties conducive to rapid increases in current and rapid reversal of current (low inductance) so that the field levels can be established and reversed quickly. Additionally, the power supply to the device (when driven as a motor) will need to be of sufficiently high voltage, relative to the inductance of the rotating coil 14, in order to effect this rapid establishment and reversal of current. The waveform above is a fully reversing DC signal (or square wave AC current signal). A non-reversing square wave DC current wave form could be used provided that the drive coil is an open circuit during the half cycle dwell time.

If the background field is pulsating or changing for any reason, the peak background field strength should remain lower than the strength of the field around the rotating coil 14 in order to produce maximum power from the coils.

Figure 18:
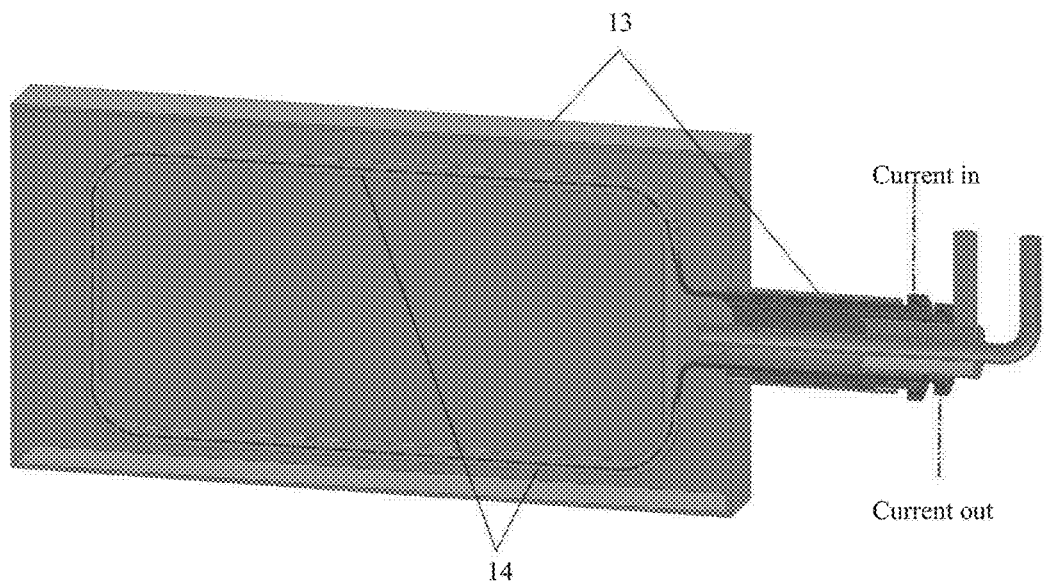
FIG. 18 is a sectional view of the rotating cryostat from the assembly illustrated in FIG. 14 only showing the current path within the coil in the current delivery system.

FIG. 18 is a sectional view of the rotating coil 14 and cryostat assembly 13 showing the current path within the rotating coil 14 and the preferred current delivery system. The direction of current is to be reversed every 180 degrees to maintain rotation.

In the illustrated embodiment, the current to the rotating coil 14 is delivered from stationary current leads from the square wave power supply. This current delivery is achieved via a set of sliding current contacts provided on a current input sleeve 19 and a concentric current output sleeve 20 which are connected to the rotating coil 14. The current input sleeve 19 and current output sleeve 20 are insulated from each other and from the cryostat itself using insulation sleeves 21. The sliding current contacts in the preferred embodiment are each an annular liquid metal brush. Therefore, a current input brush 22 and a current output brush 23 are illustrated in FIG. 19.

Figure 19:
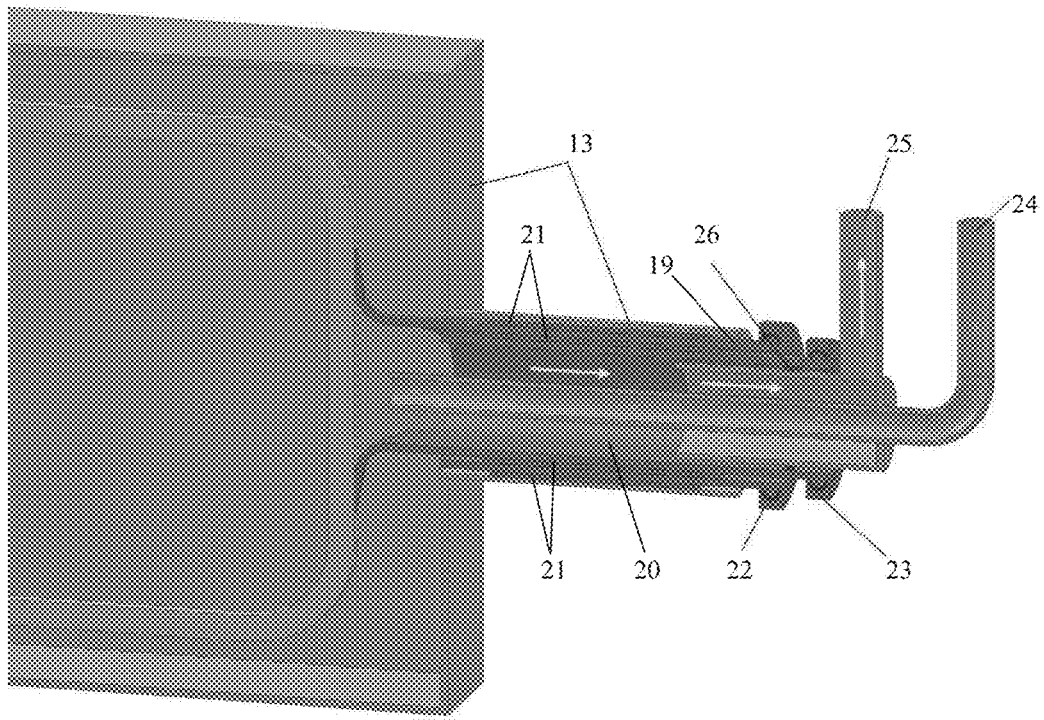
FIG. 19 is a detailed sectional view of the assembly illustrated in FIG. 18 showing the delivery path and return path of the cooling fluid used to cool the rotating superconducting coil.

FIG. 19 also illustrates a detailed half sectional view of the rotating cryostat 13 assembly showing the stationary delivery path of the liquid cryogen used for cooling the rotating superconducting coil 14 as well as the return path of the cryogen as an expanded gas.

Cooling in the cryostat is achieved via the delivery of a liquid cryogen, such as helium via a stationary delivery tube 24. The liquid cryogen is delivered to the outer parts of the coil assembly via centrifugal force created by the rotating of the cryostat 13. A secondary stationary outer pipe 25 is used to collect the heated cryogenic gas which is used to impart additional cooling on the current input sleeve 19 and a current output sleeve 20 as the cryogenic gas exits the rotating cryostat 13 and is returned to be re-cooled as part of a closed loop cryogenic system. This system can be configured so as to not require additional pumping of the cryogenic fluid. There is one point of rotating cryogenic seal 26 required between the stationary and rotating boundary.

Figure 20:
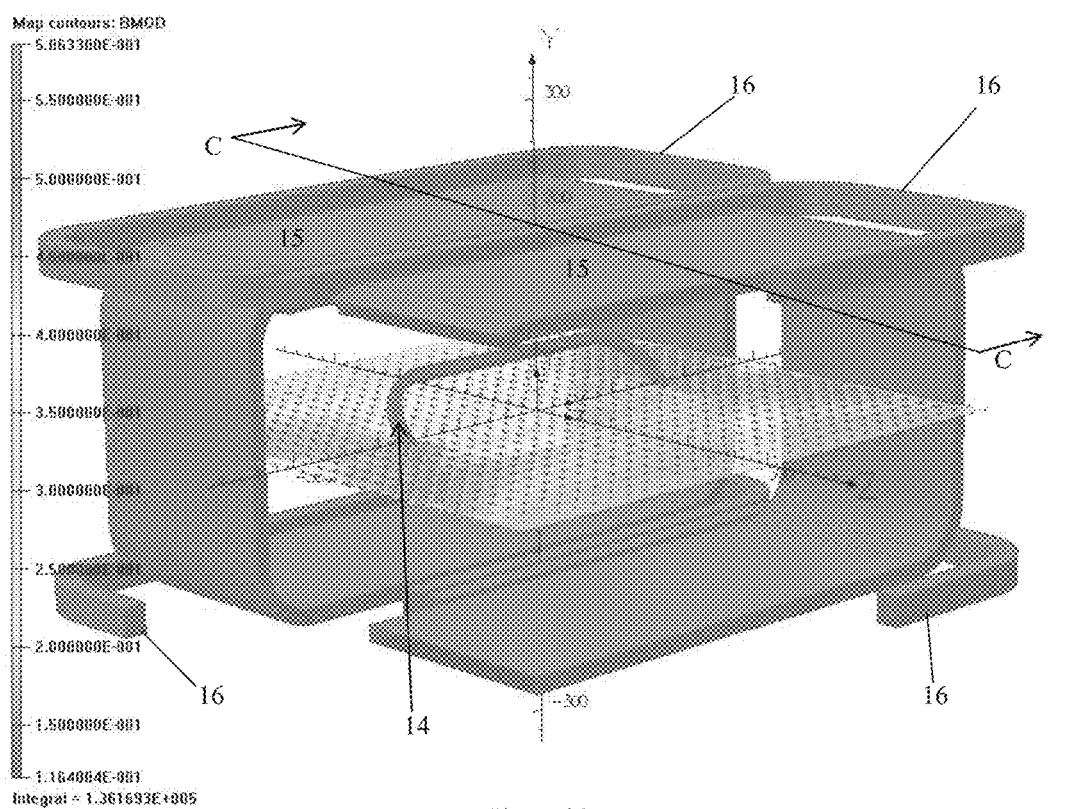
FIG. 20 is a schematic illustration of a three-dimensional magnetic field plot showing a partial cutaway of the drive coils of the assembly illustrated in FIG. 14 to show the magnetic field strength across the working region of the rotating coil.

FIG. 20 is a 3D field plot image showing a partial cut away of the primary 15 and secondary drive coils 16 in order to better show the magnetic field strength across the working region of the rotating coil 14.

FIG. 20 also shows the relative strength of the magnetic field across the centre of the working region of the preferred embodiment. The background field could be simply created through the use of a simple split rectangular solenoid. The gap between the solenoid halves simply has to be large enough to accommodate the current and cryogen delivery components as well as any shaft mounting and bearings.

The preferred embodiment illustrated in FIG. 20 includes the secondary superconducting coils 16 that improve the uniformity of the background field along the long side of the rectangular primary coils 15. Without these secondary coils 16, a significant drop in the strength of the magnetic field occurs near the middle of the long side of the rectangular primary coils 15.

Figure 21:
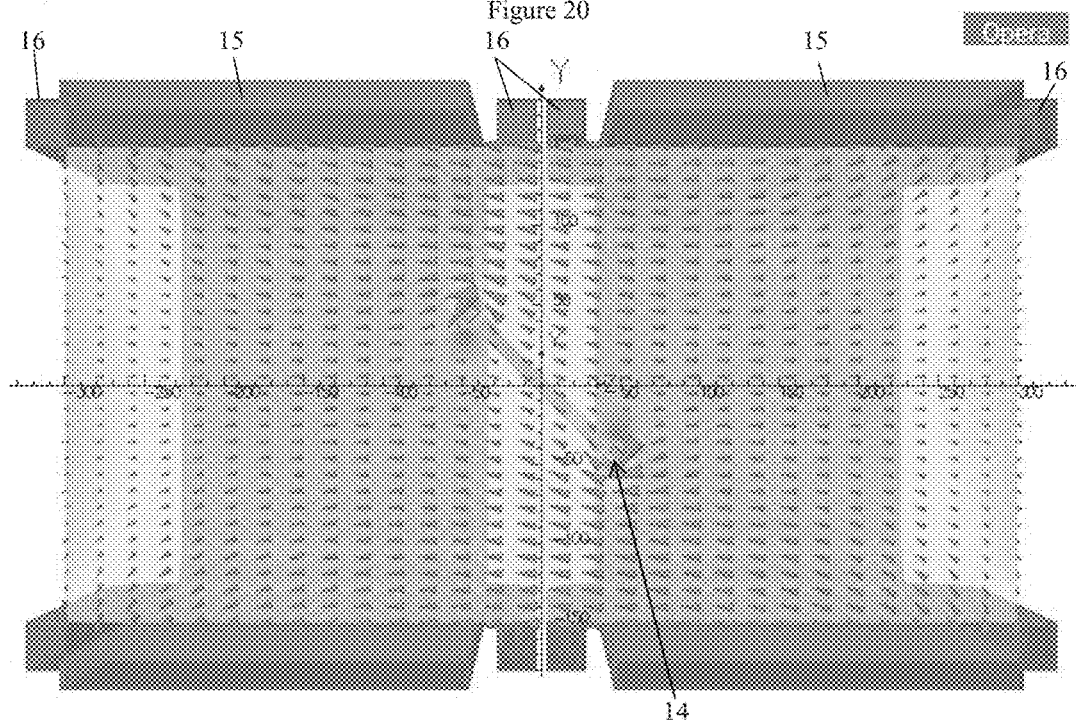
FIG. 21 is a sectional view of the configuration illustrated in FIG. 20 along line C-C with the rotating coil displaced at an angle of approximately 45° to the horizontal.
Figure 22:
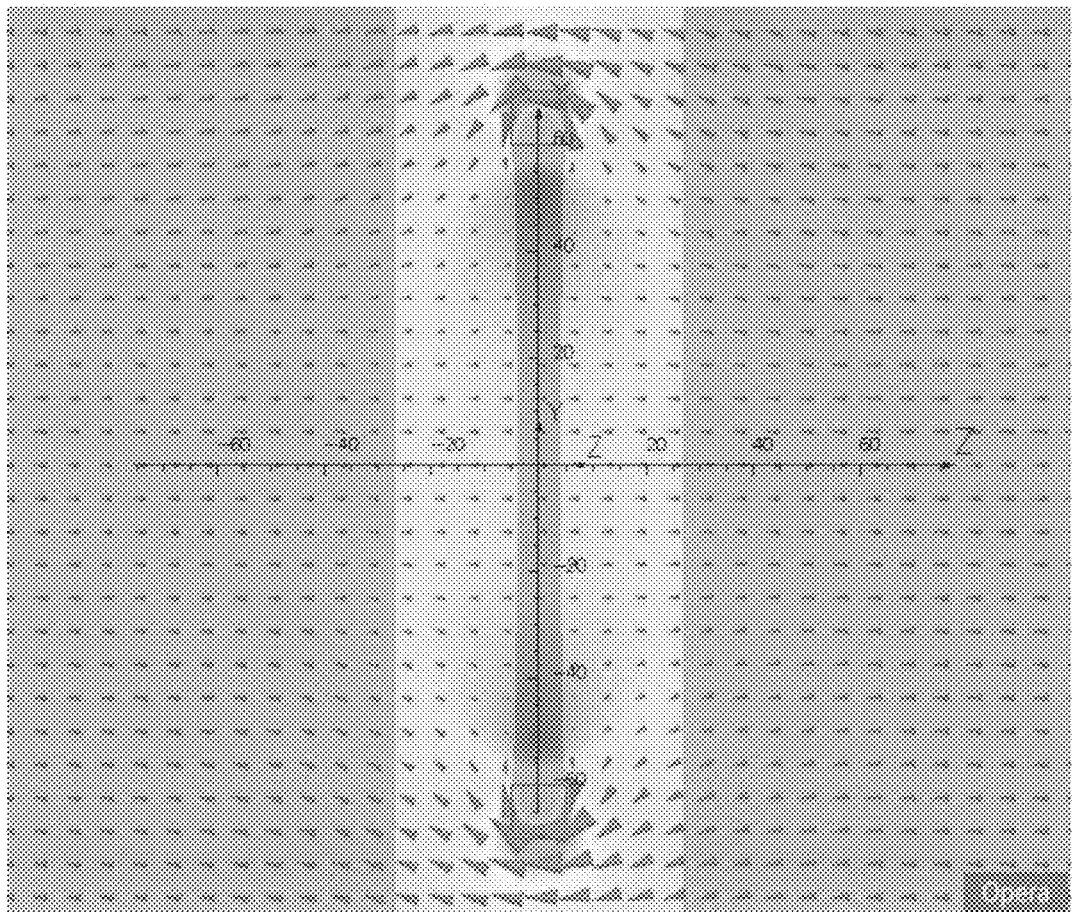
FIG. 22 is a magnetic field plot of the configuration illustrated in FIG. 20 with a background field of 0.5 Tesla and a magnetic field around the windings of a rotating coil of one Tesla with the rotating coil oriented at 90° from the horizontal.
Figure 23:
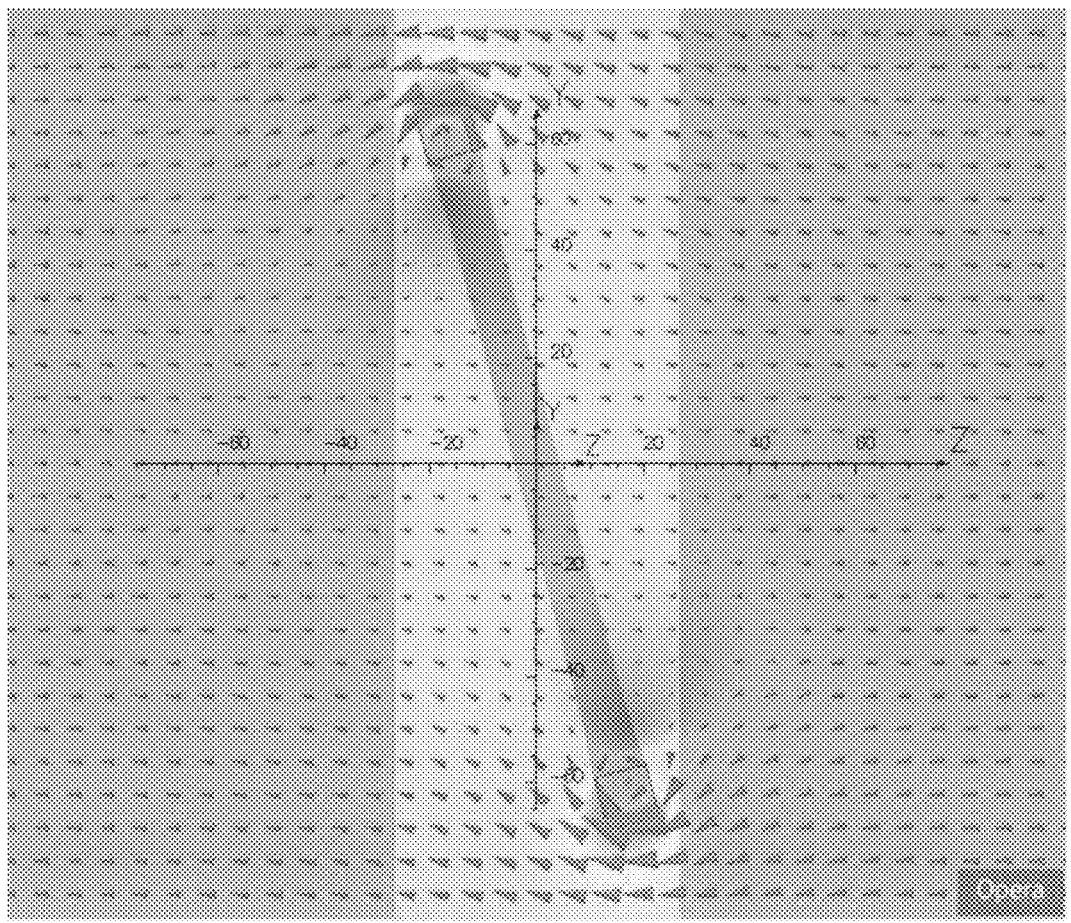
FIG. 23 is a magnetic field plot of the configuration illustrated in FIG. 22 with the rotating coil oriented at 75° from the horizontal.
Figure 24:
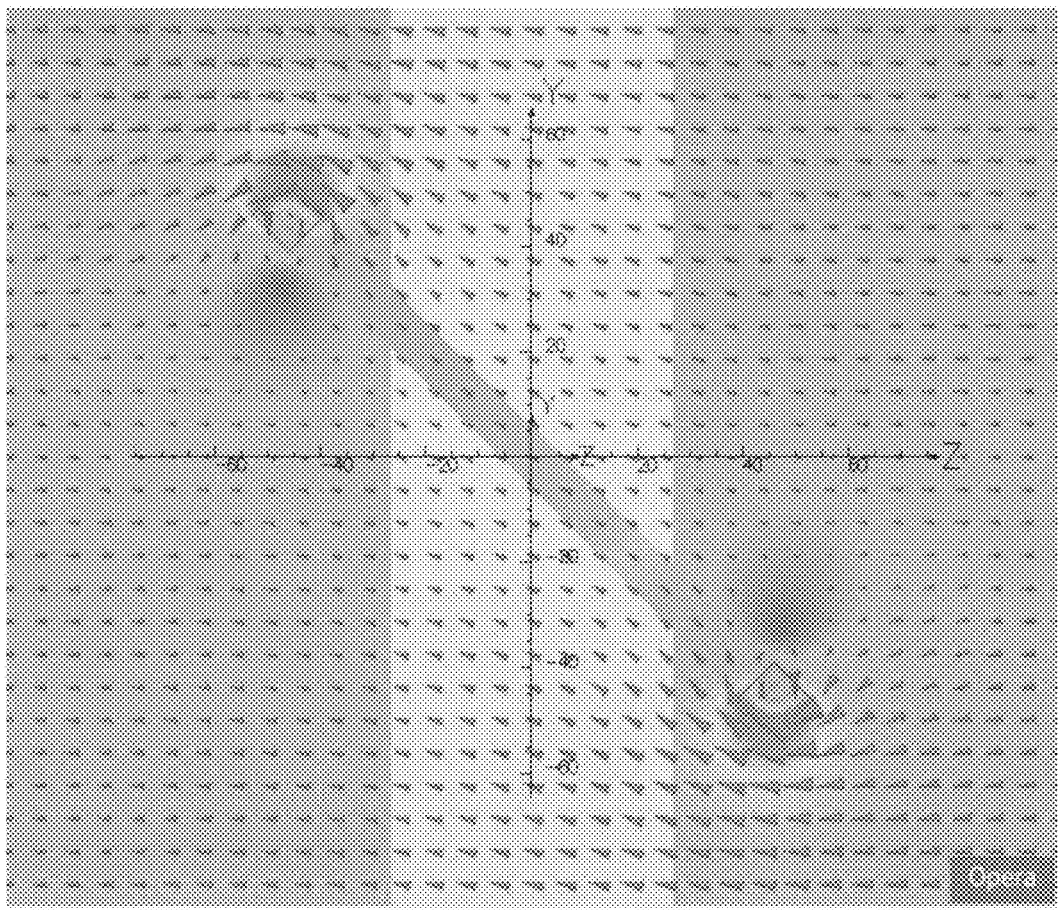
FIG. 24 is a magnetic field plot of the configuration illustrated in FIG. 23 with the rotating coil oriented at 45° from the horizontal.
Figure 25:
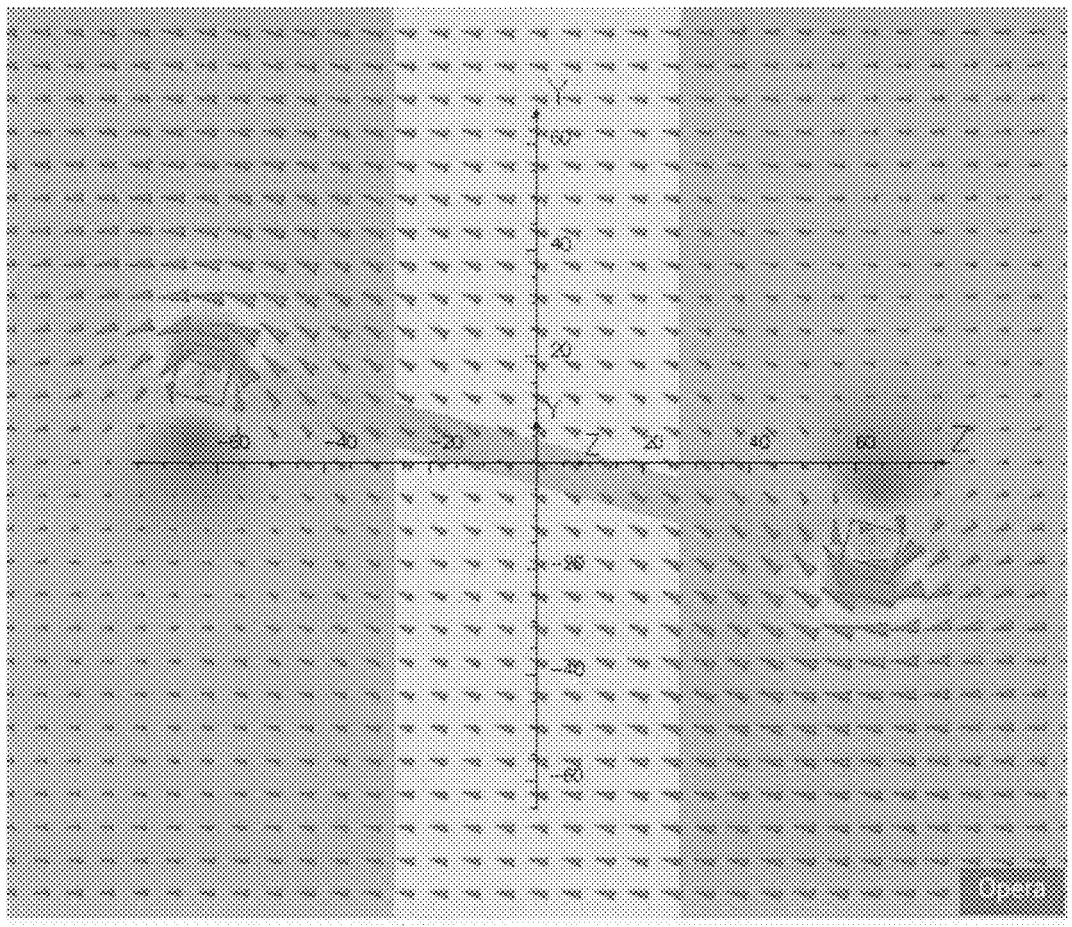
FIG. 25 is a magnetic field plot of the configuration illustrated in FIG. 23 with the rotating coil oriented at 15° from the horizontal.
Figure 26:
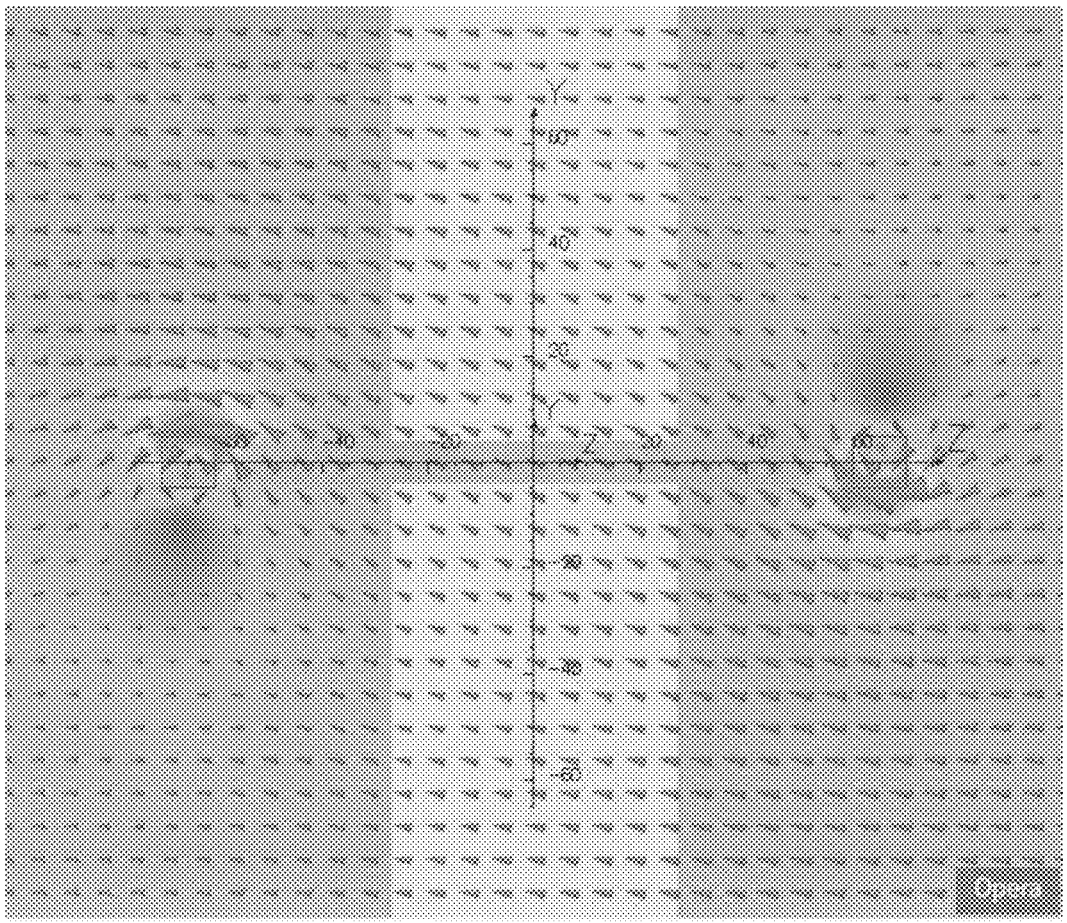
FIG. 26 is a magnetic field plot of the configuration illustrated in FIG. 23 with the rotating coil oriented at 0° from the horizontal.

FIG. 21 is a field plot showing a half sectional view of the complete assembly of the primary 15 and secondary drive coils 16 and the rotating coil 14. The rotating coil 14 is displaced at an angle of 45 degrees to the horizontal.

As with the previous embodiments discussed, a feature of this device is that the field around the coil windings of the rotating coil 14 remains equal to or greater than the background field in which the coil 14 is rotating.

The image sequence in FIGS. 22 to 26 shows a close up detail view of the field around the windings of the rotating coil 14 at various angles of rotation.

All of the example rotating devices shown in FIGS. 14 to 26 have only shown a single rotating coil that switches polarity every 180 degrees. This single winding could readily be extended to multiple equi-spaced coils rotating about a common axis. The reversal of the current supplied to these windings would be sequentially timed so as to result in a continuous rotation of the multi-coil rotor assembly. An advantage of multiple co-rotating coils would be a smoother delivery of output torque.

Figure 27:
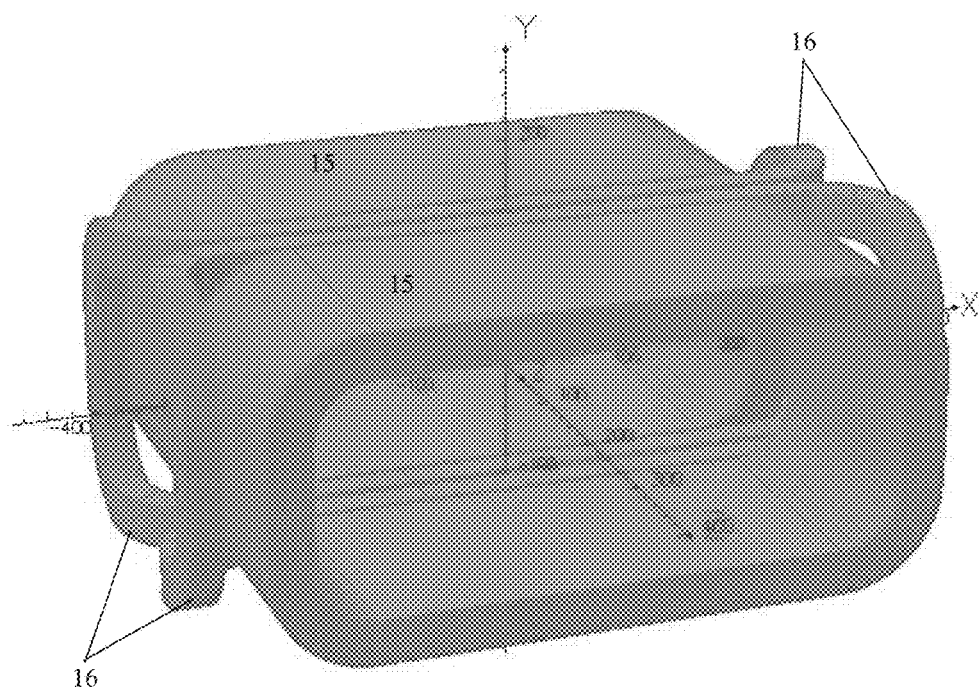
FIG. 27 is an isometric view of an alternative configuration of the drive coils which could be used in an assembly illustrated in FIG. 14.
Figure 28:
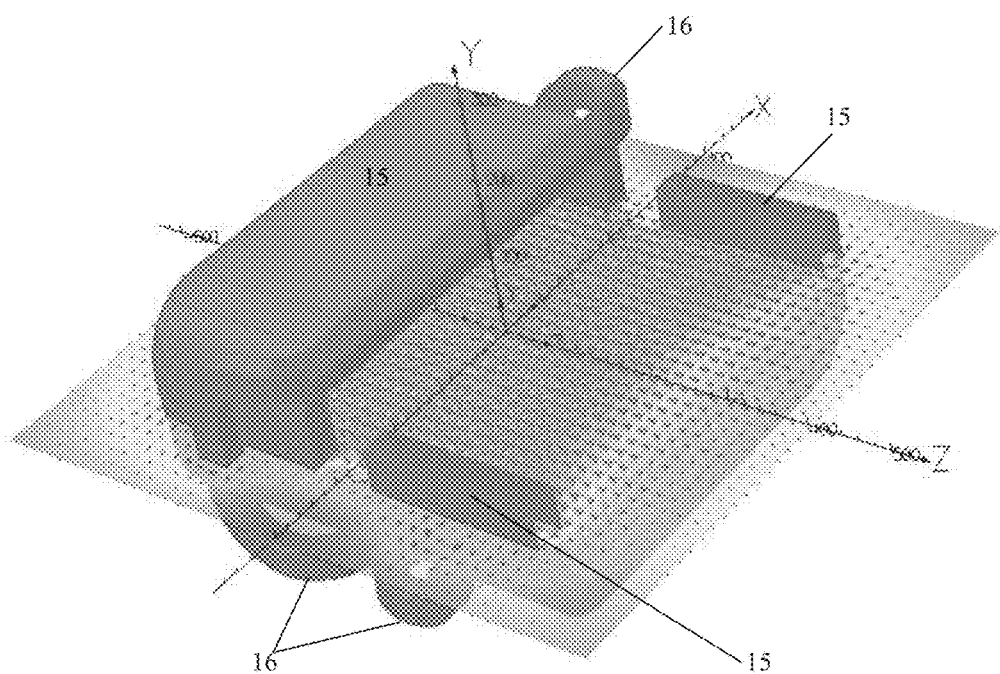
FIG. 28 is a partial cutaway magnetic field plot of the configuration illustrated in FIG. 27 indicating the magnetic field uniformity through the centre of the assembly.
Figure 29:
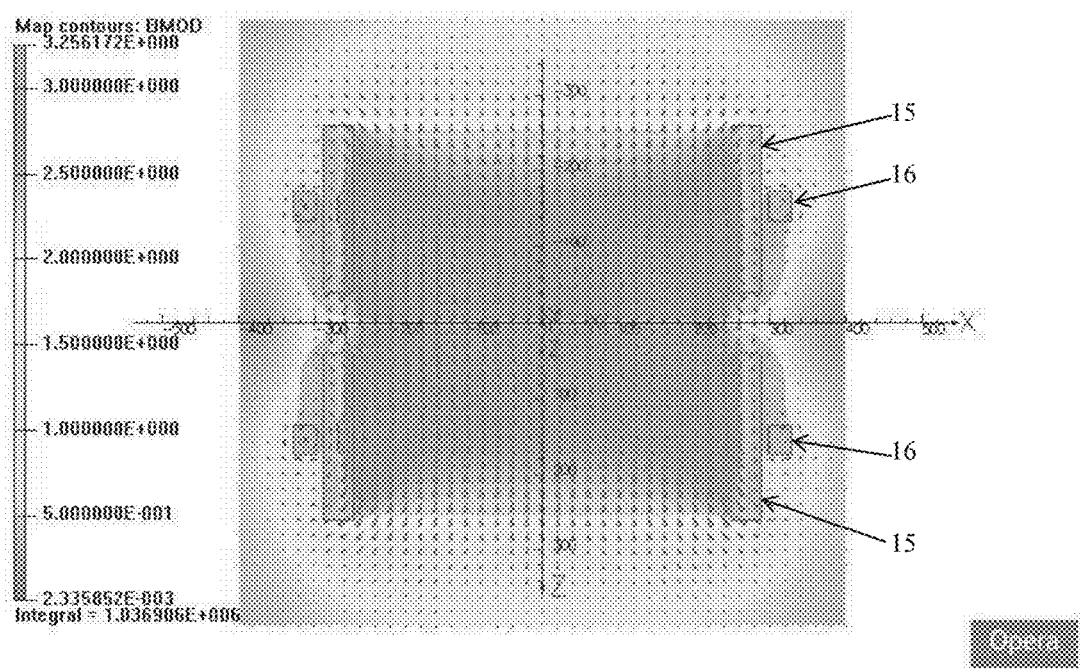
FIG. 29 is a plan view of the configuration illustrated in FIG. 28 in the Z-plane with magnetic field plot indicating field direction and uniformity.

FIGS. 27 to 29 illustrate a variation in which the two secondary coils 16 have bedstead style return paths that allow the cryogenic and current delivery systems to pass through the side gaps while still increasing the field uniformity in the central region of the rectangular primary coils 15. The fewer total number of secondary coils 16 makes for lower usage of superconducting wire and smaller overall dimensions when compared with the previous embodiment that had four secondary coils 16. However, the bedstead-shaped secondary coils of this embodiment are more complicated to make than the standard racetrack rectangular coils used in the previous embodiment.

Figure 30:
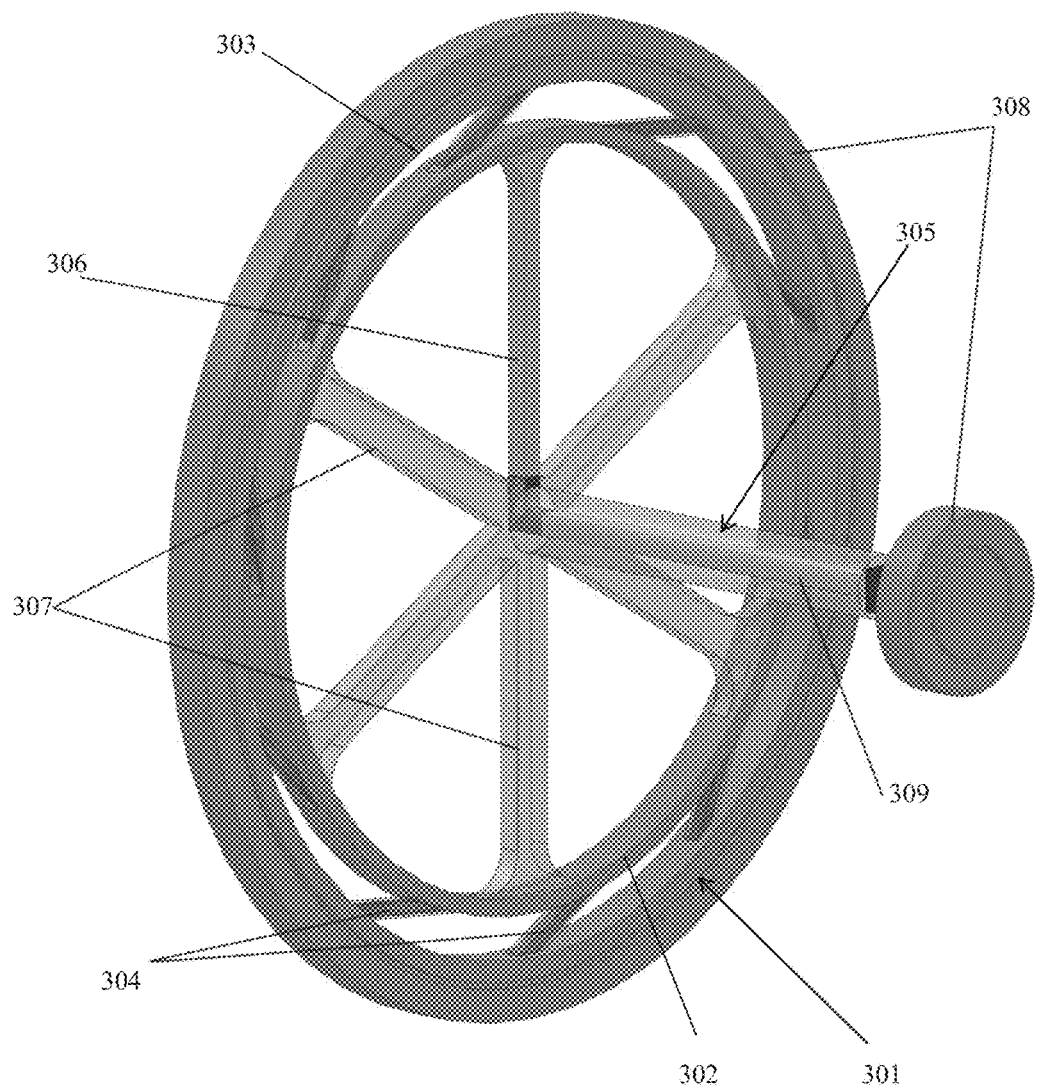
FIG. 30 is an axonometric view of yet another alternative configuration according to a preferred embodiment of the present invention.

FIG. 30 shows the major components of a superconducting rotor including preferred intermediate thermal blocking stages between the room temperature liquid metal brushes and the low temperature of the superconducting elements. The rotor in this form has superconducting current transmission elements between the outer liquid metal brush used for current input and the inner liquid metal brush used to remove current from the system.

The rotor 301 illustrated in FIG. 30 includes a pair of concentric, annular conducting elements, including an inner conducting element 302 and an outer conductive element 303. The inner conductive element 302 and the outer conductive element 303 are linked using thermally optimised normal conducting elements or HTS bulks or wires 304 as an intermediate current transfer stage with limited thermal conductivity.

The rotor 301 is mounted relative to a central shaft assembly 305. In the preferred embodiment a single primary HTS drive element 306 is configured as a radiating spoke, which radiates from the central shaft assembly 305 to the inner conducting element 302. The primary HTS drive element 306 and the central mounting point are encapsulated within a nonconductive support structure with additional torque transfer provided by the non-conducting radiating spokes 307 as the preferred configuration of multiple strands of HTS wire or tape used to form the primary HTS drive element 306 is not usually sufficiently rigid to transfer torque.

In an alternative form of the embodiment of the invention illustrated in FIG. 30, multiple HTS drive elements 306 are employed between the inner superconductive element 305 and the outer conductive element 302. In a preferred embodiment each of these HTS drive elements produce a field strength around the coil equal or greater to the strength of the background magnetic field.

Electrical current is provided to the configuration illustrated in FIG. 30 through a pair of liquid metal brushes 308 and the preferred direction of current flow is from the larger radius liquid metal brush surrounding the outer conductive element 303, through the HTS bulks 304, to the inner conducting element 302, through the primary HTS drive element 306 and out through a HTS current return path 309 provided in the central shaft assembly 305 and out through the smaller radius liquid metal brush.

One important implementation of this device is a form where a single superconducting current lead made of multiple strands of superconducting wire/tape is used as each of the primary HTS drive elements 306 in the region where the primary drive field is perpendicular to the flow of current through the primary HTS drive elements 306 resulting in rotation of rotor 301. In keeping with previous embodiments that involve single bars in a background field, this configuration uses a single current path where the current density is sufficiently high enough to ensure the strength of the magnetic field is higher than the strength of the background field in which the rotor 301 is situated.

As an example a background field of 0.5 T could be met by a primary HTS drive element 306 that forms a 10 mm×10 mm square that has a current density of around 180-200 A/mm2. The resulting current path creates a field 0.5 T around the external extremity of the 10 mm×10 mm cross section of the primary HTS drive element 306.

Figure 31:
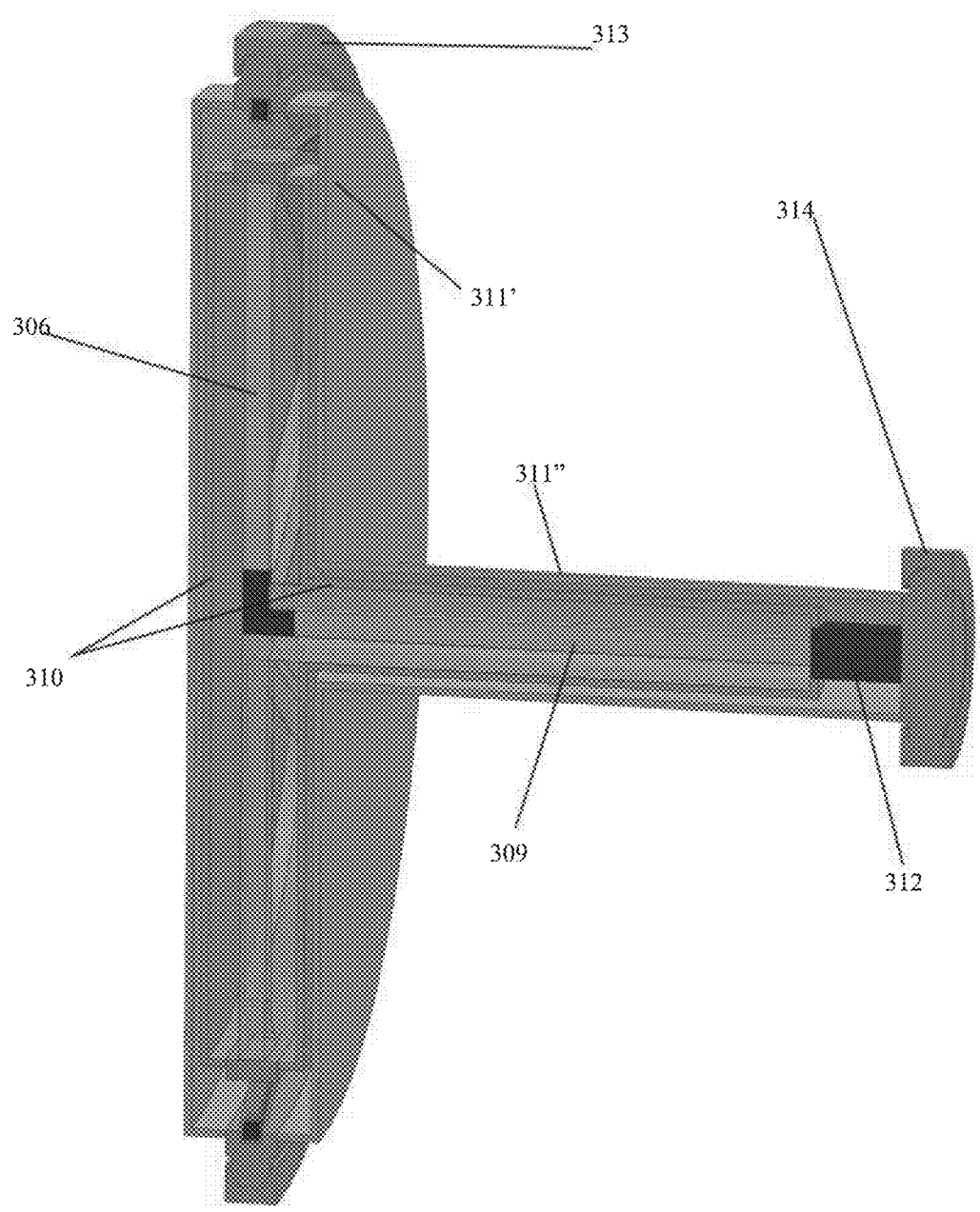
FIG. 31 is a sectional view of the configuration illustrated in FIG. 30 encapsulated in a dual-walled cryostat according to a preferred embodiment of the present invention.

It is anticipated that the rotor 301 will be encapsulated by a dual-walled or two stage rotating cryostat as illustrated in FIG. 31. The first of two stages is the inner superconducting stage that contains the rotor 301, and the current return path 309 that transports the working current out along the axis of rotation. This inner superconducting stage is preferably contained within an inner, rotating cryostat 310.

The second stage is the thermal isolation stage that transitions between the temperature of the inner stage (around 40-60K) and the liquid metal brushes at room temperature. This transitional stage could be comprised of a conducting material, such as copper, whose path length has been optimised for both current transmission and thermal loss, from High Temperature Superconducting wires or bulk material or from some combination of the two. As illustrated in FIG. 31, the outer cryostat has two portions, one portion 311' surrounding the rotor itself and a smaller diameter portion 311" surrounding the current return path 309. In the smaller diameter portion 311", thermally optimised normal-conducting elements, HTS bulks or wires 312 are used for return path thermal insulation. Again, in this configuration, the current is delivered through the larger diameter liquid metal brush 313 through the rotor assembly out of the current return path 309 and through the smaller diameter liquid metal brush 314.

A further advantage of the superconducting rotor results from the fact that the output current is directed through primary HTS drive element 306 to the current output brush 314. In a conventional rotor arrangement the current flows through a normal conducting output shaft that has to be of sufficient diameter to accommodate the device current levels (on the order of 20 kA). As the diameter of the output shaft is increased the effective length of the drive element of the rotor is decreased which decreases the output torque of the device. By channelling the current through the primary HTS drive element 306 (the preferred embodiment uses a 10 mm×10 mm lead), the effective length of the drive element is increased. This effect becomes particularly noticeable in smaller sized devices—successful development of a superconducting rotor will significantly increase the feasibility of smaller scale devices.

Figure 32:
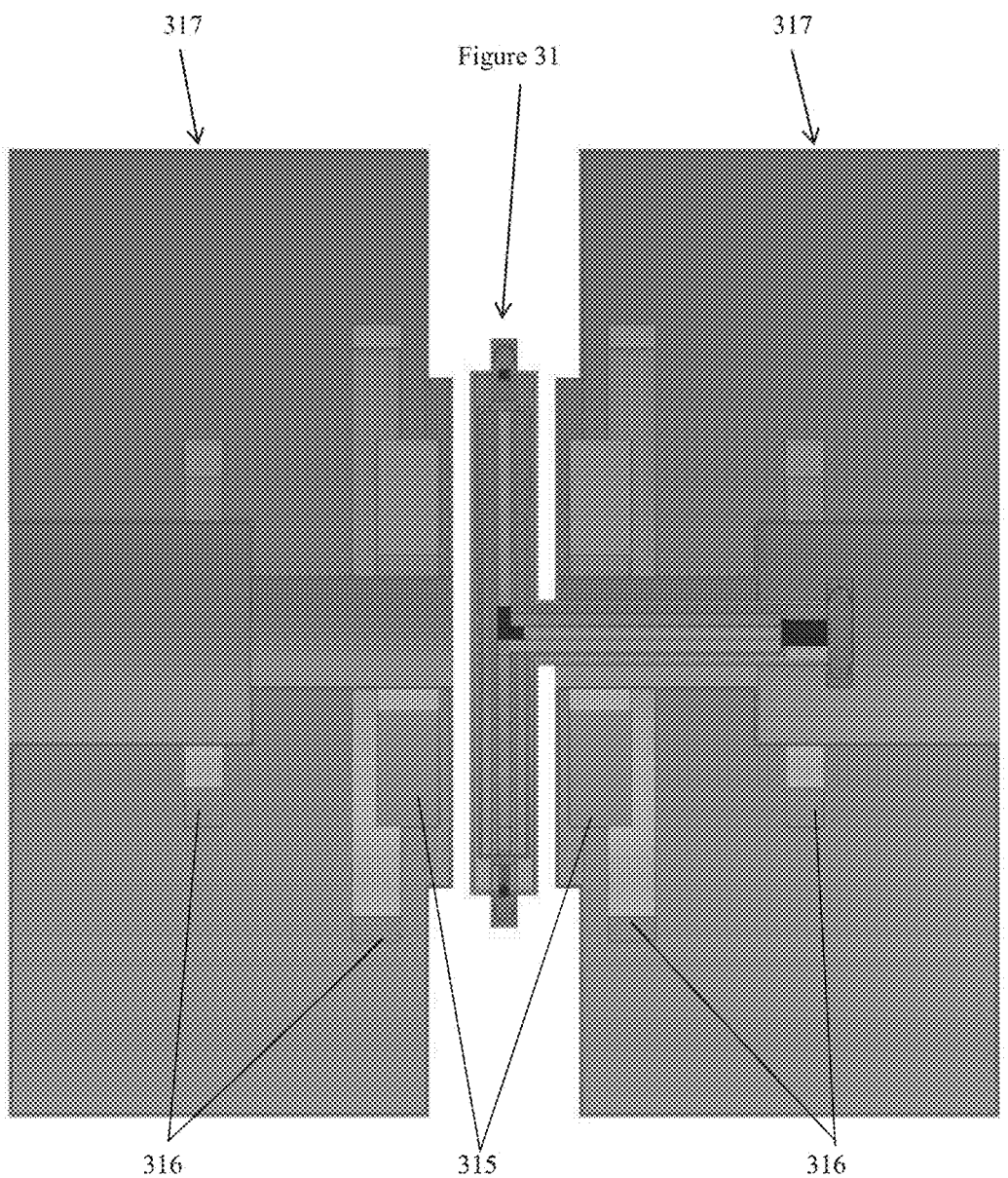
FIG. 32 is a sectional view of the configuration illustrated in FIG. 31 with a background field producing coil system according to a preferred embodiment of the present invention.

FIG. 32 shows the rotor configuration illustrated in FIG. 31 integrated within a background field producing coil system. As illustrated, primary field superconducting coils 315 are used to generate a primary field in which the rotor consideration of FIG. 31 is located. The particular location of the preferred primary field superconducting coils 315 produces an effective drive field in the location of interest in which the rotor 301 is located. This field is further controlled and shaped by the provision of secondary field superconducting coils 316.

Figure 33:
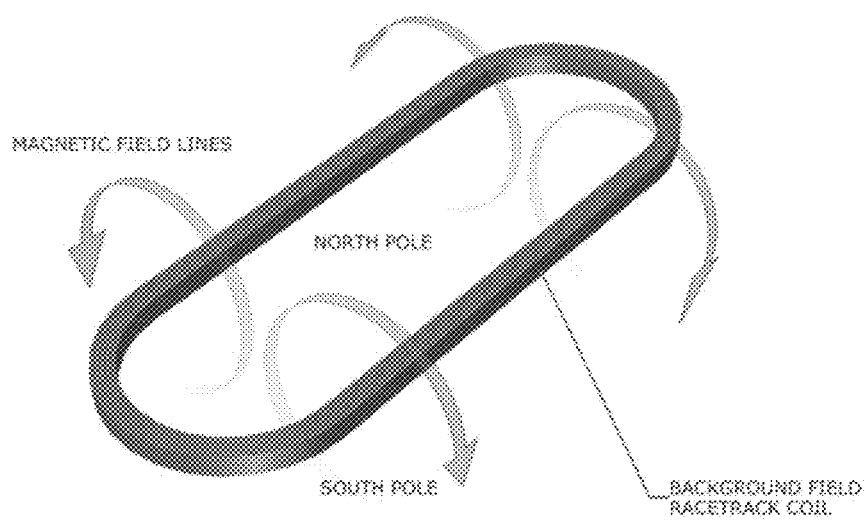
FIG. 33 is an isometric view of a single electromagnetic coil with arrows indicated the direction of the magnetic field created around the coil.

The fundamental basis of operation of the devices illustrated in FIG. 33 onward is the interaction between a current carrying conductor and a background magnetic field. This interaction results in an output torque developed in the device (in the case of a motor) or an output voltage and current in the case of a generator.

The background magnetic field consists, at a fundamental level, of a magnetic pole created by either an electromagnetic coil or by a permanent magnet. The pole has a North and South orientation of the magnetic field. This fundamental unit upon which the background field in the All-Pole Machines is built is shown in FIG. 33.

One key advance in the devices presented in this document and in all the devices developed and shown in previous patent applications is the manner in which the magnetic field in the devices is used more than once. That is—that multiple paths are described through the background magnetic field by the current carrying conductors in order to greatly increase the power density of the electrical machines.

Figure 34:
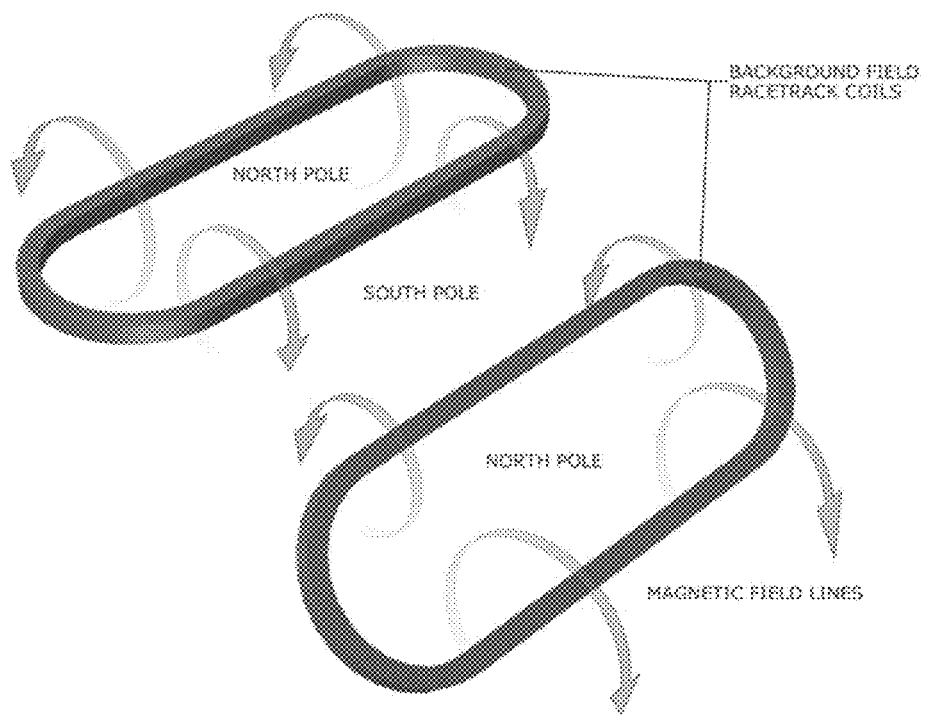
FIG. 34 is an isometric view the interstitial South pole created when electromagnetic coils as illustrated in FIG. 33 are placed adjacent to one another.

In the case where the fundamental building blocks of the background field consists of electromagnetic coils, placing straight-sided electromagnetic coils adjacent to one another while keeping the direction of current flow around the coils identical (thus ensuring that the direction of the magnetic field is identical in both coils) results in a compression of the return path of the magnetic field between the two coils. This phenomenon is illustrated in FIG. 34.

If a current carrying conductor describes a path across the top of the conductors, perpendicular to the primary magnetic poles created in the electromagnets, the current carrying conductor will effectively see 4 magnetic poles:

Firstly the North pole created by the first electromagnet.
Secondly a South magnetic pole created by the compression of the return path between the two electromagnets.
Thirdly, a North Pole created by the second electromagnet.
Fourthly and lastly, the final South Pole as it exits the second electromagnet.

It should be noted that throughout this document, the embodiments shown use straight-sided 'racetrack' style electromagnetic coils to produce the background magnetic field. It would be readily apparent to those skilled in that art that any coil geometry allowing the adjacent placement of electromagnetic coils, either linearly or about a circular arc, such that an interstitial pole is created between the two electromagnets could be suitably employed in the devices described in this document.

Figure 35:
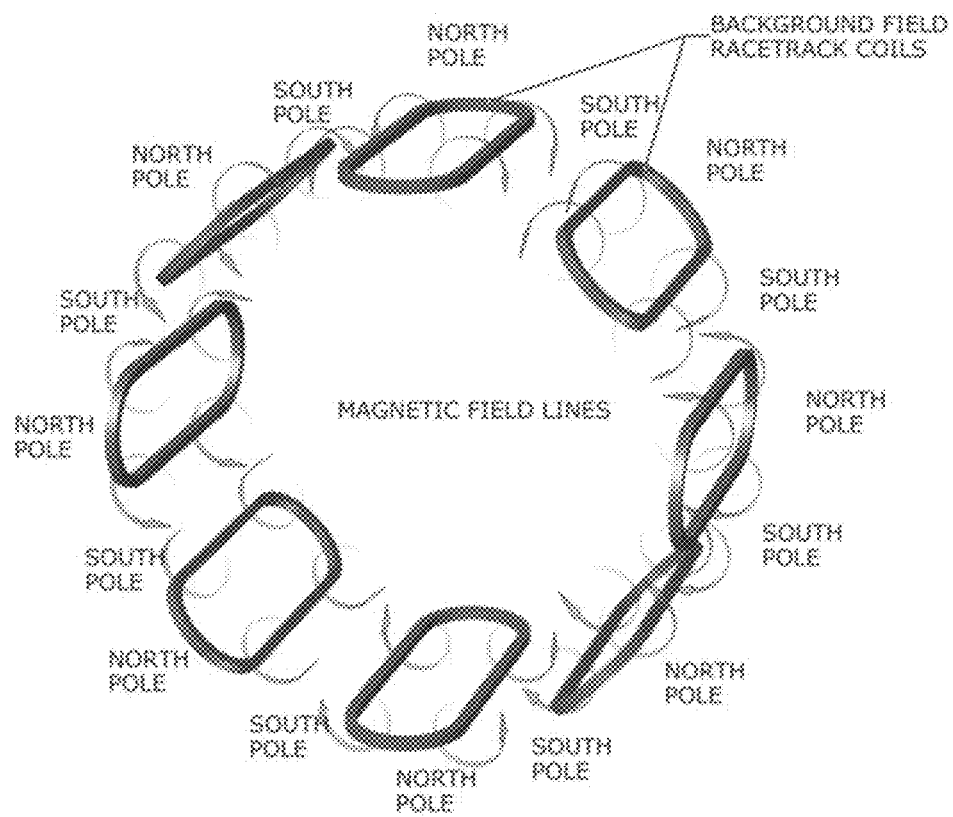
FIG. 35 is an isometric view of the two adjacent electromagnetic coils shown in FIG. 34 to form a complete circular array of coils.

If the idea of the adjacent electromagnets is expanded to its fullest logical application in the field or rotating electrical machinery the result is a series of adjacent electromagnetic coils arrayed circularly around a pitch circle diameter. The full development of this circular array of straight-sided electromagnets is illustrated in FIG. 35.

The two adjacent electromagnetic coils shown in FIG. 34 have been extended in the above image to form a complete circular array of coils. This circular array creates the background magnetic field used in the All Pole Machines.

In the above circular array of racetrack style electromagnets, a current carrying conductor traversing a circular path, that is adjacent to but externally or internally offset from the pitch circle diameter upon which the background field coils are arranged, will travel through a number of magnetic poles equal to twice the number of background field coils. This is because the coils form one primary pole in the middle of the coil and one interstitial pole due to the compression of the return path of the magnetic field between adjacent coils. The poles seen by the current carrying conductor will be sequentially opposite in orientation.

Figure 36:
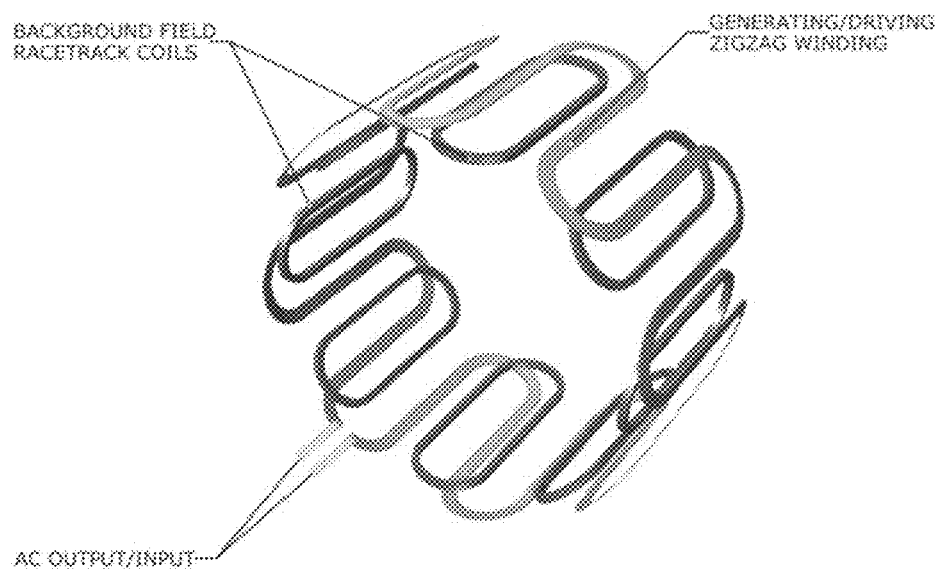
FIG. 36 is an isometric view of the configuration in FIG. 35 with background field coils with a 'Zig-zag' style winding to form a complete generator or motor.

FIG. 36 shows the completed circular assembly of racetrack coils together with a generating path/winding of the type described in greater detail in the next section. The generator shown above will produce an alternating voltage and current from the output terminals of the generator path windings. The frequency of the reversal of the current and voltage is proportional to the number of magnetic poles of the device and the rotational speed of the generator.

Figure 37:
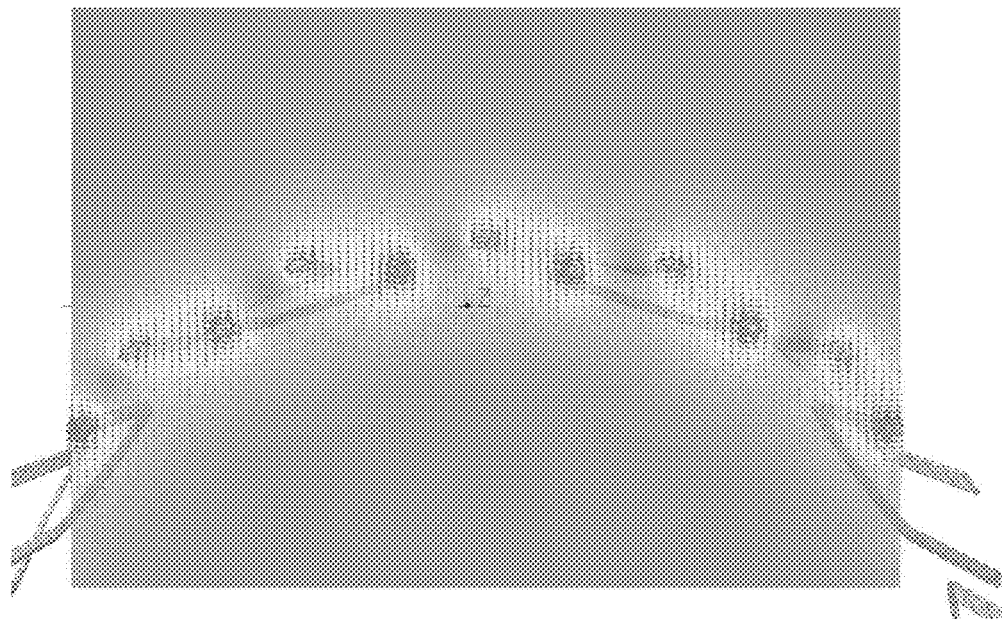
FIG. 37 is a sectional view showing the magnetic field plot of the device in FIG. 36.

FIG. 37 is a sectional view showing the magnetic field plot of the device in FIG. 36. In the above field plot current is passed through the external zigzag windings, interacting with the background field coils and resulting in a torque.

In the reverse scenario when the device is supplied with current and driven as a motor, the device must be supplied with an alternating current (AC—preferably a square wave AC) that reverses as the driving path moves between poles (relative to the background field coils). A field plot of a motor implementation is shown in FIG. 37.

The Driving or Generating Path

The second fundamental building block of the machines described in this document is the driving or generating path. This path consists fundamentally of the arrangement and interconnection of a number of current carrying conductors whose primary driving or generating elements are positioned parallel to the axis around which the background field coils are arrayed. These current carrying conductors traverse the field in the manner previously disclosed around the background coils.

Figure 38:
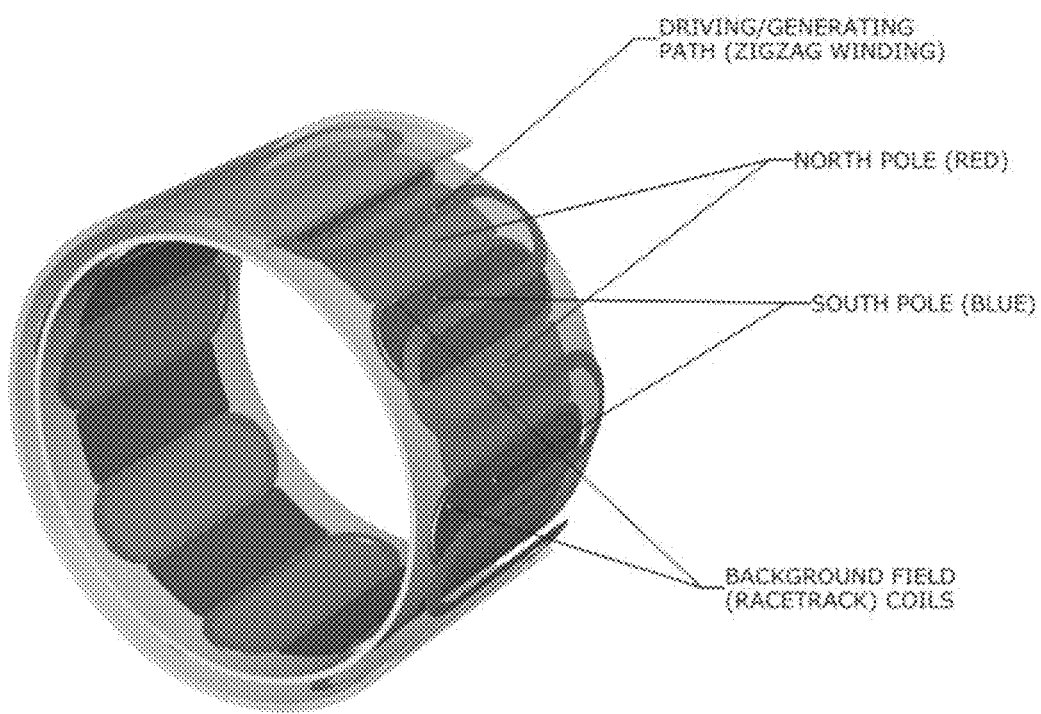
FIG. 38 is an isometric view of a complete generator or motor assembly with both the background field coils and an external zigzag style driving or generating path.

In a preferred embodiment a number of conductors equal to the number of poles created by the background field are positioned as described in the previous paragraph. As the field direction of successive poles is reversed it is necessary for the direction of current in the bar to also reverse in succession around the diameter of the device. In order to achieve this reversal of current direction the current carrying conductors are alternately connected at each end of the device forming a series connected 'Zig-zag' style driving or generating path around the background field producing coils. This zig-zag series connection also results in the series addition of the voltage generated on each of the current carrying conductor elements in the case where the device is operating as a generator. An example of a device with a zig-zag style driving or generating path is shown FIG. 38.

In the above embodiment the driving or generating path is positioned on the outside of the background field coils. In general, the power density is increased with the external placement of the driving or generating path due to the increase in the working radius, resulting in an increase in the torque when powered as a motor or an increase the surface velocity of the current carrying bars (which in turn increases the output voltage) when functioning as a generator.

Figure 39:
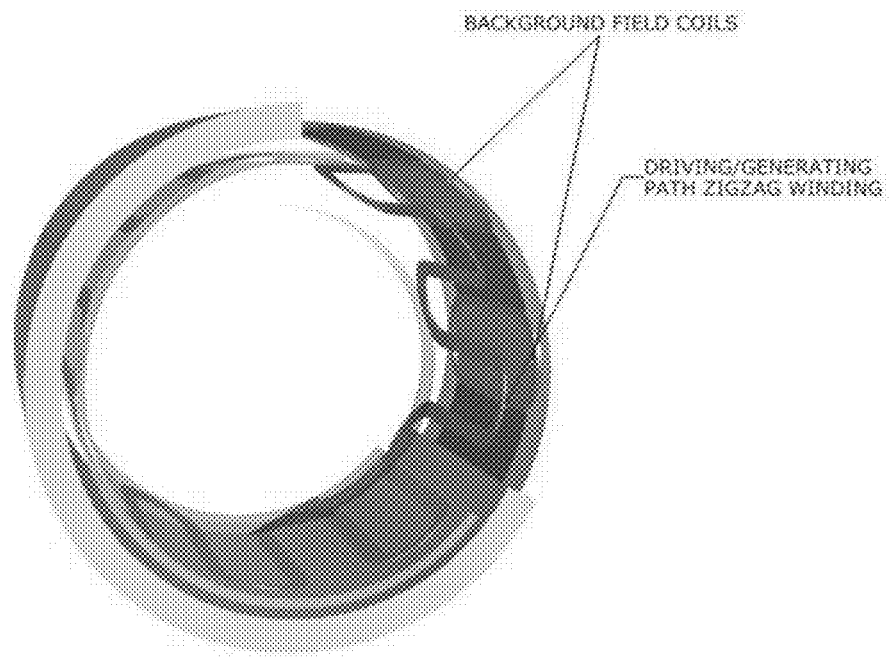
FIG. 39 is a front elevation view of the configuration illustrated in FIG. 38.

A further variation to this embodiment would be to place the driving or generating path inside the background field coils. This variation would be suited to situations where there are size constraints or where internal positioning of the driving or generating path is dictated by constraints imposed by the input or output mechanical shaft. This variation is shown in the FIG. 39.

Yet another variation to the above embodiment involves the placement of driving or generating paths both externally and internally about the background field coils. The two zig-zag paths could be connected in series or in parallel in the case of motor operation or connected in series to increase the voltage when generating. This variation allows the current in the driving or generating paths to be split between the inner and outer paths—potentially lowering the peak field developed in the windings of the driving or generating paths. This lowering of the field is particularly advantageous where superconducting windings are employed as the reduction in field results in an increase in the current carrying capacity of the wire and a reduction in the total amount of superconducting wire used.

Alternatively, the use of both external and internal driving or generating paths could allow an increase in the total current capacity of these paths, thereby resulting in an increase in the power rating and power density of the device. The operating mode of the device (motoring or generating) and the manner in which the driving or generating paths are connected may necessitate a difference in the number of windings in the internal path with respect to the external path in order to load balance between them or to make up for the generally lower torque and voltage delivered by the inner path. This embodiment is illustrated in FIG. 40.

The external and internal current paths could also be connected in reverse to function as a counter-rotating motor or generator. In this embodiment the direction of rotation of the internal windings is reversed relative to the direction of rotation of the external windings as shown in FIG. 41.

Figure 40:
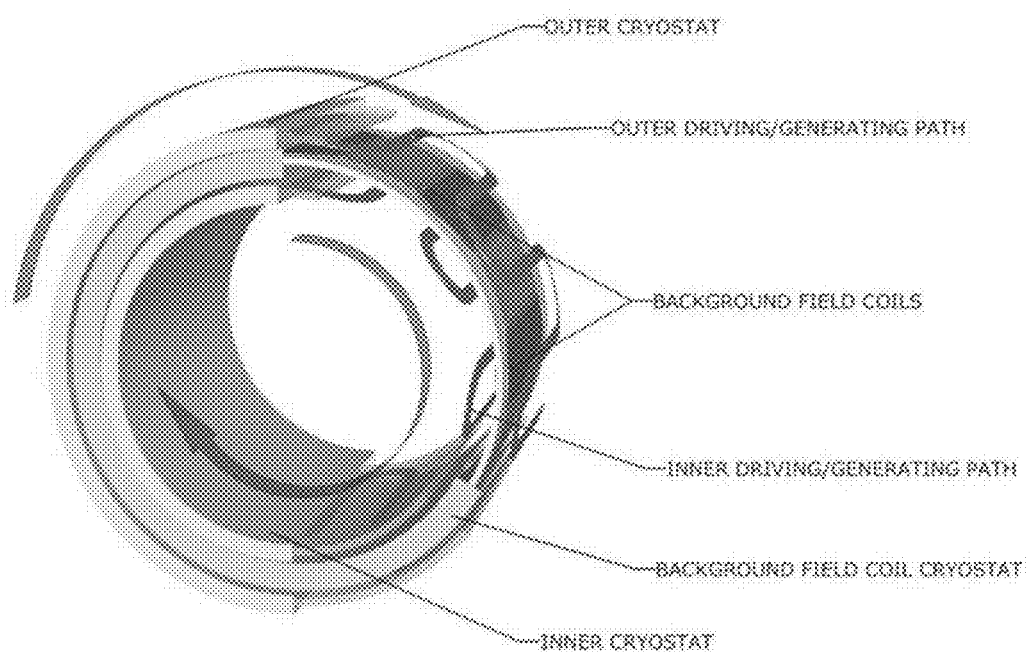
FIG. 40 is a front elevation view of another complete generator or motor assembly showing background field coils but with both internal and external zigzag style driving or generating paths shown.
Figure 41:
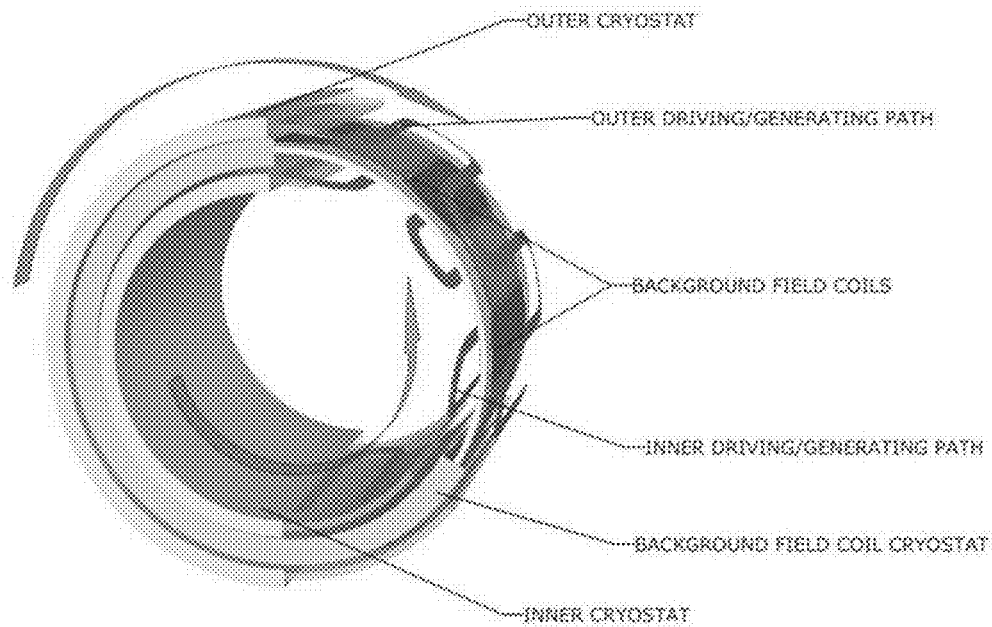
FIG. 41 shows the generator or motor assembly of FIG. 40 with both internal and external zigzag style driving or generating paths shown for counter-rotating operation.

FIG. 41 shows the generator or motor assembly of FIG. 40 with both internal and external zigzag style driving or generating paths shown. In the above embodiment the external and internal paths/windings are configured for counter-rotating operation as a motor or a generator.

A further variation on the basic zig-zag arrangement of the driving or generating windings is where these winding are again split and interwoven. This variation is knows as a 'platted' or an interweaving winding.

Figure 42:
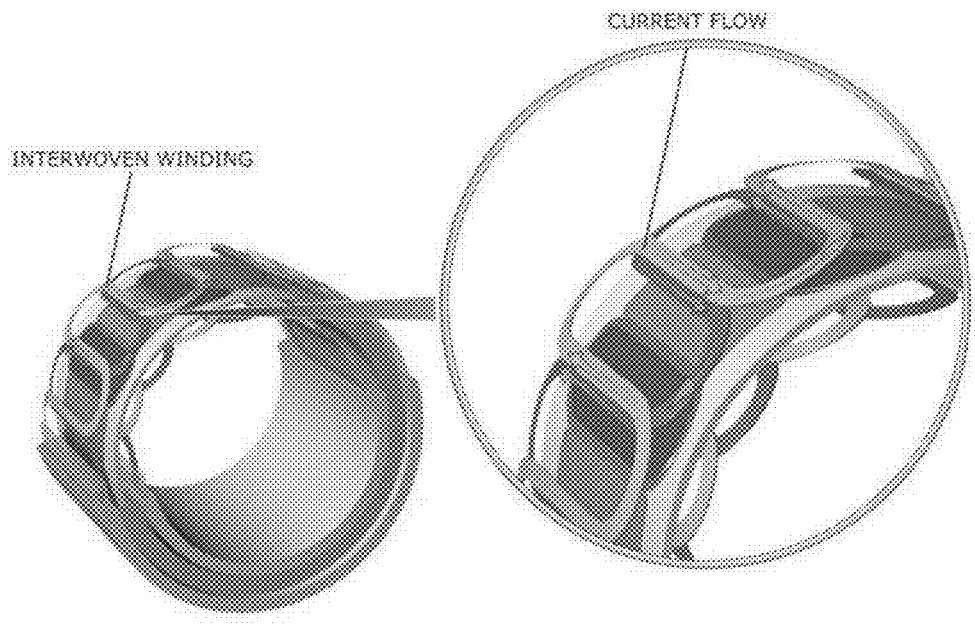
FIG. 42 is a front elevation view of another complete generator or motor assembly showing background field coils with the zigzag style driving/generating paths have been split and offset resulting in an interwoven or 'platted' winding.

The simplest way to describe this winding variation would be if a standard zig-zag style winding was split in half and half of the winding was rotated by an angle equivalent to the angle between the poles of the machine. The direction of current in this second half-winding is reversed such that the newly adjacent axial components of the path transport current or generate voltage in the same direction. The end connections are now effectively split into two halves that are displaced by one pole. This variation to the driving or generating path/windings is best shown in FIG. 42.

Figure 43:
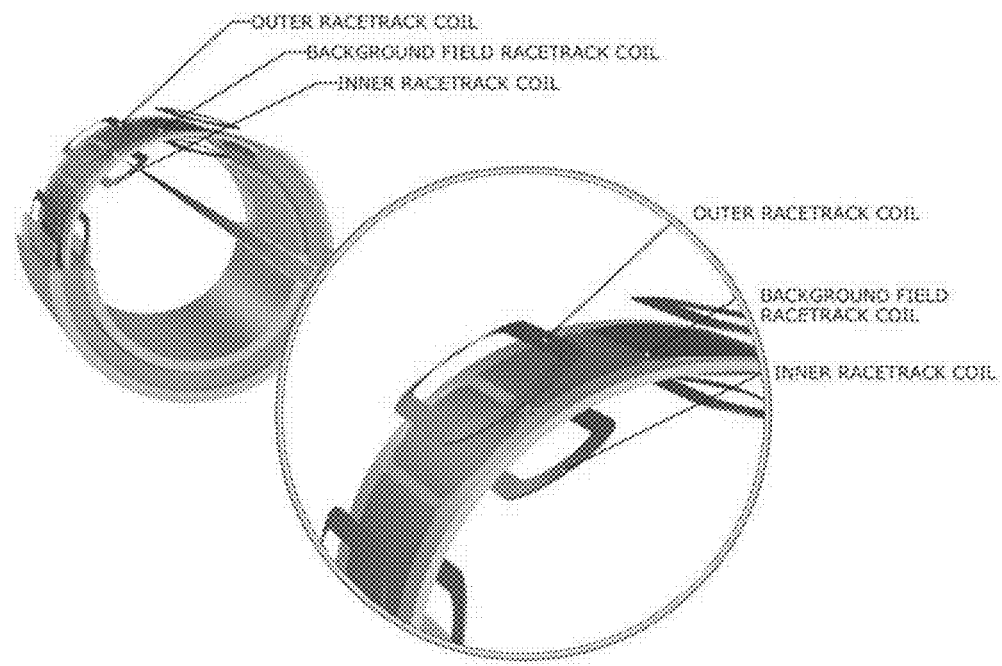
FIG. 43 is a front elevation view of another variation of the generator/motor assembly where the zigzag style driving/generating paths have been replaced by a series of interconnected racetrack coil windings.

Another variation on the driving or generating windings involves a move away from the zig-zag style series interconnected winding to using circular loops or coils. In this embodiment two of the adjacent current carrying bars/windings are joined at each end. These end windings transport the current between the two bars and ensuring the correct direction of interconnection and current flow between them. When this connection is made in a series of windings the driving or generating paths resemble a series of electromagnetic coils that are sequentially connected by a small current path (or alternatively, powered by a parallel connected power supply). When using superconducting windings, this interconnecting wire can be quite small relative to the large number of windings used in the coil parts of the driving or generating path. This embodiment is illustrated in FIG. 43.

Figure 44:
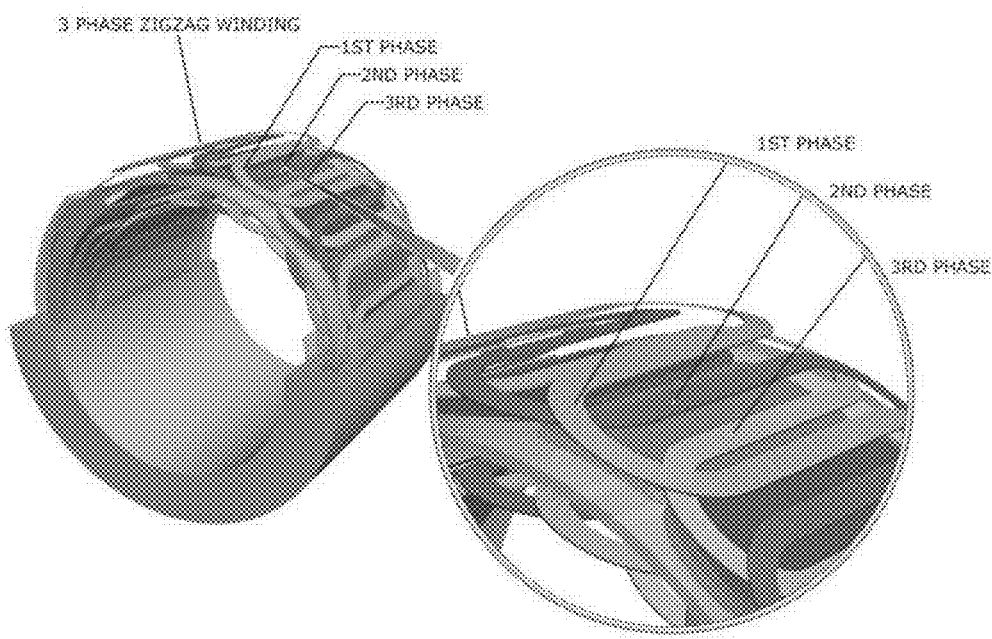
FIG. 44 is a front elevation view of another generator/motor assembly with three zigzag style driving/generating paths that are operating at different phase angles.

In another variation, the windings of the driving or generating paths could be split into a set of equi-spaced windings that form a number of separate phases. Three-phase operation of motors and generators is common and this three- or multiphase operation could be extended to the devices and windings describe with this document. FIG. 44 shows such a multi-phase embodiment.

There are a number of advantages to multi-phase winding of the driving or generating paths:
- Additional windings can be readily added to increase the rated power and power density of the device.
- Splitting of the windings across multiple phases may decrease the peak magnetic field density seen by the windings leading to an increase in the current carrying capacity of windings if superconducting. This would lead to a decrease in the amount of superconducting wire used for a given power density.
- Multi-phase windings would have smoother torque delivery for a given power level when motoring.
- Multi-phase windings would tend decrease the peak voltages and currents developed when generating, in turn decreasing the AC-losses experienced by the driving or generating path windings.
- When operating as a motor, multi-phase windings would not be subject to a potential torque 'dead-zone' when starting.

Further Extensions to Previous Embodiments

Figure 45:
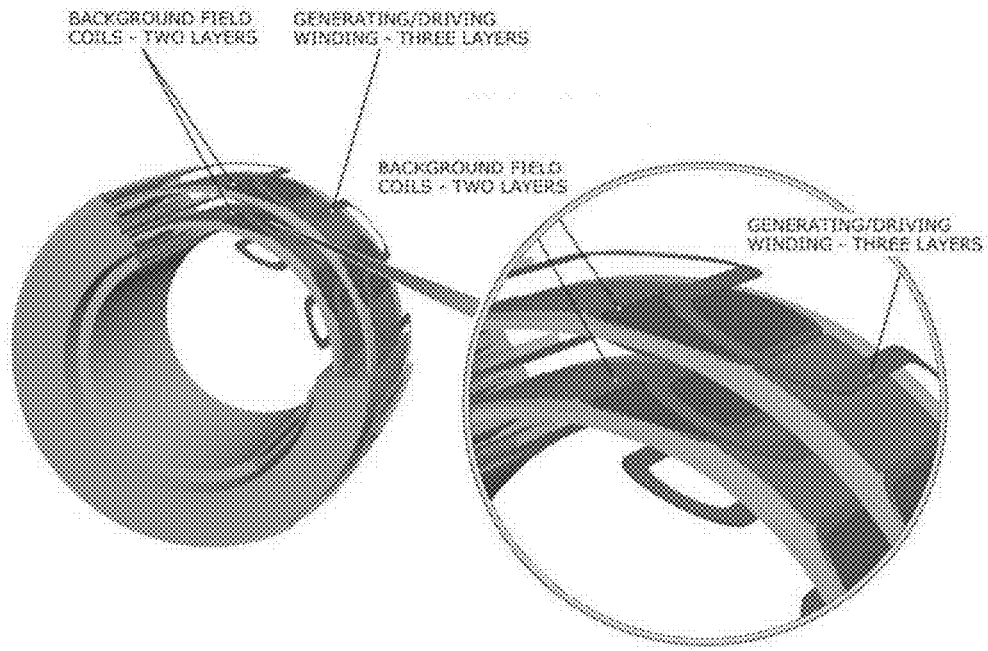
FIG. 45 is a front elevation view of another example motor/generator where there are two concentric layers of background field coils.
Figure 46:
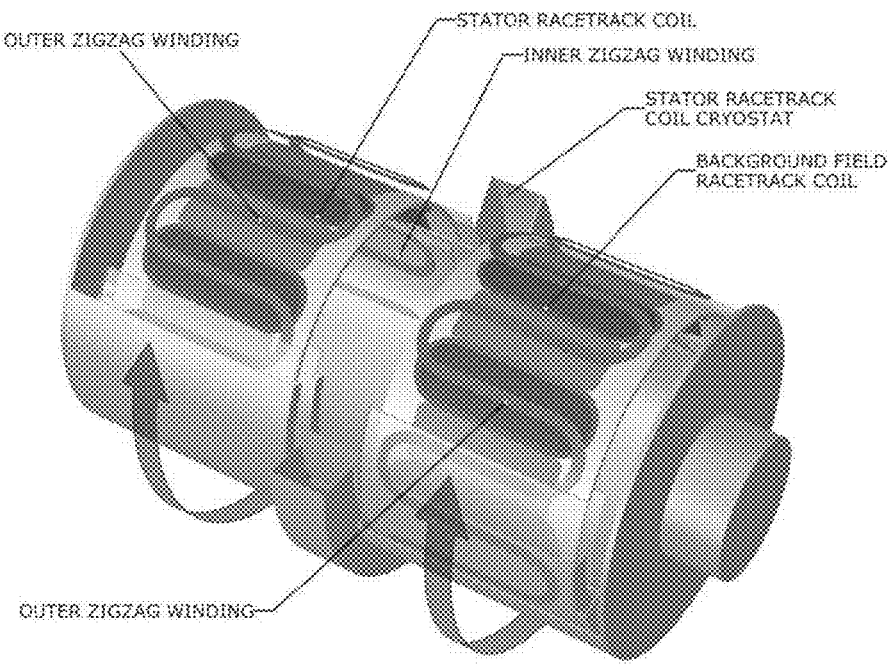
FIG. 46 is a yet another example of a double ended motor/generator with both internal and external driving/generating windings.
Figure 47:
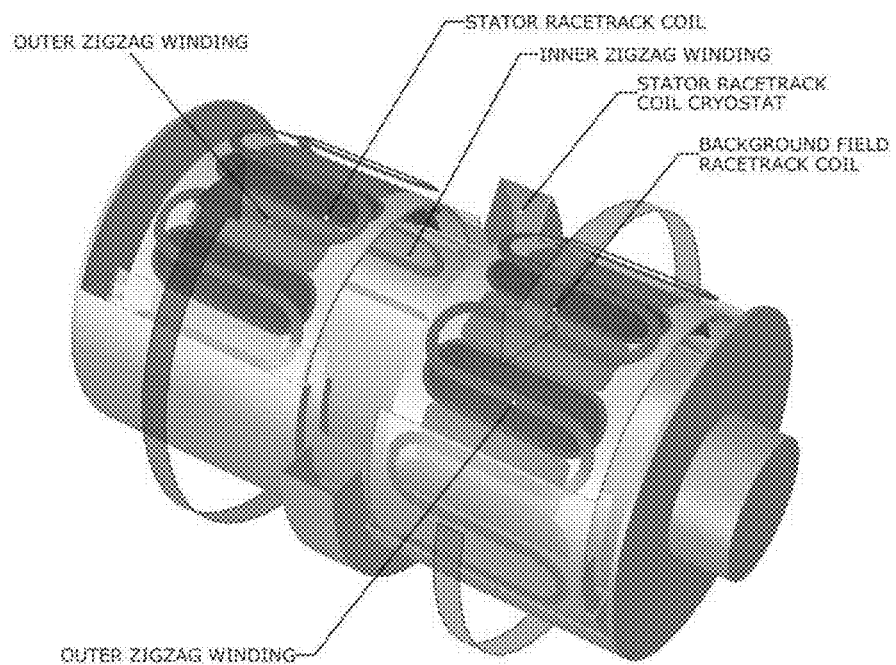
FIG. 47 is an example of a counter rotating double ended motor/generator.

The embodiments presented can be further extended to include multiple, concentric, background field producing, electromagnetic coils. The use of multiple concentric background coils creates a series of concentric paths around which the driving or generating windings can traverse. As with the previously described dual internal and external paths this use of multiple concentric stages can increase the rated power or power density of the device and alternatively be configured to result in counter-rotating operation as a motor or generator. FIG. 45 shows an example of a device comprised of multiple concentric stages:

FIG. 45 shows an example motor/generator where there are two concentric layers of the double ended device can be configured to rotate in the same direction as shown in FIG. 46 or be configured to counter-rotate as shown in FIG. 47.

Further Discussion on Coil Geometry and Windings

The background field coils have been shown as racetrack style electromagnetic coils consisting of a number of windings. It should be noted that similar coil geometry could be used to achieve the same or better outcomes in terms field strength and pole to pole uniformity. Acceptable alternative geometries include coils with angled straight sections and helical or constant perimeter curved ends.

The driving or current carrying bars would most preferably consist of a number of windings rather than a single solid bar. While winding geometry where the zig-zag or coil geometry is somewhat wider than it is thick has proven to be advantageous in terms of reduced peak fields experience by the windings, the fact that these windings are illustrated with this geometry should not exclude the use of other aspect ratios in the driving or current carrying windings.

In the preferred embodiment of the devices shown in this document both the background field coils and the driving or generating paths consist of a number of windings of superconducting wire. This wire could be of a Low Temperature Superconducting (LTS) variety such as NbTi, Nb3Sn or MgB2 or a High Temperature Superconducting (HTS) wire such as BSCCO or YBCO. It would also be readily apparent to someone skilled in the art that either or both of these windings could readily be made from normal conducting material such a copper or aluminium.

In addition to the rectangular or square shape of the windings that is shown in the illustrations it should also be noted that the shape of the windings could easily be circular like a cable or any other desired shape and that such a shape may offer improvements:
- in the uniformity of the field strength of successive poles,
- in a reduction of the peak field seen by either set of windings, thereby reducing the amount of superconducting wire used,
- in the packing factor of the windings.

The illustrations of the various embodiments use 8 background field coils, creating a total of 16 poles. The number of coils should only be seen as indicative for the purposes of illustration. In a practical application of this technology the number of background field coils and poles depends on a number of factors:
- The size of the device—larger devices (wind turbine generators, ship motors) are more suited to a higher number of background field coils (10 coils is typical). Smaller devices have geometry constraints that prevent a large number of adjacent background coils.
- The optimum number of coils given the magnetic field experienced by the wire. It has been found that a larger number of coils operating a lower peak magnetic field in the coils is more efficient from a wire usage perspective than a smaller number of coils operating a higher field.
- The frequency of the required output or input—a higher number of background coils results in a higher operating frequency for a given RPM. This operating frequency is an optimisation exercise between the requirements of the driver circuit or load and the desire to reduce the operating frequency to reduce the AC losses of the superconducting or normal conducting windings.

Start-Up Considerations

Several approaches can be taken to mitigate the potential torque 'dead-zone' during start up where the rotating components start in a region of reduced magnetic field. These approaches include:
- A clutch that decouples the load from the device during start up and engages an external starter motor.
- The uses of multiple phase windings for the driving or generating paths.
- Progressively switching on the background field coils during the starting sequence to create a mismatch of the number of stator and rotor poles.

A Discussion on Rotating and Stationary Components

The rotating machines (motors and generators) described have:
- a rotating and a stationary component or,
- a rotating and a counter-rotating component or,
- a combination of rotating and counter-rotating and stationary components.

In the preferred embodiment the driving or generating path remains stationary while the background field electromagnetic coils rotate. While the reverse scenario with moving driving or generating windings and stationary background field coils is also perfectly acceptable the advantage of the preferred embodiment is that the higher currents that are constantly reversing polarity in the driving or generating coils do not have to be transmitted via a sliding contact or brush, reducing electrical losses in the device.

On the other hand if there is application requirement that the spinning mass of the device be reduced to allow for rapid stopping, starting, acceleration and deceleration there may well be an advantage in spinning the driving or generating path instead of the background field coils. In this case the design of the machine should favour a larger number of windings in the background field coils and a commensurate reduction in the driving or generating path windings.

The operating direction of the machines presented in this document can be reversed by a reversal of the current direction in the background field coils or driving/generating path windings.

While the images and descriptions in this document have presented the designs in terms of rotating electrical machinery it would be obvious to anyone skilled in the art that the principles presented could be applied to linear machines as well as rotating devices.

Replacing the Zig-Zag Outer Windings with Racetrack-Style Coil Windings.

In the previous embodiments the outer driving/generating path was shown as a series of zig-zag windings. In a variation of these embodiments the zig-zag windings are replaced by racetrack style coils connected in series or parallel for the purposes of generating or motoring.

A key observation is that it is straight section of the racetrack coil or zig-zag winding, that is, aligned with the axis of rotation of the machine, which is the primary driving or generating element. The interconnecting windings at either end of the device can be made in any manner that transmits current in the correct direction to the subsequent driving/generating element. Ideally this interconnection should be made such that the peak field experienced by the windings is minimised, thereby minimising the length of the wire used by the device for a given power level.

Splitting the Racetrack Windings.

In this variation the racetrack windings in the device (both the previously described background field racetrack coils and the new driving/generating racetrack variation) can be split into two coils of opposite polarity. This means that where there previously existed one coil creating one direct pole and one interstitial pole there are now two coils of opposing current polarity each creating one pole. These poles are sequentially opposite in polarity when traversing the radial path around the surface of the windings.

The first advantage of splitting the racetrack coils is in the reduction in variations in the field (and hence variations in the output torque or generated power of the device) experienced by a current carrying bar traversing around the windings. By splitting the coils the field experienced by the traversing members is equal from one pole to the next. This equality produces a smoother delivery of output power, whether motoring or generating, resulting in a reduction in the amount of wire required for a given power level.

The second advantage pertains to the field dependence of the current carrying capacity of the superconducting wires. When using superconducting windings the current carrying capacity of the windings is limited by the peak magnetic field experienced by these windings. In the previously described single coil embodiment the peak field was usually found in the corners of the windings, towards the end of the working length. By splitting the windings into two racetrack coils the current transfer from one working length to the next is split between the two ends of the working length resulting in lower peak fields on the windings. This lower peak field results in a higher current capacity of the superconducting wire reducing the total amount of wire required for a given power level.

Figure 48:
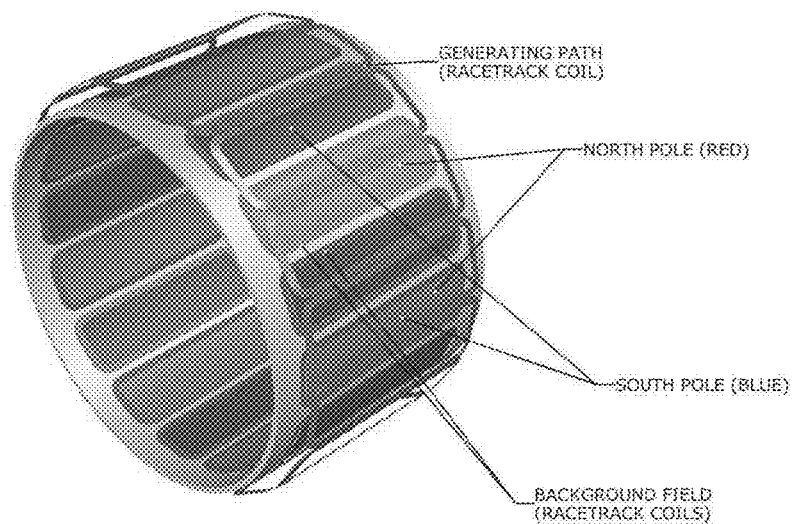
FIG. 48 shows two of the further variations to previously shown embodiments. The outer coils are racetrack style windings and are split to form sequentially alternate poles.

FIG. 48 shows two of the further variations to previously illustrated embodiments. The outer driving/generating windings are shown as racetrack coils. This version also incorporates the split coil arrangement such that the number of coils in either of the winding sets is equal to the number of poles with each coil sequentially reversing the magnetic field.

Figure 49:
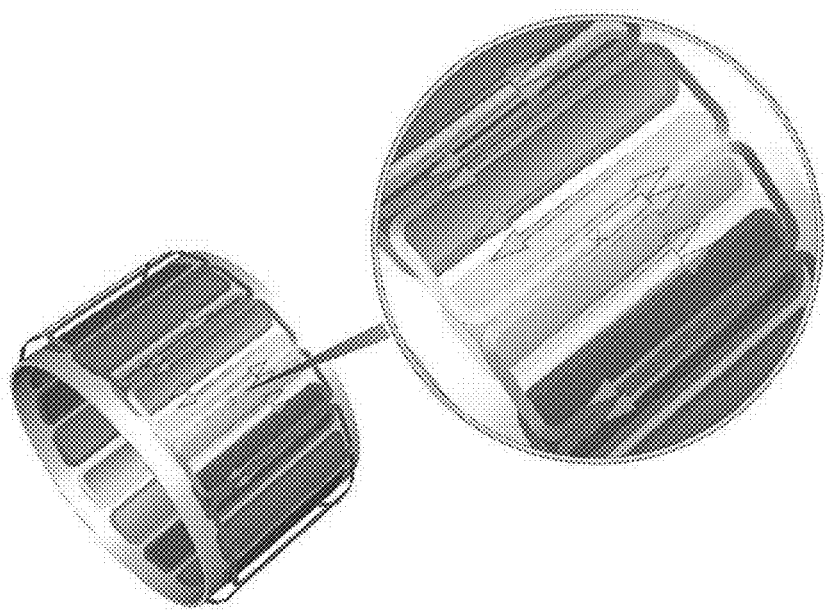
FIG. 49 highlights the relative direction of current flow between successive racetrack coils of the configuration illustrated in FIG. 48.

FIG. 49 highlights the relative direction of current flow between successive racetrack coils. Note that the direction in the outer windings is indicative as these windings are subject to alternating current (AC).

Concentric Racetrack Coil Geometry

The following describes a variation to the previously disclosed embodiments. This variation involves a further division of the racetrack coils such that they are arranged concentrically with a gap between the concentric racetracks.

Figure 50:
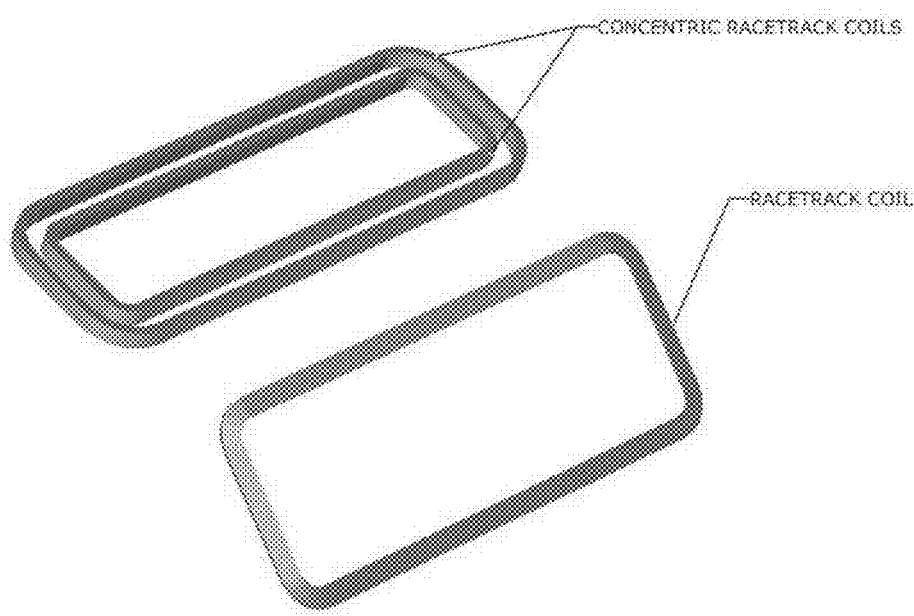
FIG. 50 shows both a conventional racetrack coil of type employed in the embodiment shown in FIG. 47 and an alternative, dual concentric racetrack coil.

FIG. 50 shows both a conventional racetrack coil of type employed in the embodiment shown in FIG. 48 and a dual concentric racetrack coil. The dual concentric racetrack coil geometry can reduce the required wire lengths for a given power level by 10-15%.

The following list describes potential embodiments using this variation:

Background field racetrack windings split concentrically (preferred).

Driving/generating racetrack windings split concentrically.

Both background field and driving/generating racetrack windings split concentrically.

Splitting of the racetrack winding into a series of concentric racetrack windings results in a lower peak magnetic field on the windings and lower usage of superconducting wire for a given power level. These concentric racetrack windings operate on the same voltage and current phase. The direction of current flow is the same for all coils in the concentric winding. The greatest reduction in wire use was seen in an embodiment where the background field windings were concentrically split without concentrically splitting the driving/generating windings. This preferred embodiment can reduce the length of superconducting wire used by 10-15%.

Figure 51:
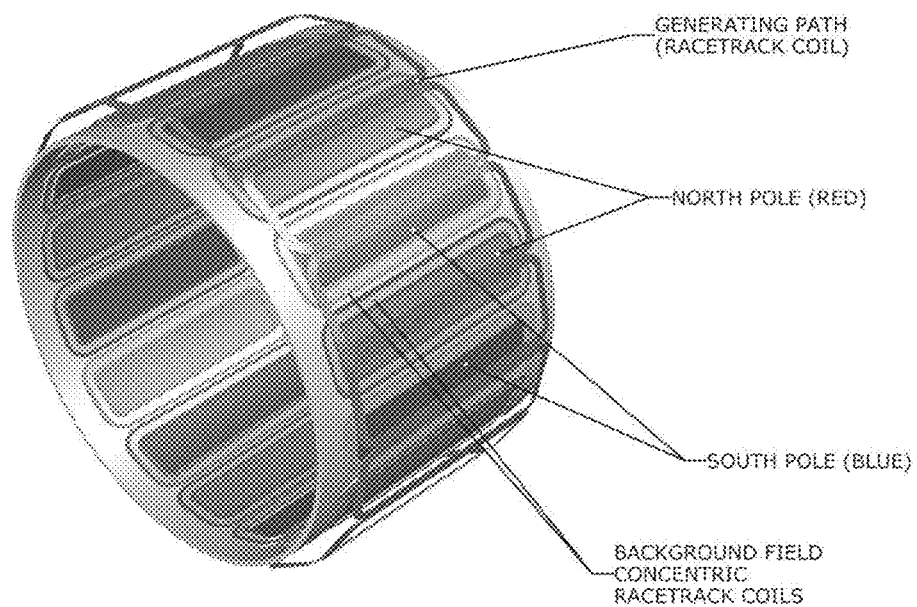
FIG. 51 shows the embodiment of FIG. 48 above but with the background field coils constructed from concentric racetrack coils.

FIG. 51 shows the embodiment of FIG. 48 above but with the background field coils constructed from concentric racetrack coils. The outer driving/generating coils are also racetrack coils as opposed to the zig-zag windings shown previously.

Figure 52:
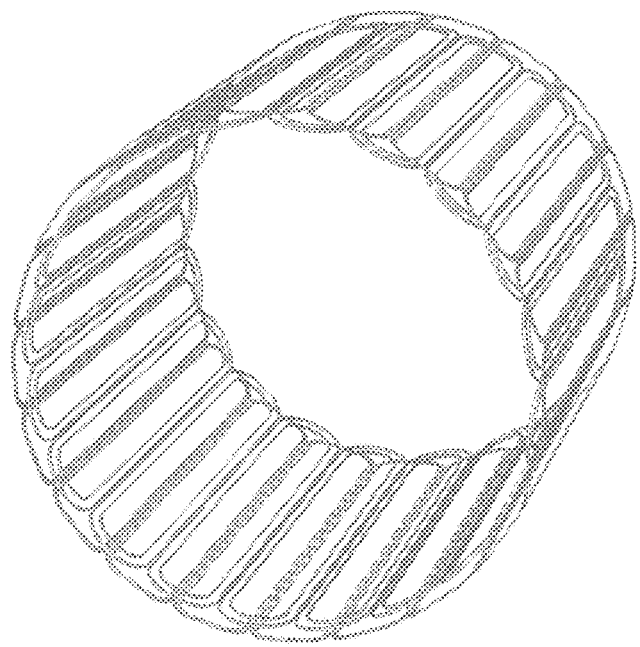
FIG. 52 shows the background field and driving/generating windings of the device shown in FIG. 51 where the inner background racetrack coils have been split concentrically.

FIG. 52 shows the background field and driving/generating windings of the device shown in FIG. 51 where the inner background racetrack coils have been split concentrically.

Figure 53:
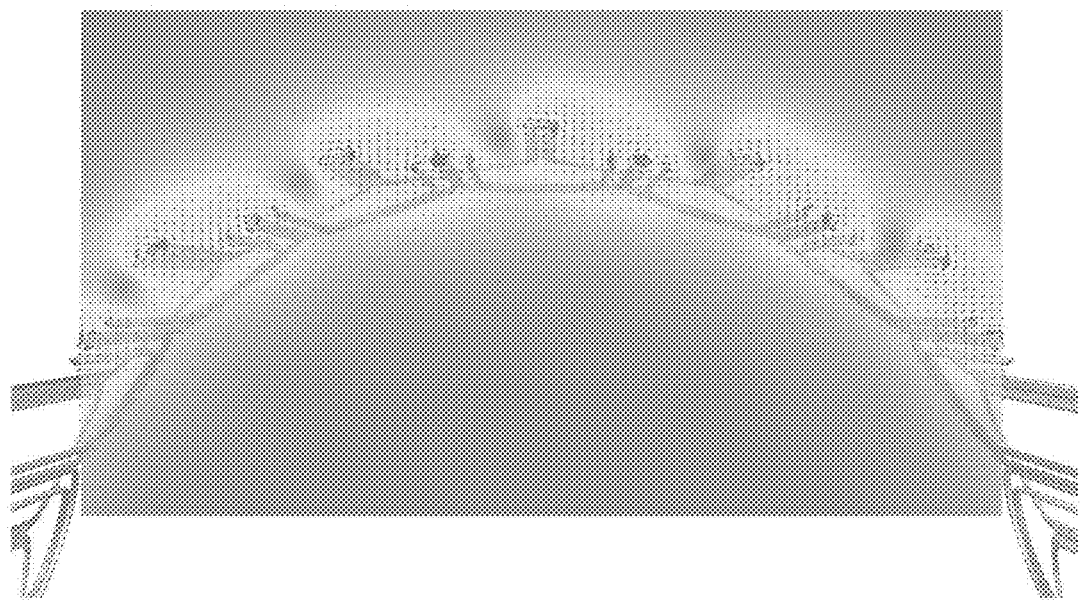
FIG. 53 shows a magnetic field plot of the device shown in FIG. 52 showing the interaction between the dual concentric background field coils and the driving/generating coils.

FIG. 53 shows a magnetic field plot of the device shown in FIG. 51 showing the interaction between the dual concentric background field coils and the driving/generating coils.

Figure 54:
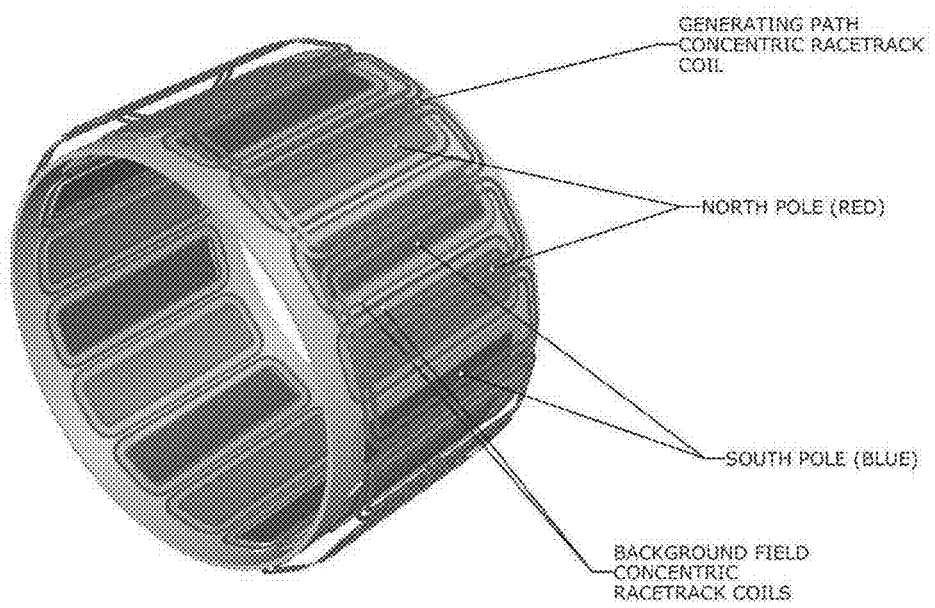
FIG. 54 illustrates a further embodiment of the device having both the background field creation windings and the driving/generating windings constructed using concentric racetrack coils.

FIG. 54 shows a further embodiment of the device has both the background field creation windings and the driving/generating windings constructed using concentric racetrack coils.

Further Improvements:

There is some advantage in constructing devices that are of increased diameter and reduced length when compared with square configurations where the diameter and length are equal and configurations where the length of the device is longer than the diameter. Over-square devices of the preferred type can result in reduced wire usage for a given output power. Please note that this preferred embodiment should be seen as an indicative trend and not a limitation of the type of devices for which protection is sought.

Further Variations on 3-Phase and Multi-Phase Embodiments:

One further variation related to the construction of 3 phase embodiments of the technology disclosed previously involves the use of bedstead shaped coils for the driving/generating windings. These coils are raised at the end of their 'working length', that is, at either end of the device in order to keep the working lengths of the driving/generating windings located on the same pitch circle diameter. This raised end or bedstead of the driving/generating coils are designed to minimise the peak magnetic field on the coils hence reducing the amount of superconducting wire used for a given power level.

The additional 3 phase embodiments presented in this document include some of the variations and improvements previously described, such as the use of split racetrack coils and constructing the background field coils as a set of concentric racetrack coils.

Figure 55:
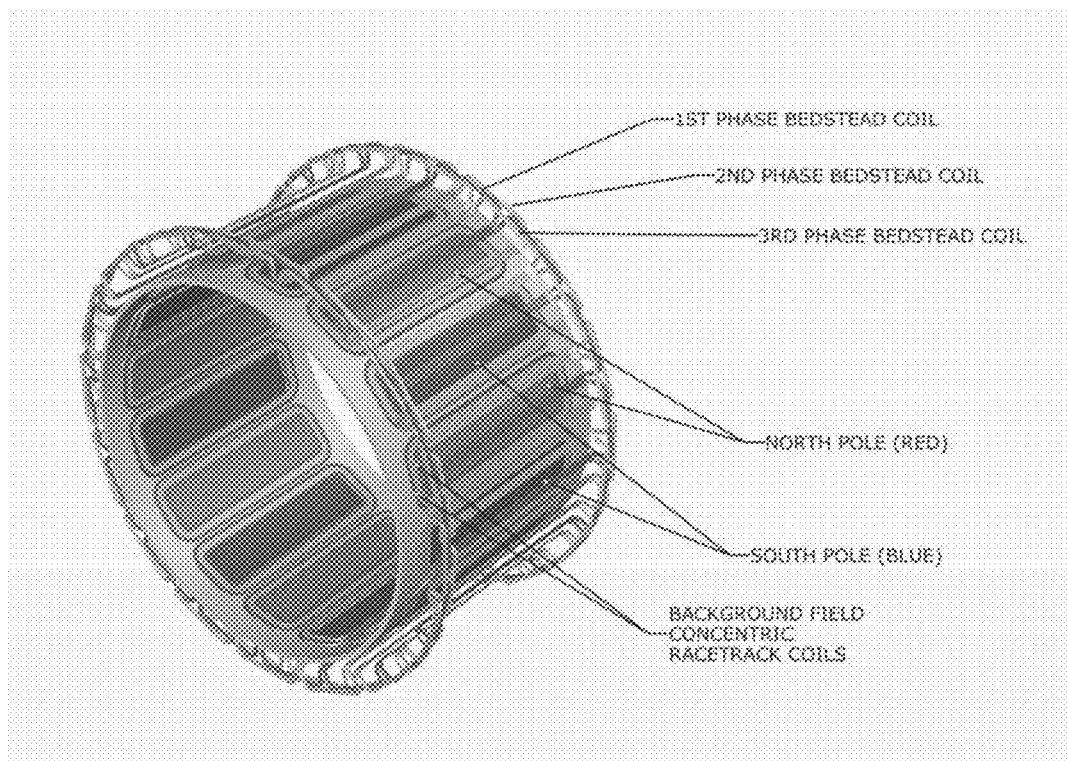
FIG. 55 shows an embodiment of a 3-phase device employing both dual concentric racetrack background field coil geometry and bedstead style driving/generating coils.

FIG. 55 shows an embodiment of a 3-phase device employing both dual concentric racetrack background field coil geometry and bedstead style driving/generating coils.

Figure 56:
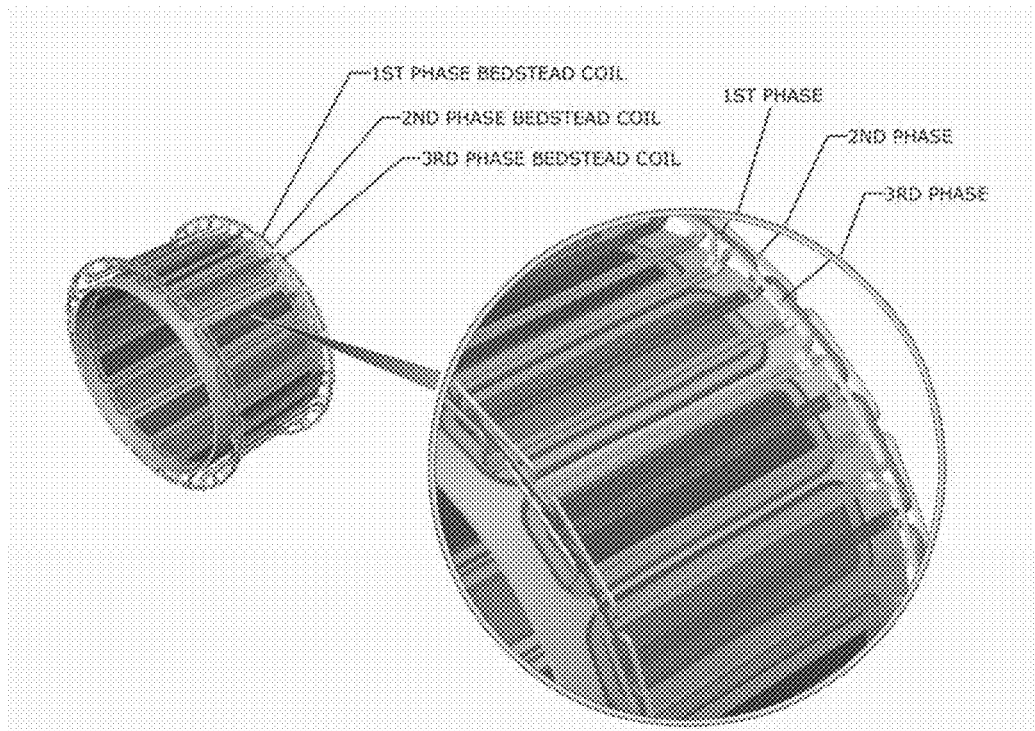
FIG. 56 shows the 3-phase device of FIG. 55 with an enlarged detail view of the bedstead-style multi-phase windings.

FIG. 56 shows the 3-phase device of FIG. 55 with an enlarged detail view of the bedstead-style multi-phase windings.

Figure 57:
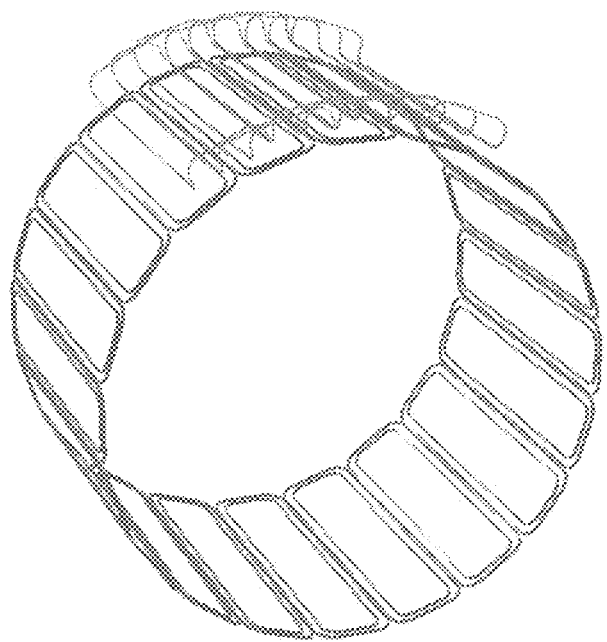
FIG. 57 shows the coil arrangement of an embodiment of a 3-Phase style motor/generator of the type shown in FIG. 55.

FIG. 57 shows the coil arrangement of an embodiment of a 3-Phase style motor/generator of the type shown in FIG. 55. The inner background field windings are dual concentric racetrack coils. Only a section of the outer driving/generating windings are shown (highlighted for clarity). These outer windings are formed from bedstead style coils.

Figure 58:
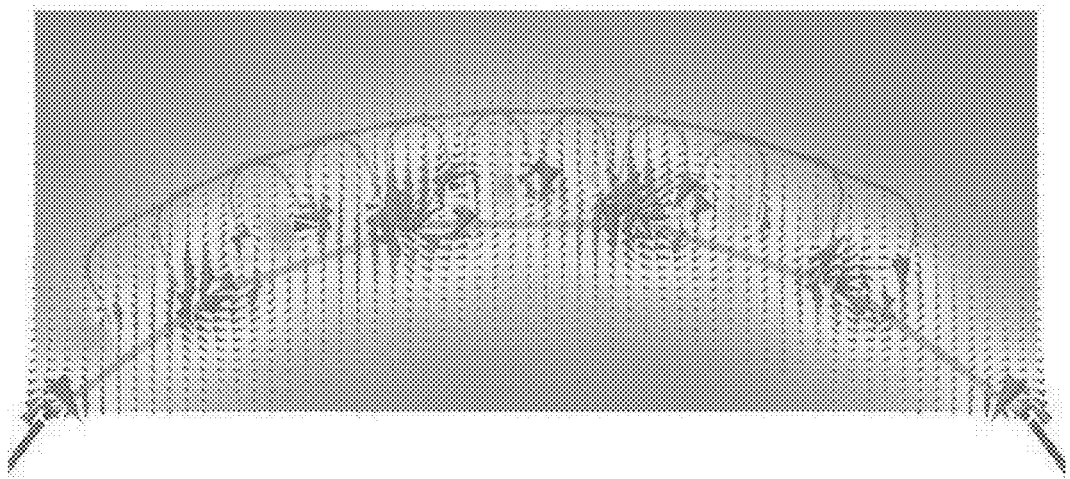
FIG. 58 is a magnetic field plot of the device shown in FIG. 55.

FIG. 58 is a magnetic field plot of the device shown in FIG. 55. The field plot shows the interaction of the magnetic field created by the background field coils and the 3-phase driving/generating windings.

In a further variation to the previously shown devices it is possible to construct a version of the All Pole Drive in which the strength of the magnetic field around the outside of the driving windings is equal or greater than the strength of the background field produced by the background field windings. In this device the driving windings would produce a large force on the current carrying windings, thereby increasing the power and/or efficiency of the device.

The inventions and variations disclosed in this document also concern the production of mechanical work from an input of electrical voltage and current (motors) or the production of electrical voltage and current from the application of mechanical work (generators). The motors and generators based on the devices disclosed are collectively known as Guina Toroidal Drives.

The motors/generators consist of a rotating part (rotor) and a stationary part (stator). In the devices disclosed the primary function of the stator is to provide a high strength background magnetic field in which the rotor rotates. The rotor can be powered with a current that changes direction in concert with the relative change in magnetic field direction of the background field (that is, as the rotor moves from one magnetic pole to the next) in the case of a motor. In the case of a generator the movement of the rotor results in the generation of an alternating voltage and current.

The basic elements of the Toroidal Drive are a set of background field windings or permanent magnets that are toroid shaped and a set of rotor windings. This shape of coils/magnets contains the bulk of the magnetic field within the cross section of the toroid itself. The rotor windings are placed inside the cross section of the toroid and operate within this contained field.

Figure 59:
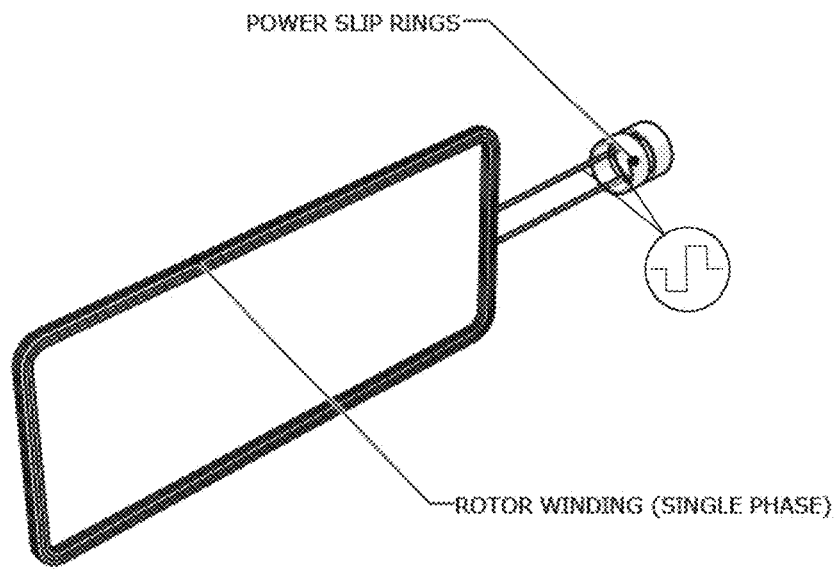
FIG. 59 is a simple embodiment of the rotor windings for a toroidal drive device according to an embodiment of the present invention.

The simplest embodiment of a rotor winding consists of a single racetrack style coil that consists of multiple windings of superconducting or normal conducting material. The windings sit within the toroidal stator with the power delivered to or taken from the windings via a pair of input and output slip rings. The winding is mounted on bearings on a mechanical shaft allowing it to rotate. The shaft and power delivery/extraction connections necessitate a gap in the side windings of the stator. The simplest embodiment of this single phase rotor is shown FIG. 59.

Figure 60:
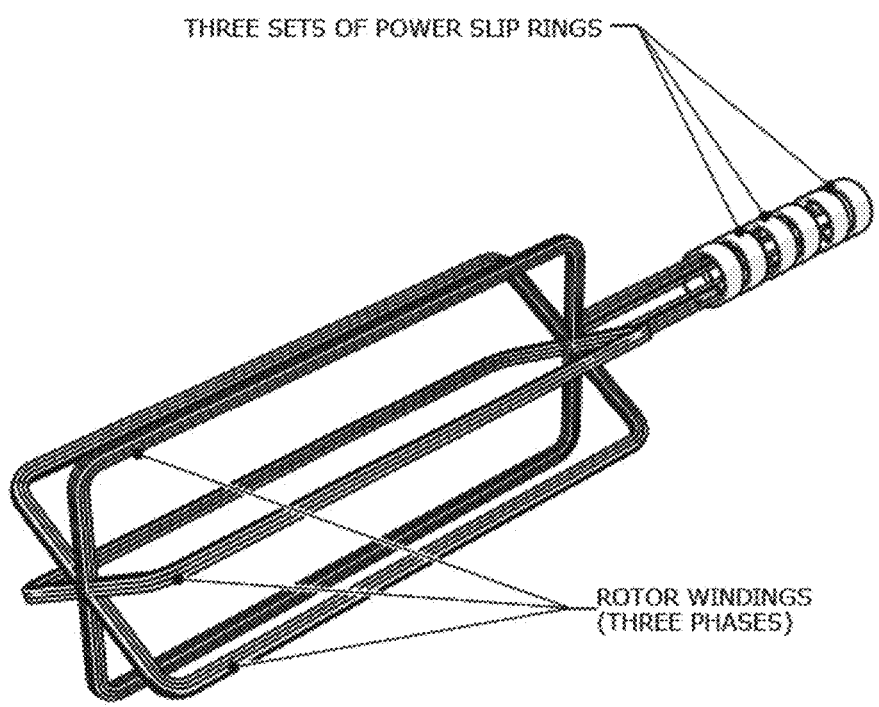
FIG. 60 shows a three phase embodiment of the rotor windings for a toroidal drive device.

The toroidal windings/magnets create a magnetic field where the field lines substantially flow concentrically about the operating radius in a round toroid or parallel to the walls of the winding in the case of a square or squared-off toroid. The rotor windings generally experience two magnetic poles per rotation. This means that torque and power delivery can be made far more consistent by employing multiphase windings that consist of independent rotor windings that have their own set of power slip rings. The alternating current in each of the windings leads or lags the other windings in proportion with the angle of separation between them. An embodiment consisting of three independent phases is shown FIG. 60.

The individual per phase windings can be wound in series or in parallel so as to produce a desired combination of operating voltage and current.

Figure 61:
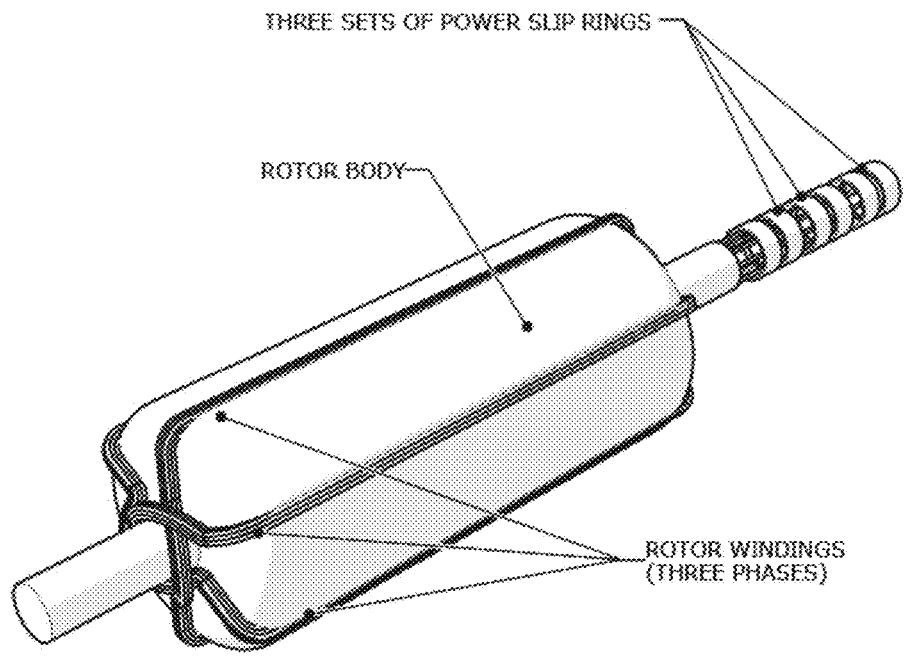
FIG. 61 shows the three phase rotor windings of FIG. 60 with the supporting structure of the rotor body and the power transmission shaft.

The rotor windings experience torque and as such must also have a mechanical support as well as a connecting shaft about which the rotor rotates and through which power is delivered (see FIG. 61).

FIG. 61 shows three phase rotor windings with the supporting structure of the rotor body and the power transmission shaft. The windings are shown displaced about the end of the shaft.

Figure 62:
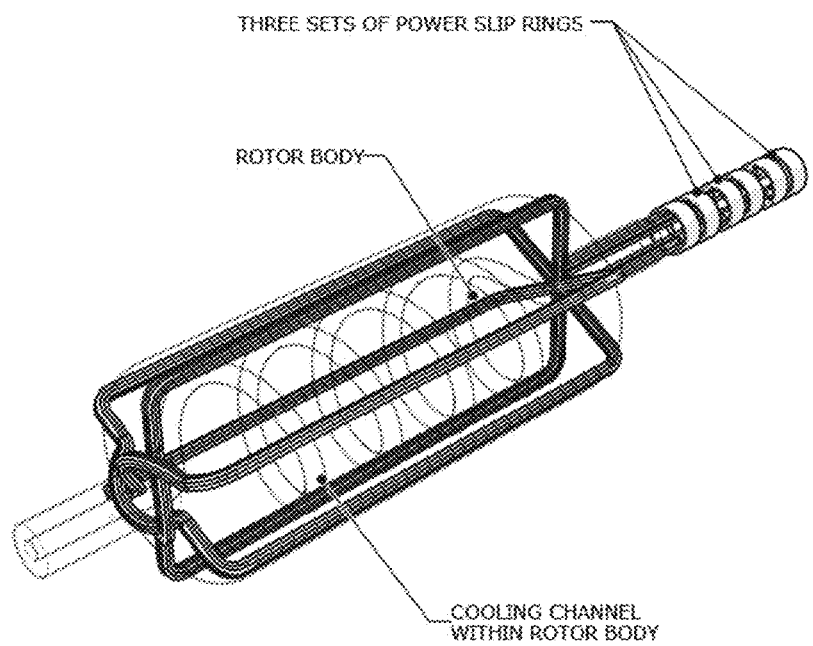
FIG. 62 shows a multiphase rotor assembly with a cooling channel.

The windings can be made from normal conducting material, such as copper, or from superconducting material. The use of superconducting material in the rotor windings requires a rotating cryostat in order to bring the temperature of the winding material down to the point at which a superconducting state is achieved.

Where normal copper windings are used the power density of the devices can be increased through the use of higher copper current densities and forced air or water/oil cooling. An example of a rotor assembly that incorporates a cooling channel through which coolant can be pumped is shown in FIG. 62. The cooling channel allows liquid cooling and correspondingly higher current densities in the rotor windings.

It is possible to fit a number of individual, multiphase rotor assemblies within the one toroidal stator. This allows the power density of the device to be increased significantly for a given amount of stator windings/magnetic material. In a preferred embodiment the rotors are arrayed on a pitch circle diameter about the central axis of the toroidal stator.

In this preferred embodiment the background magnetic field traverses about this central axis, largely contained within the toroidal stator. A single field line can be envisaged as travelling through each of the rotor assemblies in succession around the toroid. In this manner the magnetic field is employed more than once in the generation or delivery of power and the magnetic field is substantially contained within the motor/generating device.

Figure 63:
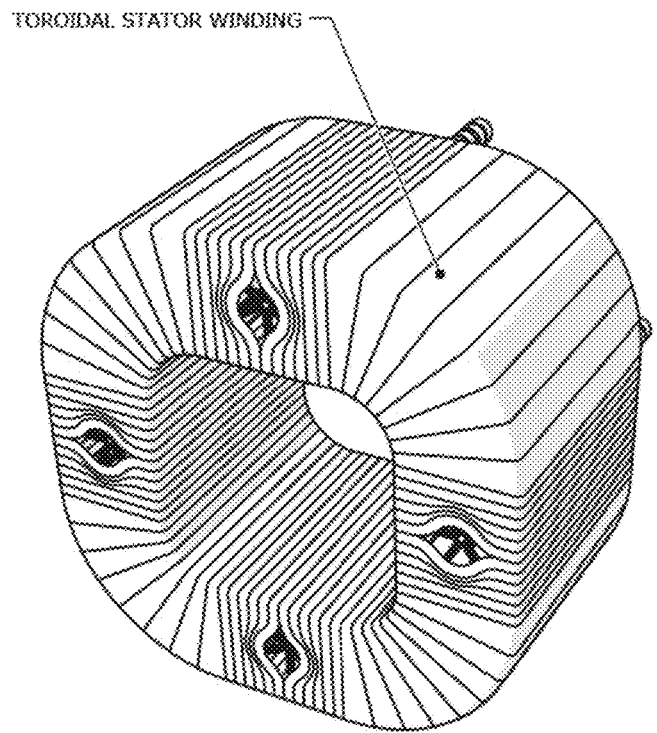
FIG. 63 shows a square toroidal set of background field stator windings.

FIG. 63 shows a square toroidal embodiment of the stator windings. The windings are gapped either side to accommodate the mechanical and electrical outputs of the rotors.

Figure 64:
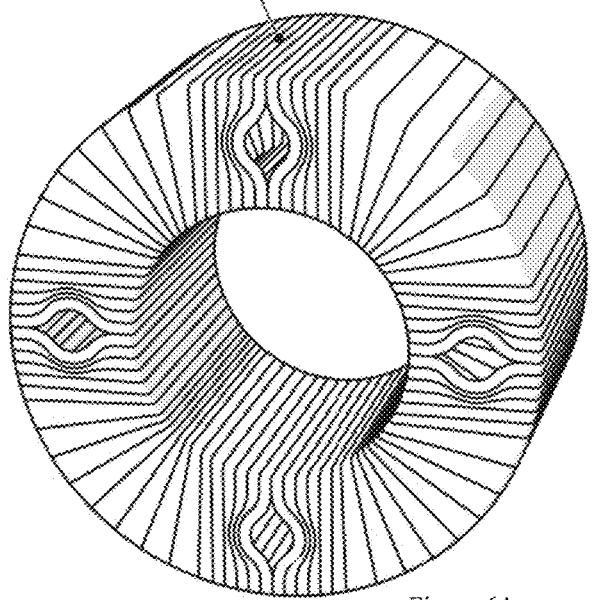
FIG. 64 shows a variation on the stator windings shown in FIG. 63 in which the stator is constructed from circular toroidal windings.

Alternatively the stator windings/assembly can be constructed as a round or circular toroid. FIG. 64 shows a variation on the stator windings shown in FIG. 63 in which the stator is constructed from circular toroidal windings. In general, the true circular windings produce less stray magnetic field outside the toroid.

Figure 65:
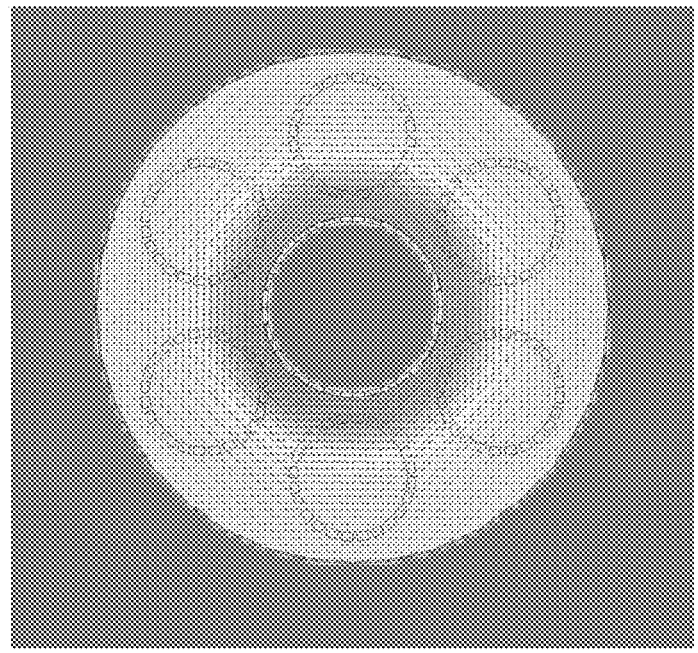
FIG. 65 shows a plot of the magnetic field produced by a toroidal style stator such as that illustrated in FIG. 64.

The square toroid and, to a slightly greater extent, the circular toroids produce a magnetic field that travels around the inside of the toroid windings. The field is largely contained with the toroidal stator windings. FIG. 65 shows the field plot from a circular toroidal winding with six rotor assembly windings included for reference. The magnetic field traverses around the inside of the stator assembly and is contained within the stator.

Figure 66:
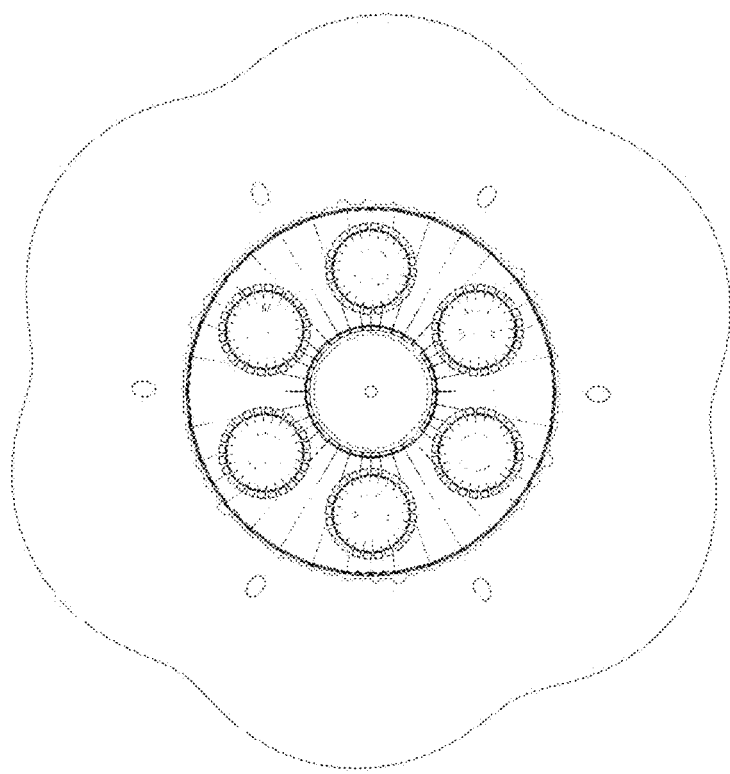
FIG. 66 is a field plot showing the 200 Gauss and 5 Gauss field limits in a device as illustrated in FIG. 65.

The field plot illustrated in FIG. 66 shows the field boundaries of the 200 Gauss (pink) 5 Gauss (blue) limits. For completeness the field contribution of the rotor windings has been included.

The stator and rotor assemblies are combined to produce the Toroidal Drive motors and generators. An embodiment of the toroidal stator and multiple rotors is shown in the FIG. 67 incorporating square toroidal stator windings and four sets of multiphase rotor windings situated within the toroidal stator.

Figure 67:
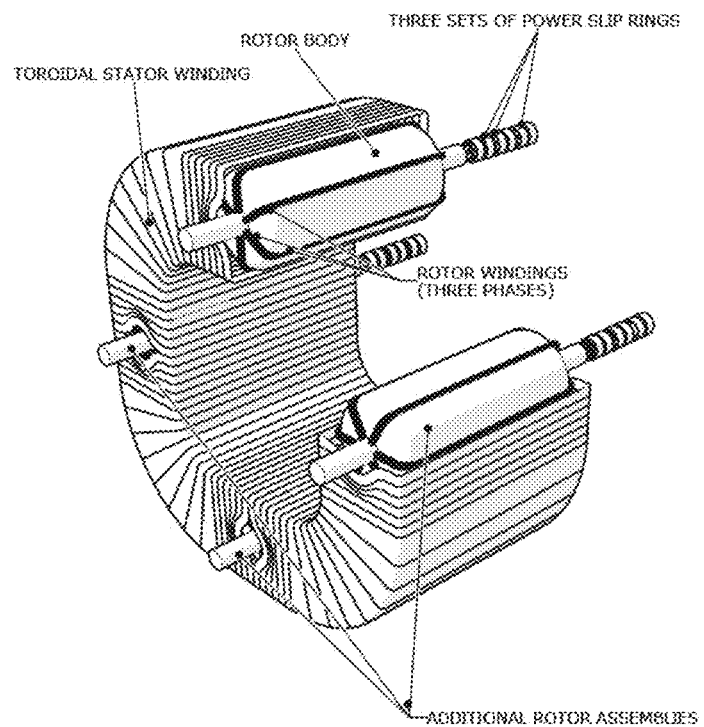
FIG. 67 shows a three quarter sectional view of toroidal device incorporating square toroidal stator windings and four sets of multiphase rotor windings situated within the toroidal stator.

While FIG. 67 shows the stator elements as rectangular coil windings in a square toroid arrangement it is important to note that:

- The arrangement of the coils could be a round toroid rather than a square toroid.
- The coils could be replaced by permanent magnets arrayed to produce a similar toroidal field profile.
- The cross section of the coils does not necessarily have to be rectangular, coils with a circular cross section could also be employed provided that sufficient clearance is left for the rotor windings.

Figure 68:
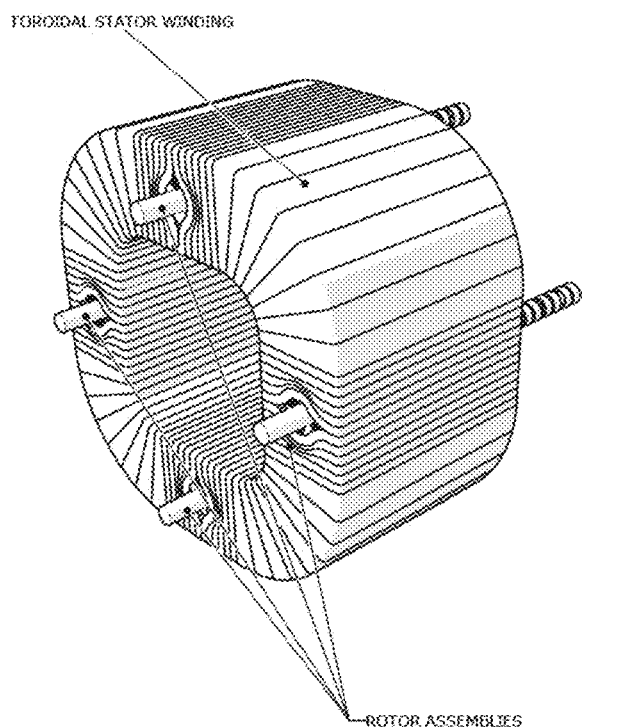
FIG. 68 is a complete view of the device shown in FIG. 67 showing how each of the rotor assemblies are encased within the toroidal stator.

FIG. 68 shows a complete view of the device shown in FIG. 67 showing how each of the rotor assemblies is encased within the toroidal stator.

In a preferred embodiment the multiple rotor assemblies are combined into a single mechanical input or output through a planetary gear connection to a central rotating shaft. An example of this planetary gear connection is shown in the following FIG. 69 and FIG. 70. The gear ratio shown in these figure is a 1:1 ratio however a step up or set down gear ratio can be employed to give the desired rotor or final drive speed. The final gear ratio could be produced directly with a central gear and pinion arrangement, through a use of a gear train, inline planetary gearbox or a combination of these gearbox arrangements.

Figure 69:
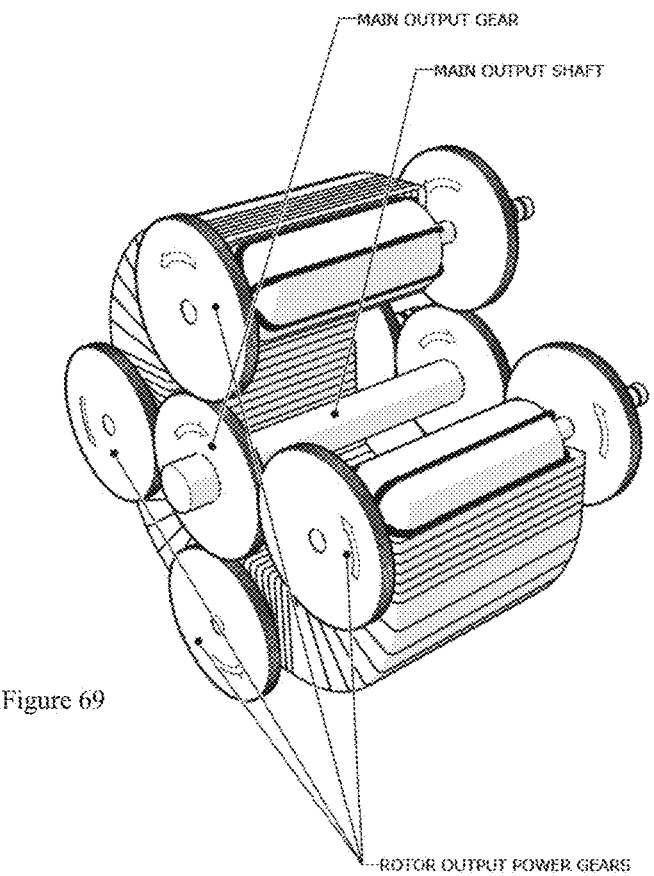
FIG. 69 is a sectional view of a toroidal drive of a preferred embodiment showing the connection of the four individual rotor assemblies to a central power input/output shaft via a system of planetary gears.

FIG. 69 shows a sectional view of the Guina Toroidal Drive showing the connection of the four individual rotor assemblies to a central power input/output shaft via a system of planetary gears.

Figure 70:
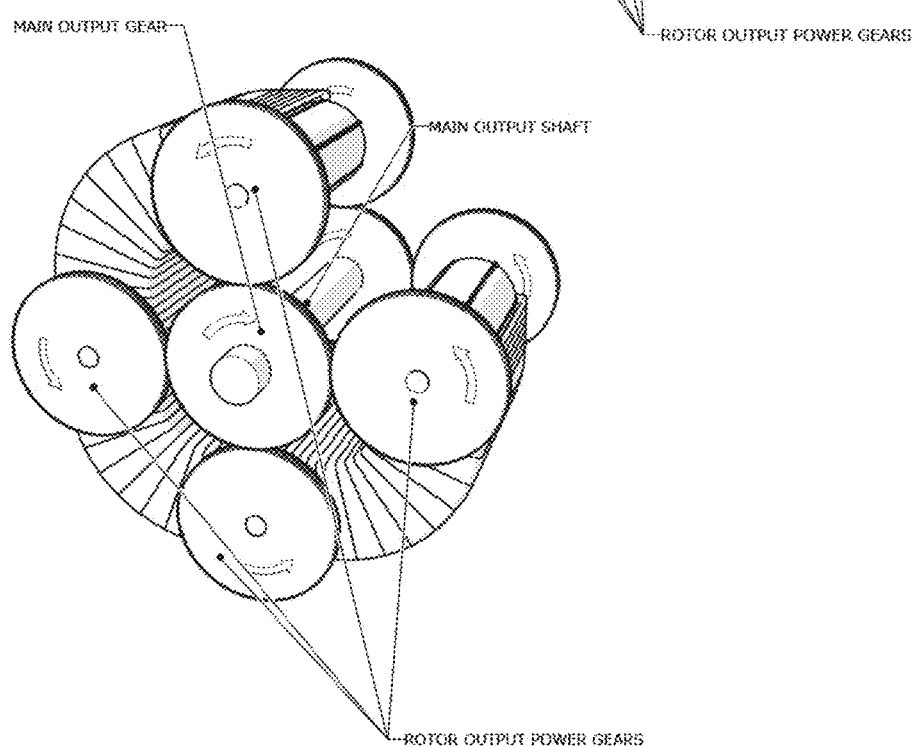
FIG. 70 is an alternative view of the device shown in FIG. 69 highlighting the relative direction of rotation of the planetary and main shafts.

FIG. 70 shows an alternative view of the device shown in FIG. 69 highlighting the relative direction of rotation of the planetary and main shafts.

Figure 71:
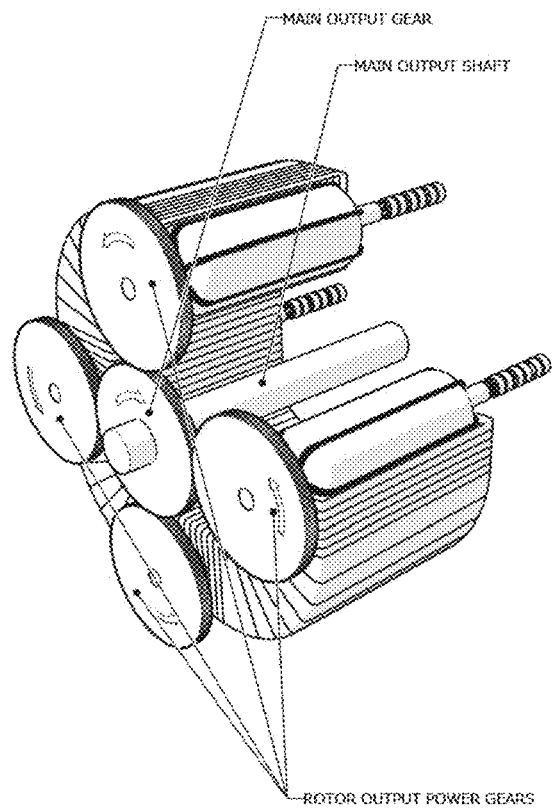
FIG. 71 shows a toroidal drive with four rotor assemblies in which the torque is transmitted to/from the rotor assemblies via one end of the mechanical shaft only.

The devices shown previously in FIG. 69 and FIG. 70 have the gears mounted at both ends of the mechanical shafts of the individual rotor assemblies in order to share the torque out between two ends of the shaft. In an alternative embodiment the torque is transmitted via one end of the rotor shaft only as shown in FIG. 71.

The following figures show different embodiments of the Toroidal Drive that incorporate different construction materials for the background field producing toroidal stator and for the rotor. These embodiments are indicative only and should not be seen as limiting in terms of either physical arrangement or the combination of superconducting, normal conducting and permanent magnetic material that can be used to create a motor/generator.

Figure 72:
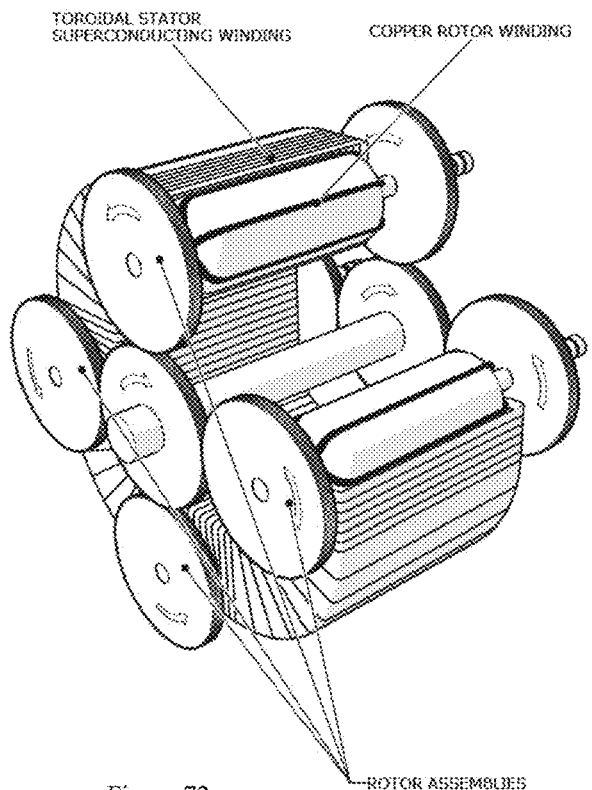
FIG. 72 shows an embodiment incorporating a toroidal stator made from superconducting windings in order to create a high strength background magnetic field.

FIG. 72 shows an embodiment incorporating a toroidal stator made from superconducting windings in order to create a high strength background magnetic field. The rotor windings are made from copper wire.

Figure 73:
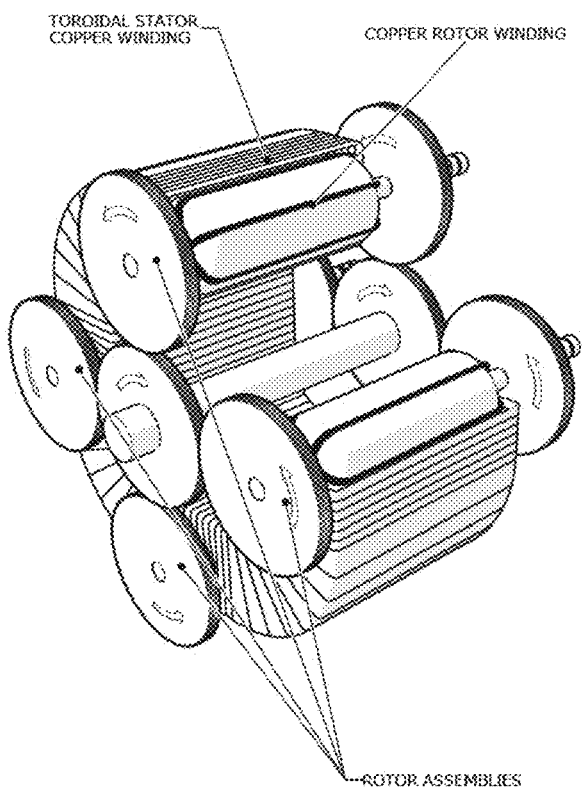
FIG. 73 shows an embodiment incorporating a toroidal stator made from normal conducting copper windings in order to create the background magnetic field.

FIG. 73 shows an embodiment incorporates a toroidal stator made from normal conducting copper windings in order to create the background magnetic field. The rotor windings are also made from copper wire.

Figure 74:
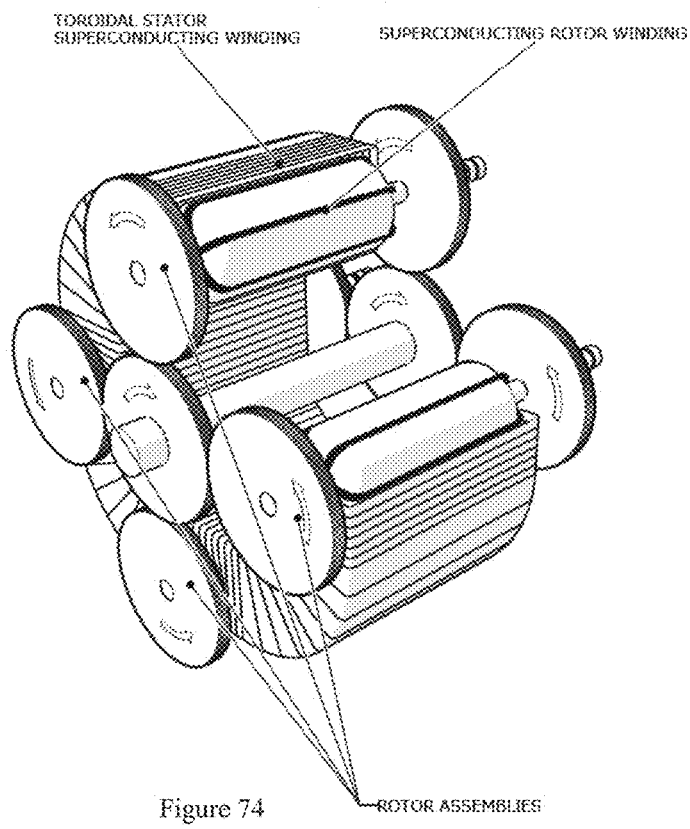
FIG. 74 shows an embodiment incorporating a toroidal stator made from superconducting windings in order to create a high strength background magnetic field and superconducting rotor windings to increase the power/torque of the device.

FIG. 74 shows an embodiment incorporates a toroidal stator made from superconducting windings in order to create a high strength background magnetic field. The rotor windings are also made from superconducting wire or tapes.

Equal and Opposite Fields

In a further variation to the previously shown devices it is possible to construct a version of the Toroidal Drive in which the strength of the magnetic field around the outside of the rotor windings is equal or greater than the strength of the background field produced by the stator. In this device the rotor winding would experience a large force reaction, increasing the power and/or efficiency of the device.

Figure 75:
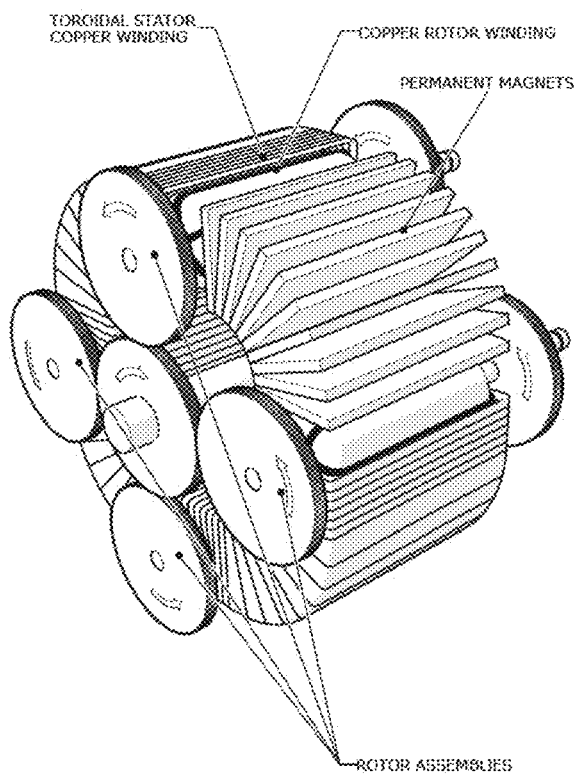
FIG. 75 shows an embodiment incorporating a hybrid toroidal stator made from both normal conducting copper windings and permanent magnetic material in order to create the background magnetic field.

FIG. 75 illustrates an embodiment incorporating a hybrid toroidal stator made from both normal conducting copper windings and permanent magnetic material in order to create the background magnetic field. The rotor windings are also made from copper wire.

In addition to the above FIG. 75 which shows a hybrid stator construction using permanent magnetic material and additional copper windings, it is possible to construct a toroidal stator using only permanent magnetic material or a combination of permanent magnetic material and magnetically permeable material such as iron or steel.

Figure 76:
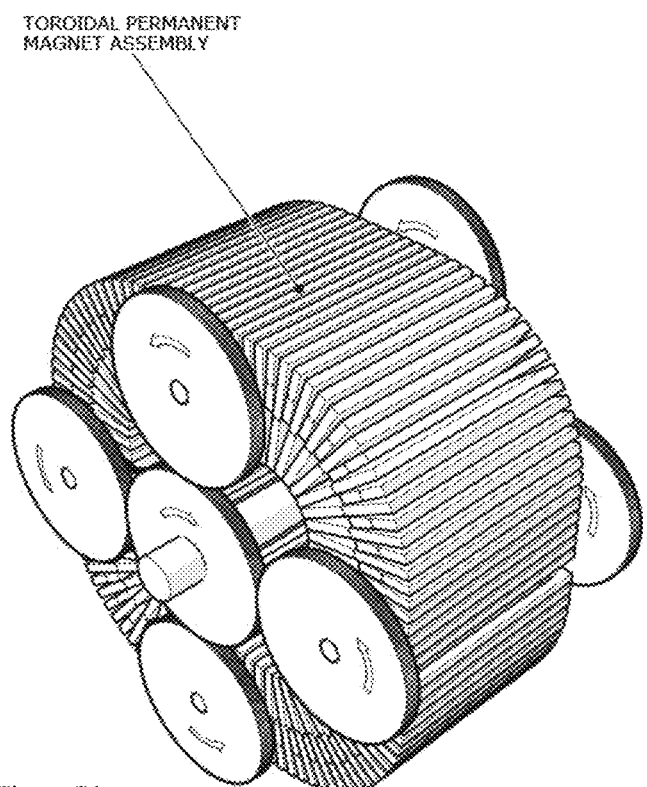
FIG. 76 shows a variation of the toroidal drive in which the toroidal stator is constructed of an assembly of permanent magnets.

FIG. 76 shows a variation of the Toroidal Drive in which the toroidal stator is constructed of an assembly of permanent magnets.

Figure 77:
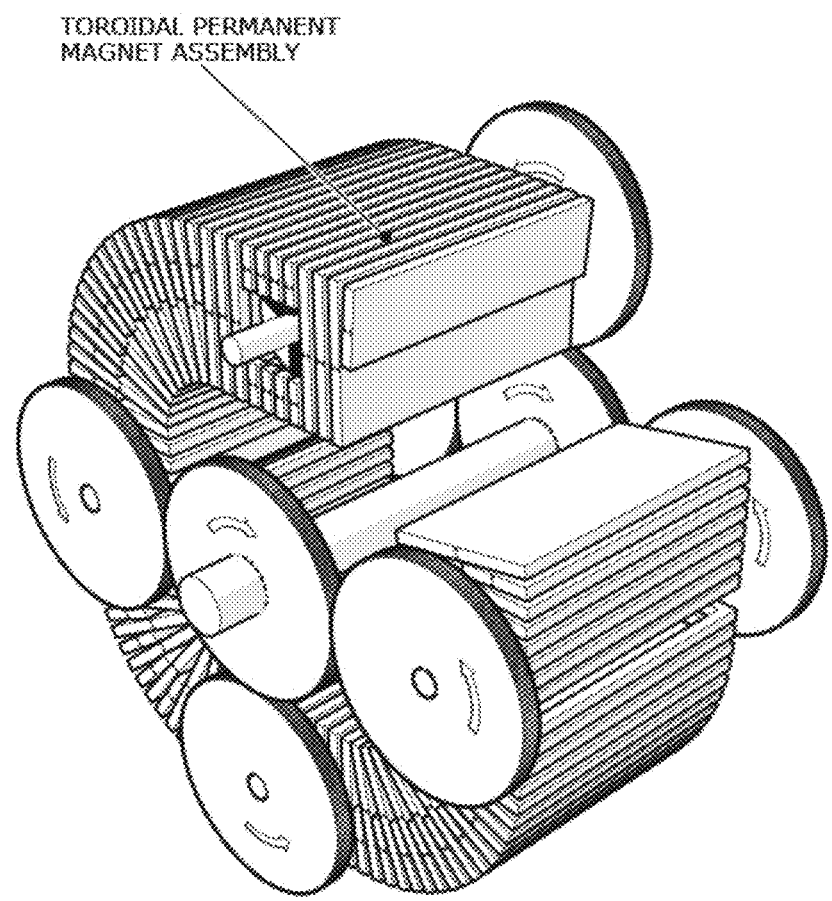
FIG. 77 is a three-quarter sectional view of the device shown in FIG. 76.

In FIG. 77, the toroidal stator is constructed from permanent magnetic material. Additional guiding of the magnetic field is achieved via the placement of smaller interstitial permanent magnets in the corner sections of the stator toroid. These smaller interstitial magnets are shown more clearly in the following FIG. 78.

A three-quarter sectional view of the device shown in FIG. 76 is provided in FIG. 77. In this implementation the stator toroid consists of a series of plate style permanent magnets that are magnetised through their thinnest dimension. Smaller interstitial magnets are employed at the corners to aid in guiding the flux to the rotor assemblies. The magnets surrounding the rotor assembly are cut away so as to physically accommodate the rotor.

Figure 78:
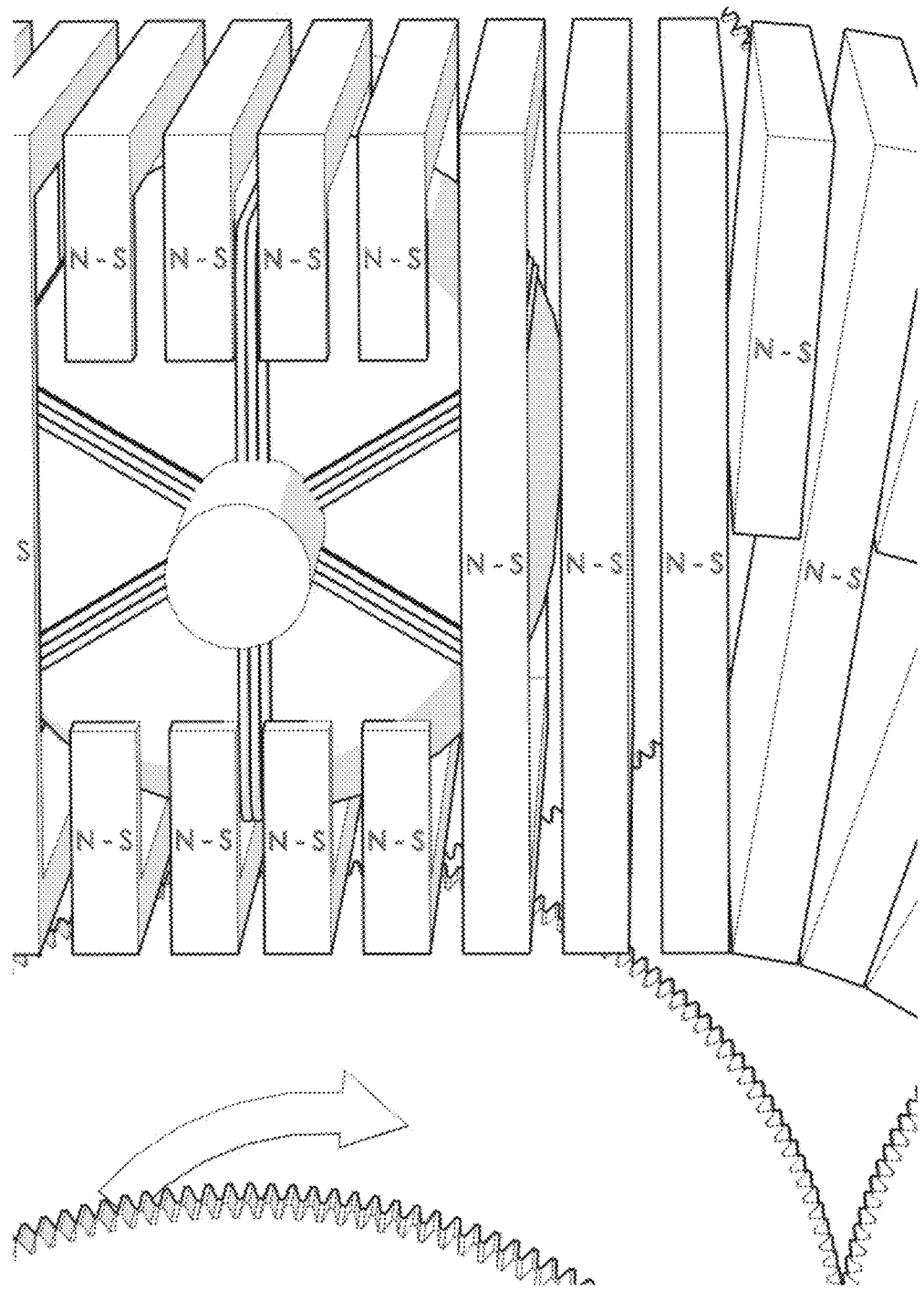
FIG. 78 is a detailed view of the device shown in FIG. 77 showing the magnetisation of successive elements of the toroid.

FIG. 78 is a detailed view of the device shown in FIG. 77. This view shows the direction of magnetisation and the regions in which the permanent magnetic material has been removed in order to accommodate the rotor assembly.

Figure 79:
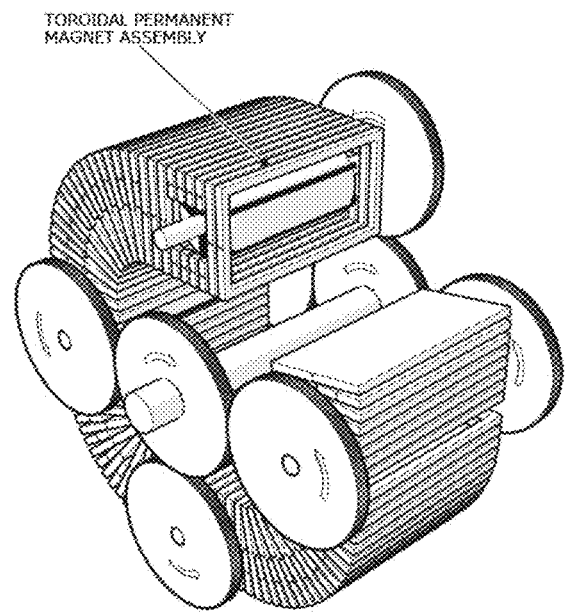
FIG. 79 is a three quarter sectional view of the device shown in FIG. 76.

FIG. 79 shows a three quarter sectional view of the device shown in 75. This view shows the regions in which the permanent magnetic material has been removed in order to accommodate the rotor assembly.

Further investigation showed that there was a significant advantage in removing as little magnetic material as possible close to the rotor assemblies allowing the preservation of a high strength magnetic field close to the rotor windings. Additionally it was found to be better not to have the magnetic material completely encapsulating the rotor assemblies. The additional material outside the rotor radius and at either end of the rotor tended to direct the bulk of the magnetic field away from the rotor windings thereby reducing the power of the device.

Finally a significant increase in the power of the device was achieved by introducing a cylindrical permanent magnet that sits inside the rotor windings. This internal magnetic mass is polarised in line with the magnets shown in FIG. 78 and remains stationary relative to the rotor. Each of these advances is shown embodied in FIG. 80. The magnet material surrounding the rotor assembly now closely follows the external contour of the rotor assembly, increasing the power of the device. The magnetic material that forms the stator toroid interconnect between the individual rotors has been hollowed in order to reduce the weight of the device.

The internal stationary permanent magnetic mass necessitates a concentric shaft arrangement where the mechanical power transmission occurs via an outside sleeved shaft, with an inner shaft providing static support for the internal magnetic mass.

Figure 80:
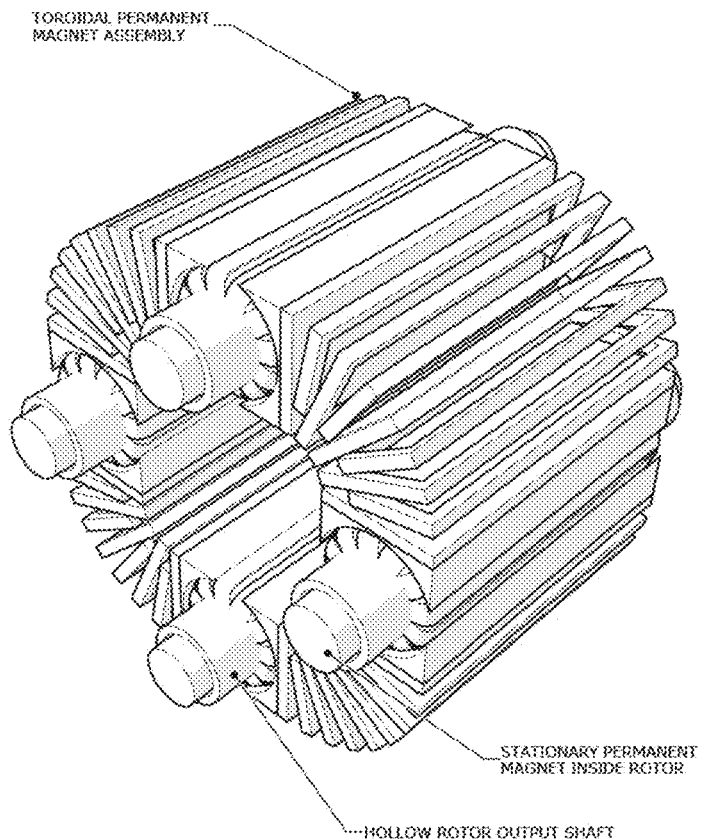
FIG. 80 illustrates a further embodiment of the toroidal drive utilising a toroidal stator constructed from permanent magnetic material.
Figure 81:
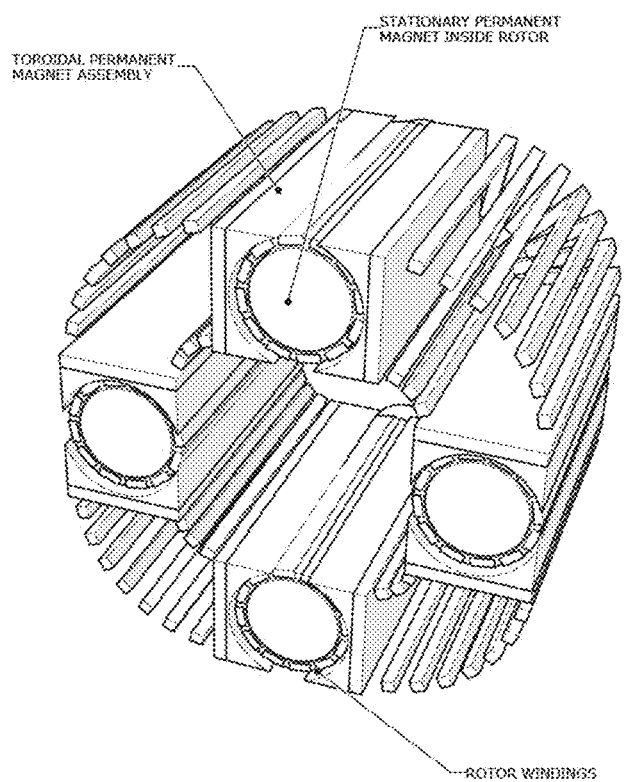
FIG. 81 is a sectional side view of the device shown in FIG. 80.

FIG. 81 is a sectional side view of the device shown in FIG. 80. The cut away shows how the rotor windings encase another cylindrical mass of magnetic material. This additional magnetic mass is stationary and helps to guide the magnetic field such that is perpendicular to the rotor winding, thus increasing the power of the device.

Figure 82:
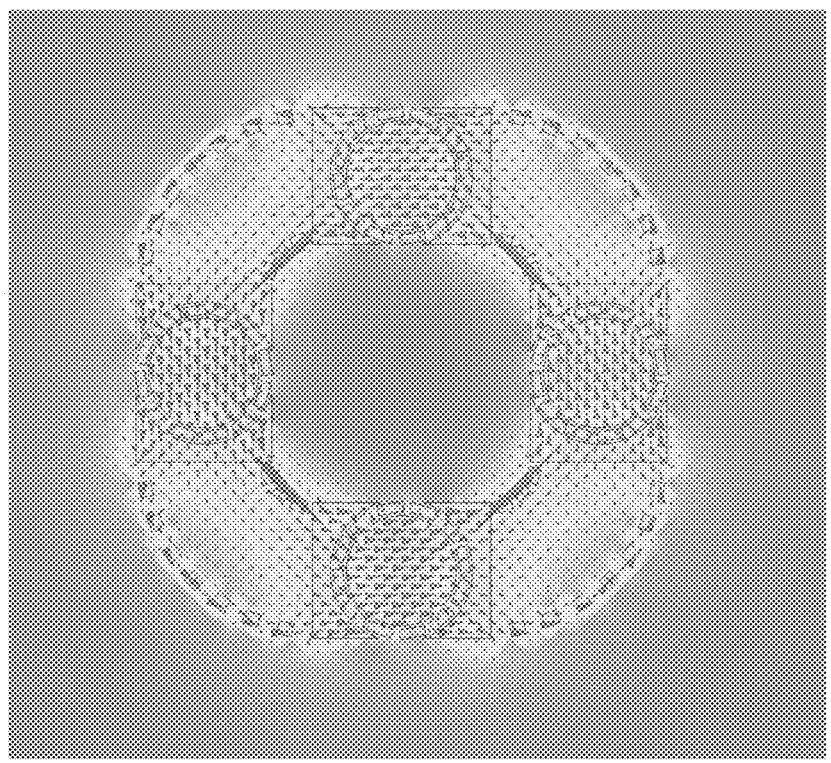
FIG. 82 is magnetic field plot of the embodiment of the permanent magnet device shown in FIG. 80.

The primary effect of the additional magnetic mass stems from attraction of the field coming out of and going to the magnetic masses either side of the rotor assembly. This attraction intensifies and straightens the magnetic field relative to the rotor windings resulting in a significant increase in the power of the device. A magnetic field plot of the device in FIG. 81 is shown in the following FIG. 82.

Figure 83:
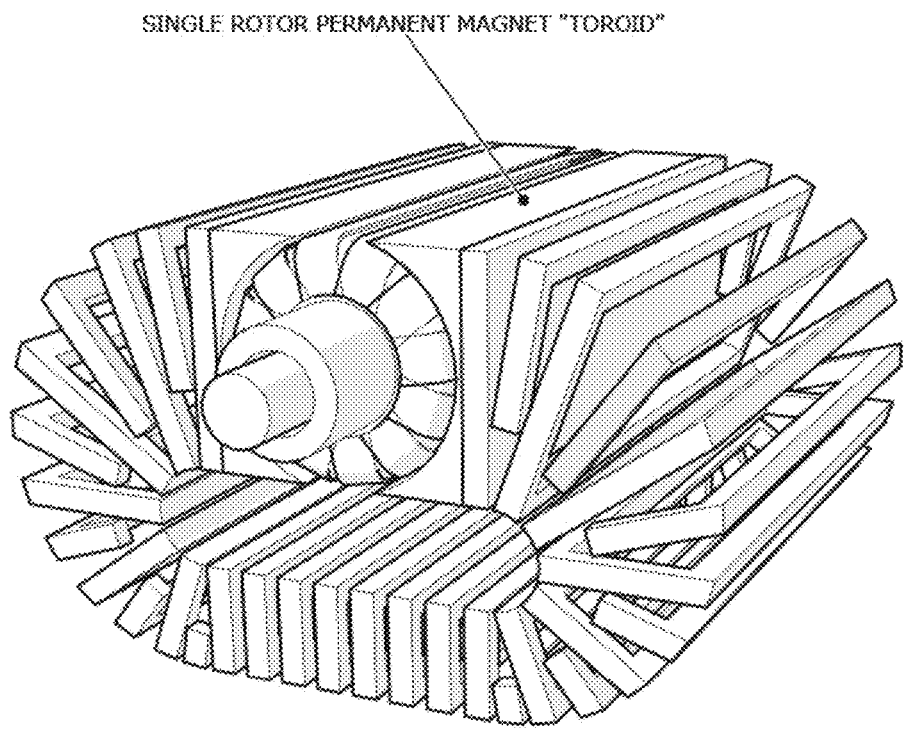
FIG. 83 shows an alternative variation of the embodiment shown in FIG. 80.

A further variation on the four rotor device shown in FIG. 80 incorporates a single rotor assembly and a reduced toroid-style return path. An embodiment of this variation is shown in FIG. 83. The device shown is based around a single rotor assembly with an oblong field permanent magnet assembly to contain and return the background magnetic field.

This single rotor variation has the advantage of not requiring a gearing system to the final power transmission shaft. The reduced toroidal return path is used to contain the background magnetic field of the device.

Figure 84:
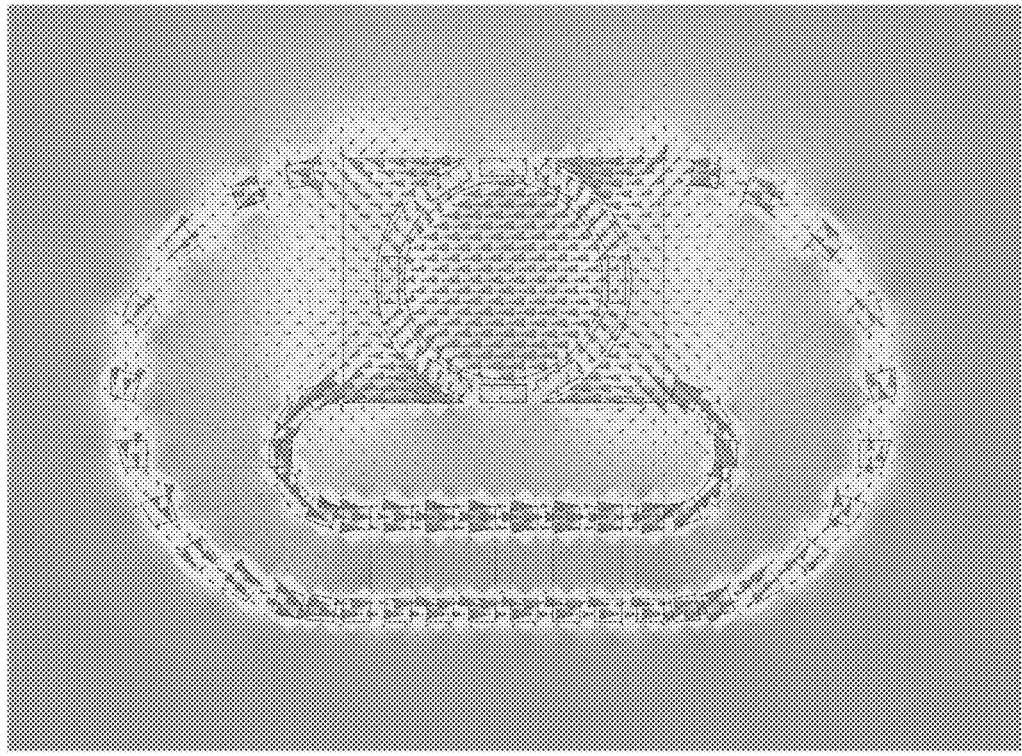
FIG. 84 is a magnetic field plot of the single rotor permanent magnet Toroidal drive shown in FIG. 83.

FIG. 84 shows a magnetic field plot of the single rotor permanent magnet Toroidal Drive shown in FIG. 83.

It is important to note that the rotor windings of the devices shown here could readily be constructed as normal conducting windings for ease of construction or as superconducting windings for increased power density.

While the embodiments shown have had the stator sections constructed entirely from permanent magnetic material, sections of the toroid could readily be constructed from magnetically permeable materials such as steel or iron. Candidates for construction from magnetically permeable material include the corners of the toroid that interconnect the rotor assemblies and the material that is placed inside the rotor assembly. The replacement of key components with magnetically permeable material will likely have a penalty in both power level and weight but there may be some cost savings over the exclusive use of permanent magnetic material.

Figure 85:
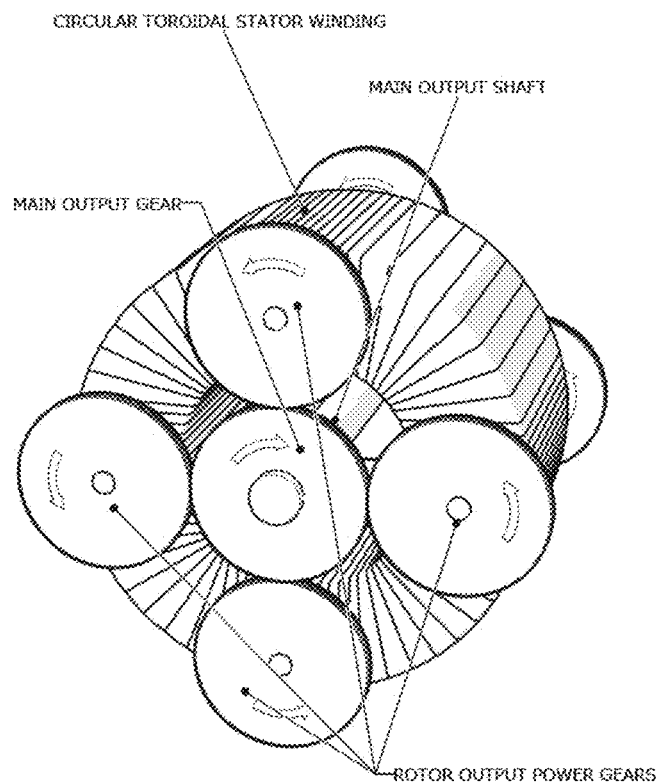
FIG. 85 shows a toroidal drive with 4 rotor assemblies with a circular or round toroidal background field stator.

In addition to the square toroid background field stators used in the previously shown embodiments, the background field stator coils can also be readily constructed in a circular or round toroidal shape as shown in FIG. 85. In a general sense, the use of a square toroidal stator produces a marginally higher power output for a given amount of stator material at the expense of a greater 'leakage' of the magnetic field in comparison with the round toroidal stator. The improved containment of the round toroidal stators is seen in the reduction of the 5 Gauss and 200 Gauss magnetic field boundary lines around the device.

FIGS. 85 to 93 show embodiments of the Toroidal Drive in which the background field stators have been constructed as circular or round toroids.

FIG. 85 shows a Toroidal Drive with 4 rotor assemblies with a circular or round toroidal background field stator.

Figure 86:
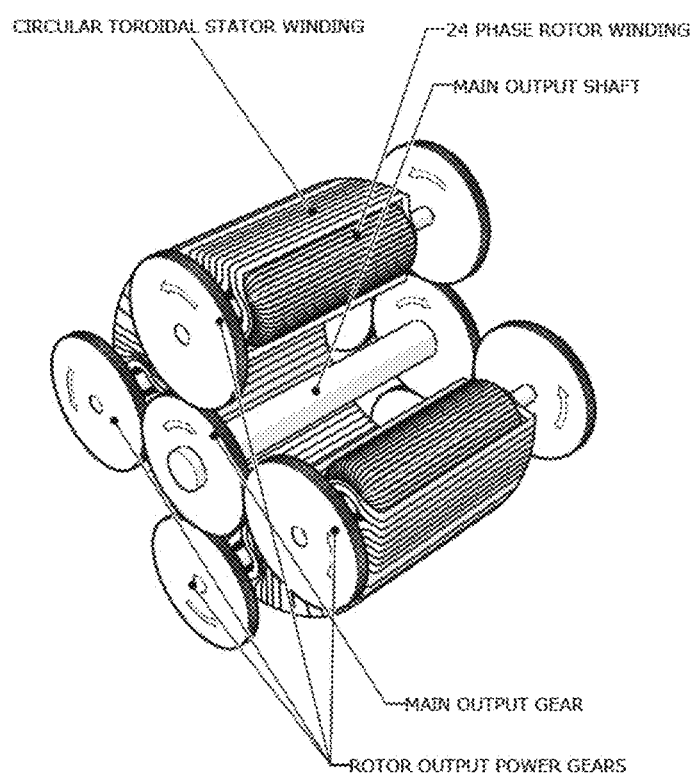
FIG. 86 shows a three-quarter sectional view of the embodiment shown in FIG. 85 with 4 Rotor assemblies and with a circular or round toroidal background field stator.

FIG. 86 shows a three-quarter sectional view of the embodiment shown in FIG. 85 with 4 rotor assemblies and with a circular or round toroidal background field stator.

The number of rotor assemblies that can be placed around the background field stator is mainly limited by the mechanical and clearance limitations of the individual rotor assemblies. In the case of the previously shown square toroidal background fields the number of straight sides in the background field increases with an increase in the number of rotor assemblies.

Figure 87:
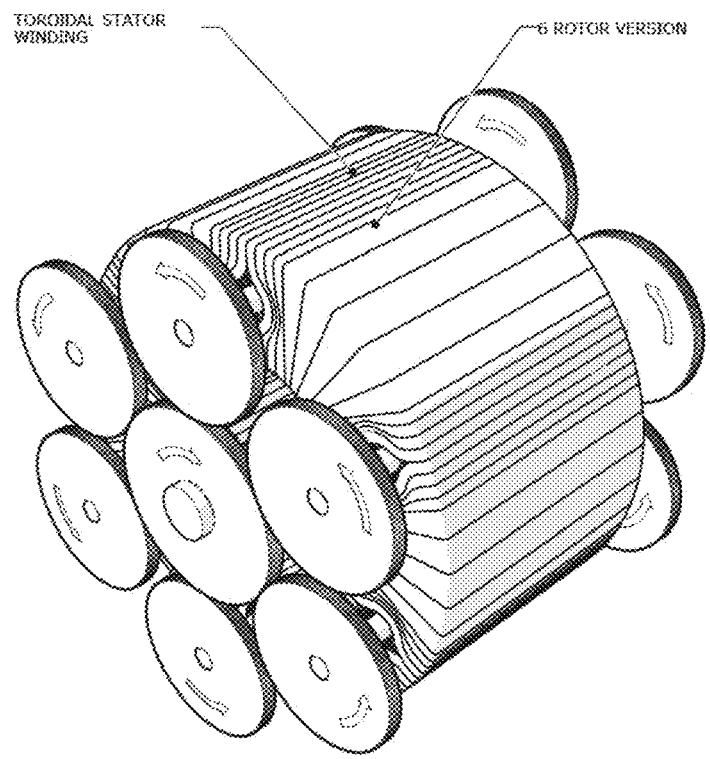
FIG. 87 shows an embodiment of a toroidal drive that has 6 rotor assemblies with a circular or round toroidal background field stator.

FIG. 87 shows an embodiment of a Toroidal Drive that has 6 rotor assemblies with a circular or round toroidal background field stator.

Figure 88:
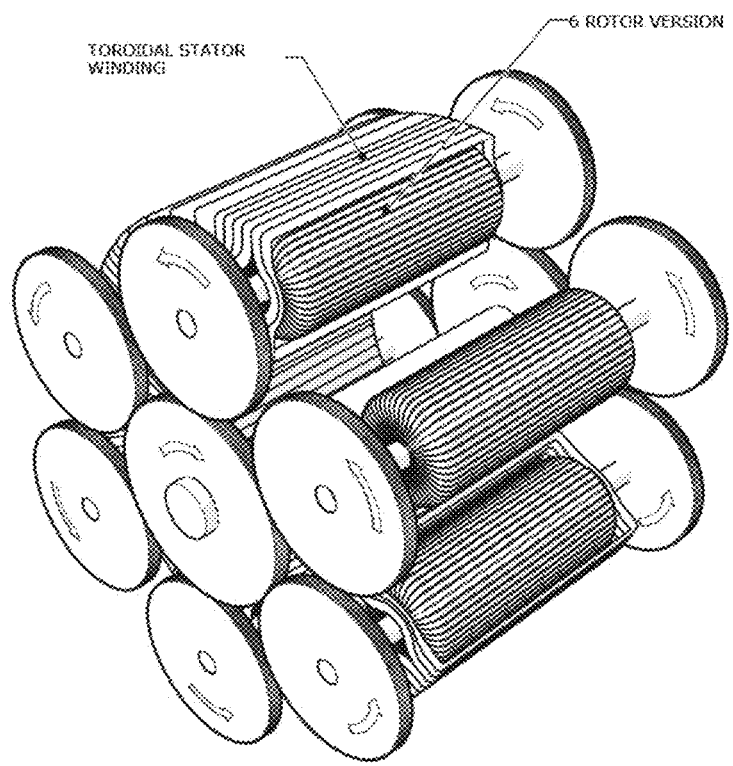
FIG. 88 is a two-thirds sectional view of the embodiment with 6 rotor assemblies shown in FIG. 87.

FIG. 88 shows a two-thirds sectional view of the embodiment with 6 rotor assemblies shown in FIG. 87. Again a circular or round toroidal background field stator has been employed.

Figure 89:
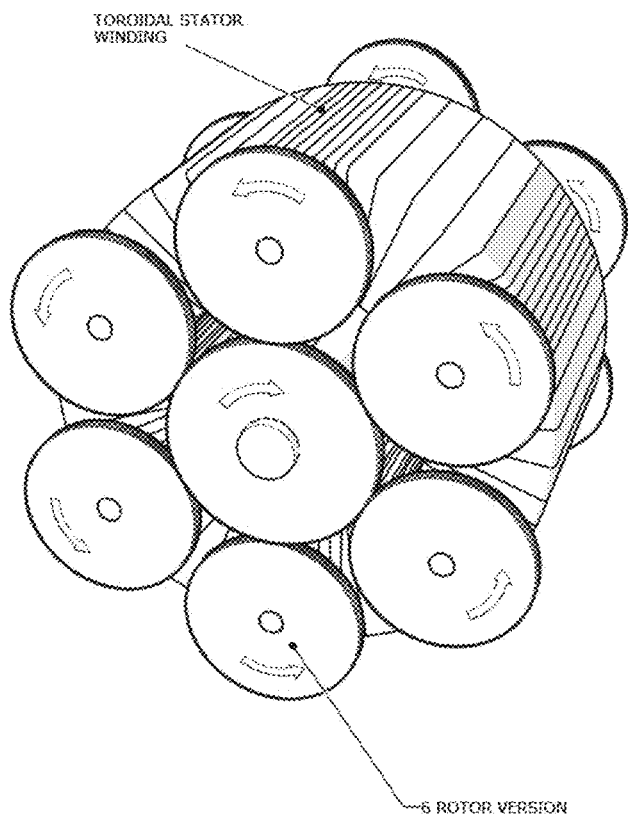
FIG. 89 is an alternative view of the embodiment with 6 rotor assemblies shown in FIG. 87.

FIG. 89 is an alternative view of the embodiment with 6 rotor assemblies shown in FIG. 87. The relative direction of rotation of the main shaft and the individual rotor shafts has been indicated with arrows.

Figure 90:
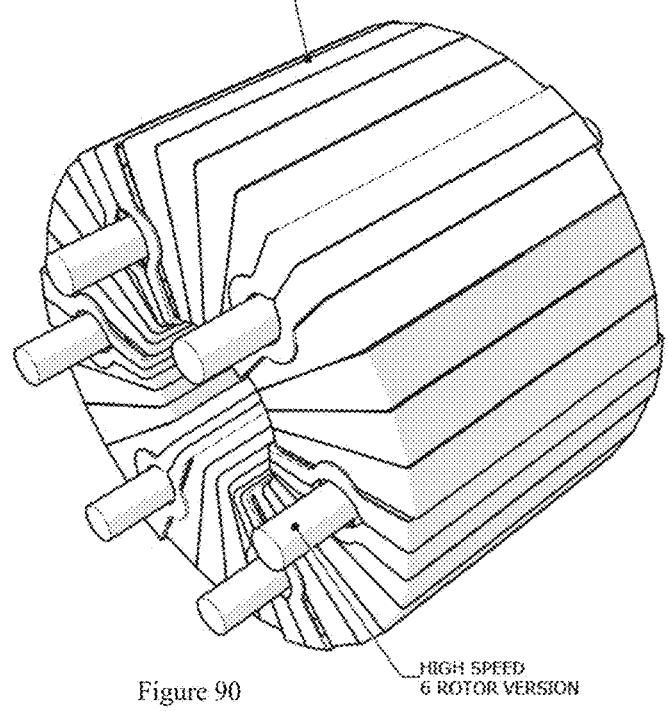
FIG. 90 shows a toroidal drive motor/generator with a circular toroidal stator and six rotor assemblies.

FIG. 90 shows a Toroidal Drive motor/generator with a circular toroidal stator and six rotor assemblies. The device is designed for high speed operation and incorporates superconducting stator windings and copper rotor windings.

The embodiment shown in FIG. 90 incorporates 6 rotor assemblies into a circular toroid style stator that is wound from superconducting material. This device is a high speed, power dense implementation of the toroidal drive motor/generator. The windings that distort either side of the power transmission shafts are offset a distance from the face of the bulk of the superconducting toroidal windings in order to reduce the peak field experienced by the superconducting windings and increase the power density of the device for a given amount of superconducting material.

Figure 91:
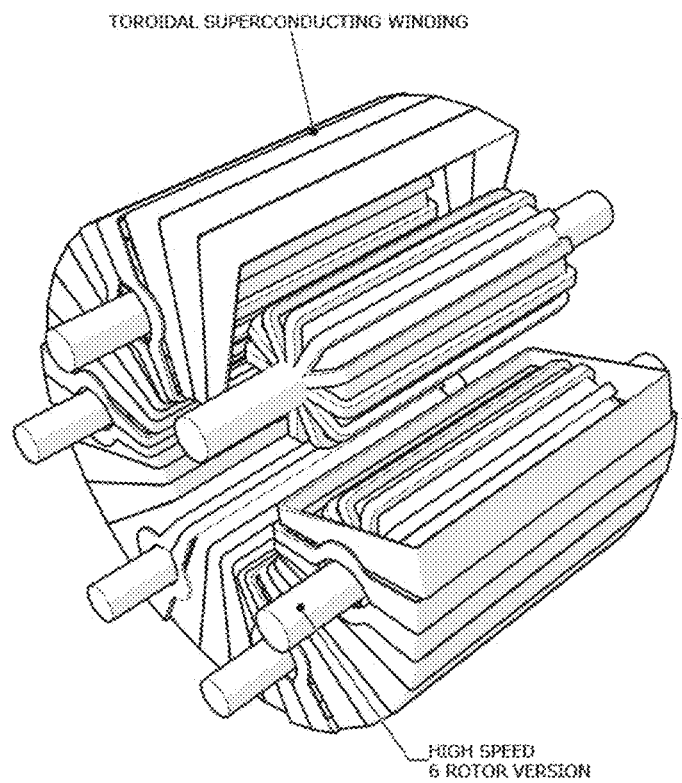
FIG. 91 is a sectional view of the embodiment shown in FIG. 90 featuring multiphase windings in the rotor assembly.

FIG. 91 is a three quarter sectional view of the embodiment shown in FIG. 90 featuring multiphase windings in the rotor assembly.

The rotor windings for the high speed Toroidal Drive device are made from copper and are multiphase to reduce the amount of ripple in the output power. The use of superconducting rotor windings is possible but the high speed of operation means that careful design would be necessary to minimise AC loss in the superconducting windings.

Figure 92:
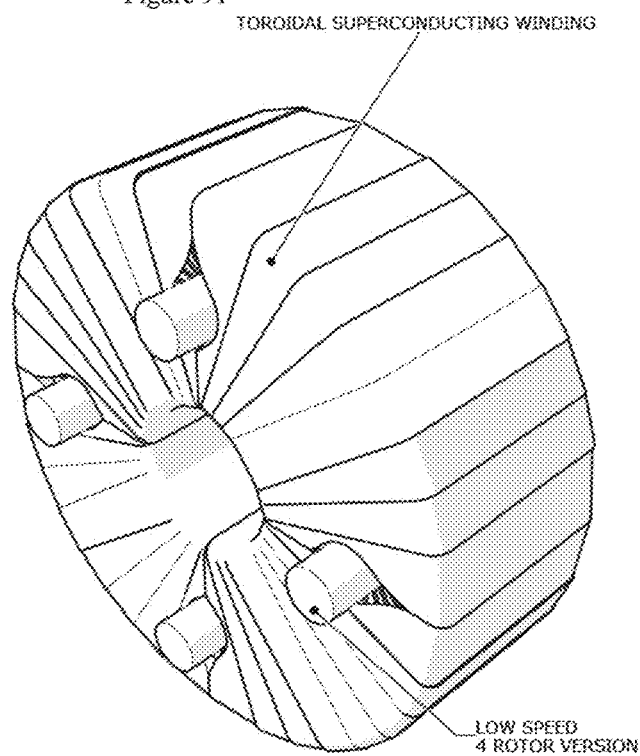
FIG. 92 shows a toroidal drive motor/generator with a circular toroidal stator and four rotor assemblies.

A further variation on previous embodiments is shown in FIG. 92. This embodiment is designed to operate as a low speed generator suitable for use as a direct drive wind turbine generator. The device is designed for low speed operation, including use as a wind turbine generator, and incorporates superconducting stator windings and superconducting rotor windings.

The low speed of operation results in a low frequency of operation and, in turn, reduced AC loss in the rotor windings. As a result of this, both the stator and rotor windings are constructed from superconducting material.

This device would be used with the planetary gear configuration shown in previous embodiments in either as direct drive (1:1) configuration or a step up (1:25 or higher) configuration. The step up configuration results in a higher operating frequency but uses a proportionally smaller amount of superconducting material. The net result being that the AC loss in the rotor windings remains much the same.

Figure 93:
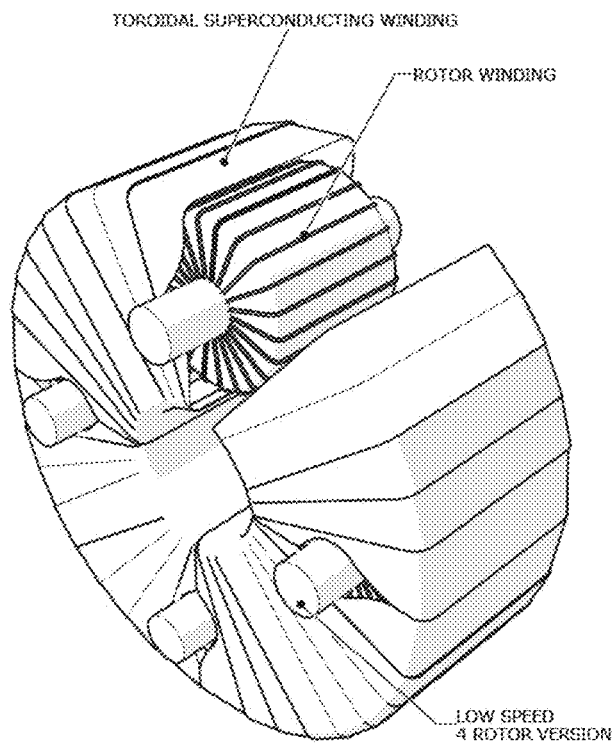
FIG. 93 is a sectional view of the embodiment shown in FIG. 92.

FIG. 93 shows a three quarter sectional view of the embodiment shown in FIG. 92. The superconducting rotor windings have been optimised to reduce AC loss.

The need to minimise the AC loss in the superconducting rotor windings stems from the large penalty factor that occurs when removing loss due to heat at cryogenic temperature. The energy required to remove the heat loss can be a factor 10-1000 times higher than the actual energy lost depending on the operating temperature and superconducting material used.

A further variation of the previously disclosed embodiments involves changing the axis of rotation of the individual rotor assemblies. Where previously the rotor assemblies rotated on an axis that is parallel to the axis about which the toroidal stator is wound/constructed, in the following embodiments this axis of rotation is now perpendicular to the axis of the toroid. The power transmission of the individual rotor assemblies can then be combined using a bevel gear assembly. Examples of this variation are shown in FIGS. 94 and 95.

Figure 94:
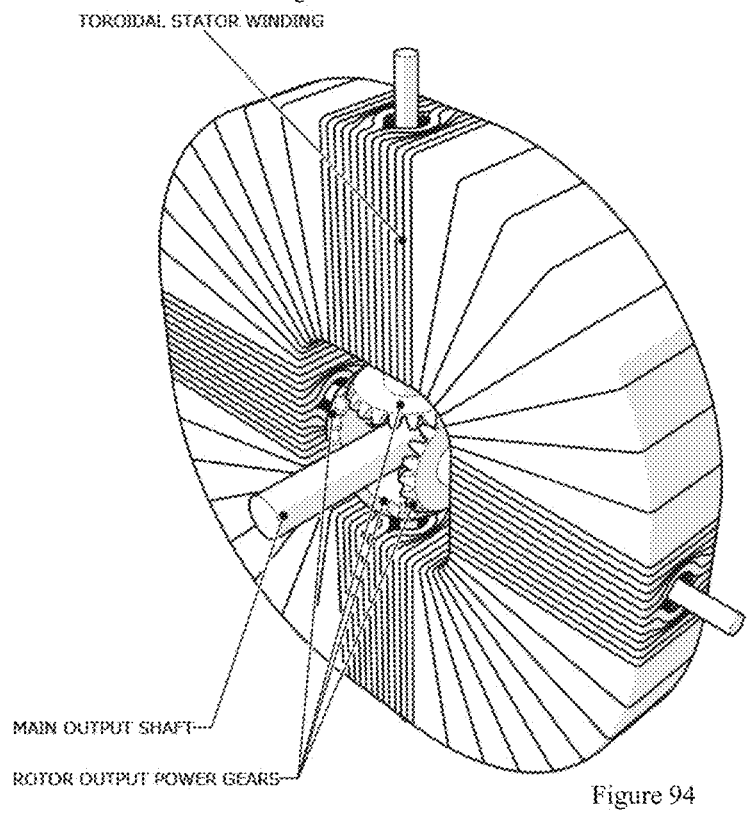
FIG. 94 shows a variation on the previously presented embodiments in which the axis of rotation of the individual rotor assemblies has been changed such that it is now perpendicular to the central axis of the toroidal background stator.

FIG. 94 shows a variation on the previously presented embodiments in which the axis of rotation of the individual rotor assemblies has be changed such that it is now perpendicular to the central axis of the toroidal background stator.

Figure 95:
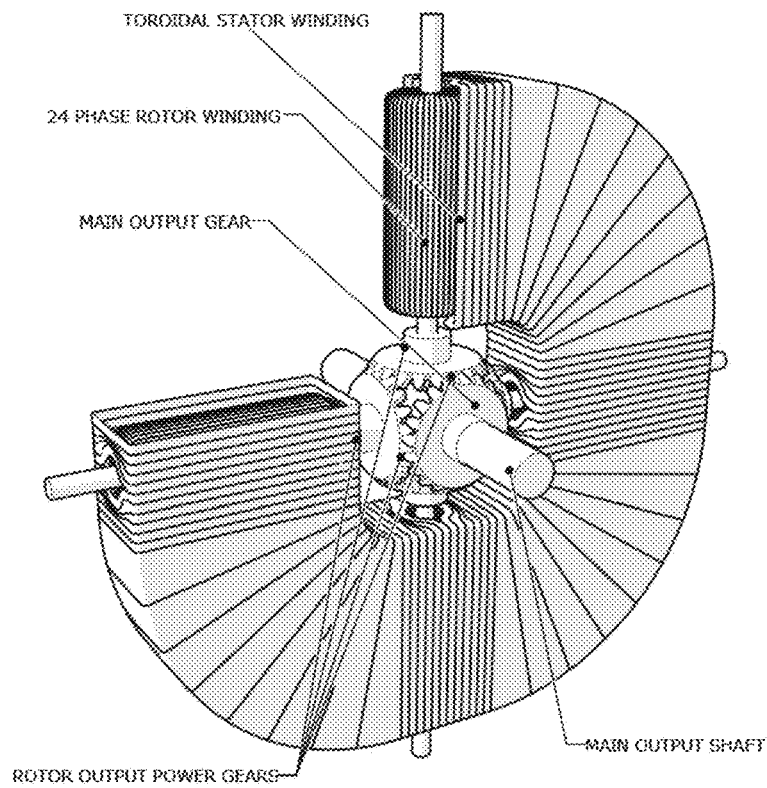
FIG. 95 is a three-quarter sectional view of the device as shown FIG. 94.

FIG. 95 is a three-quarter sectional view of the device as shown FIG. 94. Note that the number of phases in the individual rotor assemblies has been increased to 24 in order to smooth out power delivery/generation.

FIGS. 90-100 show the rotor elements and the immediate permanent magnetic material surrounding the rotor assemblies and contained within them. These variations represent the basic driving or generating element of the Toroidal Drive but devoid of the toroidal field return elements.

Figure 96:
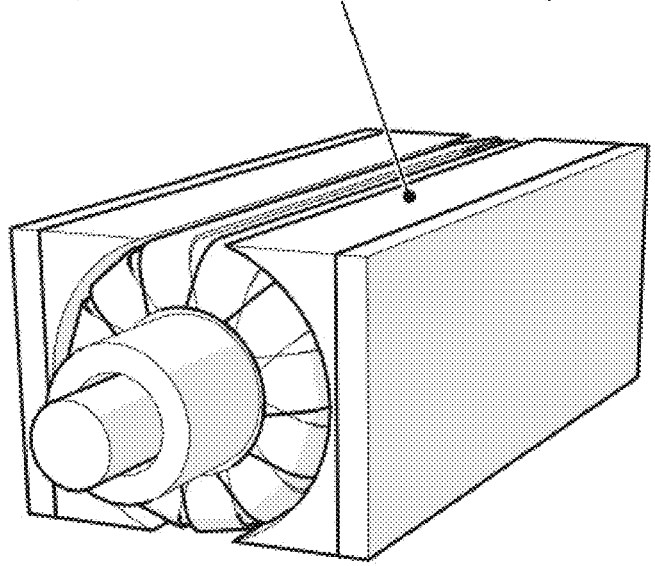
FIG. 96 is an isometric view of a single rotor assembly with adjacent and internal permanent magnet material according to an aspect of the present invention.
Figure 97:
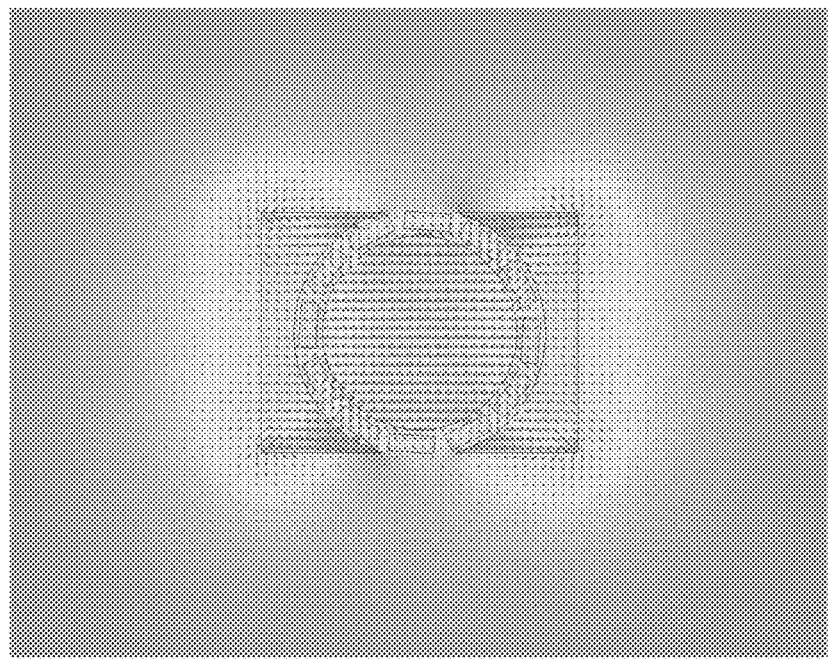
FIG. 97 is a field plot of the magnet assembly shown in FIG. 96.

FIG. 96 shows a single rotor assembly with the adjacent and internal permanent magnet material. FIG. 97 shows a field plot of the magnet assembly shown in FIG. 96.

Figure 98:
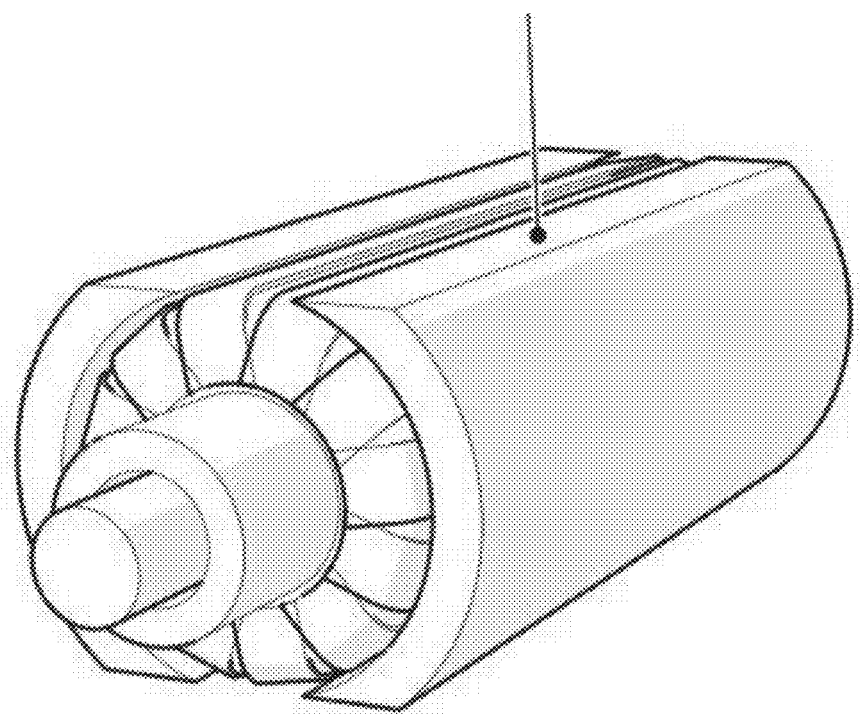
FIG. 98 is an isometric view of rotor assembly similar to that illustrated in FIG. 96 with the external adjacent magnets curved.
Figure 99:
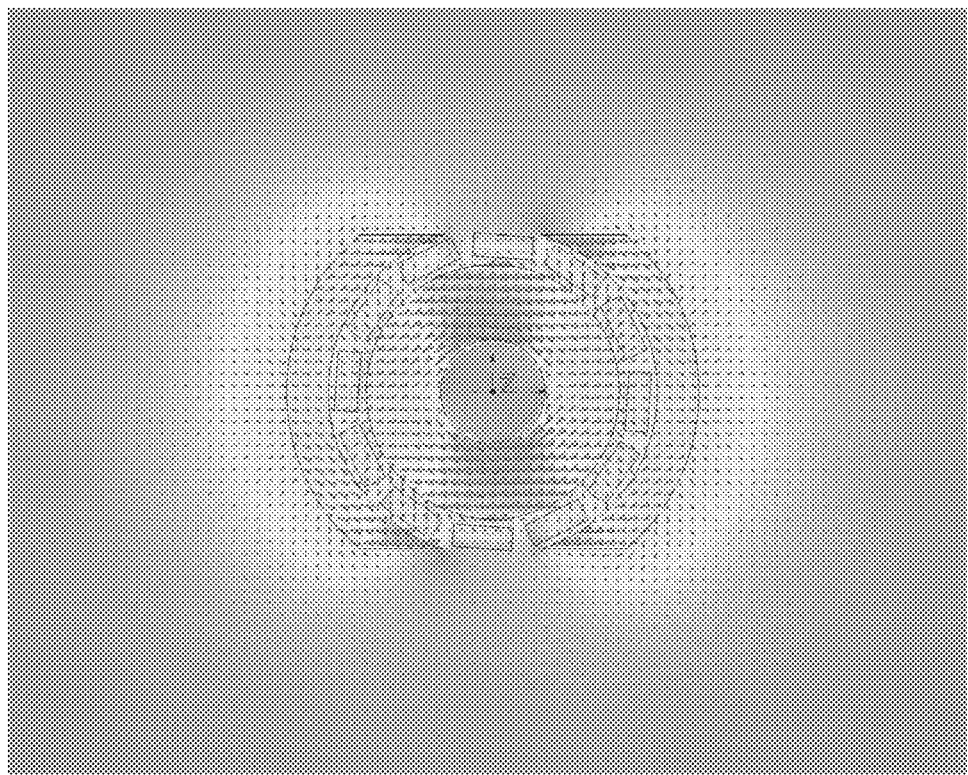
FIG. 99 is a field plot of the curved magnet assembly shown in FIG. 98.

A further variation to the basic assembly shown in FIG. 96 involves the curvature of the magnet mass adjacent to the outside of the rotor assembly as is shown in FIG. 98. The inner magnet assembly can either be a solid cylinder as shown previously or can be tubular with an internal bore as highlighted in the field plot FIG. 99.

The direction of magnetisation of the magnetic material is unidirectional in the field plots of the devices shown. It is also possible for the curved external magnetic material to be radially polarised about the axis of rotation of the device.

Figure 100:
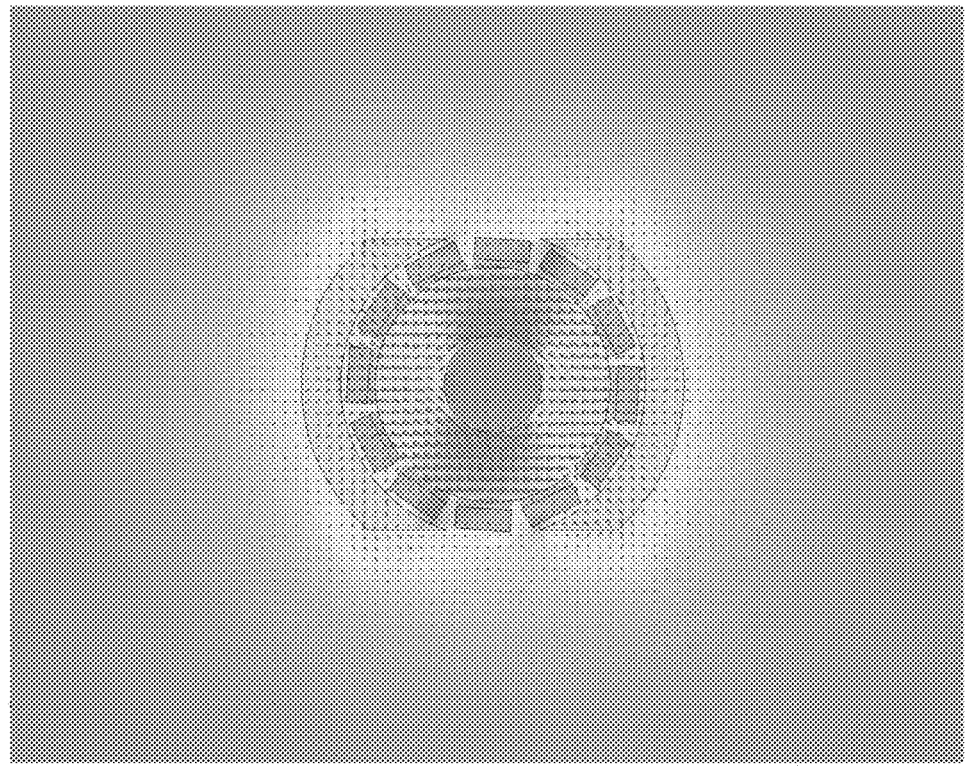
FIG. 100 is a field plot of a permanent magnet machine where the outer magnetic elements either side of the rotor have been radially magnetised about the axis of rotation.

It was previously stated that the permanent magnetic material could be magnetised either straight through the magnet assemblies on the inner and outer part of the assemblies or radially about the axis on the machine. One beneficial variation is where the magnet assembly outside the rotor windings is magnetised radially. The field plot in FIG. 100 shows the effect of this radial magnetisation on the magnetic field where the outer magnetic elements either side of the rotor have been radially magnetised about the axis of rotation.

A further variation involves the removal of the outer magnet assemblies. In this variation the current carrying windings react with the internal permanent magnetic material. The reaction produces torque, in the case of a motor or produces current in the case of a generator.

In the following variations the previously rotating windings become stationary and the internal permanent magnet rotates. The advantages of this reversal of the rotor and stator includes removing the need for slip rings or rotating electrical contacts for the current carrying windings and the fact that it is easier to cool the stationary windings with pumped liquid or forced air.

Figure 101:
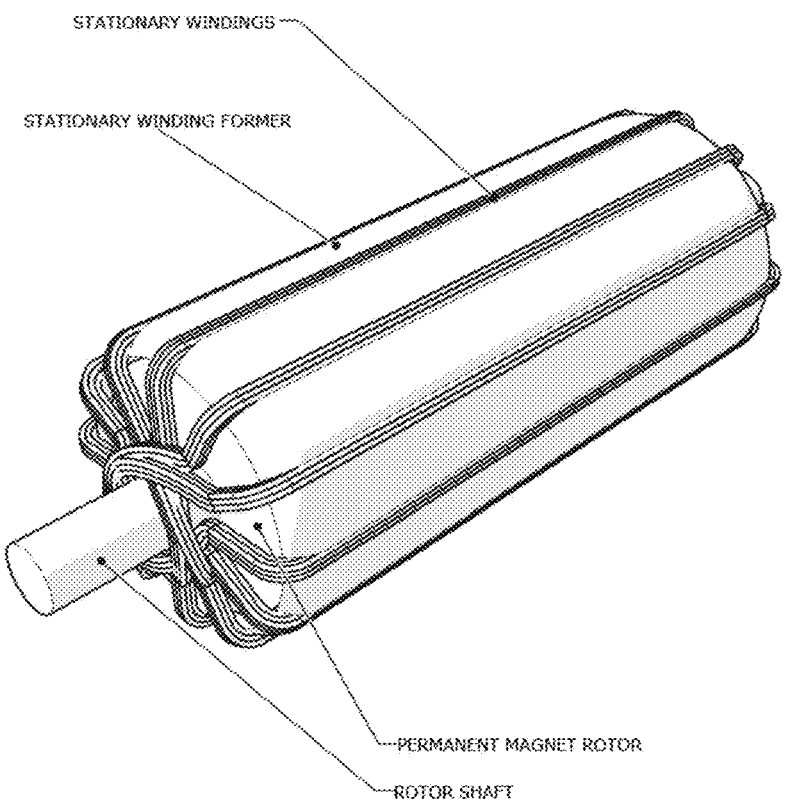
FIG. 101 is an isometric view of a permanent magnet motor according to a preferred embodiment of the present invention.

FIG. 101 shows a permanent magnet motor, similar to the variations disclosed previously but with the outer magnetic material removed. The rotor windings are now kept stationary and operate as a brushless-DC (square wave) or AC winding. The internal magnet becomes the rotating element of the device.

Figure 102:
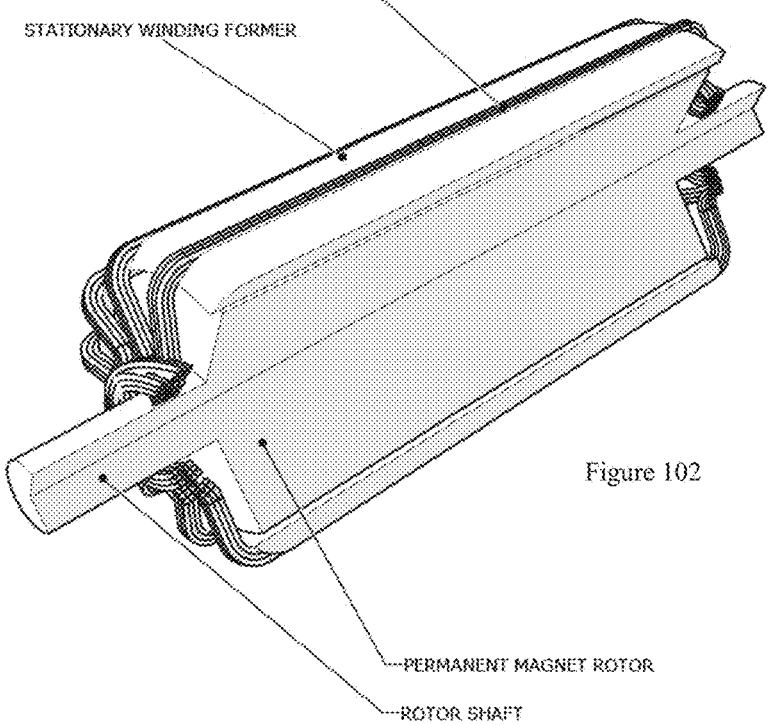
FIG. 102 is a sectional view of the device shown in FIG. 101.

FIG. 102 is a sectional view of the device shown in FIG. 101. The outer windings are formed around a stationary former. The permanent magnet rotor, mounted inside the windings, is mounted on a shaft for mechanical power transmission.

While the devices are shown with stator windings and permanent magnet rotors the reverse arrangement of rotating windings and stationary internal magnetic assemblies is also acceptable and may be desirable in some instances.

Figure 103:
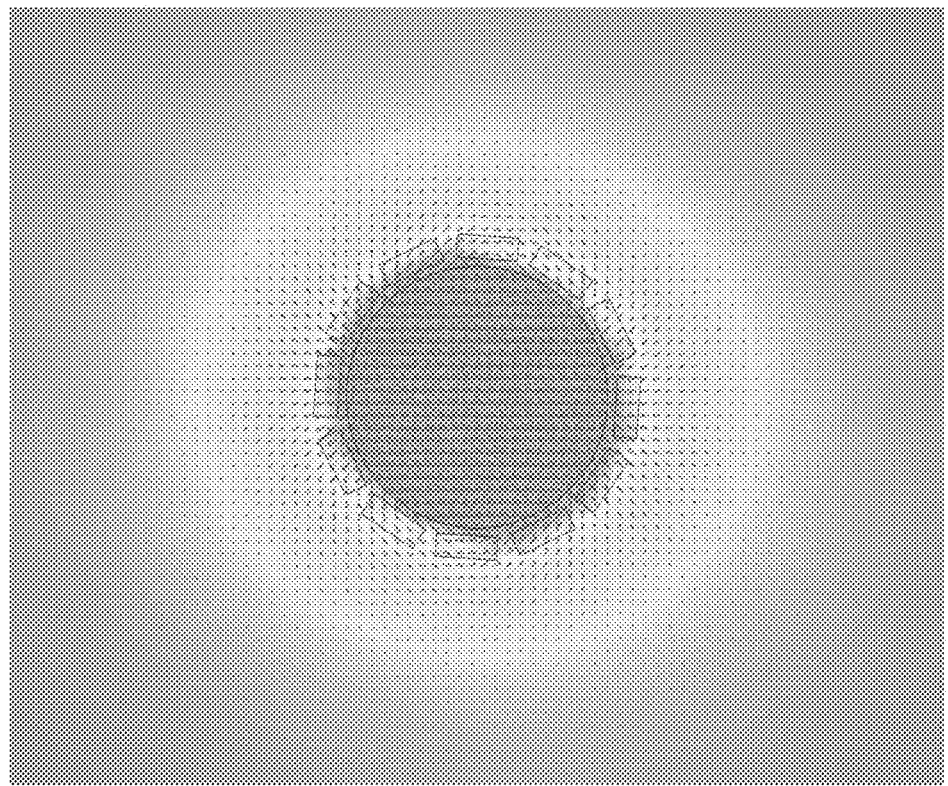
FIG. 103 is a plot of the magnetic field of the device shown in FIGS. 101 and 102.

FIG. 103 is a plot of the magnetic field of the device shown in FIG. 101 and FIG. 102. The permanent magnet rotor is shown as one solid cylinder of material.

Figure 104:
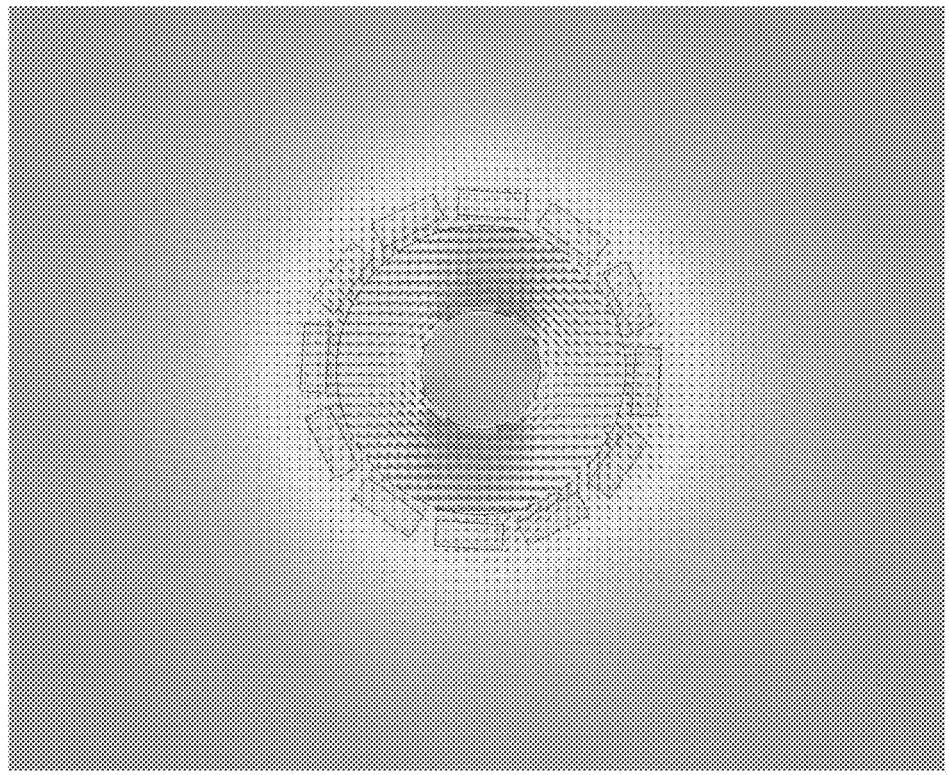
FIG. 104 is a magnetic field plot of a permanent magnet motor similar to that of FIG. 101 but in which the internal magnet is a tube of magnetic material with an internal bore.

FIG. 104 is field plot of a permanent magnet motor similar to that of FIG. 103. The internal magnet is a tube of magnetic material with an internal bore rather than a solid cylinder.

The following material details further variations on the permanent magnet machines previously disclosed.

Figure 105:
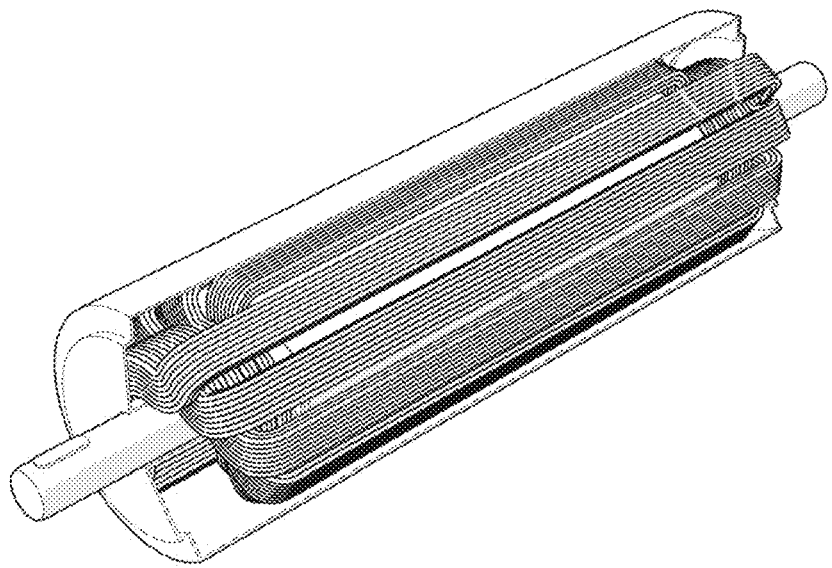
FIG. 105 shows a permanent magnet machine similar to the single rotor machine previously disclosed but with revised end windings to accommodate a supporting shaft.

The first variation depicted in FIG. 105 is a single rotor permanent magnet machine with an internal permanent magnet and a set of external multiphase windings. The primary variation when compared with previously disclosed examples is in the end windings. The windings have been arranged sequentially around a clear bore to allow the passage of a support shaft for the magnet assembly. This figure shows a permanent magnet machine similar to the single rotor machine previously disclosed but with revised end windings to accommodate a supporting shaft.

One of the key advantages of the devices disclosed is that the large permanent magnetic mass in the midst of the magnetic windings produces a considerable amount of magnetic field at a distance away from the outer radius of the magnetic mass. This large 'throw' of the magnetic field enables a large number of conductive windings to be placed around the magnetic mass. This large number of windings operating in the magnetic field when combined with high current densities in the windings and effective active cooling of these windings results in superior power density of the devices. Alternatively a larger number of windings supplied with lower current density can lead to higher device efficiency.

A further variation of the device shown in FIG. 105 incorporates the single permanent magnet with individual windings into a single device consisting of a plurality of magnet and rotor assemblies arrayed about a central axis.

Alternatively, these variations can be viewed as variations on the permanent magnet toroidal drives previously disclosed where the positioning of the individual rotor assemblies has been condensed and the interconnecting (or flux-guiding) magnetic material removed. The removal of the interconnecting material represents a significant saving in the weight of the devices and results in only a small change in the stray field boundary.

Figure 106:
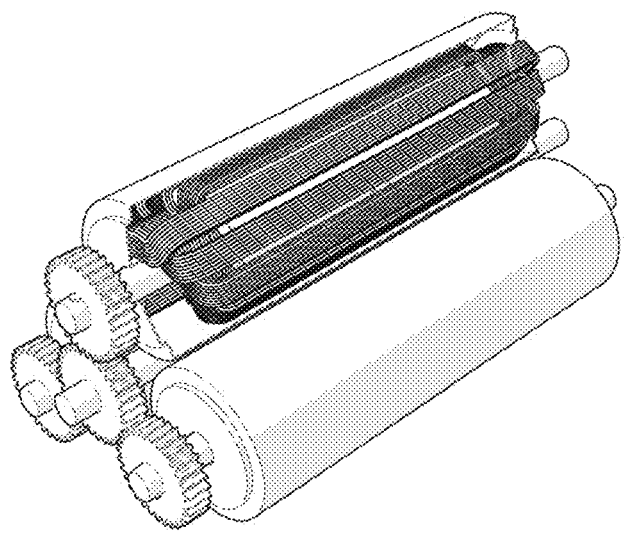
FIG. 106 shows a device consisting of three magnet and winding assemblies connected to a central shaft that spins at the same speed as the individual assemblies.

The second variation depicted in FIG. 106 shows a device with three permanent magnet and winding assemblies connected to a central shaft and gear. In this variation the rotational speed of the central shaft and of the outer rotating elements are the same.

In a further variation of the device shown in FIG. 106, the operating speed of the magnet and winding assemblies can be stepped up or down from that of the central connecting shaft. This allows the outer assemblies to operate at much higher rotational speeds which results in higher system power density while still delivering power and torque levels suitable for the desired input or output.

Figure 107:
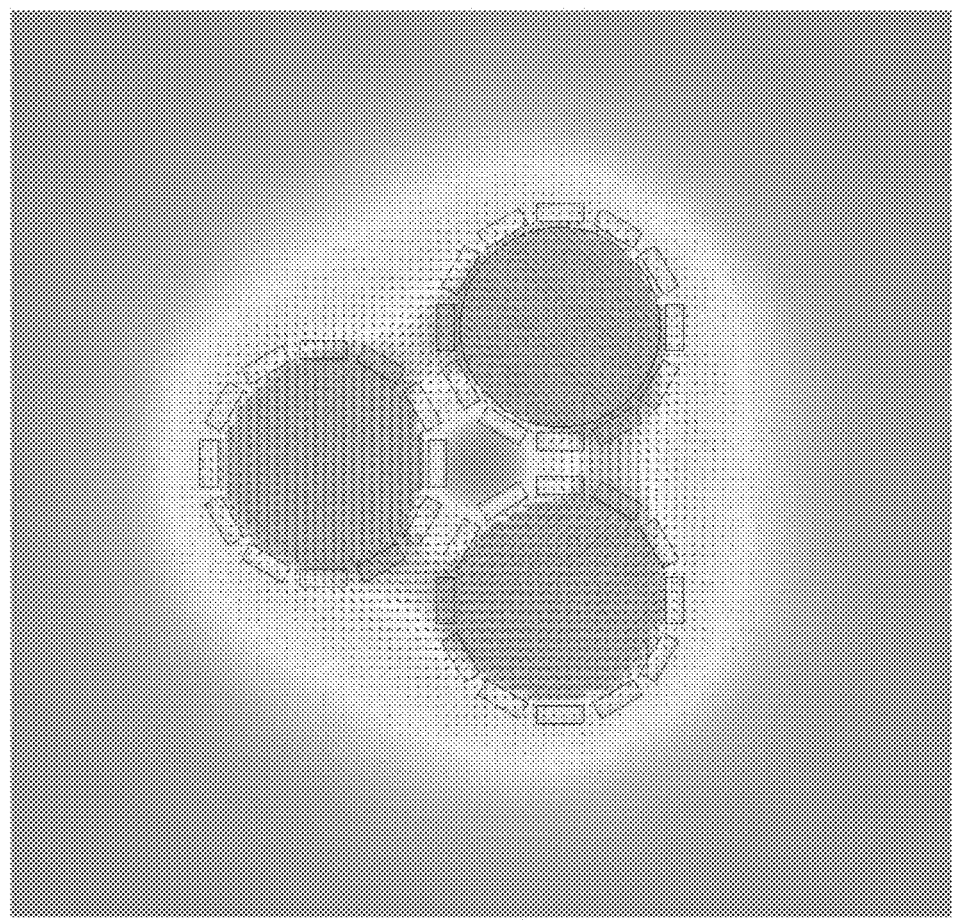
FIG. 107 shows a magnetic field plot of the device shown in FIG. 106.

FIG. 107 shows a magnetic field plot of the device shown in FIG. 106. The proximity of the magnet and winding assemblies results in a magnetic field profile that is largely contained within the outer boundary of the assemblies.

Figure 108:
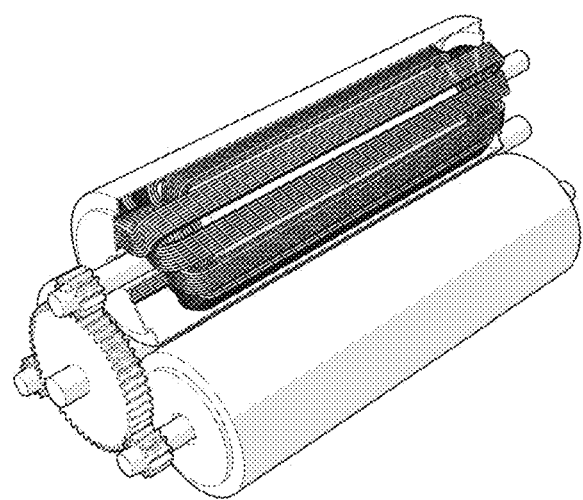
FIG. 108 shows a variant of the device shown in FIG. 106 in which the rotor assemblies operate at a higher rotational speed than the central shaft.

FIG. 108 shows a device similar to that shown in FIG. 106. In this variation the rotor assemblies operate at a higher rotational speed than the central shaft.

The device shown FIG. 106 can be extrapolated to any number of magnet and winding assemblies. FIG. 109 to FIG. 114 inclusive show four and six assembly variations where either;
the central shaft and individual assembly shaft speeds are similar or,
where the rotational speed of the outer assembly shafts have been stepped up relative to the central shaft.

Figure 109:
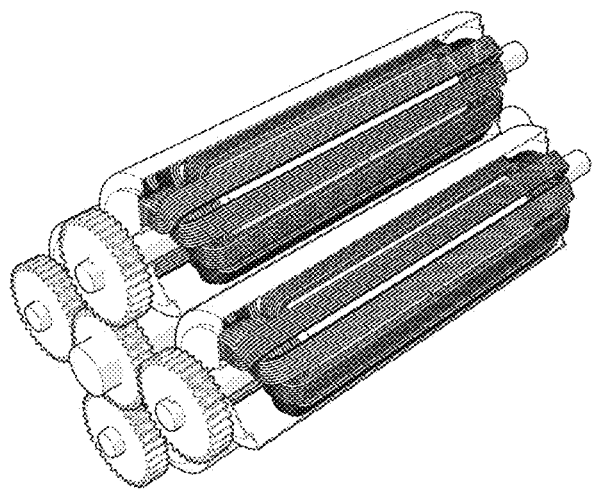
FIG. 109 shows a device consisting of four magnet and winding assemblies connected to a central shaft that spins at the same speed as the individual assemblies.

FIG. 109 shows a device consisting of four magnet and winding assemblies connected to a central shaft that spins at the same speed as the individual assemblies.

Figure 110:
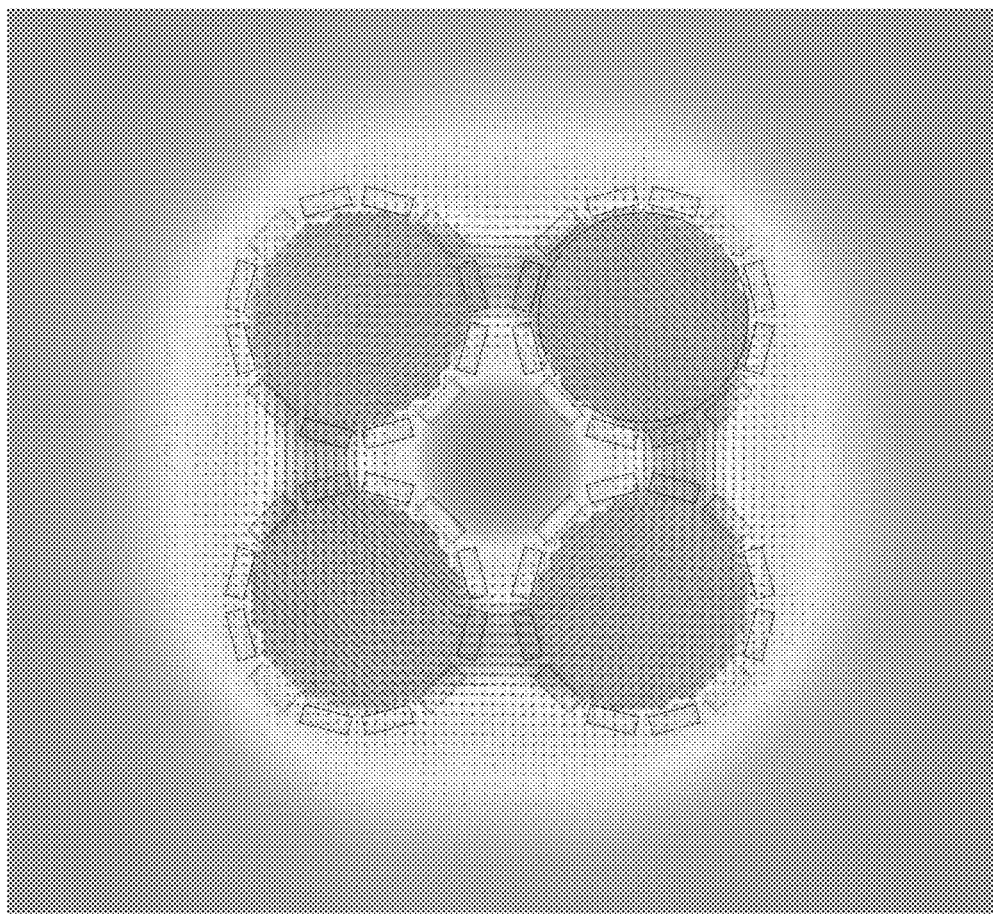
FIG. 110 is a magnetic field plot of the device shown in FIG. 109.

FIG. 110 is a magnetic field plot of the device shown in FIG. 109.

Figure 111:
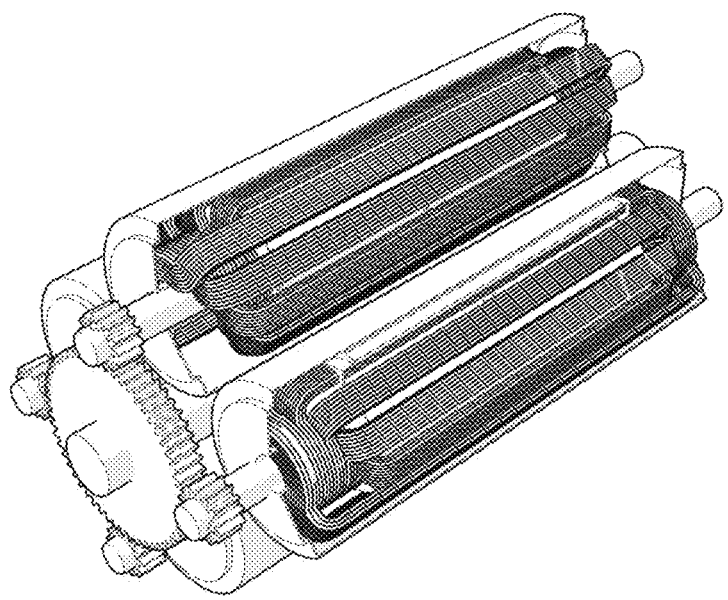
FIG. 111 shows a variant of the device shown in FIG. 109 in which the rotor assemblies operate at a higher rotational speed than the central shaft.

FIG. 111 shows a device similar to that shown in FIG. 109. In this variation the rotor assemblies operate at a higher rotational speed than the central shaft.

Figure 112:
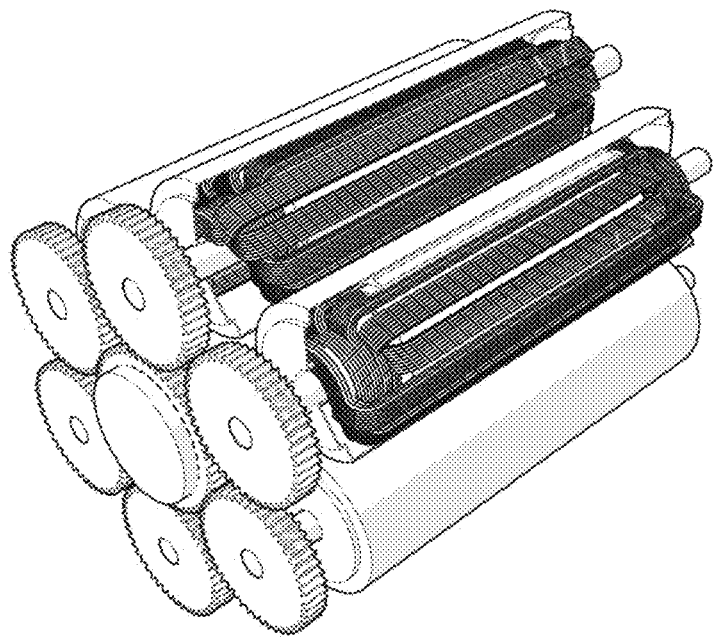
FIG. 112 shows a device including six magnet and winding assemblies connected to a central shaft that spins at approximately the same speed as the individual assemblies.

FIG. 112 shows a device consisting of six magnet and winding assemblies connected to a central shaft that spins at approximately the same speed as the individual assemblies.

Figure 113:
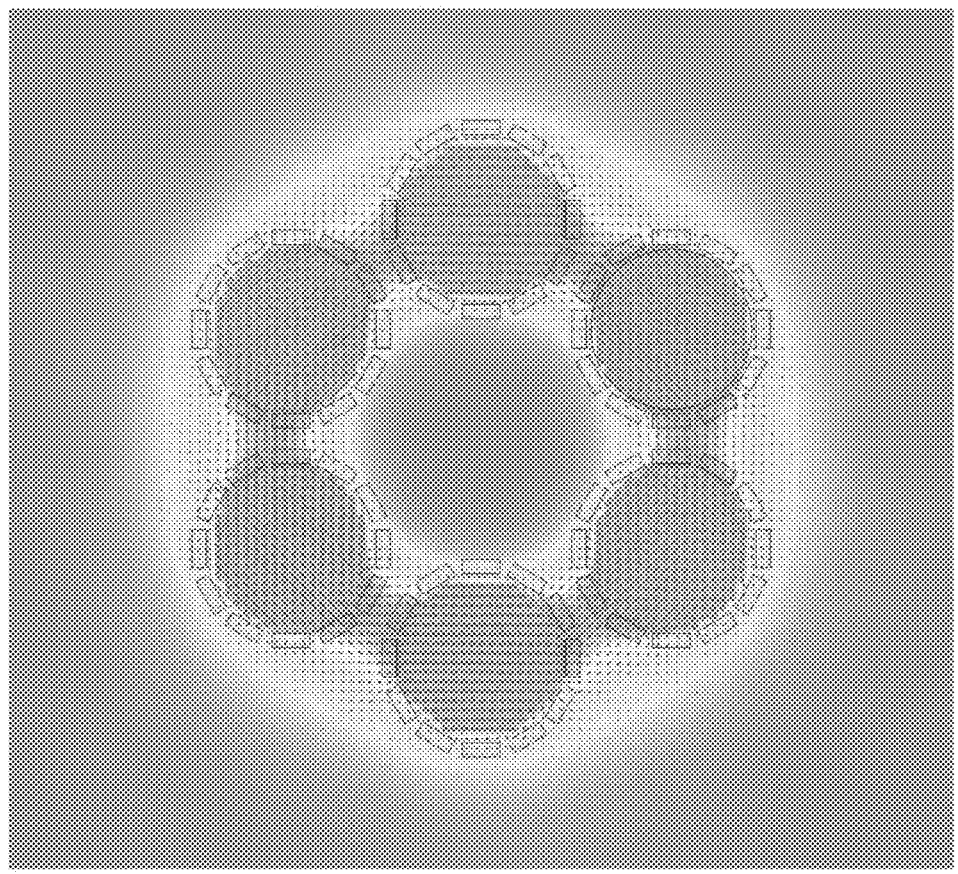
FIG. 113 is a magnetic field plot of the device shown in FIG. 112.

FIG. 113 is a magnetic field plot of the device shown in FIG. 112.

Figure 114:
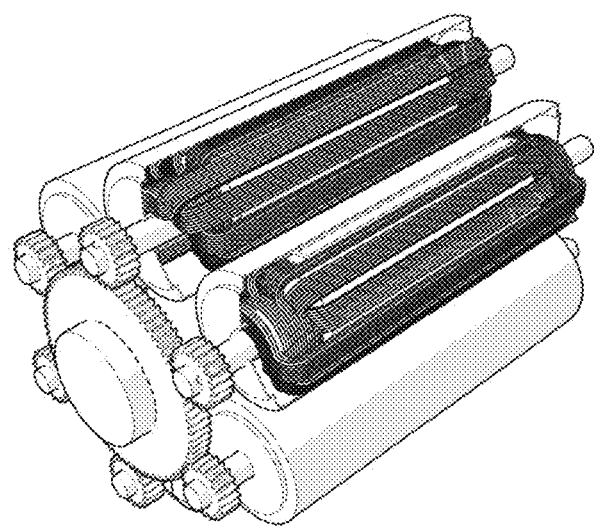
FIG. 114 shows a variant of the device shown in FIG. 112 in which the rotor assemblies operate at a higher rotational speed than the central shaft.

FIG. 114 shows a device similar to that shown in FIG. 112. In this variation the rotor assemblies operate at a higher rotational speed than the central shaft.

A further variation of the devices shown in FIGS. 109 and 112 has an additional permanent magnet and winding assembly in the middle (along the central axis) of the toroidal style assemblies. This results in a total of 5 and 7 individual assemblies that form the complete device.

The close proximity of the individual assemblies arrayed around the central shaft increases the torque/power level of the total device when the magnets are held stationary and the windings are rotated. In this configuration as the distance between the individual assemblies is increased the torque/power level of the system decreases until the point when each individual assembly exhibits the same power/torque level as the same sized individual assembly in free space.

The closeness of the individual assemblies to one another about the central axis correlates with an improvement in the containment of stray magnetic field beyond the physical boundary of the device.

A brushless variant of the designs presented here could be achieved by rotating the permanent magnet components and keeping the windings stationary. In this variation the positioning of the magnetic assemblies influence each other as they are rotated making it desirable to increase the distance between them in order to reduce torque ripple and ensure that the torque applied by the rotor windings is able to overcome the forces between successive permanent magnets. The resultant torque and power from an individual assembly with a spinning magnet is the same as for a device consisting of a single permanent magnet and winding assembly in free space.

If the individual windings form the rotating elements of the devices and the magnets are kept stationary, power must be delivered to or taken from the rotating windings. This could be achieved via a slip ring or brush mechanism. Alternatively, power could be supplied to and from the windings via a DC Exciter or Rotary Transformer that allows the transfer of electrical power between stationary and rotating components.

Further Single Motor Variations

A further variation of the previously disclosed single permanent magnet devices has the permanent magnet located within the windings magnetised such that more than two magnetic poles are seen by a conductor as it traverses 360 degrees around the axis of rotation. The windings around the magnet need their polarity to be changed more frequently with an increase in the number of poles. For example, the two pole devices previously shown require switching of individual windings every 180 degrees, increasing the number of poles to four means that polarity reversal must happen every 90 degrees.

Figure 115:
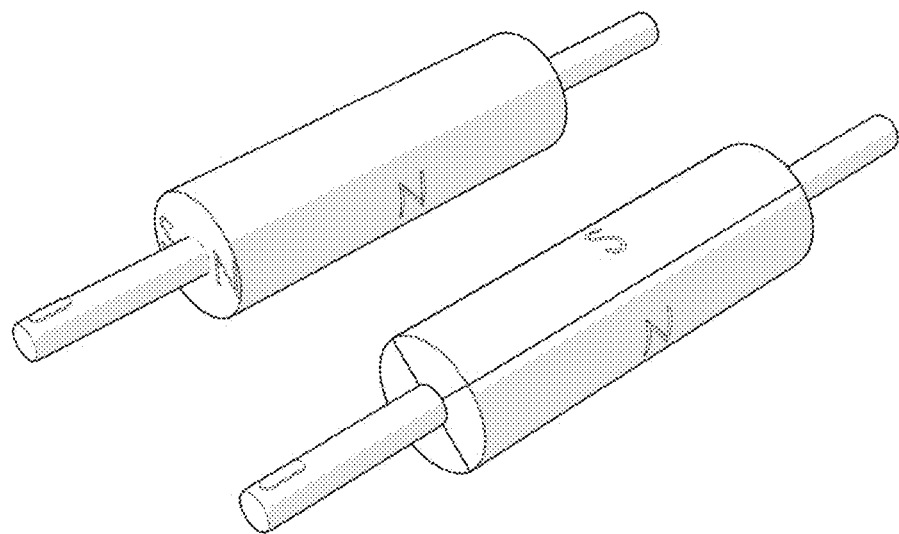
FIG. 115 is an isometric view of two variations of permanent magnet construction from disclosed embodiments.

FIG. 115 shows two variations of permanent magnet construction from disclosed embodiments. The magnet in the background is magnetised 'straight through' resulting in a two pole device. The magnet in the foreground is made from four magnetised sections, resulting in a four pole device.

In addition to changing the number of magnetic poles, a further variation involves the use of steel shields or shrouds around both the single or multiple assembly embodiments of the devices shown. The use of steel or ferrite shrouds can increase the power/torque levels of the device while also containing any stray magnetic field.

Figure 116:
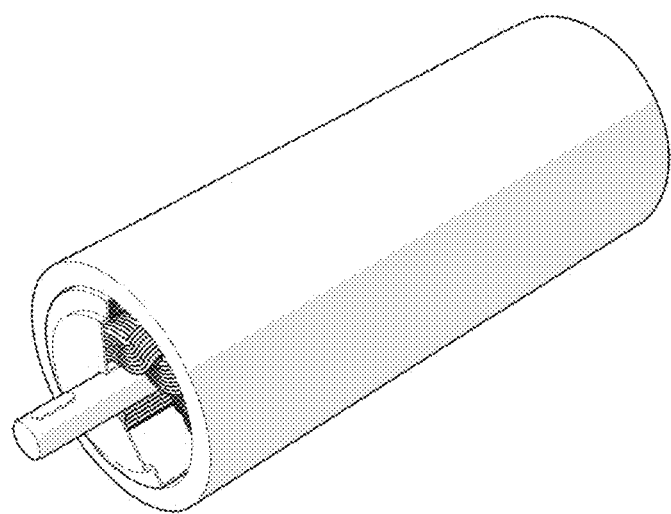
FIG. 116 is an isometric view of a two pole permanent magnet and rotor assembly with a steel shield or shroud around the outer windings.

FIG. 116 shows a two pole permanent magnet and rotor assembly with a steel shield/shroud around the outer windings.

Figure 117:
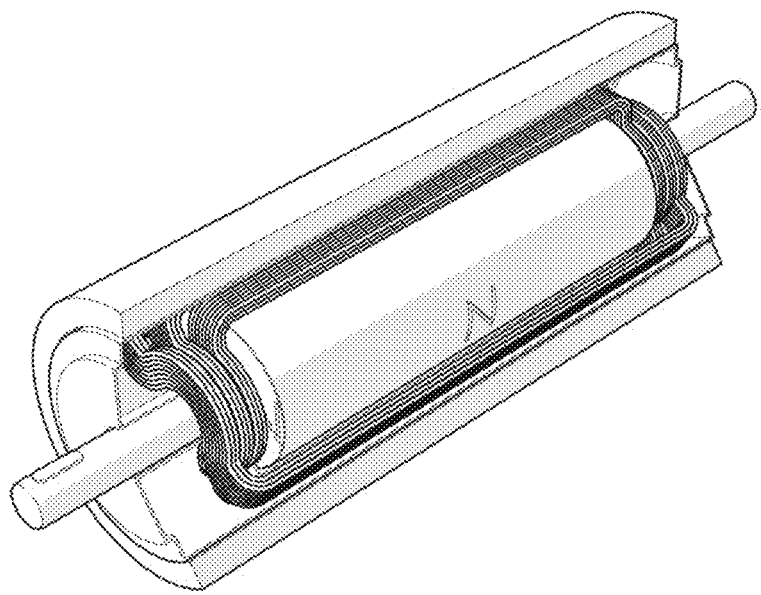
FIG. 117 shows the device shown in FIG. 116 with the steel shroud and some windings cut away to show the windings and the two pole permanent magnet.

FIG. 117 shows the device shown in FIG. 116 with the steel shroud and some windings cut away to show the windings and the two pole permanent magnet.

Figure 118:
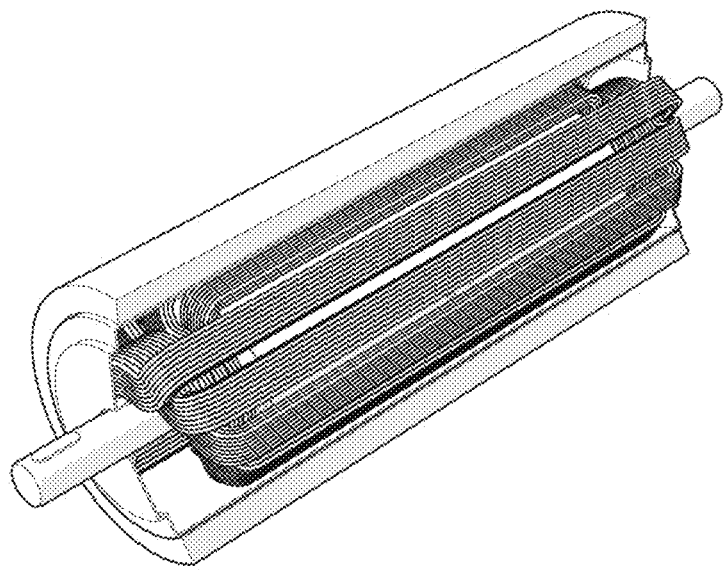
FIG. 118 shows the device shown in FIG. 116 with the steel shroud cut away to show the individual windings.

FIG. 118 shows the device shown in FIG. 16 with the steel shroud cut away to show the individual windings.

Figure 119:
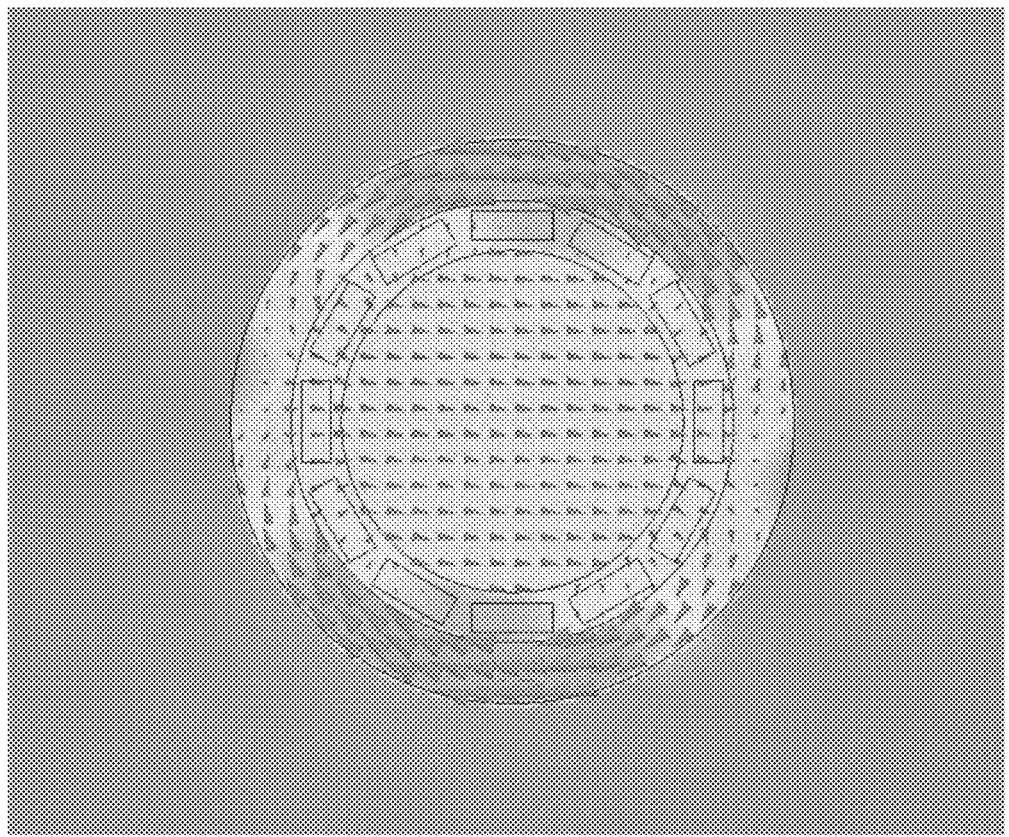

FIG. 119 is a magnetic field plot of the two pole permanent magnet and individual windings assembly with a steel shroud around the outside of the device. The shroud helps to contain the stray magnetic field and increase the power of the device.

Figure 120:
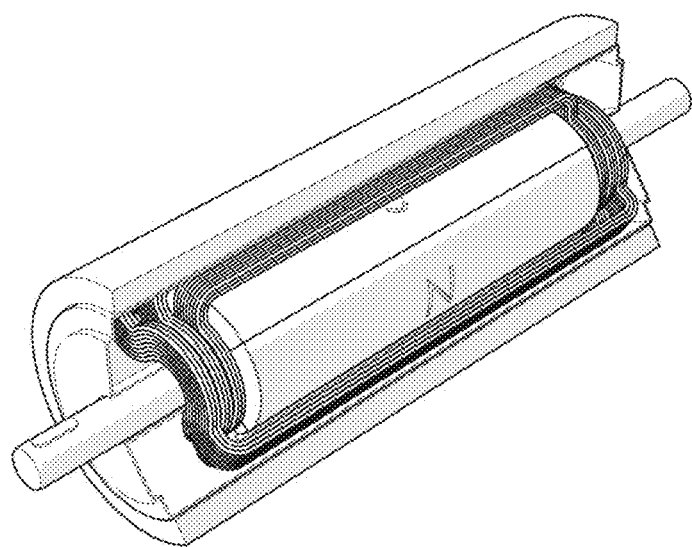

FIG. 120 shows a four pole permanent magnet and rotor assembly with a steel shield around the outer windings. The steel shroud and some windings have been cut away to show the remaining windings and the two pole permanent magnet.

Figure 121:
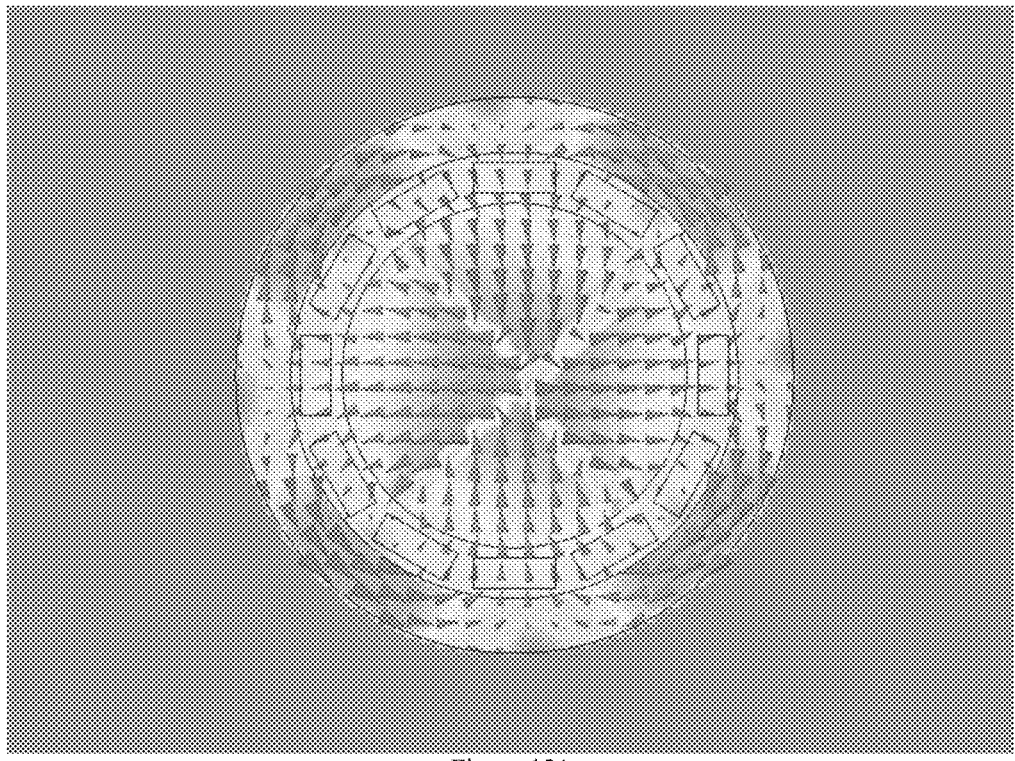

FIG. 121 is a magnetic field plot of the four pole permanent magnet and individual windings assembly with a steel shroud around the outside of the device. The shroud helps to contain the stray magnetic field and increase the power of the device.

The number of poles should not been seen as limited by the embodiments shown. Increasing the number of poles increases the effectiveness of the steel shroud/shielding resulting in lower device weight.

Figure 122:
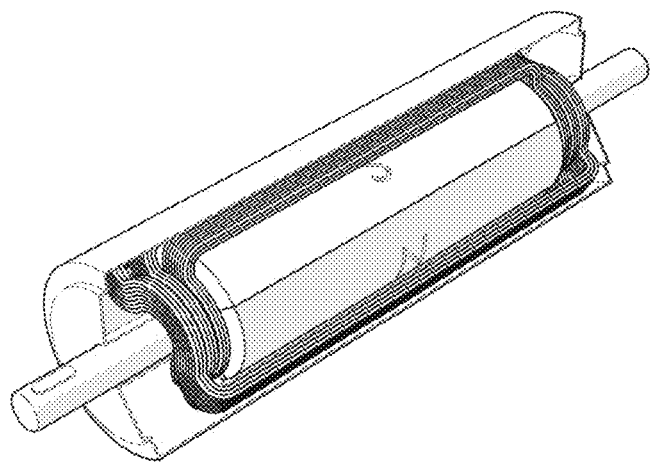
Figure 123:
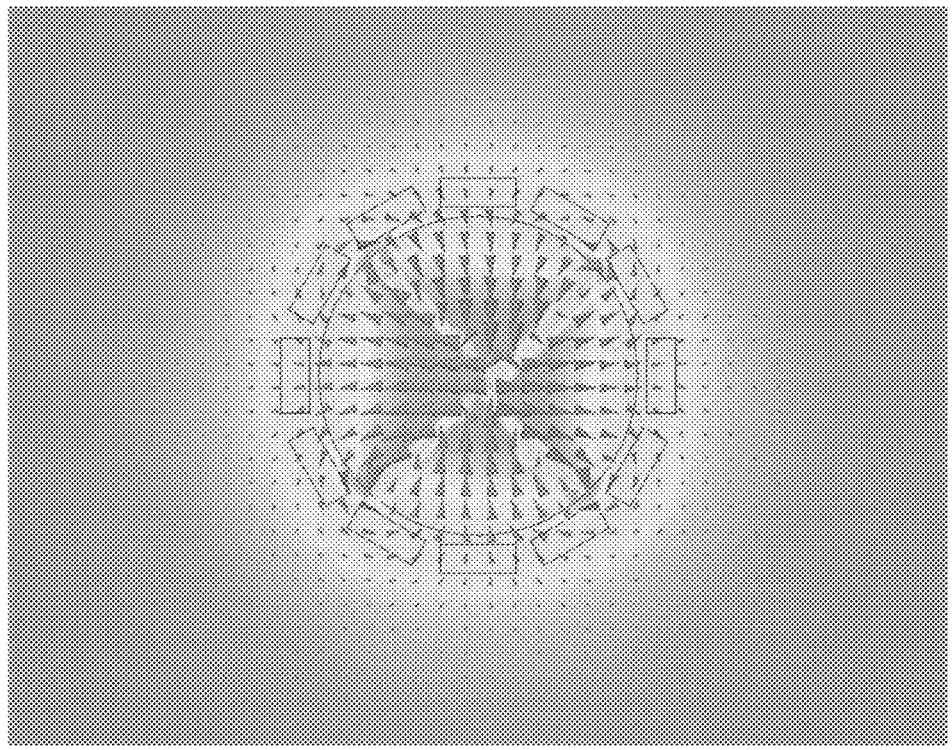

FIG. 122 shows a four pole device similar to that shown in FIG. 120 but without the steel shielding/shroud. FIG. 123 is a magnetic field plot of the device shown in FIG. 122.

Figure 124:
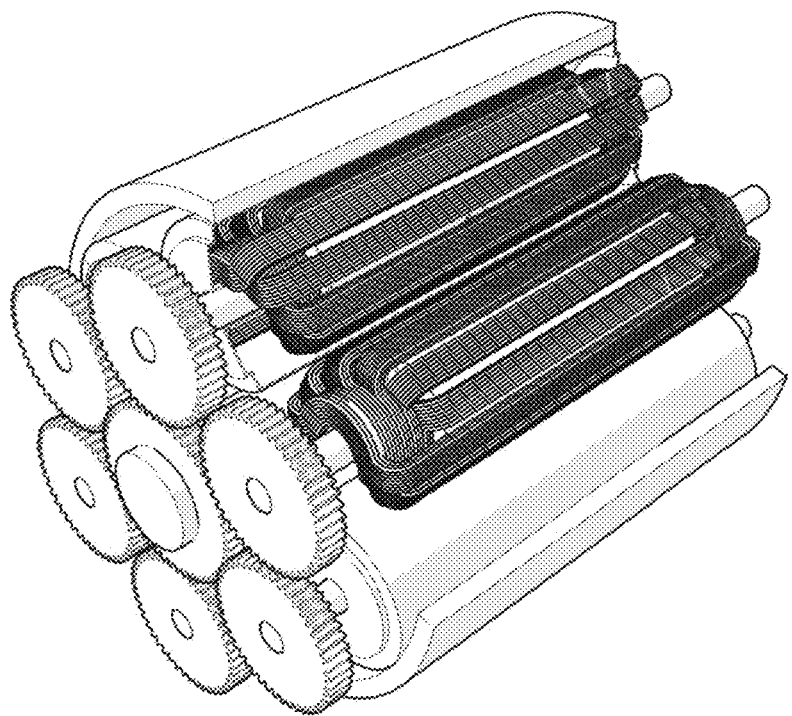
Figure 125:
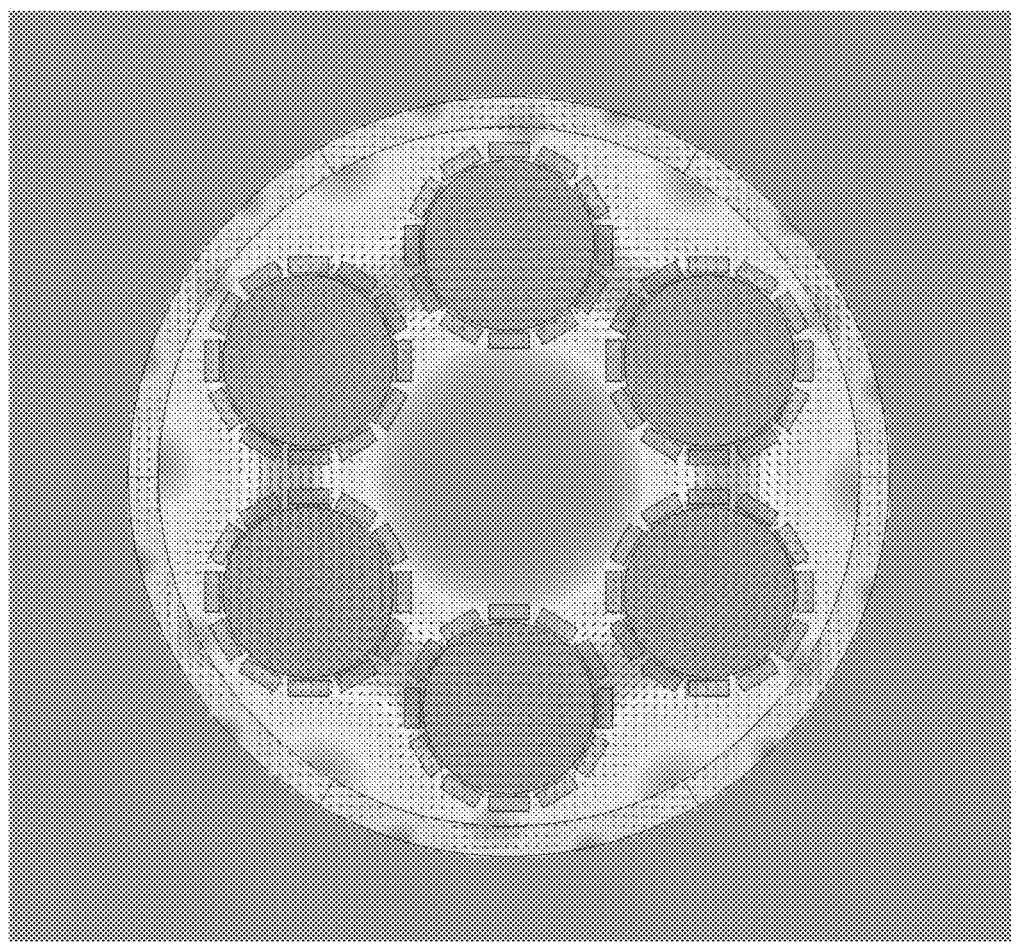

Steel shrouds or shielding can also be employed in multi-motor assemblies. FIGS. 124 and 125 show the 6 motor/generator assembly from FIG. 112 with a single layer steel shroud around the outside.

These shielding shrouds could be made using ferrite material or other materials with high magnetic permeability. While depicted as being constructed from a single layer the shielding could also be constructed using multiple layers of material with or without gaps between the layers.

The shielding material could also be laminated from thin sheets to minimise eddy current and hysteresis losses. FIG. 125 is a field plot of the device shown in FIG. 124 showing the improved containment of the magnetic field resulting from the steel shield/shroud.

The physical construction of the multi-pole magnets has been previously shown as a series of angular segments with alternating magnetic polarity. The following images show different approaches to the physical construction of multi-pole permanent magnets.

Figure 126:
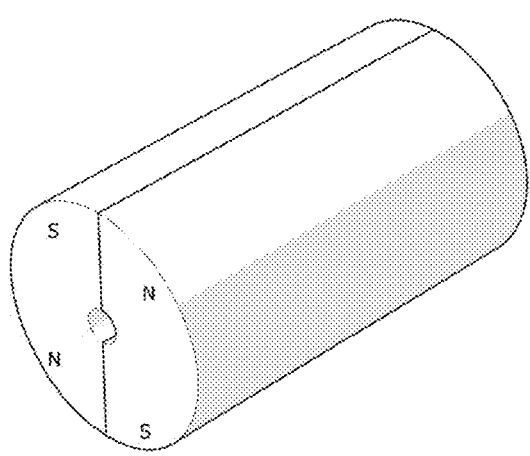

FIG. 126 shows a four pole permanent magnet assembly that is constructed from two halves that are magnetised in a direction parallel to the split plane.

Figure 127:
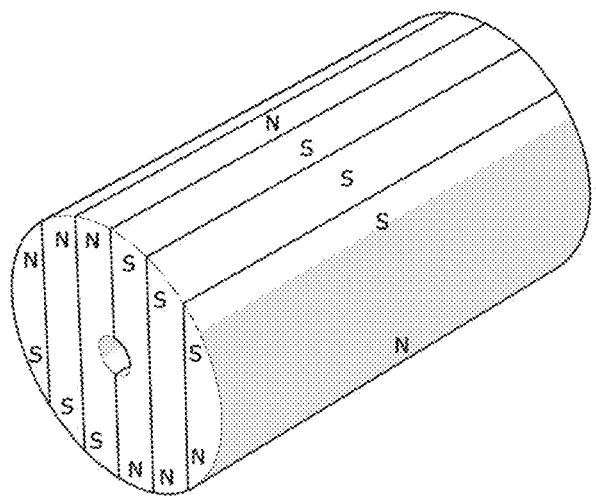

FIG. 127 shows a further variation of the four pole magnet shown in FIG. 126. In this variation the four magnetic poles are created by assembling a series of magnets that are magnetised in a direction parallel to the split planes of the assembly.

Figure 128:
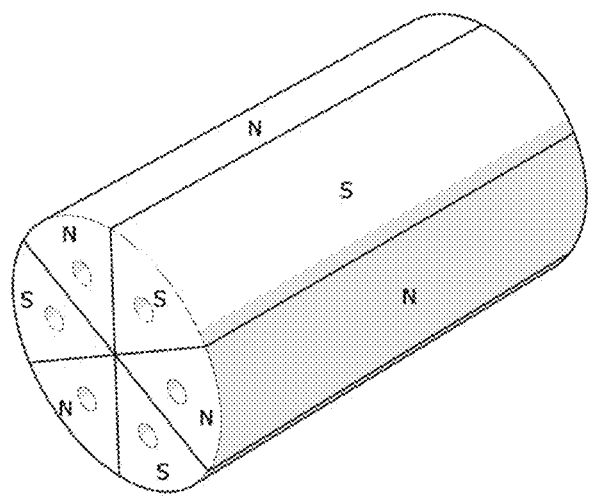

FIG. 128 shows a six pole permanent magnet assembly constructed from a series of arc segments that alternate radially in magnetic polarity. The manner of construction is similar to that used for the four pole magnet in FIG. 120.

Figure 129:
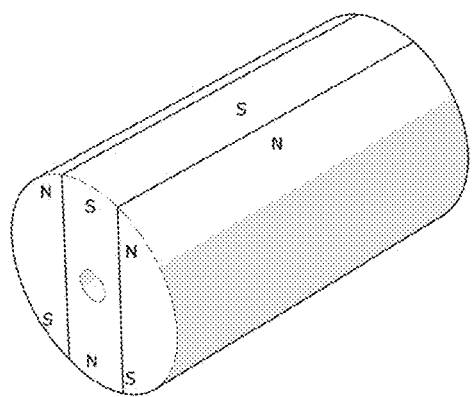

FIG. 129 shows a six pole magnetic assembly constructed from magnets that are magnetised parallel to assembly split planes. The magnets could be further subdivided for assembly purposes provided that the directions of magnetisation shown in the image are preserved.

Figure 130:
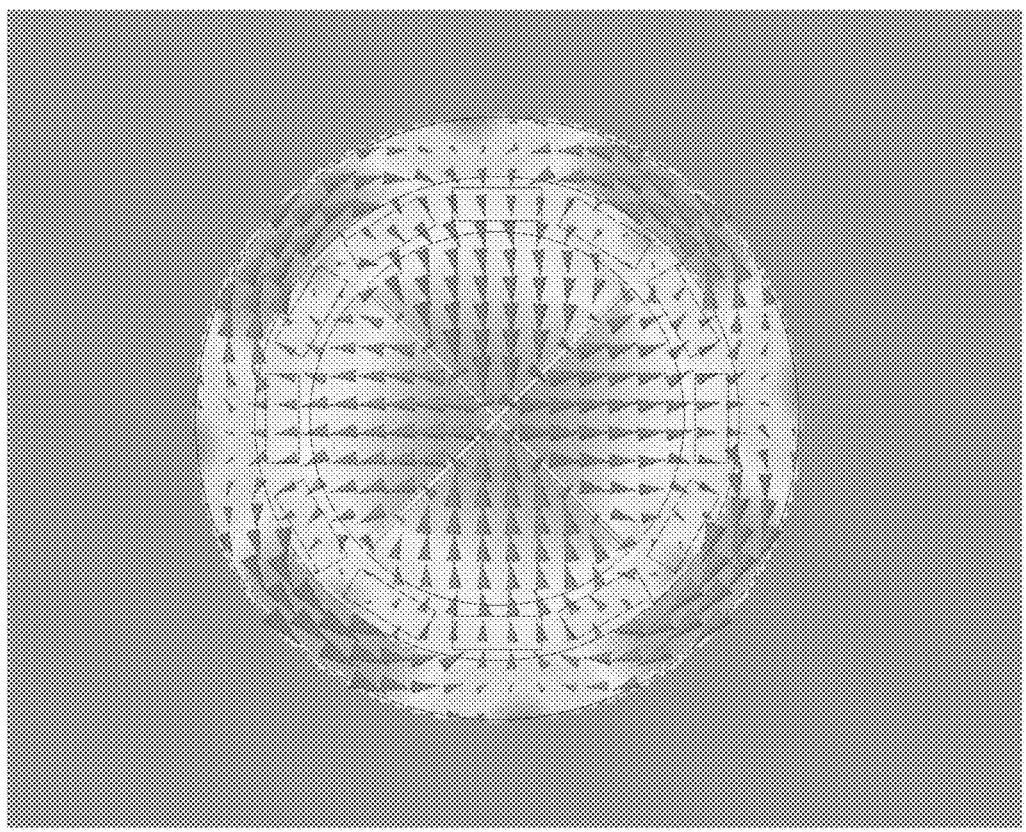

FIG. 130 shows a magnetic field plot for a variation of the construction of a 4-Pole permanent magnet assembly. In the FIG. 130 plot, the permanent magnet assembly is constructed with gaps between the sectors of permanent magnetic material. These gaps result in greater uniformity of the magnetic field within the permanent magnet itself. These gaps could be readily applied to any of the other magnet assemblies previously disclosed.

FIG. 131 shows a 4-pole permanent magnet assembly that incorporates small gaps between the sectors of magnetic material. The direction of magnetisation through each sector is indicated by arrows on the end faces of the respective sectors. This direction of magnetisation produces the magnetic field seen in FIG. 130.

Parasitic energy loss due to the formation of eddy currents in the magnetic shielding or support structures due to local variations in the magnetic field can be mitigated by constructing the shielding or support structures out of a series of laminated sheets.

In a variation of previously disclosed permanent magnet devices, the device in FIG. 132 shows the external steel shielding constructed from multiple laminations of steel or other magnetically permeable or ferromagnetic material.

Each sheet used in the construction is electrically insulated from adjoining sheets thereby preventing the formation of large eddy currents in the shielding or support structures. Where ferrite shielding is not employed the support structures could be largely constructed from non-conducting material further reducing parasitic loss.

In another variation the steel shielding could be constructed from a series of concentric laminated assemblies that contain a gap of non-magnetic material. This method of construction allows a significant reduction in the volume of the shielding material with a minimal reduction in both the efficacy of the magnetic shielding and the output power of the device.

FIG. 133 shows a further variation on the device shown in FIG. 132 where the steel shielding is created from a set of concentric layers of laminated shielding material. The use of multiple layers with an intermediate air gap allows a reduction in the mass of required shielding material with only a minimal effect on the field containment and power output of the device.

In the brushless embodiments previously disclosed the rotation of the permanent magnet assemblies at high rotational speeds place a significant centrifugal force loading on the assembly material. The following variation uses an external layer or wrap of high strength material (such as Kevlar or carbon fibre) to contain this force and preserve the structural integrity of the permanent magnetic material at high speed.

FIG. 134 shows a permanent magnet that has an external wrap of Kevlar, carbon fibre or other high strength, low electrical conductivity material, such as titanium. The external material contains the centrifugal forces on the magnetic material at high rotational speeds.

In another variation of the assembly shown in FIG. 102 the permanent magnet material in the assembly is further subdivided into a collection of concentric rings. The high strength material is located within these inter-annular gaps in order to provide several layers of additional support against the centrifugal force exerted on the magnetic material. A variation with an external support layer and an additional internal support layer is shown in FIG. 135.

This variation on the construction of the permanent magnet assembly is one where the permanent magnetic material is divided into a number of concentric layers with Kevlar or carbon fibre material between concentric layers. This additional material between layers is designed to contain centrifugal forces at high rotational speeds ensuring the structural integrity of the permanent magnet assembly.

A key difference between the embodiments presented in this document and conventional approaches to motor and generator design concerns the use of cylindrical magnetic assemblies that are predominantly constructed from permanent magnetic material. This is in contrast with more conventional approaches to motor/generator design using permanent magnets where the magnetic material consists of a thinner layer of material disposed at the radial extremity of the permanent magnet assembly. This disposition is shown in FIG. 136 and a resulting plot of the radial field strength is shown in FIG. 137.

The strength of the radial field is important as it is the interaction with this radial magnetic field and the current flowing in the conductors arrayed circularly about the permanent magnet that produces an output torque in the case of a motor. In the same fashion it is the interaction of the radial magnetic field and the moving conductors that generates current in the conductors corresponding to the applied torque in the case of a generator.

The strength of the radial magnetic field for a cylindrical magnet that is comprised of permanent magnetic material in its entirety (ie. completely 'filled in') is shown in FIG. 138. The first observation is that the strength of the radial magnetic field is more uniformly distributed about the radius of the device. This in effect results in a more uniform delivery of torque/generation of power from a single phase over 360 degrees of rotation.

The second observation is that the increase in the volume of magnetic material increases the strength of the radial magnetic field. In effect the power output of the device is proportional to the volume of magnetic material employed in its construction. In order to obtain devices of the highest power within a given volume as much as possible of the interior assembly of the device should be made from permanent magnetic material with any reduction of this material only for the purposes of location or mechanical support.

The power output of the devices for a given volume of magnetic material decrease with an increasing number of magnetic poles, that is 4-pole devices have lower output than 2-pole devices etc.

FIG. 138 is a sectional field plot of the strength of the radial magnetic field produced by a full thickness 2-pole permanent magnet assembly similar to the assemblies disclosed previously. The regions of high radial field strength are spread more evenly about the perimeter of the device when compared with FIG. 137.

This disclosure pertains to the development of homopolar style Turbine motors and generators. In particular the construction of Turbines where the electromagnetic coils or magnetic material that provide the driving magnetic field (in which the homopolar rotor operates) are replaced by bulk superconducting material or by laminations of superconducting material that produce a persistent magnetic field.

The production of magnetic field using bulk superconducting material occurs when the material is cooled in the presence of an external or energising magnetic field. When this external field is removed the diamagnetic nature of superconducting material results in the creation of persistent circulating currents within the superconductor. These persistent circulating currents create an external magnetic field effectively resulting in a permanent superconducting magnet that retains its field production capabilities for as long as the material is kept within the superconducting state.

The first embodiment in FIG. 139 shows a homopolar rotor assembly between two bulk superconducting magnets. The removal of current carrying leads to and from the superconducting magnets greatly reduces the cooling power required to maintain the superconducting state. The simplified cryostat can optionally be fixed to the rotor and allowed to rotate. The device will still operate as a result of the Faraday Paradox.

FIG. 139 shows a homopolar style Electromagnetic Turbine where the driving magnetic field is created via energised superconducting bulk material. The bulk material has a persistent magnetic field induced such that it forms a type of superconducting permanent magnet.

In the second embodiment in FIG. 140, the bulk superconducting magnet is constructed from laminations of superconducting material. These laminations are aligned such that the circulating currents are allowed to form and flow in the direction required to create the desired magnetic field profile. FIG. 140 shows a Homopolar Electromagnetic Turbine similar to that shown in FIG. 139. The bulk superconducting material has been created using laminations of superconducting material.

In the embodiments previously disclosed, the current carrying windings surround the permanent magnet assembly by a fixed offset or clearance. Due to this offset, the broad aspect ratio of the device is principally determined by the aspect ratio of the permanent magnetic assembly. This aspect ratio or relationship between the length of the permanent magnet and its diameter has an effect on the output power available for a given volume of magnetic and current carrying material.

The output power of the device (as a function of the device aspect ratio) is subject to the following two considerations:

Firstly, the power obtainable from a particular geometry increases with the rotational speed or RPM of the device. In practice the peak rotational speed is subject to physical limitations imposed by centrifugal loading on the rotating material which is, in turn, dependant on the surface speed at the outer radius of the material. This means that device geometries with smaller rotor diameters can spin at higher speeds resulting in increased power.

Secondly, the length of the magnetic assembly creates the bulk of the resultant torque on the current carrying windings with a small percentage of the torque resulting from magnetic field 'captured' by the end windings (when operating as a motor). As the devices become longer relative to their diameter the torque contribution from the end windings reduces. In the case of a generator the contribution to the generated voltage from the end windings reduces.

FIG. 141 to FIG. 144 show two embodiments using identical amounts of magnetic material and current carrying windings but with different ratios of the device diameter to device length.

FIG. 141 shows an embodiment of a permanent magnet device with an aspect ratio identical to that of devices previously disclosed. Some windings have been hidden for clarity.

FIG. 142 is a magnetic field plot of the device shown in FIG. 141. The field is plotted through a horizontal section of the device that is aligned parallel to the direction of magnetisation of the permanent magnet assembly.

FIG. 143 is an embodiment of a permanent magnet device that uses the same volume of magnetic material and current carrying windings as the device shown in FIG. 141 but with a smaller diameter and correspondingly longer length. Some windings have been hidden for clarity.

FIG. 144 shows the corresponding magnetic field plot of the device shown in FIG. 143. The field is plotted through a horizontal section of the device that is aligned parallel to the direction of magnetisation of the permanent magnet assembly.

In the magnetic field plot in FIG. 143 of the device shown in FIG. 141, the vectors showing the magnetic field enter the device (the South' Pole) and exit (the 'North' Pole) in line with the direction of magnetisation of the magnetic material. For a substantial portion of the length of the magnet either side of the midpoint, the magnetic field exits the permanent magnet and returns 'in-plane' to the nearest opposite pole. Thus the field behaves similarly to the sectional field plots previously shown in this document.

At either end of the magnet the magnetic field does not return 'in-plane' around the circumference of the cylindrical magnet but bends around the ends of the device to take the shortest flux return path to the nearest opposite pole.

By way of comparison FIG. 144 shows the magnetic field plot of the embodiment shown in FIG. 143 which, relative to the embodiment in FIG. 141, has a smaller device diameter and correspondingly longer length. The extended length of the device results in a greater proportion of the device length where the field return is in-plane around the device circumference, diminishing the relative contribution of the magnetic field bending around the ends.

For the same volume of material the device with a smaller diameter and longer working length can produce more power given the same outer surface speed of the rotating components.

The following embodiments show variations on the technology previously disclosed. The following variations incorporate revisions to the way in which the primary torque elements of the current carrying windings are interconnected to form a single winding phase or bundle. The primary torque elements are the sections of the current carrying winding that traverse the axial length of permanent magnet and are disposed about the radius of the permanent magnet. The windings that connect these primary torque elements at either end of the permanent magnet are referred to as the 'end windings'.

In previous embodiments the end windings have interconnected the primary torque elements by bending around the ends of the permanent magnet while allowing a reduced clear bore at the centre of the magnet to accommodate a torque transmitting shaft.

In the following embodiments a single layer of the primary torque windings has been further subdivided into two layers. The end windings connect the out layer of a particular phase with the inner layer of the corresponding return element of the same phase. Another layer displaced at an angle about the device corresponding to the number of poles (180° for a 2 pole device, 90° for a 4 pole device etc.) completes the winding for a single phase.

FIG. 145 shows an embodiment of the previously disclosed Permanent Magnet device incorporating a revised 6 phase winding. The current carrying windings have been revised such that the return windings at either end of the device are now confined to within the same cylindrical profile as the primary torque elements.

Subdividing the windings means that the end windings can be formed by twisting the windings in a helix out from the end of the primary torque element for half of the angle of separation between the inner and outer layers, folding the windings back on themselves at the midpoint and traversing helically back to the inner layer of the opposing primary torque windings. This can be accomplished without the need to bend the windings down outside of the inner and outer radii that constrain the primary torque elements, leaving a clear bore through which the permanent magnet assembly can be assembled.

FIG. 146 shows a single layer from one phase of the current carrying windings depicted in the embodiments shown. Note that the primary torque elements are connected by end windings that consist of helical paths that bend back upon themselves.

The additional clearance in the bore of the device afforded by the new windings also aids the provision of cooling channels around the windings and the support structure of the windings.

FIG. 147 shows the device of FIG. 145 without the current carrying windings. The outer structure consists of a set of laminated winding supports or formers. These supports are laminated to reduce the generation of parasitic eddy currents in the supports. Encapsulating the winding supports are inner and outer helical paths or channels through which coolant is passed to remove heat generated in the windings. The outer structure consists of inner and outer helical channels through which coolant is passed to remove heat generated in the windings. The laminated winding supports are also shown.

FIG. 148 is an end-on, sectional view of the device shown in FIG. 147, showing the start of the helical cooling channel.

FIG. 149 shows the embodiment of FIG. 147 with an additional detail view of the laminated coil support structure in between the helical cooling channels.

FIG. 150 shows the device shown in FIGS. 145 to 147 with the outer covering removed to show the outer cooling channel that forms a helical path along the axis of the device.

A further variation concerning the cooling of the current carrying windings is shown in FIG. 151. In this variation the outer support structure is constructed from a series of laminations. Each of the laminations has a series of cut outs positioned on a pitch circle diameter around the lamination. When the laminations are assembled with an angular skew introduced into successive laminations a set of helical channels are formed within the stack of laminations. FIG. 151 shows a device where the outer structure consists of a series of laminated plates to minimise loss due to parasitic eddy currents. Multiple helical channels are formed by progressively twisting the cut outs stamped in the laminations.

FIG. 152 shows the device in FIG. 151 with the current carrying windings in place. FIG. 153 is different semi-sectional view of the device shown in FIG. 152.

In a similar manner to embodiments previously shown the current carrying windings can by divided into any number of electrical phases. FIG. 154 shows the device of FIG. 153 with the current carrying windings sub-divided into 12 Phases.

A person skilled in the art may recognise that the 12 electrical phases of windings indicated in 154 could be seen as 12 bundles of current carrying windings and could be run as a 3 or 6 Phase device with phase current shared across multiple winding bundles.

Multi-Layer Permanent Magnet Motors/Generators:

In yet a further variation to the embodiments previously presented additional layers of current carrying conductive windings can be added to the device. The additional layers of windings interact with the magnetic field produced by the permanent magnet producing more power from the device when motoring or generating. Due to the increased working radius of the additional layers of windings the width of individual winding bundles can be increased, again increasing the power level of the device.

FIG. 155 shows an embodiment of the permanent magnet device where an additional layer of current carrying windings has been included. The additional layer increases the power level of the device. There are also three layers of cooling channels, one above and one below the current carrying windings with a third in between the winding layers.

The use of multiple layers of windings instead of one large layer allows channels to be created between the winding layers through which coolant can be pumped in order to more effectively remove heat generated in the windings.

The dimension of the gap between the layers of windings can be increased to allow for greater cooling capacity. There is an optimisation that must take place between the extra cooling capacity gained by increasing the gap and the resulting decrease in magnetic field that occurs as the windings increase in radius relative the permanent magnet. The extra cooling capacity allows for greater current density in the windings and hence greater total current in a given winding area. The gap distance therefore is a question of optimisation between the increased current capacity available with increasing gap and decreased magnetic field strength available with increasing gap.

FIG. 156 is a half sectional view of the embodiment of FIG. 155 with the current carrying windings removed showing the three layers of helical cooling channels in the winding support structure.

FIG. 157 shows the embodiment of FIG. 156 with an additional detail view showing the three sets of cooling channels. The previously shown inner and outer channels are augmented by a third channel located in between the inner and outer layers of the current carrying windings.

FIG. 158 shows an end-on, semi-sectional view the multi-layer current carrying windings shown in FIG. 155. FIG. 159 is plot of the magnetic field produced by the two layer device shown in FIG. 158.

It would be apparent to a person skilled in the art that the variations detailed could be readily applied to other embodiments previously presented—including multi-pole variants.

FIG. 160 shows a 4 Pole variation of the single layer permanent magnet device incorporating the revised end windings and cooling channels.

FIG. 161 shows a single layer from one phase of the 4 Pole current carrying windings. The end windings of the 4 pole machines do not extend as far past the end of the permanent magnet when compared with the 2 pole devices.

FIG. 162 shows a permanent magnet motor of the type shown in this document with the support and cooling structures in place. These structures seal the windings from the environment while catering for the delivery of current to or from the windings and the removal of heat from the windings.

Improvements and Variations to the Multi-Rotor Superconducting Toroidal Technology.

The following material details variations and improvements to the previously described Toroidal motors and generators that utilise a superconducting external Toroidal winding to create the background or 'drive' magnetic field and multiple normal conducting current carrying windings that are situated within the outer toroid. While the following embodiments are shown with superconducting toroidal windings and normal conducting rotor windings it would be clear to anyone skilled in the art that any or all of the windings could be readily constructed from either superconducting or normal conducting material.

FIG. 163 shows a Multi-rotor Toroidal Style motor/generator. The outer toroidal windings are divided into sections contained within separate cryostats to facilitate construction of the toroid around the internal rotor windings.

One of the primary variations is the division of the drive field producing toroid into segments. Each segment has its own cryostat allowing each of the segments to be assembled around the internal rotor windings.

The windings in FIG. 163 are continuous within each segment—a distinguishing feature when compared with previously disclosed embodiments of toroidal style drive devices. The continuous nature of the segment winding leads to improved containment of the magnetic field within the body of the toroid producing more power and less stray magnetic field external to the device.

The devices illustrated are also shown with helical gears for the transmission of torque between the central and multi-rotor drive shafts.

FIG. 164 shows the embodiment of FIG. 163 with one half section of one toroidal segment removed to show the internal current carrying rotor windings. FIG. 165 shows a quarter sectional view of FIG. 163 showing the internal rotor windings in greater detail.

A clarification of the embodiment shown in FIG. 163 concerns the physical construction of the segmented windings and cryostats that make up the outer toroid. By segmenting the outer toroid into individual cryostats the required clearance between the superconducting windings contained within the cryostats and the outer surface of the cryostat itself necessitates a gap between the windings where the individual toroid segments mechanically fasten together.

FIG. 166 shows an embodiment of the multi-rotor toroidal drive system with gaps between adjacent winding segments of the toroid shown. These gaps result from the clearance required between the superconducting windings and the outer wall the cryostat.

FIG. 167 shows an end-on view of the embodiment shown in FIG. 166 that shows the gaps between successive segments of the toroidal windings.

FIG. 168 is a plot of the magnetic field produced by the gapped toroidal windings shown in FIG. 166.

FIG. 169 shows the internal rotor assemblies of the devices shown in FIG. 163 and FIG. 165. Six rotors are shown connected a central drive shaft via helical gears. As disclosed previously, the rotor drive shafts can spin at approximately the same speed as the central shaft or be stepped down or up (shown) in rotation speed relative to the central shaft.

FIG. 170 is an end view of the multi-rotor assembly shown in FIG. 169.

Multi-Rotor Permanent Magnet Toroidal Technology:

The variations disclosed in this document relating the single permanent magnet embodiments can be readily applied to the toroidal permanent magnet technology that incorporates multiple rotor assemblies. Applicable variations include the revised end windings that produce a clear bore, the additional cooling channels through the device to remove the heat generated in the device via fluid and the use of multiple layers of windings with inter-layer liquid cooling channels.

FIG. 171 shows a 3 Rotor Toroidal Permanent Magnet motor/generator that incorporates the revised end windings and the channels for liquid cooling of the current carrying windings.

FIG. 172 shows a 4 Rotor Toroidal Permanent Magnet motor/generator that incorporates the revised end windings and the channels for liquid cooling of the current carrying windings.

FIG. 173 shows a 6 Rotor Toroidal Permanent Magnet motor/generator that incorporates the revised end windings and the channels for liquid cooling of the current carrying windings.

Timing Variations in the Delivery of Current to the Current Carrying Windings

In the embodiments previously disclosed it has been envisaged that the current in the current carrying windings would take the shape of a square wave with the polarity reversal of the current occurring at the angular midpoint between successive magnetic poles. For example if the North pole of the permanent magnet is at 0° and the South pole at 180° then the reversal of current in the winding takes place at 90°. The following illustrations are for a single phase of the current carrying windings in a 2 Pole device. Application to multi-pole devices involves decreasing the angle between switch points.

FIG. 174 shows a default square wave current pattern intended in the embodiments presented. The poles of the permanent magnet align through 0° and 360°.

As the number of current carrying windings (and hence the total amount of current) around the permanent magnet increases, the magnetic field produced by the windings distorts the magnetic field produced by the permanent magnet. This distortion in the field shifts the poles of the device such that the application of a strictly square wave current profile results in elements of the current carrying windings that produce torque or current opposing the intended direction of torque or current production.

One approach to mitigating this field distortion and counter-productive effect is to alter the timing of the current signal in the current carrying windings. Approaches include:

- Advancing or retarding the switchover point of the square wave relative to the angle between the windings and the pole produced by the permanent magnet (FIG. 175 and FIG. 176).
- Introducing a dwell period at the point of current reversal such that the current is effectively zero in the windings for some period before and/or after the switchover point (FIG. 177).
- Replacing the square wave signal with an equivalent Sine or Cosine current signal that naturally tapers the level of current in the windings as the switch over point is approached (FIG. 178).

FIG. 175 shows a square wave current delivery with the timing of the current reversal retarded relative to the timing of FIG. 174.

FIG. 176 shows a square wave current delivery with the timing of the current reversal advanced relative to the timing of FIG. 174.

FIG. 177 shows a square wave current delivery with a dwell zone of during current reversal where no current is flowing in the windings.

FIG. 178 shows a comparison between square wave current delivery and the equivalent power current waveform as a cosine wave for sinusoidal current delivery.

Furthermore, the variations in timing presented could also be used together, for example, using a sinusoidal current waveform or current waveform with a dwell zone that has advanced or retarded timing. It would also be acceptable to employ a gradual reduction of the current as it approaches the switchover point that is not strictly sinusoidal. The important point is that the variations in the current amplitude and timing reduce the counter-productive effects on the output power of the device caused by large distortions to the magnetic field caused by the current carrying windings.

The current waveforms presented are indicative and should not be seen as limiting potential current waveforms in the conductive windings.

The following material concerns a variation on the toroidal technology. In previously disclosed embodiments involving a current carrying toroidal winding, the background field produced is constant—the function of a DC current in the background field coils. The current in the rotating windings alternates as either a sine or square wave AC signal.

In a variation to this embodiment the toroidal windings are subjected to an alternating current with the rotating windings subject to a fixed DC current. The alternating current in the toroidal windings results in rotation of the rotating windings when employed as a motor. Alternatively the rotation of the DC powered rotating windings induces an AC signal in the toroidal windings when employed as a generator.

In yet a further variation to the devices previously disclosed, the rotating windings are replaced by permanent magnet rotors or by persistently magnetised superconducting bulks. Rotation of the magnetic material is achieved through the same alternating current passed through the toroidal background field windings.

FIG. 179 shows an embodiment of the Toroidal technology where the toroidal background windings are powered by an AC source resulting in a background field that alternates in polarity. The rotors are permanent magnets where previously current carrying windings/electromagnets were used.

FIG. 180 shows a magnetic field plot of the device shown in FIG. 179. The permanent magnet rotors are shown aligned with the magnetic field of the toroidal background windings.

FIG. 181 shows a magnetic field plot of the device shown in FIG. 179. The permanent magnet rotors are shown rotated 45 degrees relative to the tangential direction of the magnetic field from the toroidal background windings.

FIG. 182 shows a magnetic field plot of the device shown in FIG. 179. The permanent magnet rotors are shown rotated 90 degrees relative to the tangential direction of the magnetic field from the toroidal background windings.

Previously a number of potential current waveforms were disclosed. The disclosed waveforms referred to the current signal in a single phase. It would be obvious to a person skilled in the art that when these waveforms are applied to multiple independent phase windings that a phase shift to the waveform must be applied to successive phase windings.

FIG. 183 and FIG. 184 show potential current waveforms in the alternating or current carrying windings of the devices disclosed in the context of a multi-phase operation. Note that the 6 phases of windings result in 12 torque producing or current generating elements in order to produce continuous torque from the applied input waveforms shown.

FIG. 183 shows a potential sinusoidal current waveform in the current carrying windings showing the required phase shift for a 2 Pole 6 Phase device.

FIG. 184 shows a potential square current waveform in the current carrying windings showing the required phase shift for a 2 Pole, 6 Phase device.

There is a further benefit in using an AC sine wave to drive the current carrying windings over an equivalent square wave. When the square and sine waves deliver equivalent power (that is the RMS values of the delivered currents are identical) the power output of the device operating with a sine wave current produces less ripple in the delivered torque when motoring and approximately 8-11% more power. This trend is shown in FIG. 185.

FIG. 185 shows the difference in output power from a device operating with square wave current in the windings vs. sine wave current in the windings, each having the same RMS current values. Note the lower ripple and higher power of the device using sine wave current.

In addition to the previous embodiment where the multi-rotor permanent magnet machine has steel shielding around the circumference of the device the following embodiments concern a variation in which this external shielding follows the external contours of the device. This form of shielding reduces the amount of stray magnetic field that extends out from the device. This shielding also increases the power level of the machine. Both this and the previous forms of shielding could be constructed from laminated steel sheets in order to reduce eddy and hysteresis losses. Furthermore hysteretic losses in all of the devices presented in this patent could be minimised through the use of low-hysteretic materials, such as silicon steels.

FIG. 186 shows the shielding extending the length of the permanent magnet and open at each end. This should not be seen in any way as limiting the shape or extent of the steel shielding. The shielding could extend to the end of the windings and support structure. Steel end caps could also be used at either end of the device to further contain the magnetic field. The thickness of the shielding could also change in areas where more or less field containment is required in order to minimise the weight of the additional shielding.

In FIG. 186, a 3 Rotor Permanent Magnet Toroidal machine with a laminated steel shield that follows the external contours of the 3 Rotor system is illustrated. For clarity the shielding only extends the length of the permanent magnets but could alternatively extend to the end of the windings and be enclosed at either end if further shielding was deemed necessary.

FIG. 187 is a magnetic field plot of a 3 Rotor Toroidal Device shown in FIG. 186 with additional steel shielding that follows the external contours of the machine. The additional steel further contains the magnetic field and increases the power output of the device.

FIG. 188 is a magnetic field plot of a 4 Rotor Toroidal Device with additional steel shielding that follows the external contours of the machine. The additional steel further contains the magnetic field and increases the power output of the device.

FIG. 189 is a magnetic field plot of a 6 Rotor Toroidal Device with additional steel shielding that follows the external contours of the machine. The additional steel further contains the magnetic field and increases the power output of the device.

FIG. 190 is a magnetic field plot of the 6 Rotor Toroidal Device with additional steel shielding shown in FIG. 189 but with the 200 Gauss and 5 Gauss magnetic field line boundaries indicated to show the containment of the magnetic field.

In the aforementioned embodiments, the magnets were aligned within the assembly such that the magnetic field was contained largely within the assembly in a toroidal pattern. As the magnets are rotating in the following embodiments, this arrangement of successive magnetic poles results in a larger variation in the output torque of the devices. The following embodiments use differing relative angles of polarity between adjacent permanent magnetic rotors in order to produce very low ripple in the output torque or power.

The novel arrangement of successive rotor polarities also reduces the amount of shielding steel required by ensuring that not all of the permanent magnets 'throw' the field outwards at the same time.

In the previously disclosed toroidal cases the difference in the angle of the magnetic poles between successive permanent magnets in the assembly was equal to 360°/(Number of assemblies). This resulted in effective field containment when the permanent magnets were stationary.

In the following embodiments the difference in the angle of the magnetic poles between successive permanent magnets in the assembly is equal to 2×360°/(Number of assemblies). For example in the case of the 4 assembly cluster the angle is 2×360°/4=180°. While this relationship produces low ripple it should not be seen as in anyway limiting alternative arrangements of successive magnetic polarities that produce similar out of phase relationships and low ripple of the output torque or power.

A further enhancement to the devices presented previously and in this document concerns the behaviour of the devices during start up. In order to avoid a scenario where the device may have come to rest in a region of reduced torque capacity, one of the assembly or cluster members could be shifted slightly relative to its 'normal' position to produce an additional starting torque. Alternatively the controller that supplies the windings with current could advance or retard the relative timing of the current flow in the windings in order to produce a higher level of starting torque and reduce the possibility of a stalled starting condition.

FIG. 191 shows a brushless Permanent Magnet Cluster Assembly with 6 Rotors. The image shows a partial cut away of the outer steel laminations and the windings in order to see the details of the permanent magnets.

FIG. 192 is an end view of the device shown in FIG. 191. The arrows and angles indicate the relative polarities of the successive permanent magnets within the cluster assembly at one position of rotation.

FIG. 193 is magnetic field plot of the device shown in FIG. 191 for a single rotor position.

FIG. 194 shows a brushless Permanent Magnet Cluster Assembly with 4 Rotors. The image shows a partial cut away of the outer steel laminations and the windings in order to see the details of the permanent magnets.

FIG. 195 is an end view of the device shown in FIG. 194. The arrows and angles indicate the relative polarities of the successive permanent magnets within the cluster assembly at one position of rotation.

FIG. 196 is a magnetic field plot of the device shown in FIG. 194 for a single rotor position.

FIG. 197 shows a Brushless Permanent Magnet Cluster Assembly with 3 Rotors. The image shows a partial cut away of the outer steel laminations and the windings in order to see the details of the permanent magnets.

FIG. 198 is an end view of the device shown in FIG. 197. The arrows and angles indicate the relative polarities of the successive permanent magnets within the cluster assembly at one position of rotation.

FIG. 199 is a magnetic field plot of the device shown in FIG. 197 for a single rotor position.

Homopolar devices of various forms can also be used as a form of energy storage and pulsed energy delivery, that is, operating modes where the duty cycle of the homopolar device is below 100%.

Electromagnetic linear acceleration motors (linear motors) are used widely. With increasing power and energy delivery levels, energy supply and switching devices become problematic, limiting the adoption of large scale devices. The advanced homopolar technology disclosed within this document is highly suitable for linear motor and pulsed energy delivery applications including but not limited to Railgun and Coilgun applications.

The basic elements of the Pulsed Power system disclosed are:

1. a flywheel for energy storage;
2. a homopolar generator; and
3. a high current pulsed switching system A flywheel is a rotating mechanical device that is used to store rotational energy. The energy can be stored efficiently over different time periods and released via a shaft connected to a generator under load. The energy which is stored in the device depends on shape, rotation speed and weight of the rotating parts. New materials and technologies make flywheels one of the most efficient energy storage systems available. The energy contained in a flywheel system can be described as follows:

Rotational Energy:

$$E_k = 1/2 I \omega^2$$

Inertia (selected examples):

$$I = 1/2 m r^2 \qquad \text{Solid Isotropic Cylinder:}$$

$$I = 1/2 m (r_{out}^2 + r_{in}^2) \qquad \text{Isotropic Cylindrical Tube:}$$

A homopolar generator produces pure DC power depending on rotation speed, magnetic field, dimensions and load. In the disc type generator a large disc is rotating in an external magnetic field and generates a voltage between the shaft and outer rim.

In a preferred embodiment the rotating mass of the rotor can also form an energy storage device similar to a flywheel when no electrical contact is made between the rotor and stator. In this 'freewheeling' mode a voltage is generated between the inner and outer radius of the rotor but no current flows between the rotor and the stationary current delivery path. When a momentary connection is formed between the rotor and stationary current path, current flows delivering a pulse of electrical energy from the mechanical energy stored in the flywheel. For high power or pulse energy levels the switching must be both robust to withstand high currents and controllable in order to deliver accurate pulse widths over time frames from a few milliseconds to several seconds.

In a preferred embodiment this switching is accomplished using a liquid metal switch that provides a current path between a cathode and an anode. In contrast with previously disclosed embodiments of liquid metal brushes that rely on the entrainment of a volume of liquid metal in a rotating tongue and stationary groove, a liquid metal switch delivers a controlled spray or film of liquid metal between the cathode and anode of a current contact. This delivery could be accomplished by pumping the liquid metal or pressurising it with a compressible gas. These liquid metal switch systems are capable of high current transfer densities and are also well suited to intermittent operation.

FIG. 200 shows two forms of stationary liquid metal switches based on the principle of making and breaking a current transfer path using a spray of liquid metal material or a film of material between a cathode and an anode.

The two basic forms of liquid metal switch are based on either a spray of liquid metal material or a pressurised film of liquid metal material. In the above examples both the cathode and anode are stationary.

In general, the Spray System shown in FIG. 200 can be used for very short contact times but requires a larger amount of liquid. The contact time mainly depends on the liquid velocity (pressure) and operating time of the shutter.

By comparison the Brush System allows a larger contact area between the cathode and anode and uses therefore less liquid overall. The switching time depends again on the liquid velocity (pressure), shutter operating time and the time required to release the liquid between the two contact areas.

The switching could also be achieved by implementing an intermittent liquid metal contact between the rotor of the homopolar device and the stationary current carrying path. The Spray System and Brush System implementations of this type of liquid metal switch are shown in FIG. 201 and FIG. 202 respectively.

FIG. 201 shows a Spray System liquid metal switch or contact between a stationary Cathode and a rotating Anode.

FIG. 202 shows a Brush System liquid metal switch or contact between a stationary Cathode and a rotating Anode.

The Spray System shown in FIG. 201 was developed to allow very short pulses with high current densities. The contact time between on and off can be as low as a few milliseconds. By comparison the Brush System of FIG. 202 was developed to allow continuous operation at high current densities or pulsed operation with switching times of a few hundred milliseconds.

As stated previously, the flywheel of the pulsed power system could form the rotor of the homopolar generator. An embodiment of such a device for storing large amounts of energy in the homopolar rotor is shown in the following FIG. 203. An external motor or a homopolar motor disc coupled directly to the generator/flywheel rotor can be used to charge the system.

In one embodiment the combined flywheel/generator of FIG. 203 forms part of a complete Pulsed Power System shown in FIG. 204. In this embodiment final control of the energy pulse duration is performed by a liquid metal switch that is separate from the liquid metal contacts or brushes that transfer current between the stationary and rotating components of the homopolar generator/flywheel. Separating the switching mechanism allows finer control of the energy pulse width modulation and duration.

In order to minimise frictional losses in the generator/flywheel component the liquid metal brushes employed between the rotating and stationary parts may also be intermittent in operation forming a longer contact time that extends either side of the current pulse duration determined by the separate liquid metal switch.

The loads or potential applications indicated in FIG. 204 include Railguns and Coils Guns—these loads are indicative and should not be seen as limiting applications where precise pulsed power/energy delivery is required.

In FIG. 204, a pulse power system is shown where the final control of the output electrical energy pulse is performed by a separate and stationary liquid metal switch. This separate switch allows fine control over the duration of the energy pulse.

In a further embodiment the liquid metal switch forms a part of the homopolar generator/flywheel assembly. In 'freewheeling' mode no contact is made between the rotor/flywheel and the stationary current carrying path. When an energy pulse is required, liquid metal is pumped or delivered under pressure through a rotary liquid metal switch of the type shown in FIG. 201 and FIG. 202 resulting in a current pulse being delivered to the attached load. An example of this system is shown in FIG. 205. This system is slightly simpler than that depicted in FIG. 204 at the possible expense of being unable to achieve as precise energy pulse durations. In the pulse power system of FIG. 205, the liquid metal switch is integrated into the homopolar generator/flywheel assembly.

In yet a further embodiment a twin-disc homopolar generator can be employed with two liquid metal switch systems. This system allows the ready provision of sequential current pulses. This type of power delivery is often required for the supply of pulsed stator coils in a linear motor. If the rotors are counter-rotating then the current pulses can be of alternating polarity. A further benefit of counter-rotating rotors is that the total torque loading on the mounting points is reduced. An embodiment depicting a common ground between the discs is shown in FIG. 206.

While the devices shown use a flywheel that is integral to the homopolar rotor, a person skilled in the art would readily realise that the separate flywheel could be employed connected to the generator via a rotating shaft. FIG. 206 shows a twin disc Pulse Power system for the supply of sequential pulses of electrical power to a series of stator coils in a linear motor. By employing counter-rotating rotors the sequential pulses could be of opposite polarity.

The following embodiments concern the practical construction of permanent magnet technology previously disclosed. In order to construct these devices in a manner that allows efficient operation, careful consideration must be given to the minimisation of generated eddy current or parasitic loss in the various components that constitute the device. While much of the support structure can be constructed using material that is either non-conducting or a poor electrical conductor, the magnetic requirements dictate the use of steel laminations in the outer part of the machine and thermal considerations may require a conductive material such as aluminium be used to support the current carrying windings.

In general, eddy current loss can be reduced by constructing these sections out of thin laminations instead of solid bulks. While this is effective against eddy currents induced by the magnetic fields acting in-plane about the radius of the device, significant eddy current loss can be generated by field components that act out of this radial plane. This is particularly evident in the regions at either end of the permanent magnet.

A typical embodiment, including the support structure for the conductive windings is shown in FIG. 207 showing a permanent magnet motor/generator that includes both laminated steel flux guides and laminated aluminium winding supports.

A significant reduction in the energy loss caused by these additional eddy currents can be achieved through the addition of circular cuts in both the winding support structure and the laminated steel flux guides. In addition to the circular cuts further reduction in eddy current loss can be achieved by cutting the laminations radially. The cuts in the laminations must be done in a manner that provides complete electrical isolation between adjacent segmented components. The cuts reduce the path length along which the eddy current can form, thereby reducing their strength and associated energy loss. FIG. 208, FIG. 209 and FIG. 210 highlight the additional cuts used in the embodiment depicted in FIG. 207.

FIG. 208 is an end view of the embodiment of FIG. 207 that shows the detail of the circular and radial isolating cuts in the winding support and steel flux guides to reduce eddy current loss. Also shown are a series of oval cuts in the laminations that form cooling channels for the passage of fluid straight through the device.

The location of the radial cuts may be sequentially staggered in successive laminations in order to improve dimensional stability, strength and uniformity of material behaviour of the completed laminated assemblies.

The additional circular and radial cuts to the laminations have the greatest impact at the ends of the lamination stacks. In a further variation to the embodiments shown a portion of the laminations near the centre of the lamination stack can be constructed without additional cuts without causing a significant increase in the losses.

FIG. 209 shows a detailed call-out of the radial isolating cuts at the end of the aluminium winding support structure.

FIG. 210 shows a detailed call-out of the circular and radial cuts applied to the steel flux guide. The radial cuts in the above figure have been sequentially offset in successive laminations in order to improve the uniformity of the laminated material's properties and strength.

Further Variations of the Design of Liquid Metal Current Collectors.

The following embodiments show variations in the geometry of liquid metal current collectors designed to operate as part of a pressurised liquid metal recirculation system.

In the first variation (shown in FIG. 211), the liquid metal material is fed in parallel to a series of injection ports within the stator from a common reservoir or pressurised supply channel in the stator itself. A wall between the inlet and the outlet of the common pressurised supply channel can be used to prevent the liquid metal from recirculating in this channel.

FIG. 211 is semi-sectional view of the rotor and stator of a liquid metal current collector system. The stator in the system contains a common pressurised supply channel in which a reservoir of liquid metal material is dispensed through the angled holes in the stator.

The injection ports are shown at an angle suitable for operation in one direction of rotation. These ports could be at 90 degrees to the circumference (that is normal to the circumference) of the stator for bi-directional operation. In this variation excess liquid metal could be collected at the sides of the rotor disc. Alternatively, two sets of injection ports, each set angled to suit a particular direction of rotation, could be employed with a non-return valve system ensuring operation of the correct set of ports for the current direction of rotation.

FIG. 212 is a half sectional side view of the embodiment of FIG. 211. The common pressurised supply channel and angled injection holes are used to deliver liquid metal to the gap between the stator and the rotor. The supply channel itself has an inlet and an outlet through which pressurised liquid metal can be delivered and extracted. The inlet and outlet is separated by a wall that prevents the liquid metal from continuing to circulate in the supply channel.

FIG. 213 is a further sectional variation of the embodiment of FIG. 211. The common pressurised supply channel and angled injection holes are used to deliver liquid metal to the gap between the stator and the rotor. The supply channel itself has multiple inlets and outlets through which pressurised liquid metal can be delivered and extracted.

In a second variation, the common pressurised supply channel is removed and the angled injection ports are brought out to the external surface of the rotor. The delivery of liquid metal to these injection ports could be in parallel from an external reservoir or via individually controlled regulators for each injection port. Additional, non-angled ports are shown in the following embodiments that could facilitate an additional ejection path for the entrained liquid metal that is delivered to the gap between the stator and the rotor FIG. 214 shows an alternative embodiment in which the angled injection ports are brought out to individual orifices on the outer edge of the stator. Non-angled liquid metal ejection ports are also shown.

FIG. 215 is a half sectional side view of the embodiment of FIG. 214. In this embodiment the common pressurised supply channel has been removed and the angled injection holes extended to the outer surface of the stator. The non-angled holes can optionally be used to aid the ejection of liquid metal from the rotor-stator gap region.

In the following devices electrical energy is turned into mechanical work or mechanical work is used to create electrical energy through the action of a current carrying conductor moving within a background magnetic field.

In the following embodiments this background magnetic field is created by a series of adjoining electromagnetic coils that are wound in the form of toroids or sections of toroids in order to direct magnetic field into a working region or a series of working regions through which a current carrying conductor moves. These toroidal sections both direct the magnetic field such that it is substantially perpendicular to the direction of current flow in the current carrying conductors/windings and contain the magnetic field largely within the device itself. In this manner a high power device can be constructed without the need for steel or ferromagnetic flux guides.

A gap region exists between toroidal winding sections to allow for the mechanical placement and operation of the current carrying conductors.

In all of the embodiments shown the toroidal winding sections and arrangements are built from superconducting wire and the current carrying conductors from normal conducting material such as copper. It would be obvious to a person skilled in the art that either part of the device could be readily constructed from either superconducting or normal conducting material.

Additionally the current carrying conductors shown in the embodiments presented are shown as a continuous zig-zag winding around the rotor circumference. It is obvious that the alternative embodiment using a series of bedstead or racetrack style coils could also be employed. This alternative style of winding has been previously disclosed in this document.

In the embodiments presented the magnetic field produced by the adjoining toroidal sectors remains constant and is produced by a constant direct current that is fed to the toroidal sector coils. The current in the current carrying windings changes polarity as it approaches the successive magnetic poles created by the arrangement of the toroidal sectors. The current waveform could be a sine wave, a square wave or any other wave form that maximises the produced power and reduces the output power ripple.

It should be obvious to a person skilled in the art that the reverse scenario is also possible, where the polarity of the background field is sequentially changed and the current in the current carrying rotor assembly kept constant.

In the usual case, the 'background field coils' that create the magnetic field in the working or gap region are stationary and the current carrying conductors or windings move on a rotor support structure through this gap or working region. The reverse situation, where the current carrying windings are stationary and the background field coils move, is also possible.

FIGS. 216 to 234 disclose a series of devices referred to as the 'Star Toroidal' devices. They consist of multi-pole AC motors or generators in which the current flowing in the working region flows parallel to the rotational axis of the machine. The background magnetic field, produced by the Star Toroidal windings, acts in a predominately radial direction.

These devices are multi-pole and the rotors consist of multiple electrical phase windings. The embodiments could readily be extended to any number of poles and electrical phases.

FIG. 216 shows a Star arrangement of toroidal winding sections. This arrangement produces 8 poles that are sequentially opposing in sign around the circumference of the working region or gap.

FIG. 217 shows a plot of the magnetic field generated by the embodiment of FIG. 216 showing the orientation of the magnetic field through the current carrying conductors in the working region.

FIG. 218 shows a variation of the embodiment shown in FIG. 216. In this variation the total number of successive magnetic poles has been increased to 18.

FIG. 219 is a magnetic field plot of the variation shown in FIG. 218.

FIG. 220 shows an isolated view of the rotor assembly of current carrying windings. In the embodiment shown the current carrying windings consist of six electrical phases of zig-zag windings positioned around the circumference of the working radius of the device.

FIG. 221 is an end view of a complete embodiment of the Star Toroidal device consisting of the toroidal sector assembly of FIG. 216 combined with the rotor assembly shown in FIG. 220.

FIG. 222 is an isometric view of the complete embodiment of FIG. 221.

In a preferred embodiment the Star toroidal coils are made of superconducting wire or tape and are housed in a cryostat. This cryostat housing could consist of separate cryostats for the inner and outer elements of the Star toroid, as depicted in FIG. 223.

In an alternative embodiment the inner and outer cryostats could be joined at one end to create a single unified cryostat for all of the cryogenic componentry. Physical and mechanical access to the current carrying rotor assembly would be from the end opposite to where the cryostats are joined. This embodiment is illustrated in FIG. 225.

In yet a further embodiment each toroidal sector element, whether inner or outer, could be contained within its own separate cryostat in a modular manner. This arrangement could be well suited to larger devices or where it would be desirable for the device to be able to continue operating following the failure of an individual cryostat module. This embodiment is depicted in FIG. 226 to FIG. 228.

FIG. 223 shows the embodiment of FIG. 221 showing partially sectioned inner and outer cryostats for the superconducting Star Toroidal assembly and a support structure for the rotor assembly that contains the current carrying windings.

FIG. 224 shows the complete cryostat and rotor assembly of FIG. 223.

FIG. 225 shows a half sectional view of an embodiment where the inner and outer Star Toroidal sectors are housed in one joined cryostat.

FIG. 226 shows a complete 18 pole embodiment with each of the inner and outer Star Toroidal sectors housed in modular style individual cryostat.

FIG. 227: An isometric view of the complete 18 pole device shown in FIG. 228 with the outlines of the modular cryostat elements shown.

FIG. 228 is an external isometric view of the embodiment of FIG. 226.

The following embodiments depict further variations to the previously disclosed Star Toroidal Drive. These variations should not be seen as in any way limiting potential applications or methods of constructing the devices based on the principles disclosed.

In the first variation, the inner toroidal sectors that previously interconnected the outer toroidal path have been rotated 45 degrees about the central axis and the current orientation set such that the magnetic field is directed in a near circular path around the individual toroids and through the working gap region.

FIG. 229 shows a variation of the Star Toroidal Device in which the inner toroidal sectors have been rotated 45 degrees such that each magnetic pole pair is now created by a magnetic field directed around a single set of inner and outer toroid sectors.

FIG. 230 shows the embodiment of FIG. 229 shown with the toroidal sectors and the current carrying rotor windings.

In another embodiment, the inner toroids are replaced by steel or ferromagnetic based flux guides that are used to guide the magnetic flux from the working region to each successive outer toroid sector. This approach would be well suited to smaller devices where the internal toroids become difficult to fit in the device.

FIG. 231 shows a variation where the internal toroidal sectors have been replaced with a ring of steel or ferromagnetic material that guides the magnetic field between successive outer toroidal sectors.

FIG. 232 shows the embodiment of FIG. 231 shown with the current carrying rotor windings added.

FIG. 233 shows a further variation where the internal steel flux guides are shaped like circular sectors to direct magnetic field between successive toroidal elements.

FIG. 234 shows the embodiment of FIG. 233 shown with the current carrying rotor windings added.

The following devices replace the current carrying rotor assembly with a toroidal coil assembly that operates in a larger working region or gap in the Star toroidal assembly. This toroidal coil assembly could consist of a single phase or of multiple electrical phases of toroids that have been interleaved.

FIG. 235 is an alternative embodiment that utilises the Star Toroidal assembly to produce a background field in which an inner circular toroid is positioned and rotates.

FIG. 236 shows the inner toroidal rotor assembly isolated from the assembly of FIG. 223.

FIG. 237 is a view of the alternative embodiment of FIG. 236 showing the support structure for the inner toroidal rotor and the extents of the cryostat structure for the Star toroidal assembly.

In another variation to the previously disclosed Star Toroidal Device the orientation of the background magnetic field and the working current direction have been shifted such that the direction of the working current extends in the radial direction of the device and the background magnetic field is predominately parallel to the axis of the device in the working region or gap. In effect, it is an axial flux embodiment of the previously disclosed radial flux Star Toroidal Device.

In this embodiment the background magnetic field is again directed between successive working regions by a series of toroidal sectors that produce a high concentration of magnetic field in the working regions but largely contain this magnetic field within the extents of the device itself.

FIG. 238 shows the Wave Toroidal arrangement of coils that produce the background field of alternating axial polarity around the working circumference of the device.

FIG. 239 is a side view of the Wave toroidal coils that shows the gap between the two halves where the current carrying conductors/windings are placed.

FIG. 240 is a sectional plot of the magnetic field produced across the working gap of the coils shown in FIG. 238 and FIG. 239.

FIG. 241 is a plot of the magnetic field strength in the location of the working gap around circumference of the device. The polarity of successive radial regions of high magnetic field alternates positive and negative into and out of the page.

FIG. 242 shows the current carrying windings isolated from the Wave Toroid. The windings are depicted as zig-zag winding consisting of six electrical phases.

FIG. 243 shows the Wave Toroidal coil assemblies of FIG. 238 have been combined with the rotor assembly of FIG. 242 to form the completed device.

FIG. 244 shows the completed device of FIG. 243 with the rotor support structure added and the boundaries of the cryostats that encapsulate the Wave Toroidal coils outlined.

FIG. 245 is an external view of the cryostat and rotor assembly shown in FIG. 244.

In another embodiment of the Toroidal style devices, the background magnetic field is created by a series of C-shaped toroids that are arranged together to form a circular assembly. The direction of current flow in adjacent toroids in the circular assembly is reversed to create a succession of alternating poles around the circumference of the device. Similar to the previously disclosed Wave Toroidal device, the magnetic flux in the working region/gap is predominately parallel to the rotational axis of the device.

The individual toroidal sectors are 'C-shaped' wherein instead of forming a completely closed toroidal coil; a gap is created in one section of the toroid through which a current carrying winding can be moved to perform mechanical or electrical work.

In the embodiments shown this gap can be located on the inner side of the toroidal assembly allowing traversal of the inner radial succession of magnetic poles by the current carrying windings or on the outer side of the toroidal assembly, wherein the current carrying windings traverse the outer radius. It will be obvious to a person skilled in the art that the device could conceivably have both inner and outer working regions with bother inner and outer rotors.

The C-shaped toroidal sectors are depicted as wedge shaped in order to interlock more closely in the final circular assembly. In an alternative embodiment these sectors could be constructed using constant rectangular cross section in order to simplify construction.

In a further refinement to the depicted embodiments the straight windings of the toroidal sectors that are tangential to the circumference of the device could be curved to match the radial location of respective edges of the wedges, thus allowing the device to appear more circular in external appearance.

FIG. 246 is a front view of the background field coils of the C-Shaped Toroidal Device. The toroidal sectors are shaped such that they fit together as a series of interlocking wedges.

FIG. 247 is a magnetic field plot of the C-shaped Toroidal coils illustrated in FIG. 246. The polarity of the magnetic field alternates into and out of the page for each successive toroidal sector.

FIG. 248 is an end view of the C-shaped Toroidal coils of FIG. 246.

FIG. 249 is a plot of the magnetic field in one sector of the C-shaped Toroidal device. In this embodiment the working region/gap where the current carrying conductors are situated is indicated for both the inner rotor and outer rotor embodiments.

FIG. 250 shows a C-Shaped Toroidal device complete with both the C-shaped wedge toroidal coils that produce the background magnetic field and the multi-phase current carrying rotor assembly similar to that employed in the Wave Toroidal Device. One sector of the C-shaped toroid has been removed to show the inner assembly.

FIG. 251 shows the multi-phase rotor windings of FIG. 250 shown in isolation.

FIG. 252 shows the complete device of FIG. 250 shown with the cryostat for the C-shaped coils and the rotor support assembly in place.

FIG. 253 shows a further embodiment where the working region has been shifted to the outer side of the C-shaped toroids. The current carrying windings now rotate at this outer radius.

FIG. 254 shows the embodiment of FIG. 253 with the cryostat for the C-shaped coils and the rotor support assembly in place.

The following embodiment shows a device similar to that disclosed in the Star Toroidal section but adapted for operation as a 2-pole device. The stator coils are arranged as shown in FIG. 255. The stator coils can be superconducting racetrack coils that would normally be enclosed in a cryostat. These stator coils direct the magnetic field such that concentrated magnetic field is delivered to the region where the current carrying windings that form the rotor assembly are located while still containing the magnetic field largely within the confines of the device itself.

FIG. 256 shows the field profile of the 2 pole stator winding. The toroidal sections contain and direct the stray magnetic field while producing a straight magnetic field in which the rotor can be positioned. The stator toroidal sectors are supplied with DC current in order to produce a magnetic field as shown in FIG. 256.

The Rotor Windings of the 2 Pole Toroidal device can be a three phase zig-zag winding or alternatively use bedstead coil style windings. This rotor winding could also be made from bedstead coils or an overlapping coil arrangement. The current in the winding is reversed every 180 degrees (or supplied with a sinusoidal AC current) in order to maintain rotation of the rotor. The rotor winding is supported by suitable rotor support structure in order to accommodate torque on the rotor. It should also be designed with a view to minimising eddy current formation and to accommodate cooling of the rotor windings. The rotor winding is constructed from copper in a way to minimise AC losses (eg. Litz wire, thin stranded).

FIG. 257 shows the multi-phase rotor windings isolated from the complete assembly of a 2 Pole Toroidal device. The said rotor is positioned in the straight field portion in between the two toroidal sections as shown in FIG. 258.

The two pole layout can be varied by further separating the toroidal stator coils and reducing the radius of the toroids as showing in FIG. 259. This separation can lead to the use of less superconducting material and a smaller overall size of the device while still allowing good magnetic field containment.

In a further variation to the embodiment depicted in FIG. 259 additional coils can be placed in outer gap created by toroidal sectors in the Alternative 2 Pole Toroidal device in order to reinforce and better contain the magnetic field.

FIG. 260 shows a field plot for the Alternative 2 Pole Toroidal Device layout illustrated in FIG. 259.

The cryostat shape or number of pieces of construction may also be varied in order to aid construction or assembly. This alternative 2-Pole Toroidal arrangement is shown with its cryostat in FIG. 261.

In another embodiment a toroidal drive can be formed by using 3 toroidal assemblies of race track coils. The outer two toroidal assemblies form the stationary coils and are supplied with DC current such that the field from the racetrack coils is produced around the toroid in the directions indicated in FIG. 262. The racetrack coils can be superconducting and housed in a suitable cryostat.

The central coil set forms the rotor coil assembly and is supported by a suitable rotor structure. The rotor coil windings are normally of copper construction. The coil layout is shown in FIG. 263 and is comprised of 3 phases each supplied with an alternating current.

The completed assembly of both the stator toroids and the toroidal rotor coil assembly are shown in FIG. 264.

FIG. 265 shows a completed 3 Toroidal Layer Drive of FIG. 264 with the rotor support structure shown.

FIG. 266 shows a completed 3 Toroidal Layer Drive of FIG. 264 with the cryostats for the stationary outer toroids shown.

The following device employs a central toroid of superconducting racetrack coils to generate a large toroidal magnetic field and an outer toroid that is comprised of coils that are 'U-shaped' that sit over the smaller racetrack toroid in the manner depicted in FIG. 267.

When an appropriate current waveform is applied to the outer U-shaped toroid, the interaction between the fields of the inner toroid and the outer U-shaped toroid cause the outer toroid to spin. Alternatively spinning one of the toroids generates electrical energy in the other toroid.

FIG. 268 shows the U-Shaped Toroidal Drive of FIG. 267 with the inner Stator Coils isolated and the boundaries of the cryostat shown.

FIG. 269 shows the U-Shaped Toroidal Drive of FIG. 267 with the Rotor Toroid shown. One segment of the rotor toroid has been removed to show the U-shaped profile of the coils.

FIG. 270 shows a U-Shaped Toroidal Drive with the supporting structure of the rotor shown.

FIG. 271 shows a U-Shaped Toroidal Drive with the completed external assembly.

The following disclosures relate to devices that use permanent magnetic material to create a background magnetic field whose flux in the working region or gap acts in a direction that is predominately perpendicular to the axis of rotation of the device. This magnetic field is directed between magnetic poles and the working region by steel or ferromagnetic flux guides.

Current carrying conductors, whose working length is oriented parallel to the axis of rotation, traverse a circumferential path about the midline of the working region or gap either generating electricity from applied mechanical energy or performing mechanical work from applied electrical energy.

One embodiment of this device is known as the 'C-Drive' due to the shape formed by an individual pole assembly, comprised of two permanent magnets of like polarity that are adjacent to the working region, and the C-shaped steel flux guide that connects the back of the two permanent magnets.

FIG. 272 shows a single pole element of the permanent magnet and steel assembly that produces the background magnetic field. The indicated polarity of the magnets shows the relative direction of magnetisation for a single element. In adjacent pole elements in a completed assembly the polarity is reversed.

The complete device is created by arranging these individual pole elements in a circular array around the axis of rotation of the device. In this array the polarity of adjacent pole elements is reversed such that the current carrying conductor experiences a North-South-North-South . . . progression of magnetic field polarity as it traverses its circumferential path.

The embodiments depicted show the current carrying windings comprised of zig-zag style windings arranged in multiple electrical phases. Alternatively these windings could readily be constructed from bedstead coils. The current carrying windings are fed with phase and pole aligned alternating current. This current could be a sine or square waveform or any other waveform that maximises output power level and minimises output ripple.

The steel flux guide depicted is indicative only and is expected to vary in thickness, shape and cross-section to effectively guide the magnetic field without saturation.

FIG. 273 shows a complete C-Drive assembly consisting of twelve magnetic pole elements and three electrical phases of current carrying windings.

FIG. 274 shows the completed assembly of FIG. 273 with one pole element removed to display the current carrying windings.

FIG. 275 is an end view of the device illustrated in FIG. 274. The partial sectional view illustrates the end projection of the zigzag style current carrying windings.

FIG. 276 shows the multi-phase current carrying windings from the embodiment of FIG. 274 isolated from the rest of the assembly.

In a further variation, two of the C-Drive devices are combined on the same axis of rotation. The current carrying windings of the two C-Drive subassemblies are interconnected to form a single multi-phase winding. This completed device is referred to as the T-Drive. Alternatively the two current carrying windings could be independent—allowing for the device to be counter rotating.

FIG. 277 illustrated an embodiment consisting of two C-Drive motor/generators mounted on the same axis of rotation. The multi-phase current carrying windings of the two individual C-Drive sub-assemblies are interconnected to form a single set of multiphase windings for the device.

In a further variation to the previously presented C-Drive embodiments, the source of the magnetic flux previously employed (permanent magnetic material) is replaced with an electromagnet. A circular winding of current carrying conductors (a solenoid winding) create a magnetic field around the conductors when current is fed through them. This magnetic field is encapsulated by a set of C-shaped steel or ferrite-based flux guides that concentrate the magnetic field and direct it to an air-gap in which a second set of current carrying windings are placed.

Due to the direction of the field created in the air-gap from a single solenoid winding a single device of this type would generate pulses of voltage when the current carrying windings are rotated through the air-gap. Two devices can preferably be used in order to smooth out the generation of current or the production mechanical work from alternating current supplied to the windings.

In the embodiments presented the devices are shown mounted on the same axis back to back but they could also be interlocked such that the two electromagnetic and steel assemblies operate on the same set of current carrying windings.

FIG. 278 shows a complete Electromagnetic C-Drive embodiment featuring the electromagnetic coils and steel flux guides that generate and direct the background magnetic field as well as the current carrying windings that operate or rotate through the air gap.

FIG. 279 shows the embodiment of FIG. 278 with one of the Electromagnetic Background Field assemblies removed to show the details of the multi-phase current carrying windings.

FIG. 280 shows the embodiment of FIG. 278 with one of the steel/ferrite based flux guides removed to show the background field generating solenoid.

FIG. 281 is an end view of the device of FIG. 278. In this view one set of current carrying windings has been removed in order to show the 'C-shape' of the steel/ferrite based flux guides.

FIG. 282 depicts an alternative arrangement of the toroidal sectors of the Wave Toroidal device. In this embodiment the toroidal sectors have been positioned such that the background magnetic field is directed around a series of circular toroids through a pair of gaps in the toroids. A pair of magnetic poles are formed in the two working regions created by a single circular toroidal body.

The previously disclosed C-Shape Toroidal Drive can also be built as a radial flux machine, that is, where the working regions/gaps are positioned such that the background field produced by the toroidal sectors is delivered predominately in a direction perpendicular to the axis of rotation of the device.

This allows for the positioning of current carrying windings in these working regions/gaps where the working direction of current flow in the windings is parallel to the axis of rotation of the device. As in the previous axial flux version where inner and outer windings could be employed, current carrying windings can be built at either end of the device or at both ends of the device as shown in FIG. 284.

FIG. 283 is an end view of one of the revised C-Shaped sectors of the alternative C-shaped Toroidal device embodiment. The previously vertical working regions/gaps in the toroid are now horizontal.

FIG. 284 shows the complete alternative radial flux version of the C-shaped Toroidal device. In this embodiment two axial working regions have been created with two sets of current carrying windings.

The following devices employ a set of coil windings that form a helix that traverses a circular central path. As in previously disclosed embodiments gaps are introduced into the circular helix path in order to create working regions/gaps through which current carrying windings can be positioned and rotate.

The positioning of the gaps around the helix dictates various possible embodiments of the device including axial flux embodiments with inner and/or outer current carrying rotor windings or radial flux embodiments with axial current flow in the rotor windings.

FIG. 285 shows a radial flux embodiment of the helical toroidal drive. The current carrying windings are depicted as a single phase comprised of racetrack style coils.

FIG. 286 shows a single helical element of the background field creating coils from the embodiment depicted in FIG. 285 that shows how the background field windings progress in a helix around a circular path.

FIG. 287 shows an isolated single phase of the current carrying windings depicted for the radial flux embodiment of FIG. 285.

FIG. 288 shows a radial flux embodiment of the helical toroidal drive similar to that depicted in FIG. 285 but with current carrying windings at either end of the device.

FIG. 289 shows two sets of isolated single phase current carrying windings depicted for the radial flux embodiment of FIG. 288.

FIG. 290 shows a helical toroid configured for operation as an axial flux machine (vertical working regions/gaps).

FIG. 291 shows the Helical Toroid of FIG. 290 combined with a series of current carrying windings on the outer radius of the device.

FIG. 292 shows an isolated single phase of the current carrying windings depicted for the axial flux embodiment of FIG. 291.

The following devices consist of a cylindrical oval or torus of permanent magnetic material that has a series of gaps through which current carrying windings rotate.

FIG. 293 shows a circular array of oval shaped permanent magnets. The permanent magnets are gapped and direct their magnetic field into the gap regions.

FIG. 294 shows an individual oval shaped permanent magnet from the circular array shown in FIG. 293 showing the positioning of the gaps.

FIG. 295 shows a complete Multi-gapped permanent magnet device with three layers of multi-phase current carrying windings positioned in the gaps on either side of the device.

The following device consists of a circular array of background field coil assemblies that consist of a long straight section of windings with a 180 degree toroidal sector of windings at the outer working radius of the device and a 90 degree toroidal sector of windings at the inner working radius of the device.

In the space between this inner and outer working radius a circular array of racetrack style current carrying windings rotate. This rotor arrangement can consist of multiple racetracks in multiple phases. As a single current carrying racetrack winding rotates through the background field a voltage is generated in the windings—when connected to a suitable load a current is developed in the windings with the application of mechanical work.

Preferably, the current in the coils of the background field array flows in the same orientation such that the voltage and current generated in the current carrying windings consists of a series of sequential pulses of the same polarity.

Alternatively the direction of current flow in successive elements could be reversed and the generated pulses of voltage and current would be of alternating polarity.

It is also readily possible to build a motor from this arrangement by powering the rotating windings with either unipolar pulses or pulses of alternating polarity.

FIG. 296 shows an embodiment of the DC Drive consisting of a circular array of shaped coils that direct magnetic field in to a working region in which a set of rotating current carrying windings are placed.

FIG. 297 shows the circular array of shaped background field producing windings of FIG. 296 shown in isolation.

FIG. 298 shows the current carrying rotor assembly of FIG. 296 consisting of multiple phases of racetrack coil windings shown in isolation.

FIG. 299 is an end view of one set of the shaped coils from FIG. 296.

FIG. 300 shows the shaped coils of FIG. 299 with a current carrying racetrack winding shown. The arrows indicate the dominant direction of magnetic field exiting the background field coils.

In further variation to the embodiment of FIG. 296 the shape of the circular array of shaped coils has been modified such that the coils now have angled sides so that they better interlock. In this arrangement magnetic field is directed to the rotor elements for a greater portion of the rotor's rotational period.

In further variations shown in FIG. 305 and FIG. 306, the point at which the magnetic field is directed to the upper section of the current carrying rotor windings has been shifted as indicated and in FIG. 306 the shape of the upper section of the current carrying rotor windings modified to come to an angular peak.

FIG. 301 shows a variation of the embodiment of FIG. 296 where the background field producing coils are more wedge shaped and interlock more completely.

FIG. 302 shows the embodiment of FIG. 301 with one sector from one side of the now wedge shaped background field coils removed to show the current carrying windings.

FIG. 303 shows the current carrying windings of FIG. 301 shown with one sector of the wedge shaped coils for context.

FIG. 304 is a cross section of one sector of the wedge shaped variation presented in FIG. 301 showing both the background field producing windings and the current carrying rotor windings. The arrows indicate the dominant direction of magnetic field exiting the background field coils.

FIG. 305 shows a further variation in the positioning of the background field producing coils of the devices in FIG. 296 and FIG. 301. In this variation the magnetic field is directed to the upper vertical section of the current carrying windings. The arrows indicate the dominant direction of magnetic field exiting the background field coils.

FIG. 306 shows a further variation in the positioning of the background field producing coils of the devices in FIG. 296 and FIG. 301. In this variation the upper horizontal section of the current carrying windings has been modified as shown with the magnetic field is directed perpendicularly across this revised upper section. The arrows indicate the dominant direction of magnetic field exiting the background field coils.

In a further variation to the 3 Toroidal Layer Drive, the rotating middle toroid that is usually constructed from normally conducting materials is powered by an AC current wave form that is a maximum at the mid-point when traversing between two outer toroidal sectors and is a zero when moving past the constituent coils of the outer toroidal assemblies. The outer toroids that are normally made from superconducting material have the direction of current sequentially reversed around the circular array. The application of the AC waveform to the inner toroid results the rotation of this inner toroid.

It would obvious to those skilled in the art that by spinning and applying torque to the inner toroidal rotor that the AC electrical energy could be generated in the inner toroidal windings.

FIG. 307 shows a variation of the 3 Toroidal Layer Device where coil elements of the two outer toroidal layers alternate in polarity and the inner rotor layer operates on AC current.

The following embodiments show a couple variations on the previously presented radial flux C-Shape Toroidal devices. The devices presented utilise rotating current carrying windings in two working regions/gaps in the device. The main variations from previously depicted embodiments are:

The number of magnetic poles developed by the background toroidal windings has been significantly increased thus demonstrating a variation in device construction that can be applied to all of the multi-pole or AC devices presented so far.

Two versions of the background field toroids are presented:
  the first is constructed from a series of racetrack style individual windings (FIG. 308) and;
  the second where the inner and outer halves of the toroid winding that produce a pole pair are each wound as a continuous winding (FIG. 310). This continuous winding helps to seal the generated magnetic flux within the toroidal sectors.

The rotating current carrying windings shown in the embodiments presented are depicted as two sets of multi-phase bedstead style coils. In a preferred embodiment the two sets of windings are interconnected such that there is an angular displacement of connected windings equal to the angle between successive magnetic poles. In this manner the two windings can be controlled as one multi-phase winding.

In an alternative embodiment each of the two multiphase windings are separate and are controlled separately.

In light of this disclosure, it would be clear to a person skilled in the art:

that any of the technologies disclosed to date that rely on toroidal coils could be readily constructed using arrangements of discrete sub-coils (open toroids/windings) or by a continuous winding of conductive material in a toroid or toroidal sector (sealed or closed windings/toroids)

that where toroidal windings have been used to direct flux to an air gap or working region, that these windings could be replaced by permanent magnetic material, with or without ferromagnetic flux guides, that direct the flux to these regions in a like fashion.

that where attributions have been made regarding one part of the device being the 'rotor' and another being the 'stator' that these designations simply imply relative rotation between the two parts and that the rotating and stationary roles or designations could readily reversed such that previously stationary parts rotate and rotating parts are stationary.

That with devices that operate on the principle of maintaining one DC or stationary (background) magnetic field and one alternating magnetic field that it is equally acceptable that the background field alternate in polarity and the current carrying windings that previously produced the alternating field produce a stationary field.

That where an alternating current is employed that that wave form of that current could suitably be any shape of waveform such that continuous rotation or generation of the device results and that such waveform maybe shaped to produce a minimum of ripple in the power output of the motor or generator.

That where a device has been described as a motor, producing mechanical work upon the application of electrical energy, that the reverse scenario of a generator that produces electrical energy on the application of mechanical work is also claimed.

The where a device has been described as a generator that the reverse scenario where the device operates as a motor is also claimed.

FIG. 308 shows a radial flux embodiment of the C-shape Toroidal device that is an 80 Pole device featuring background field coils constructed from discrete sets of 'racetrack' style windings.

FIG. 309 shows the C-shape toroidal device of FIG. 308 with all but one of the background field producing coils removed in order to show the arrangement of the two sets of bedstead style multi-phase current carrying windings.

FIG. 310 shows a radial flux C-shaped device similar to that depicted in FIG. 308 but with the background field coil sets shown as continuous windings rather than arrangements of discrete sub-coils.

FIG. 311 shows the current carrying windings of the device of FIG. 310 with one sector of the pole pair shown to indicate placement of the windings.

FIG. 312 depicts an alternative arrangement of the of the Star Toroidal device. In this embodiment the previously disclosure rotor has been removed and instead the rotor is formed by the inner toroidal segments. The outer toroidal windings are stationary and provide the DC background field. These outer toroidal windings are preferably constructed from superconducting wire. The inner toroidal windings are preferably constructed from copper but may also be made from a superconducting wire suitable for AC current. The current in these inner toroidal rotor windings is switched in order to provide continuous rotation when motoring or alternatively produce an AC current when in generator mode.

The stationary outer toroid windings are housed in a cryostat and the inner toroidal windings are support by suitable rotor structure as shown in FIG. 313.

The rotor can also be constructed from more than a single phase. A three phase variation is shown in FIG. 314. The three phase rotor enables smoother torque delivery and allows the motor to self-start at any rotor position.

FIG. 315 shows a 3D view of the inner toroidal 3 phase rotor winding.

FIG. 316 depicts a magnetic gearbox utilising permanent magnet segments mounted to an input shaft and output shaft with alternate polarity such that mechanical torque is transferred between the input and output without mechanical contact by way of magnetic forces. The disclosed magnetic gearbox could be implement with the geared toroidal drive previously disclosed whereby the output of multiple rotors are combined into a single shaft output and a given gear ratio. A six input gearbox is shown with a 4:1 ratio to the output shaft.

FIG. 317 shows a preferred arrangement of the magnetic segments in alternate polarity in order to transfer torque. For clarity only the effective polarity of the working magnetic face has been indicated. The magnets are magnetised in the radial direction. The strength of the magnet, the gaps between the input and output shafts and the axial length of the gearbox all affect the torque capacity of the gearbox. The concept could also be readily constructed by a person skilled in the art in an axial formation. The gearbox could also be run in the reverse direction.

FIG. 318 shows a variation of the device of FIG. 316 there the previously straight wedges of permanent magnetic material are now 'S-shaped' or feature a series of bends along the length of the inner and outer gear elements. These bends help to reduce the overall length of the device. The direction of magnetisation of the individual gear magnets alternates in the same manner shown in FIG. 317. Only the magnets are depicted, the required supporting structure is not shown for clarity.

FIG. 319 depicts an axial style embodiment of the magnetic gear system where the predominant direction of gears working magnetic field is along the axis of rotation.

FIG. 320 depicts a detail view of the device of FIG. 319 indicating directions of relative magnetisation.

FIG. 321 depicts an axial style embodiment similar to that of FIG. 319 but with wedge shaped permanent magnetic elements that better interlock around the radius of the gears.

FIG. 322 depicts a further variation of the device shown in FIG. 319 where the permanent magnetic elements are 'S-shaped' or feature a series of bends to reduce the volume of the device.

A further variation is the stacking of multiple axial style gears along the axis of rotation of the device in order to increase the torque capacity of the gear system.

It would be obvious to a person skilled in the art that steel or ferromagnetic backing could be used in the magnet assemblies to direct, contain and strengthen the magnetic flux in the gap region between the gears.

The embodiments shown have 6 pinion rotors inside a ring gear but could be readily extended to any number of pinions and any gear ratio. The pinions could also be mounted external to the ring gear.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. An electromagnetic device, comprising:
    a stator;
    a rotor; and
    a gap comprising one or more gap regions;
    wherein:
        one of the rotor and the stator includes a conductor array accommodated in the gap, the conductor array having one or more conductors each configured to carry current in a respective current-flow direction and configured to move relative to the other of the rotor and stator;
        the other of the rotor and stator includes electromagnetic coils wound in the form of one or more toroidal sectors, each toroidal sector comprising end portions and an intermediate portion between the end portions;
        the end portions of each of the one or more toroidal sectors are configured to direct magnetic flux through a respective gap region in a substantially perpendicular direction to the respective current-flow direction of the one or more conductors moving through the respective gap region; and
        the intermediate portion of each of the one or more toroidal sectors is configured to redirect magnetic flux exiting from a respective gap region to the same or different gap region to facilitate at least one circulating magnetic flux path through the one or more gap regions.

2. The electromagnetic device of claim 1 wherein the at least one circulating magnetic flux path forms a single closed loop.

3. The electromagnetic device of claim 1 wherein the at least one circulating magnetic flux path forms multiple closed loops.

4. The electromagnetic device of claim 1 wherein the electromagnetic coils include superconducting coils.

5. The electromagnetic device of claim 4, wherein the at least one superconducting coils are at least partially enclosed within a cryogenic envelope.

6. The electromagnetic device of claim 1 wherein the electromagnetic coils are in the form of one or more racetrack coils.

7. The electromagnetic device of claim 6, wherein the one or more racetrack coils consist of first and second concentric racetrack coils both configured to carry current in the same direction.

8. The electromagnetic device of claim 1, wherein the other of the rotor or stator includes one or more permanent magnets.

9. The electromagnetic device of claim 1, wherein the other of the rotor or stator includes one or more ferromagnetic flux guides.

10. The electromagnetic device of claim 1 wherein the magnetic flux through the respective gap region is in a radial direction of the rotor and the current-flow direction is in an axial direction of the rotor.

11. The electromagnetic device of claim 10, wherein the one or more toroidal sectors comprises one or more inner toroidal sectors and one or more outer toroidal sectors and wherein the gap is formed between the inner and outer toroidal sectors.

12. The electromagnetic device of claim 10, wherein the conductor array is cylindrical in shape.

13. The electromagnetic device of claim 12, wherein the conductor array is arranged in a zig-zag winding along the length of the cylindrical shape.

14. The electromagnetic device of claim 10, wherein the conductor array includes one or more racetrack coils.

15. The electromagnetic device of claim 10, wherein the conductor array is formed from one or more bedstead-style windings.

16. The electromagnetic device of claim 1 wherein the magnetic flux through the respective gap region is in an axial direction of the rotor and the current-flow direction is in a radial direction of the rotor.

17. The electromagnetic device of claim 16 wherein the conductor array is in the form of a disc.

18. The electromagnetic device of claim 17 wherein the conductor array is arranged in a zig-zag winding along the radial direction of the disc.

19. The electromagnetic device of claim 16, wherein the conductor array includes one or more racetrack coils.

20. The electromagnetic device of claim 16, wherein the conductor array is formed from one or more bedstead-style windings.

* * * * *